US012739381B2

(12) United States Patent
Lim et al.

(10) Patent No.: US 12,739,381 B2
(45) **Date of Patent: *Sep. 15, 2026**

(54) QUANTIZATION MATRIX ENCODING/DECODING METHOD AND DEVICE, AND RECORDING MEDIUM IN WHICH BITSTREAM IS STORED

(71) Applicants: Electronics and Telecommunications Research Institute, Daejeon (KR); CHIPS & MEDIA, INC, Seoul (KR)

(72) Inventors: Sung Chang Lim, Daejeon (KR); Jung Won Kang, Daejeon (KR); Ha Hyun Lee, Seoul (KR); Jin Ho Lee, Daejeon (KR); Hui Yong Kim, Daejeon (KR); Dae Yeon Kim, Seoul (KR)

(73) Assignees: Electronics and Telecommunications Research Institute, Daejeon (KR); CHIPS & MEDIA, INC, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 19/267,424

(22) Filed: Jul. 11, 2025

(65) Prior Publication Data

US 2025/0343912 A1 Nov. 6, 2025

Related U.S. Application Data

(63) Continuation of application No. 18/674,647, filed on May 24, 2024, now Pat. No. 12,389,000, which is a (Continued)

(30) Foreign Application Priority Data

Dec. 26, 2018 (KR) ........................ 10-2018-0169896
Mar. 6, 2019 (KR) ........................ 10-2019-0026003

(Continued)

(51) Int. Cl.
*H04N 19/124* (2014.01)
*H04N 19/159* (2014.01)

(Continued)

(52) U.S. Cl.
CPC ......... *H04N 19/124* (2014.11); *H04N 19/159* (2014.11); *H04N 19/176* (2014.11); *H04N 19/186* (2014.11)

(58) Field of Classification Search
None
See application file for complete search history.

(56) References Cited

U.S. PATENT DOCUMENTS 9,253,483 B2 * 2/2016 Lou ...................... H04N 19/124
11,350,127 B2 * 5/2022 Tsukuba .............. H04N 19/176

(Continued)

FOREIGN PATENT DOCUMENTS

CN 104170382 A 11/2014
CN 104521232 A 4/2015

(Continued)

OTHER PUBLICATIONS

Office Action for CN 201980086403.3 by China National Intellectual Property Administration dated Nov. 6, 2023.

(Continued)

*Primary Examiner* — Tyler W. Sullivan
(74) *Attorney, Agent, or Firm* — BROADVIEW IP LAW, PC

(57) ABSTRACT

Disclosed herein is a method of encoding/decoding an image. The image decoding method includes decoding information on a quantization matrix from a bitstream, acquiring a quantization matrix of a current block based on the information on the quantization matrix, and dequantizing the current block using the quantization matrix of the current block. The acquiring of the quantization matrix of the (Continued)

| scaling_list_data( ) { | Descriptor |
|---|---|
| for( sizeId = 0; sizeId < 6; sizeId++ ) | |
| for( matrixId = 0; matrixId < 6; matrixId += ( sizeId = = 6 ) ? 3 : 1 ) { | |
| if( ! ( ( sizeId == 0 ) && ( matrixId % 3 == 0 ) ) ) { | |
| **scaling_list_pred_mode_flag[ sizeId ][ matrixId ]** | u(1) |
| if( !scaling_list_pred_mode_flag[ sizeId ][ matrixId ] ) | |
| **scaling_list_pred_matrix_id_delta[ sizeId ][ matrixId ]** | ue(v) |
| else { | |
| nextCoef = 8 | |
| coefNum = Min( 64, ( 1 << ( 2 + ( sizeId << 1 ) ) ) ) | |
| if( sizeId > 2 ) { | |
| **scaling_list_dc_coef_minus8[ sizeId − 3 ][ matrixId ]** | se(v) |
| nextCoef = scaling_list_dc_coef_minus8[ sizeId − 3 ][ matrixId ] + 8 | |
| } | |
| for( i = 0; i < coefNum; i++ ) { | |
| **scaling_list_delta_coef** | se(v) |
| nextCoef = ( nextCoef + scaling_list_delta_coef + 256 ) % 256 | |
| ScalingList[ sizeId ][ matrixId ][ i ] = nextCoef | |
| } | |
| } | |
| } | |
| } | |
| } | |

current block includes deriving a single identifier using at least one of a size of the current block, a prediction mode or a color component, and acquiring the quantization matrix of the current block based on the single identifier.

3 Claims, 92 Drawing Sheets

Related U.S. Application Data continuation of application No. 17/418,690, filed as application No. PCT/KR2019/018432 on Dec. 24, 2019, now Pat. No. 12,034,929.

(30) Foreign Application Priority Data

| | | |
|---|---|---|
| Mar. 8, 2019 | (KR) | 10-2019-0026850 |
| Mar. 25, 2019 | (KR) | 10-2019-0033329 |
| Jun. 17, 2019 | (KR) | 10-2019-0071310 |
| Jun. 18, 2019 | (KR) | 10-2019-0072278 |

(51) Int. Cl.
*H04N 19/176* (2014.01)
*H04N 19/186* (2014.01)

(56) References Cited

U.S. PATENT DOCUMENTS

| | | | | |
|---|---|---|---|---|
| 2015/0189289 | A1 | 7/2015 | Kim et al. | |
| 2015/0334396 | A1 | 11/2015 | Lim et al. | |
| 2016/0212429 | A1 | 7/2016 | Ichigaya et al. | |
| 2018/0310005 | A1 | 10/2018 | Kim et al. | |
| 2023/0232003 | A1* | 7/2023 | De Lagrange | H04N 19/126 375/240.03 |
| 2023/0396769 | A1 | 12/2023 | Lim et al. | |

FOREIGN PATENT DOCUMENTS

| | | | |
|---|---|---|---|
| CN | 105580368 | A | 5/2016 |
| EP | 2806640 | A1 | 11/2014 |
| KR | 100772576 | B1 | 11/2007 |
| KR | 1020140089583 | A | 7/2014 |
| KR | 1020180044944 | A | 5/2018 |
| KR | 1020180080334 | A | 7/2018 |
| KR | 101875206 | B1 | 8/2018 |
| WO | 2001086962 | A1 | 11/2001 |
| WO | 2012108237 | A1 | 8/2012 |
| WO | 2012172779 | A1 | 12/2012 |
| WO | 2013070766 | A1 | 5/2013 |
| WO | 2017052174 | A1 | 3/2017 |

OTHER PUBLICATIONS

Alshina, Elena et al., "CE7: Experimental results of fast ROT by Samsung," Joint Collaborative Team on Video Coding (JCT-VC) of ITU-T SG16 WP3 and ISO/IEC JTC1/SC29/WG11. Jan. 2011. doc: JCTVC-D357.

Elena Alshina et al., CE7: Experimental results of fast ROT by Samsung, Joint Collaborative Team on Video Coding (JCT-VC) of ITU-T SG16 WP3 and ISO/IEC JTC1/SC29/WGII, 4th Meeting: Daegu, KR, Jan. 20-28, 2011, Document: JCTVC-D357, Samsung Electronics Co., Ltd.

Olena Chubach et al., CE7-related: Support of quantization matrices for VVC, Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N0847-v1, MediaTek Inc., Panasonic, Electronics and Telecommunications Research Institute (ETRI).

Olena Chubach et al., CE7-related: Support of signalling default and user-defined scaling matrices, Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N0090-v2, MediaTek Inc.

* cited by examiner

--Prior Art--

--Prior Art--

--Prior Art--

--Prior Art--

--Prior Art--

FIG. 9

| size | Intra Prediction Mode | | Inter Prediction Mode | |
|---|---|---|---|---|
| | Luma Block | Chroma Block | Luma Block | Chroma Block |
| MxM<br>(M = 4) | {6,9,12,22,<br>8,12,24,31,<br>12,16,30,35,<br>13,17,32,38} | {11,12,14,19,<br>12,14,20,23,<br>14,16,23,25,<br>14,16,24,27} | {10,15,26,39,<br>13,18,39,49,<br>16,29,50,58,<br>23,42,56,62} | {14,15,18,20,<br>15,16,20,22,<br>16,18,22,24,<br>17,21,24,25} |
| MxN<br>(M > 4 or N > 4) | {11,11,12,14,17,18,19,19,<br>11,11,12,16,19,20,21,21,<br>11,12,13,18,24,26,27,27,<br>11,12,14,19,29,32,33,33,<br>12,13,16,22,32,36,38,38,<br>12,15,18,27,36,39,40,41,<br>13,16,19,29,35,40,41,42,<br>13,16,21,30,37,40,42,42} | {2,2,2,8,20,24,28,28,<br>2,2,2,16,28,34,36,38,<br>2,2,6,24,48,56,60,60,<br>2,2,8,28,70,80,84,86,<br>2,6,18,40,82,98,104,104,<br>2,12,24,60,96,108,114,116,<br>6,16,28,68,94,112,118,120,<br>6,16,36,72,102,114,120,122} | {14,14,15,17,19,20,20,21,<br>14,15,16,18,19,21,21,22,<br>15,15,17,18,20,22,23,24,<br>15,16,18,20,22,23,24,25,<br>16,17,20,21,24,25,26,27,<br>16,17,20,22,25,26,27,27,<br>17,18,21,23,25,27,28,28,<br>17,18,21,24,26,27,28,28} | {5,5,14,32,44,52,59,62,<br>5,10,17,34,50,61,68,70,<br>8,12,25,37,57,70,84,91,<br>10,17,34,52,73,84,95,104,<br>17,26,52,66,88,98,113,116,<br>23,32,57,73,97,107,118,122,<br>26,35,62,84,102,118,124,125,<br>30,35,64,89,107,120,124,125} |

FIG. 10

| size | Intra Prediction Mode | | Inter Prediction Mode | | Intra Block Copy Mode | |
|---|---|---|---|---|---|---|
| | Luma Block | Chroma Block | Luma Block | Chroma Block | Luma Block | Chroma Block |
| MxM (M = 2) | | {11,14,<br>14, 23} | | {14,18,<br>16,72} | | {11,14,<br>14, 23} |
| MxM (M = 4) | {6,9,12,22,<br>8,12,24,31,<br>12,16,30,35,<br>13,17,32,38} | {11,12,14,19,<br>12,14,20,23,<br>14,16,23,25,<br>14,16,24,27} | {10,15,26,39,<br>13,18,39,49,<br>16,29,50,58,<br>23,42,56,62} | {14,15,18,20,<br>15,16,20,22,<br>16,18,22,24,<br>17,21,24,25} | {6,9,12,22,<br>8,12,24,31,<br>12,16,30,35,<br>13,17,32,38} | {11,12,14,19,<br>12,14,20,23,<br>14,16,23,25,<br>14,16,24,27} |
| MxN (M > 4 or N > 4) | {11,11,12,14,17,18,19,19,<br>11,11,12,16,19,20,21,21,<br>11,12,13,18,24,26,27,27,<br>11,12,14,19,29,32,33,33,<br>12,13,16,22,32,36,38,38,<br>12,15,18,27,36,39,40,41,<br>13,16,19,29,35,40,41,42,<br>13,16,21,30,37,40,42,42} | {2,2,2,8,20,24,28,28,<br>2,2,2,16,28,34,36,38,<br>2,2,6,24,48,56,60,60,<br>2,2,8,28,70,80,84,86,<br>2,6,18,40,82,98,104,104,<br>2,12,24,60,96,108,114,11<br>6,<br>6,16,28,68,94,112,118,12<br>0,<br>6,16,36,72,102,114,120,1<br>22} | {14,14,15,17,19,20,20,21,<br>14,15,16,18,19,21,21,22,<br>15,15,17,18,20,22,23,24,<br>15,16,18,20,22,23,24,25,<br>16,17,20,21,24,25,26,27,<br>16,17,20,22,25,26,27,27,<br>17,18,21,23,25,27,28,28,<br>17,18,21,24,26,27,28,28} | {5,5,14,32,44,52,59,62,<br>5,10,17,34,50,61,68,70,<br>8,12,25,37,57,70,84,91,<br>10,17,34,52,73,84,95,104,<br>17,25,51,66,98,98,113,11<br>6,<br>23,32,57,73,97,107,118,1<br>22,<br>26,35,62,84,102,118,124,<br>125,<br>30,35,64,89,107,120,124,<br>125} | {11,11,12,14,17,18,19,19,<br>11,11,12,16,19,20,21,21,<br>11,12,13,18,24,26,27,27,<br>11,12,14,19,29,32,33,33,<br>12,13,16,22,32,36,38,38,<br>12,15,18,27,36,39,40,41,<br>13,16,19,29,35,40,41,42,<br>13,16,21,30,37,40,42,42} | {2,2,2,8,20,24,28,28,<br>2,2,2,16,28,34,36,38,<br>2,2,6,24,48,56,60,60,<br>2,2,8,28,70,80,84,86,<br>2,6,18,40,82,98,104,104,<br>2,12,24,60,96,108,114,11<br>6,<br>6,16,28,68,94,112,118,12<br>0,<br>6,16,36,72,102,114,120,1<br>22} |

FIG. 11

| size/form | Intra Prediction Mode | | Inter Prediction Mode | | Intra Block Copy Mode | |
|---|---|---|---|---|---|---|
| | Luma Block | Chroma Block | Luma Block | Chroma Block | Luma Block | Chroma Block |
| MxM<br>(M = 4) | {6,9,12,22,<br>8,12,24,31,<br>12,16,30,35,<br>13,17,32,38} | {11,12,14,19,<br>12,14,20,23,<br>14,16,23,25,<br>14,16,24,27} | {10,15,26,39,<br>13,18,39,49,<br>16,29,50,58,<br>23,42,56,62} | {14,15,18,20,<br>15,16,20,22,<br>16,18,22,24,<br>17,21,24,25} | {6,9,12,22,<br>8,12,24,31,<br>12,16,30,35,<br>13,17,32,38} | {11,12,14,19,<br>12,14,20,23,<br>14,16,23,25,<br>14,16,24,27} |
| MxN<br>(M > 4 or N > 4) | {11,11,12,14,17,18,19,19,<br>11,11,12,16,19,20,21,21,<br>11,12,13,18,24,26,27,27,<br>11,12,14,19,29,32,33,33,<br>12,13,16,22,32,36,38,38,<br>12,15,18,27,36,39,40,41,<br>13,16,19,29,35,40,41,42,<br>13,16,21,30,37,40,42,42} | {2,2,2,8,20,24,28,28,<br>2,2,2,16,28,34,36,38,<br>2,2,6,24,48,56,60,60,<br>2,2,8,28,70,80,84,86,<br>2,6,18,40,82,98,104,104,<br>2,12,24,60,96,108,114,116,<br>6,16,28,68,94,112,118,120,<br>6,16,36,72,102,114,120,12<br>2} | {14,14,15,17,19,20,20,21,<br>14,15,16,18,19,21,21,22,<br>15,15,17,18,20,22,23,24,<br>15,16,18,20,22,23,24,25,<br>16,17,20,21,24,25,26,27,<br>16,17,20,22,25,26,27,27,<br>17,18,21,23,25,27,28,28,<br>17,18,21,24,26,27,28,28} | {5,5,14,32,44,52,59,62,<br>5,10,17,34,50,61,68,70,<br>8,12,25,37,57,70,84,91,<br>10,17,34,52,73,84,95,104,<br>17,26,52,66,88,98,113,116,<br>23,32,57,73,97,107,118,12<br>2,<br>26,35,62,84,102,118,124,1<br>25,<br>30,35,64,89,107,120,124,1<br>25} | {11,11,12,14,17,18,19,19,<br>11,11,12,16,19,20,21,21,<br>11,12,13,18,24,26,27,27,<br>11,12,14,19,29,32,33,33,<br>12,13,16,22,32,36,38,38,<br>12,15,18,27,36,39,40,41,<br>13,16,19,29,35,40,41,42,<br>13,16,21,30,37,40,42,42} | {2,2,2,8,20,24,28,28,<br>2,2,2,16,28,34,36,38,<br>2,2,6,24,48,56,60,60,<br>2,2,8,28,70,80,84,86,<br>2,6,18,40,82,98,104,104,<br>2,12,24,60,96,108,114,116,<br>6,16,28,68,94,112,118,120,<br>6,16,36,72,102,114,120,12<br>2} |
| non-square<br>MxN<br>(M > 4 or N > 4)<br><br>예: 8x2, 2x8, 8x4,<br>4x8,<br>16x4, 4x16, 16x8,<br>8x16,<br>32x4, 4x32<br>32x8, 8x32<br>32x16, 16x32 등 | {14,14,15,17,19,20,20,21,<br>14,15,16,18,19,21,21,22,<br>15,15,17,18,20,22,23,24,<br>15,16,18,20,22,23,24,25,<br>16,17,20,21,24,25,26,27,<br>16,17,20,22,25,26,27,27,<br>17,18,21,23,25,27,28,28,<br>17,18,21,24,26,27,28,28} | {5,5,14,32,44,52,59,62,<br>5,10,17,34,50,61,68,70,<br>8,12,25,37,57,70,84,91,<br>10,17,34,52,73,84,95,104,<br>17,26,52,66,88,98,113,116,<br>23,32,57,73,97,107,118,12<br>2,<br>26,35,62,84,102,118,124,1<br>25,<br>30,35,64,89,107,120,124,1<br>25} | {11,11,12,14,17,18,19,19,<br>11,11,12,16,19,20,21,21,<br>11,12,13,18,24,26,27,27,<br>11,12,14,19,29,32,33,33,<br>12,13,16,22,32,36,38,38,<br>12,15,18,27,36,39,40,41,<br>13,16,19,29,35,40,41,42,<br>13,16,21,30,37,40,42,42} | {2,2,2,8,20,24,28,28,<br>2,2,2,16,28,34,36,38,<br>2,2,6,24,48,56,60,60,<br>2,2,8,28,70,80,84,86,<br>2,6,18,40,82,98,104,104,<br>2,12,24,60,96,108,114,116,<br>6,16,28,68,94,112,118,120,<br>6,16,36,72,102,114,120,12<br>2} | {14,14,15,17,19,20,20,21,<br>14,15,16,18,19,21,21,22,<br>15,15,17,18,20,22,23,24,<br>15,16,18,20,22,23,24,25,<br>16,17,20,21,24,25,26,27,<br>16,17,20,22,25,26,27,27,<br>17,18,21,23,25,27,28,28,<br>17,18,21,24,26,27,28,28} | {5,5,14,32,44,52,59,62,<br>5,10,17,34,50,61,68,70,<br>8,12,25,37,57,70,84,91,<br>10,17,34,52,73,84,95,104,<br>17,26,52,66,88,98,113,116,<br>23,32,57,73,97,107,118,12<br>2,<br>26,35,62,84,102,118,124,1<br>25,<br>30,35,64,89,107,120,124,1<br>25} |

FIG. 12

| size/form | PRIMARY TRANSFORM TYPE: FIRST TRANSFORM IS USED FOR VERTICAL TRANSFORM OR HORIZONTAL TRANSFORM (trTypeHor = 0 or trTypeVer = 0) | | | | PRIMARY TRANSFORM TYPE: SECOND TRANSFORM IS USED FOR VERTICAL TRANSFORM OR HORIZONTAL TRANSFORM (trTypeHor > 0 or trTypeVer > 0) | |
|---|---|---|---|---|---|---|
| | Intra Prediction Mode | | Inter Prediction Mode | | Intra Prediction Mode | Inter Prediction Mode |
| | Luma Block | Chroma Block | Luma Block | Chroma Block | Luma Block | Luma Block |
| MxM (M = 4) | {6,9,12,22, 8,12,24,31, 12,16,30,35, 13,17,32,38} | {11,12,14,19, 12,14,20,23, 14,16,23,25, 14,16,24,27} | {10,15,26,39, 13,18,39,49, 16,29,50,58, 23,42,56,62} | {14,15,18,20, 15,16,20,22, 16,18,22,24, 17,21,24,25} | {11,12,14,19, 12,14,20,23, 14,16,23,25, 14,16,24,27} | {14,15,18,20, 15,16,20,22, 16,18,22,24, 17,21,24,25} |
| MxN (M > 4 or N > 4) | {11,11,12,14,17,18,19,19, 11,11,12,16,19,20,21,21, 11,12,13,18,24,26,27,27, 11,12,14,19,29,32,33,33, 12,13,16,22,32,36,38,38, 12,15,18,27,36,39,40,41, 13,16,19,29,35,40,41,42, 13,16,21,30,37,40,42,42} | {2,2,2,8,20,24,28,28, 2,2,2,16,28,34,36,38, 2,2,6,24,48,56,60,60, 2,2,8,28,70,80,84,86, 2,6,18,40,82,98,104,104, 2,12,24,60,96,108,114,116, 6,16,28,68,94,112,118,120, 6,16,36,72,102,114,120,122} | {14,14,15,17,19,20,20,21, 14,15,16,18,19,21,21,22, 15,15,17,18,20,22,23,24, 15,16,18,20,22,23,24,25, 16,17,20,21,24,25,26,27, 16,17,20,22,25,26,27,27, 17,18,21,23,25,27,28,28, 17,18,21,24,26,27,28,28} | {5,5,14,32,44,52,59,62, 5,10,17,34,50,61,68,70, 8,12,25,37,57,70,84,91, 10,17,34,52,73,84,95,104, 17,26,52,66,88,98,113,116, 23,32,57,73,97,107,118,122, 26,35,62,84,102,118,124,125, 30,35,64,89,107,120,124,125} | {2,2,2,8,20,24,28,28, 2,2,2,16,28,34,36,38, 2,2,6,24,48,56,60,60, 2,2,8,28,70,80,84,86, 2,6,18,40,82,98,104,104, 2,12,24,60,96,108,114,116, 6,16,28,68,94,112,118,120, 6,16,36,72,102,114,120,122} | {5,5,14,32,44,52,59,62, 5,10,17,34,50,61,68,70, 8,12,25,37,57,70,84,91, 10,17,34,52,73,84,95,104, 17,26,52,66,88,98,113,116, 23,32,57,73,97,107,118,122, 26,35,62,84,102,118,124,125, 30,35,64,89,107,120,124,125} |

FIG. 13

| size/form | TWO-DIMENSIONAL TRANSFORM COMBINATION: FIRST TRANSFORM IS USED FOR AT LEAST ONE OF VERTICAL TRANSFORM AND HORIZONTAL TRANSFORM (trTypeHor = 0 and trTypeVer = 0) | | | | TWO-DIMENSIONAL TRANSFORM COMBINATION: SECOND TRANSFORM IS USED FOR AT LEAST ONE OF VERTICAL TRANSFORM AND HORIZONTAL TRANSFORM (trTypeHor > 0 and trTypeVer > 0) | |
|---|---|---|---|---|---|---|
| | Intra Prediction Mode | | Inter Prediction Mode | | Intra Prediction Mode | Inter Prediction Mode |
| | Luma Block | Chroma Block | Luma Block | Chroma Block | Luma Block | Luma Block |
| MxM (M = 4) | {6,9,12,22,<br>8,12,24,31,<br>12,16,30,35,<br>13,17,32,38} | {11,12,14,19,<br>12,14,20,23,<br>14,16,23,25,<br>14,16,24,27} | {10,15,26,39,<br>13,18,39,49,<br>16,29,50,58,<br>23,42,56,62} | {14,15,18,20,<br>15,16,20,22,<br>16,18,22,24,<br>17,21,24,25} | {11,12,14,19,<br>12,14,20,23,<br>14,16,23,25,<br>14,16,24,27} | {14,15,18,20,<br>15,16,20,22,<br>16,18,22,24,<br>17,21,24,25} |
| MxN (M > 4 or N > 4) | {11,11,12,14,17,18,19,19,<br>11,11,12,16,19,20,21,21,<br>11,12,13,18,24,26,27,27,<br>11,12,14,19,29,32,33,33,<br>12,13,16,22,32,36,38,38,<br>12,15,18,27,36,39,40,41,<br>13,16,19,29,35,40,41,42,<br>13,16,21,30,37,40,42,42} | {2,2,2,8,20,24,28,28,<br>2,2,2,16,28,34,36,38,<br>2,2,6,24,48,56,60,60,<br>2,2,8,28,70,80,84,86,<br>2,6,18,40,82,98,104,104,<br>2,12,24,60,96,108,114,116,<br>6,16,28,68,94,112,118,120,<br>6,16,36,72,102,114,120,122} | {14,14,15,17,19,20,20,21,<br>14,15,16,18,19,21,21,22,<br>15,15,17,18,20,22,23,24,<br>15,16,18,20,22,23,24,25,<br>16,17,20,21,24,25,26,27,<br>16,17,20,22,25,26,27,27,<br>17,18,21,23,25,27,28,28,<br>17,18,21,24,26,27,28,28} | {5,5,14,32,44,52,59,62,<br>5,10,17,34,50,61,68,70,<br>8,12,25,37,57,70,84,91,<br>10,17,34,52,73,84,95,104,<br>17,26,52,66,88,98,113,116,<br>23,32,57,73,97,107,118,122,<br>26,35,62,84,102,118,124,125,<br>30,35,64,89,107,120,124,125} | {2,2,2,8,20,24,28,28,<br>2,2,2,16,28,34,36,38,<br>2,2,6,24,48,56,60,60,<br>2,2,8,28,70,80,84,86,<br>2,6,18,40,82,98,104,104,<br>2,12,24,60,96,108,114,116,<br>6,16,28,68,94,112,118,120,<br>6,16,36,72,102,114,120,122} | {5,5,14,32,44,52,59,62,<br>5,10,17,34,50,61,68,70,<br>8,12,25,37,57,70,84,91,<br>10,17,34,52,73,84,95,104,<br>17,26,52,66,88,98,113,116,<br>23,32,57,73,97,107,118,122,<br>26,35,62,84,102,118,124,125,<br>30,35,64,89,107,120,124,125} |

FIG. 14

| size/ form | TWO-DIMENSIONAL TRANSFORM COMBINATION: FIRST TRANSFORM IS USED FOR AT LEAST ONE OF VERTICAL TRANSFORM AND HORIZONTAL TRANSFORM (mts_idx == -1) | | | | TWO-DIMENSIONAL TRANSFORM COMBINATION: SECOND TRANSFORM IS USED FOR AT LEAST ONE OF VERTICAL TRANSFORM AND HORIZONTAL TRANSFORM (mts_idx > -1 or mts_idx >= 0) | |
|---|---|---|---|---|---|---|
| | Intra Prediction Mode | | Inter Prediction Mode | | Intra Prediction Mode | Inter Prediction Mode |
| | Luma Block | Chroma Block | Luma Block | Chroma Block | Luma Block | Luma Block |
| MxM (M = 4) | {6,9,12,22,<br>8,12,24,31,<br>12,16,30,35,<br>13,17,32,38} | {11,12,14,19,<br>12,14,20,23,<br>14,16,23,25,<br>14,16,24,27} | {10,15,26,39,<br>13,18,39,49,<br>16,29,50,58,<br>23,42,56,62} | {14,15,18,20,<br>15,16,20,22,<br>16,18,22,24,<br>17,21,24,25} | {11,12,14,19,<br>12,14,20,23,<br>14,16,23,25,<br>14,16,24,27} | {14,15,18,20,<br>15,16,20,22,<br>16,18,22,24,<br>17,21,24,25} |
| MxN (M > 4 or N > 4) | {11,11,12,14,17,18,19,19,<br>11,11,12,16,19,20,21,21,<br>11,12,13,18,24,26,27,27,<br>11,12,14,19,29,32,33,33,<br>12,13,16,22,32,36,38,38,<br>12,15,18,27,36,39,40,41,<br>13,16,19,29,35,40,41,42,<br>13,16,21,30,37,40,42,42} | {2,2,2,8,20,24,28,28,<br>2,2,2,16,28,34,36,38,<br>2,2,6,24,48,56,60,60,<br>2,2,8,28,70,80,84,86,<br>2,6,18,40,82,98,104,104,<br>2,12,24,60,96,108,114,116,<br>6,16,28,68,94,112,118,120,<br>6,16,36,72,102,114,120,122} | {14,14,15,17,19,20,20,21,<br>14,15,16,18,19,21,21,22,<br>15,15,17,18,20,22,23,24,<br>15,16,18,20,22,23,24,25,<br>16,17,20,21,24,25,26,27,<br>16,17,20,22,25,26,27,27,<br>17,18,21,23,25,27,28,28,<br>17,18,21,24,26,27,28,28} | {5,5,14,32,44,52,59,62,<br>5,10,17,34,50,61,68,70,<br>8,12,25,37,57,70,84,91,<br>10,17,34,52,73,84,95,104,<br>17,26,52,66,88,98,113,116,<br>23,32,57,73,97,107,118,122,<br>26,35,62,84,102,118,124,125,<br>30,35,64,89,107,120,124,125} | {2,2,2,8,20,24,28,28,<br>2,2,2,16,28,34,36,38,<br>2,2,6,24,48,56,60,60,<br>2,2,8,28,70,80,84,86,<br>2,6,18,40,82,98,104,104,<br>2,12,24,60,96,108,114,116,<br>6,16,28,68,94,112,118,120,<br>6,16,36,72,102,114,120,122} | {5,5,14,32,44,52,59,62,<br>5,10,17,34,50,61,68,70,<br>8,12,25,37,57,70,84,91,<br>10,17,34,52,73,84,95,104,<br>17,26,52,66,88,98,113,116,<br>23,32,57,73,97,107,118,122,<br>26,35,62,84,102,118,124,125,<br>30,35,64,89,107,120,124,125} |

FIG. 15

| size / form | USE OF TRANSFORM | | | | | | NON-USE OF TRANSFORM | | |
|---|---|---|---|---|---|---|---|---|---|
| | Intra Prediction Mode | | Inter Prediction Mode | | Intra Block Copy Mode | | Intra Prediction Mode | Inter Prediction Mode | Intra Block Copy Mode |
| | Luma Block | Chroma Block | Luma Block | Chroma Block | Luma Block | Chroma Block | Luma Block or Chroma Block | Luma Block or Chroma Block | Luma Block or Chroma Block |
| Mx M (M = 4) | {6,9,12,22,8,12,24,31,12,16,30,35,13,17,32,38} | {11,12,14,19,12,14,20,23,14,16,23,25,14,16,24,27} | {10,15,26,39,13,18,39,49,16,29,50,58,23,42,56,62} | {14,15,18,20,15,16,20,22,16,18,22,24,17,21,24,25} | {6,9,12,22,8,12,24,31,12,16,30,35,13,17,32,38} | {11,12,14,19,12,14,20,23,14,16,23,25,14,16,24,27} | {16,16,16,16,16,16,16,16,16,16,16,16,16,16,16,16} | {16,16,16,16,16,16,16,16,16,16,16,16,16,16,16,16} | {16,16,16,16,16,16,16,16,16,16,16,16,16,16,16,16} |
| Mx N (M > 4 or N > 4) | {11,11,12,14,17,18,19,19,11,11,12,16,19,20,21,21,11,12,13,18,24,26,27,27,11,12,14,19,29,32,33,33,12,13,16,22,32,36,38,38,12,15,18,27,36,39,40,41,13,16,19,29,35,40,41,42,13,16,21,30,37,40,42,42} | {2,2,2,8,20,24,28,28,2,2,2,16,28,34,36,38,2,2,6,24,48,56,60,60,2,2,8,28,70,80,84,86,2,6,18,40,82,98,104,104,2,12,24,60,96,108,114,116,6,16,28,68,94,112,118,120,6,16,36,72,102,114,120,122} | {14,14,15,17,19,20,20,21,14,15,16,18,19,21,21,22,15,15,17,18,20,22,23,24,15,16,18,20,22,23,24,25,16,17,20,21,24,25,26,27,16,17,20,22,25,26,27,27,17,18,21,23,25,27,28,28,17,18,21,24,26,27,28,28} | {5,5,14,32,44,52,59,62,5,10,17,34,50,61,68,70,8,12,25,37,57,70,84,91,10,17,34,52,73,84,95,104,17,26,52,66,88,98,113,116,23,32,57,73,97,107,118,122,26,35,62,84,102,118,124,125,30,35,64,89,107,120,124,125} | {11,11,12,14,17,18,19,19,11,11,12,16,19,20,21,21,11,12,13,18,24,26,27,27,11,12,14,19,29,32,33,33,12,13,16,22,32,36,38,38,12,15,18,27,36,39,40,41,13,16,19,29,35,40,41,42,13,16,21,30,37,40,42,42} | {2,2,2,8,20,24,28,28,2,2,2,16,28,34,36,38,2,2,6,24,48,56,60,60,2,2,8,28,70,80,84,86,2,6,18,40,82,98,104,104,2,12,24,60,96,108,114,116,6,16,28,68,94,112,118,120,6,16,36,72,102,114,120,122} | {16,16,16,16,16,16,16,16,16,16,16,16,16,16,16,16,16,16,16,16,16,16,16,16,16,16,16,16,16,16,16,16,16,16,16,16,16,16,16,16,16,16,16,16,16,16,16,16,16,16,16,16,16,16,16,16,16,16,16,16,16,16,16,16} | {16,16,16,16,16,16,16,16,16,16,16,16,16,16,16,16,16,16,16,16,16,16,16,16,16,16,16,16,16,16,16,16,16,16,16,16,16,16,16,16,16,16,16,16,16,16,16,16,16,16,16,16,16,16,16,16,16,16,16,16,16,16,16,16} | {16,16,16,16,16,16,16,16,16,16,16,16,16,16,16,16,16,16,16,16,16,16,16,16,16,16,16,16,16,16,16,16,16,16,16,16,16,16,16,16,16,16,16,16,16,16,16,16,16,16,16,16,16,16,16,16,16,16,16,16,16,16,16,16} |

FIG. 16

| size/form | USE OF PRIMARY TRANSFORM | | | | NON-USE OF PRIMARY TRANSFORM | |
|---|---|---|---|---|---|---|
| | Intra Prediction Mode | | Inter Prediction Mode | | Intra Prediction Mode | Inter Prediction Mode |
| | Luma Block | Chroma Block | Luma Block | Chroma Block | Luma Block or Chroma Block | Luma Block or Chroma Block |
| MxM (M = 4) | {6,9,12,22,<br>8,12,24,31,<br>12,16,30,35,<br>13,17,32,38} | {11,12,14,19,<br>12,14,20,23,<br>14,16,23,25,<br>14,16,24,27} | {10,15,26,39,<br>13,18,39,49,<br>16,29,50,58,<br>23,42,56,62} | {14,15,18,20,<br>15,16,20,22,<br>16,18,22,24,<br>17,21,24,25} | {16,16,16,16,<br>16,16,16,16,<br>16,16,16,16,<br>16,16,16,16} | {16,16,16,16,<br>16,16,16,16,<br>16,16,16,16,<br>16,16,16,16} |
| MxN (M > 4 or N > 4) | {11,11,12,14,17,18,19,19,<br>11,11,12,15,19,20,21,21,<br>11,12,13,18,24,26,27,27,<br>11,12,14,19,29,32,33,33,<br>12,13,16,22,32,36,38,38,<br>12,15,18,27,36,39,40,41,<br>13,15,19,29,35,40,41,42,<br>13,16,21,30,37,40,42,42} | {2,2,2,8,20,24,28,28,<br>2,2,2,16,28,34,36,38,<br>2,2,6,24,48,56,60,60,<br>2,2,8,38,70,80,84,86,<br>2,6,18,40,82,96,104,104,<br>2,12,24,60,96,108,114,116,<br>6,16,28,68,94,112,118,120,<br>6,16,36,72,102,114,120,122} | {14,14,15,17,19,20,20,21,<br>14,15,16,18,19,21,21,22,<br>15,15,17,18,20,22,23,24,<br>15,16,18,20,22,23,24,25,<br>16,17,20,21,24,25,25,27,<br>16,17,20,22,25,26,27,27,<br>17,18,21,23,25,27,28,28,<br>17,18,21,24,26,27,28,28} | {5,5,14,32,44,52,59,62,<br>5,10,17,34,50,61,68,70,<br>8,12,25,37,57,70,84,91,<br>10,17,34,52,73,84,95,104,<br>17,26,52,66,88,98,113,116,<br>23,32,57,73,97,107,118,122,<br>26,35,62,84,102,118,124,125,<br>30,35,64,89,107,120,124,125} | {16,16,16,16,16,16,16,16,<br>16,16,16,16,16,16,16,16,<br>16,16,16,16,16,16,16,16,<br>16,16,16,16,16,16,16,16,<br>16,16,16,16,16,16,16,16,<br>16,16,16,16,16,16,16,16,<br>16,16,16,16,16,16,16,16,<br>16,16,16,16,16,16,16,16} | {16,16,16,16,16,16,16,16,<br>16,16,16,16,16,16,16,16,<br>16,16,16,16,16,16,16,16,<br>16,16,16,16,16,16,16,16,<br>16,16,16,16,16,16,16,16,<br>16,16,16,16,16,16,16,16,<br>16,16,16,16,16,16,16,16,<br>16,16,16,16,16,16,16,16} |

FIG. 17

| size/ form | USE OF SECONDARY TRANSFORM | | | | NON-USE OF SECONDARY TRANSFORM | |
|---|---|---|---|---|---|---|
| | Intra Prediction Mode | | Inter Prediction Mode | | Intra Prediction Mode | Inter Prediction Mode |
| | Luma Block | Chroma Block | Luma Block | Chroma Block | Luma Block or Chroma Block | Luma Block or Chroma Block |
| MxM (M = 4) | {6,9,12,22,<br>8,12,24,31,<br>12,16,30,35,<br>13,17,32,38} | {11,12,14,19,<br>12,14,20,23,<br>14,16,23,25,<br>14,16,24,27} | {10,15,26,39,<br>13,18,39,49,<br>16,29,50,58,<br>23,42,56,62} | {14,15,18,20,<br>15,16,20,22,<br>16,18,22,24,<br>17,21,24,25} | {16,16,16,16,<br>16,16,16,16,<br>16,16,16,16,<br>16,16,16,16} | {16,16,16,16,<br>16,16,16,16,<br>16,16,16,16,<br>16,16,16,16} |
| MxN (M > 4 or N > 4) | {11,11,12,14,17,18,19,19,<br>11,11,12,16,19,20,21,21,<br>11,12,13,18,24,26,27,27,<br>11,12,14,19,29,32,33,33,<br>12,13,16,22,32,36,38,38,<br>12,15,18,27,36,39,40,41,<br>13,16,19,29,35,40,41,42,<br>13,16,21,30,37,40,42,42} | {2,2,2,8,20,24,28,28,<br>2,2,2,16,28,34,36,38,<br>2,2,6,24,48,56,60,60,<br>2,2,8,28,70,80,84,86,<br>2,6,18,40,82,98,104,104,<br>2,12,24,60,96,108,114,116,<br>6,16,28,68,94,112,118,120,<br>6,16,36,72,102,114,120,122} | {14,14,15,17,19,20,20,21,<br>14,15,16,18,19,21,21,22,<br>15,15,17,18,20,22,23,24,<br>15,16,18,20,22,23,24,25,<br>16,17,20,21,24,25,26,27,<br>16,17,20,22,25,26,27,27,<br>17,18,21,23,25,27,28,28,<br>17,18,21,24,26,27,28,28} | {5,5,14,32,44,52,59,62,<br>5,10,17,34,50,61,68,70,<br>8,12,25,37,57,70,84,91,<br>10,17,34,52,73,84,95,104,<br>17,26,52,66,88,98,113,116,<br>23,32,57,73,97,107,118,122,<br>26,35,62,84,102,118,124,125,<br>30,35,64,89,107,120,124,125} | {16,16,16,16,16,16,16,16,<br>16,16,16,16,16,16,16,16,<br>16,16,16,16,16,16,16,16,<br>16,16,16,16,16,16,16,16,<br>16,16,16,16,16,16,16,16,<br>16,16,16,16,16,16,16,16,<br>16,16,16,16,16,16,16,16,<br>16,16,16,16,16,16,16,16} | {16,16,16,16,16,16,16,16,<br>16,16,16,16,16,16,16,16,<br>16,16,16,16,16,16,16,16,<br>16,16,16,16,16,16,16,16,<br>16,16,16,16,16,16,16,16,<br>16,16,16,16,16,16,16,16,<br>16,16,16,16,16,16,16,16,<br>16,16,16,16,16,16,16,16} |

FIG. 18

| seq_parameter_set_rbsp( ) { | Descriptor |
|---|---|
| … | |
| **scaling_list_enabled_flag** | u(1) |
| if( scaling_list_enabled_flag ) { | |
| **sps_scaling_list_data_present_flag** | u(1) |
| if( sps_scaling_list_data_present_flag ) | |
| scaling_list_data( ) | |
| } | |
| … | |
| } | |

FIG. 19

| pic_parameter_set_rbsp( ) { | Descriptor |
|---|---|
| … | |
| **pps_scaling_list_data_present_flag** | u(1) |
| if( pps_scaling_list_data_present_flag ) | |
| scaling_list_data( ) | |
| … | |
| } | |

FIG. 20

| adaptation_parameter_set_rbsp( ) { | Descriptor |
|---|---|
| … | |
| **aps_scaling_list_data_present_flag** | u(1) |
| if( aps_scaling_list_data_present_flag ) | |
| scaling_list_data( ) | |
| … | |
| } | |

FIG. 21

| i | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| ScalingList[ 0 ][ 0..5 ][ i ] | 16 | 16 | 16 | 16 | 16 | 16 | 16 | 16 | 16 | 16 | 16 | 16 | 16 | 16 | 16 | 16 |

FIG. 22

| i | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| ScalingList[ 1..3 ][ 0..2 ][ i ] | 16 | 16 | 16 | 16 | 16 | 16 | 16 | 16 | 16 | 16 | 17 | 16 | 17 | 16 | 17 | 18 |
| ScalingList[ 1..3 ][ 3..5 ][ i ] | 16 | 16 | 16 | 16 | 16 | 16 | 16 | 16 | 16 | 16 | 17 | 17 | 17 | 17 | 17 | 18 |
| i – 16 | 0 | 1 | 2 | 3 | 4 | 5 | 6 | 7 | 8 | 9 | 10 | 11 | 12 | 13 | 14 | 15 |
| ScalingList[ 1..3 ][ 0..2 ][ i ] | 17 | 18 | 18 | 17 | 18 | 21 | 19 | 20 | 21 | 20 | 19 | 21 | 24 | 22 | 22 | 24 |
| ScalingList[ 1..3 ][ 3..5 ][ i ] | 18 | 18 | 18 | 18 | 18 | 20 | 20 | 20 | 20 | 20 | 20 | 20 | 24 | 24 | 24 | 24 |
| i – 32 | 0 | 1 | 2 | 3 | 4 | 5 | 6 | 7 | 8 | 9 | 10 | 11 | 12 | 13 | 14 | 15 |
| ScalingList[ 1..3 ][ 0..2 ][ i ] | 24 | 22 | 22 | 24 | 25 | 25 | 27 | 30 | 27 | 25 | 25 | 29 | 31 | 35 | 35 | 31 |
| ScalingList[ 1..3 ][ 3..5 ][ i ] | 24 | 24 | 24 | 24 | 25 | 25 | 25 | 25 | 25 | 25 | 25 | 28 | 28 | 28 | 28 | 28 |
| i – 48 | 0 | 1 | 2 | 3 | 4 | 5 | 6 | 7 | 8 | 9 | 10 | 11 | 12 | 13 | 14 | 15 |
| ScalingList[ 1..3 ][ 0..2 ][ i ] | 29 | 36 | 41 | 44 | 41 | 36 | 47 | 54 | 54 | 47 | 65 | 70 | 65 | 88 | 88 | 115 |
| ScalingList[ 1..3 ][ 3..5 ][ i ] | 28 | 33 | 33 | 33 | 33 | 33 | 41 | 41 | 41 | 41 | 54 | 54 | 54 | 71 | 71 | 91 |

FIG. 23

| i | 0 | 1 | 2 | 3 |
|---|---|---|---|---|
| ScalingList[ 1 ][ 1,2,4,5,7,8 ][ i ] | 16 | 16 | 16 | 16 |

FIG. 24

| i | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| ScalingList[ 2 ][ 0..8 ][ i ] | 16 | 16 | 16 | 16 | 16 | 16 | 16 | 16 | 16 | 16 | 16 | 16 | 16 | 16 | 16 | 16 |

FIG. 25

| i | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| ScalingList[ 3..5 ][ 0..2 ][ i ] | 16 | 16 | 16 | 16 | 16 | 16 | 16 | 16 | 16 | 16 | 17 | 16 | 17 | 16 | 17 | 18 |
| ScalingList[ 3..5 ][ 3..5 ][ i ] | 16 | 16 | 16 | 16 | 16 | 16 | 16 | 16 | 16 | 16 | 17 | 17 | 17 | 17 | 17 | 18 |
| ScalingList[ 3..5 ][ 6..8 ][ i ] | 16 | 16 | 16 | 16 | 16 | 16 | 16 | 16 | 16 | 16 | 17 | 16 | 17 | 16 | 17 | 18 |
| i – 16 | 0 | 1 | 2 | 3 | 4 | 5 | 6 | 7 | 8 | 9 | 10 | 11 | 12 | 13 | 14 | 15 |
| ScalingList[ 3..5 ][ 0..2 ][ i ] | 17 | 18 | 18 | 17 | 18 | 21 | 19 | 20 | 21 | 20 | 19 | 21 | 24 | 22 | 22 | 24 |
| ScalingList[ 3..5 ][ 3..5 ][ i ] | 18 | 18 | 18 | 18 | 18 | 20 | 20 | 20 | 20 | 20 | 20 | 20 | 24 | 24 | 24 | 24 |
| ScalingList[ 3..5 ][ 6..8 ][ i ] | 17 | 18 | 18 | 17 | 18 | 21 | 19 | 20 | 21 | 20 | 19 | 21 | 24 | 22 | 22 | 24 |
| i – 32 | 0 | 1 | 2 | 3 | 4 | 5 | 6 | 7 | 8 | 9 | 10 | 11 | 12 | 13 | 14 | 15 |
| ScalingList[ 3..5 ][ 0..2 ][ i ] | 24 | 22 | 22 | 24 | 25 | 25 | 27 | 30 | 27 | 25 | 25 | 29 | 31 | 35 | 35 | 31 |
| ScalingList[ 3..5 ][ 3..5 ][ i ] | 24 | 24 | 24 | 24 | 25 | 25 | 25 | 25 | 25 | 25 | 25 | 28 | 28 | 28 | 28 | 28 |
| ScalingList[ 3..5 ][ 6..8 ][ i ] | 24 | 22 | 22 | 24 | 25 | 25 | 27 | 30 | 27 | 25 | 25 | 29 | 31 | 35 | 35 | 31 |
| i – 48 | 0 | 1 | 2 | 3 | 4 | 5 | 6 | 7 | 8 | 9 | 10 | 11 | 12 | 13 | 14 | 15 |
| ScalingList[ 3..5 ][ 0..2 ][ i ] | 29 | 36 | 41 | 44 | 41 | 36 | 47 | 54 | 54 | 47 | 65 | 70 | 65 | 88 | 88 | 115 |
| ScalingList[ 3..5 ][ 3..5 ][ i ] | 28 | 33 | 33 | 33 | 33 | 33 | 41 | 41 | 41 | 41 | 54 | 54 | 54 | 71 | 71 | 91 |
| ScalingList[ 3..5 ][ 6..8 ][ i ] | 29 | 36 | 41 | 44 | 41 | 36 | 47 | 54 | 54 | 47 | 65 | 70 | 65 | 88 | 88 | 115 |

FIG. 26

| i | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| ScalingList[ 6 ][ 0 ][ i ] | 16 | 16 | 16 | 16 | 16 | 16 | 16 | 16 | 16 | 16 | 17 | 16 | 17 | 16 | 17 | 18 |
| ScalingList[ 6 ][ 3 ][ i ] | 16 | 16 | 16 | 16 | 16 | 16 | 16 | 16 | 16 | 16 | 17 | 17 | 17 | 17 | 17 | 18 |
| ScalingList[ 6 ][ 6 ][ i ] | 16 | 16 | 16 | 16 | 16 | 16 | 16 | 16 | 16 | 16 | 17 | 16 | 17 | 16 | 17 | 18 |
| i − 16 | 0 | 1 | 2 | 3 | 4 | 5 | 6 | 7 | 8 | 9 | 10 | 11 | 12 | 13 | 14 | 15 |
| ScalingList[ 6 ][ 0 ][ i ] | 17 | 18 | 18 | 17 | 18 | 21 | 19 | 20 | 21 | 20 | 19 | 21 | 24 | 22 | 22 | 24 |
| ScalingList[ 6 ][ 3 ][ i ] | 18 | 18 | 18 | 18 | 18 | 20 | 20 | 20 | 20 | 20 | 20 | 20 | 24 | 24 | 24 | 24 |
| ScalingList[ 6 ][ 6 ][ i ] | 17 | 18 | 18 | 17 | 18 | 21 | 19 | 20 | 21 | 20 | 19 | 21 | 24 | 22 | 22 | 24 |
| i − 32 | 0 | 1 | 2 | 3 | 4 | 5 | 6 | 7 | 8 | 9 | 10 | 11 | 12 | 13 | 14 | 15 |
| ScalingList[ 6 ][ 0 ][ i ] | 24 | 22 | 22 | 24 | 25 | 25 | 27 | 30 | 27 | 25 | 25 | 29 | 31 | 35 | 35 | 31 |
| ScalingList[ 6 ][ 3 ][ i ] | 24 | 24 | 24 | 24 | 25 | 25 | 25 | 25 | 25 | 25 | 25 | 28 | 28 | 28 | 28 | 28 |
| ScalingList[ 6 ][ 6 ][ i ] | 24 | 22 | 22 | 24 | 25 | 25 | 27 | 30 | 27 | 25 | 25 | 29 | 31 | 35 | 35 | 31 |
| i − 48 | 0 | 1 | 2 | 3 | 4 | 5 | 6 | 7 | 8 | 9 | 10 | 11 | 12 | 13 | 14 | 15 |
| ScalingList[ 6 ][ 0 ][ i ] | 29 | 36 | 41 | 44 | 41 | 36 | 47 | 54 | 54 | 47 | 65 | 70 | 65 | 88 | 88 | 115 |
| ScalingList[ 6 ][ 3 ][ i ] | 28 | 33 | 33 | 33 | 33 | 33 | 41 | 41 | 41 | 41 | 54 | 54 | 54 | 71 | 71 | 91 |
| ScalingList[ 6 ][ 6 ][ i ] | 29 | 36 | 41 | 44 | 41 | 36 | 47 | 54 | 54 | 47 | 65 | 70 | 65 | 88 | 88 | 115 |

FIG. 27

| scaling_list_data( ) { | Descriptor |
|---|---|
| for( sizeId = 0; sizeId < 4; sizeId++ ) | |
| for( matrixId = 0; matrixId < 6; matrixId += ( sizeId = = 3 ) ? 3 : 1 ) { | |
| **scaling_list_pred_mode_flag**[ sizeId ][ matrixId ] | u(1) |
| if( !scaling_list_pred_mode_flag[ sizeId ][ matrixId ] ) | |
| **scaling_list_pred_matrix_id_delta**[ sizeId ][ matrixId ] | ue(v) |
| else { | |
| nextCoef = 8 | |
| coefNum = Min( 64, ( 1 << ( 4 + ( sizeId << 1 ) ) ) ) | |
| if( sizeId > 1 ) { | |
| **scaling_list_dc_coef_minus8**[ sizeId − 2 ][ matrixId ] | se(v) |
| nextCoef = scaling_list_dc_coef_minus8[ sizeId − 2 ][ matrixId ] + 8 | |
| } | |
| for( i = 0; i < coefNum; i++) { | |
| **scaling_list_delta_coef** | se(v) |
| nextCoef = ( nextCoef + scaling_list_delta_coef + 256 ) % 256 | |
| ScalingList[ sizeId ][ matrixId ][ i ] = nextCoef | |
| } | |
| } | |
| } | |
| } | |

FIG. 28

| size | sizeId |
|---|---|
| 4x4 | 0 |
| 8x8 | 1 |
| 16x16 | 2 |
| 32x32 | 3 |

FIG. 29

| sizeId | Prediction Mode | cIdx(Color Component) | matrixId |
|---|---|---|---|
| 0, 1, 2, 3 | Intra Prediction Mode | 0 (Y) | 0 |
| 0, 1, 2, 3 | Intra Prediction Mode | 1 (Cb) | 1 |
| 0, 1, 2, 3 | Intra Prediction Mode | 2 (Cr) | 2 |
| 0, 1, 2, 3 | Inter Prediction Mode | 0 (Y) | 3 |
| 0, 1, 2, 3 | Inter Prediction Mode | 1 (Cb) | 4 |
| 0, 1, 2, 3 | Inter Prediction Mode | 2 (Cr) | 5 |

FIG. 30

| scaling_list_data( ) { | Descriptor |
|---|---|
| for( sizeId = 0; sizeId < 6; sizeId++ ) | |
| for( matrixId = 0; matrixId < 6; matrixId += ( sizeId = = 5 ) ? 3 : 1 ) { | |
| if( !( ( sizeId == 0 ) && ( matrixId % 3 == 0 ) ) ) { | |
| **scaling_list_pred_mode_flag[ sizeId ][ matrixId ]** | u(1) |
| if( !scaling_list_pred_mode_flag[ sizeId ][ matrixId ] ) | |
| **scaling_list_pred_matrix_id_delta[ sizeId ][ matrixId ]** | ue(v) |
| else { | |
| nextCoef = 8 | |
| coefNum = Min( 64, ( 1 << ( 2 + ( sizeId << 1 ) ) ) ) | |
| if( sizeId > 2 ) { | |
| **scaling_list_dc_coef_minus8[ sizeId − 3 ][ matrixId ]** | se(v) |
| nextCoef = scaling_list_dc_coef_minus8[ sizeId − 3 ][ matrixId ] + 8 | |
| } | |
| for( i = 0; i < coefNum; i++ ) { | |
| **scaling_list_delta_coef** | se(v) |
| nextCoef = ( nextCoef + scaling_list_delta_coef + 256 ) % 256 | |
| ScalingList[ sizeId ][ matrixId ][ i ] = nextCoef | |
| } | |
| } | |
| } | |
| } | |
| } | |

FIG. 31

| size | sizeId |
|---|---|
| 2x2 | 0 |
| 4x4 | 1 |
| 8x8 | 2 |
| 16x16 | 3 |
| 32x32 | 4 |
| 64x64 | 5 |

FIG. 32

| sizeId | Prediction Mode | cIdx(Color Component) | matrixId |
|---|---|---|---|
| 1, 2, 3, 4, 5 | Intra Prediction Mode | 0 (Y) | 0 |
| 0, 1, 2, 3, 4 | Intra Prediction Mode | 1 (Cb) | 1 |
| 0, 1, 2, 3, 4 | Intra Prediction Mode | 2 (Cr) | 2 |
| 1, 2, 3, 4, 5 | Inter Prediction Mode | 0 (Y) | 3 |
| 0, 1, 2, 3, 4 | Inter Prediction Mode | 1 (Cb) | 4 |
| 0, 1, 2, 3, 4 | Inter Prediction Mode | 2 (Cr) | 5 |

FIG. 33

| scaling_list_data( ) { | Descriptor |
|---|---|
| for( sizeId = 0; sizeId < 6; sizeId++ ) | |
| for( matrixId = 0; matrixId < 8; matrixId += ( sizeId = = 5 ) ? 3 : 1 ) { | |
| if( !(( sizeId == 0 ) && (matrixId % 3 == 0)) ) { | |
| **scaling_list_pred_mode_flag**[ sizeId ][ matrixId ] | u(1) |
| if( !scaling_list_pred_mode_flag[ sizeId ][ matrixId ] ) | |
| **scaling_list_pred_matrix_id_delta**[ sizeId ][ matrixId ] | ue(v) |
| else { | |
| nextCoef = 8 | |
| coefNum = Min( 64, ( 1 << ( 2 + ( sizeId << 1 ) ) ) ) | |
| if( sizeId > 2 ) { | |
| **scaling_list_dc_coef_minus8**[ sizeId − 3 ][ matrixId ] | se(v) |
| nextCoef = scaling_list_dc_coef_minus8[ sizeId − 3 ][ matrixId ] + 8 | |
| } | |
| for( i = 0; i < coefNum; i++) { | |
| **scaling_list_delta_coef** | se(v) |
| nextCoef = ( nextCoef + scaling_list_delta_coef + 256 ) % 256 | |
| ScalingList[ sizeId ][ matrixId ][ i ] = nextCoef | |
| } | |
| } | |
| } | |
| } | |
| } | |

FIG. 34

| size | sizeId |
|---|---|
| 2x2 | 0 |
| 4x4 | 1 |
| 8x8 | 2 |
| 16x16 | 3 |
| 32x32 | 4 |
| 64x64 | 5 |

FIG. 35

| sizeId | Prediction Mode | cIdx(Color Component) | One-Dimensional Transform Type (trTypeHor or trTypeVer) | matrixId |
|---|---|---|---|---|
| 1, 2, 3, 4, 5 | Intra Prediction Mode | 0 (Y) | First Transform (trTypeHor==0 or trTypeVer==0) | 0 |
| 0, 1, 2, 3, 4 | Intra Prediction Mode | 1 (Cb) | First Transform (trTypeHor==0 or trTypeVer==0) | 1 |
| 0, 1, 2, 3, 4 | Intra Prediction Mode | 2 (Cr) | First Transform (trTypeHor==0 or trTypeVer==0) | 2 |
| 1, 2, 3, 4, 5 | Inter Prediction Mode | 0 (Y) | First Transform (trTypeHor==0 or trTypeVer==0) | 3 |
| 0, 1, 2, 3, 4 | Inter Prediction Mode | 1 (Cb) | First Transform (trTypeHor==0 or trTypeVer==0) | 4 |
| 0, 1, 2, 3, 4 | Inter Prediction Mode | 2 (Cr) | First Transform (trTypeHor==0 or trTypeVer==0) | 5 |
| 1, 2, 3, 4 | Intra Prediction Mode | 0 (Y) | Second Transform (trTypeHor>0 or trTypeVer>0) | 6 |
| 1, 2, 3, 4 | Inter Prediction Mode | 0 (Y) | Second Transform (trTypeHor>0 or trTypeVer>0) | 7 |

FIG. 36

| scaling_list_data( ) { | Descriptor |
|---|---|
| for( sizeId = 0; sizeId < 6; sizeId++ ) | |
| for( matrixId = 0; matrixId < 10; matrixId += ( sizeId == 5 ) ? 3 : 1 ) { | |
| if( !( sizeId == 0 ) && (matrixId % 3 == 0)) ) { | |
| **scaling_list_pred_mode_flag**[ sizeId ][ matrixId ] | u(1) |
| if( !scaling_list_pred_mode_flag[ sizeId ][ matrixId ] ) | |
| **scaling_list_pred_matrix_id_delta**[ sizeId ][ matrixId ] | ue(v) |
| else { | |
| nextCoef = 8 | |
| coefNum = Min( 64, ( 1 << ( 2 + ( sizeId << 1 ) ) ) ) | |
| if( sizeId > 2 ) { | |
| **scaling_list_dc_coef_minus8**[ sizeId − 3 ][ matrixId ] | se(v) |
| nextCoef = scaling_list_dc_coef_minus8[ sizeId − 3 ][ matrixId ] + 8 | |
| } | |
| for( i = 0; i < coefNum; i++) { | |
| **scaling_list_delta_coef** | se(v) |
| nextCoef = ( nextCoef + scaling_list_delta_coef + 256 ) % 256 | |
| ScalingList[ sizeId ][ matrixId ][ i ] = nextCoef | |
| } | |
| } | |
| } | |
| }. | |
| } | |

FIG. 37

| size | sizeId |
|---|---|
| 2x2 | 0 |
| 4x4 | 1 |
| 8x8 | 2 |
| 16x16 | 3 |
| 32x32 | 4 |
| 64x64 | 5 |

FIG. 38

| sizeId | Prediction Mode | cIdx(Color Component) | One-Dimensional Transform Type (trTypeHor or trTypeVer) | matrixId |
|---|---|---|---|---|
| 1, 2, 3, 4, 5 | Intra Prediction Mode | 0 (Y) | First Transform (trTypeHor==0 or trTypeVer==0) | 0 |
| 0, 1, 2, 3, 4 | Intra Prediction Mode | 1 (Cb) | First Transform (trTypeHor==0 or trTypeVer==0) | 1 |
| 0, 1, 2, 3, 4 | Intra Prediction Mode | 2 (Cr) | First Transform (trTypeHor==0 or trTypeVer==0) | 2 |
| 1, 2, 3, 4, 5 | Inter Prediction Mode | 0 (Y) | First Transform (trTypeHor==0 or trTypeVer==0) | 3 |
| 0, 1, 2, 3, 4 | Inter Prediction Mode | 1 (Cb) | First Transform (trTypeHor==0 or trTypeVer==0) | 4 |
| 0, 1, 2, 3, 4 | Inter Prediction Mode | 2 (Cr) | First Transform (trTypeHor==0 or trTypeVer==0) | 5 |
| 1, 2, 3, 4 | Intra Prediction Mode | 0 (Y) | Second Transform (trTypeHor==1 or trTypeVer==1) | 6 |
| 1, 2, 3, 4 | Inter Prediction Mode | 0 (Y) | Second Transform (trTypeHor==1 or trTypeVer==1) | 7 |
| 1, 2, 3, 4 | Intra Prediction Mode | 0 (Y) | Third Transform (trTypeHor==2 or trTypeVer==2) | 8 |
| 1, 2, 3, 4 | Inter Prediction Mode | 0 (Y) | Third Transform (trTypeHor==2 or trTypeVer==2) | 9 |

FIG. 39

| scaling_list_data( ) { | Descriptor |
|---|---|
| for( sizeId = 0; sizeId < 6; sizeId++ ) | |
| for( matrixId = 0; matrixId < 8; matrixId += ( sizeId == 5 ) ? 3 : 1 ) { | |
| if( !( ( sizeId == 0 ) && (matrixId % 3 == 0)) ) { | |
| **scaling_list_pred_mode_flag**[ sizeId ][ matrixId ] | u(1) |
| if( !scaling_list_pred_mode_flag[ sizeId ][ matrixId ] ) | |
| **scaling_list_pred_matrix_id_delta**[ sizeId ][ matrixId ] | ue(v) |
| else { | |
| nextCoef = 8 | |
| coefNum = Min( 64, ( 1 << ( 2 + ( sizeId << 1 ) ) ) ) | |
| if( sizeId > 2 ) { | |
| **scaling_list_dc_coef_minus8**[ sizeId − 3 ][ matrixId ] | se(v) |
| nextCoef = scaling_list_dc_coef_minus8[ sizeId − 3 ][ matrixId ] + 8 | |
| } | |
| for( i = 0; i < coefNum; i++) { | |
| **scaling_list_delta_coef** | se(v) |
| nextCoef = ( nextCoef + scaling_list_delta_coef + 256 ) % 256 | |
| ScalingList[ sizeId ][ matrixId ][ i ] = nextCoef | |
| } | |
| } | |
| } | |
| } | |
| } | |

FIG. 40

| size | sizeId |
|---|---|
| 2x2 | 0 |
| 4x4 | 1 |
| 8x8 | 2 |
| 16x16 | 3 |
| 32x32 | 4 |
| 64x64 | 5 |

FIG. 41

| sizeId | Prediction Mode | cIdx(Color Component) | Two-Dimensional Transform Combination (trTypeHor and trTypeVer) | matrixId |
|---|---|---|---|---|
| 1, 2, 3, 4, 5 | Intra Prediction Mode | 0 (Y) | First Transform (trTypeHor==0 and trTypeVer==0) | 0 |
| 0, 1, 2, 3, 4 | Intra Prediction Mode | 1 (Cb) | First Transform (trTypeHor==0 and trTypeVer==0) | 1 |
| 0, 1, 2, 3, 4 | Intra Prediction Mode | 2 (Cr) | First Transform (trTypeHor==0 and trTypeVer==0) | 2 |
| 1, 2, 3, 4, 5 | Inter Prediction Mode | 0 (Y) | First Transform (trTypeHor==0 and trTypeVer==0) | 3 |
| 0, 1, 2, 3, 4 | Inter Prediction Mode | 1 (Cb) | First Transform (trTypeHor==0 and trTypeVer==0) | 4 |
| 0, 1, 2, 3, 4 | Inter Prediction Mode | 2 (Cr) | First Transform (trTypeHor==0 and trTypeVer==0) | 5 |
| 1, 2, 3, 4 | Intra Prediction Mode | 0 (Y) | Second Transform (trTypeHor>0 and trTypeVer>0) | 6 |
| 1, 2, 3, 4 | Inter Prediction Mode | 0 (Y) | Second Transform (trTypeHor>0 and trTypeVer>0) | 7 |

FIG. 42

| scaling_list_data( ) { | Descriptor |
|---|---|
| for( sizeId = 0; sizeId < 6; sizeId++ ) | |
| for( matrixId = 0; matrixId < 14; matrixId += ( sizeId = = 5 ) ? 3 : 1 ) { | |
| if( !(( sizeId == 0 ) && (matrixId % 3 == 0)) ) { | |
| **scaling_list_pred_mode_flag**[ sizeId ][ matrixId ] | u(1) |
| if( !scaling_list_pred_mode_flag[ sizeId ][ matrixId ] ) | |
| **scaling_list_pred_matrix_id_delta**[ sizeId ][ matrixId ] | ue(v) |
| else { | |
| nextCoef = 8 | |
| coefNum = Min( 64, ( 1 << ( 2 + ( sizeId << 1 ) ) ) ) | |
| if( sizeId > 2 ) { | |
| **scaling_list_dc_coef_minus8**[ sizeId − 3 ][ matrixId ] | se(v) |
| nextCoef = scaling_list_dc_coef_minus8[ sizeId − 3 ][ matrixId ] + 8 | |
| } | |
| for( i = 0; i < coefNum; i++) { | |
| **scaling_list_delta_coef** | se(v) |
| nextCoef = ( nextCoef + scaling_list_delta_coef + 256 ) % 256 | |
| ScalingList[ sizeId ][ matrixId ][ i ] = nextCoef | |
| } | |
| } | |
| } | |
| } | |
| } | |

FIG. 43

| size | sizeId |
|---|---|
| 2x2 | 0 |
| 4x4 | 1 |
| 8x8 | 2 |
| 16x16 | 3 |
| 32x32 | 4 |
| 64x64 | 5 |

FIG. 44

| sizeId | Prediction Mode | cIdx(Color Component) | Two-Dimensional Transform Combination (trTypeHor and trTypeVer) | matrixId |
|---|---|---|---|---|
| 1, 2, 3, 4, 5 | Intra Prediction Mode | 0 (Y) | First Transform (trTypeHor==0 and trTypeVer==0) | 0 |
| 0, 1, 2, 3, 4 | Intra Prediction Mode | 1 (Cb) | First Transform (trTypeHor==0 and trTypeVer==0) | 1 |
| 0, 1, 2, 3, 4 | Intra Prediction Mode | 2 (Cr) | First Transform (trTypeHor==0 and trTypeVer==0) | 2 |
| 1, 2, 3, 4, 5 | Inter Prediction Mode | 0 (Y) | First Transform (trTypeHor==0 and trTypeVer==0) | 3 |
| 0, 1, 2, 3, 4 | Inter Prediction Mode | 1 (Cb) | First Transform (trTypeHor==0 and trTypeVer==0) | 4 |
| 0, 1, 2, 3, 4 | Inter Prediction Mode | 2 (Cr) | First Transform (trTypeHor==0 and trTypeVer==0) | 5 |
| 1, 2, 3, 4 | Intra Prediction Mode | 0 (Y) | Second Transform (trTypeHor==1 and trTypeVer==1) | 6 |
| 1, 2, 3, 4 | Inter Prediction Mode | 0 (Y) | Second Transform (trTypeHor==1 and trTypeVer==1) | 7 |
| 1, 2, 3, 4 | Intra Prediction Mode | 0 (Y) | Third Transform (trTypeHor==1 and trTypeVer==2) | 8 |
| 1, 2, 3, 4 | Inter Prediction Mode | 0 (Y) | Third Transform (trTypeHor==1 and trTypeVer==2) | 9 |
| 1, 2, 3, 4 | Intra Prediction Mode | 0 (Y) | Fourth Transform (trTypeHor==2 and trTypeVer==1) | 10 |
| 1, 2, 3, 4 | Inter Prediction Mode | 0 (Y) | Fourth Transform (trTypeHor==2 and trTypeVer==1) | 11 |
| 1, 2, 3, 4 | Intra Prediction Mode | 0 (Y) | Fifth Transform (trTypeHor==2 and trTypeVer==2) | 12 |
| 1, 2, 3, 4 | Inter Prediction Mode | 0 (Y) | Fifth Transform (trTypeHor==2 and trTypeVer==2) | 13 |

FIG. 45

| scaling_list_data( ) { | Descriptor |
|---|---|
| for( sizeId = 0; sizeId < 6; sizeId++ ) | |
| for( matrixId = 0; matrixId < 6; matrixId += ( sizeId == 5 ) ? 3 : 1 ) { | |
| if( !( ( sizeId == 0 ) && ( matrixId % 3 == 0 ) ) ) { | |
| **scaling_list_pred_mode_flag**[ sizeId ][ matrixId ] | u(1) |
| if( !scaling_list_pred_mode_flag[ sizeId ][ matrixId ] ) | |
| **scaling_list_pred_matrix_id_delta**[ sizeId ][ matrixId ] | ue(v) |
| else { | |
| nextCoef = 8 | |
| coefNum = Min( 64, ( 1 << ( 2 + ( sizeId << 1 ) ) ) ) | |
| if( sizeId > 2 ) { | |
| **scaling_list_dc_coef_minus8**[ sizeId − 3 ][ matrixId ] | se(v) |
| nextCoef = scaling_list_dc_coef_minus8[ sizeId − 3 ][ matrixId ] + 8 | |
| } | |
| for( i = 0; i < coefNum; i++ ) { | |
| **scaling_list_delta_coef** | se(v) |
| nextCoef = ( nextCoef + scaling_list_delta_coef + 256 ) % 256 | |
| ScalingList[ sizeId ][ matrixId ][ i ] = nextCoef | |
| } | |
| } | |
| } | |
| } | |
| } | |

FIG. 46

| size | sizeId |
|---|---|
| 2x2 | 0 |
| 4x4 | 1 |
| 8x8 | 2 |
| 16x16 | 3 |
| 32x32 | 4 |
| 64x64 | 5 |

FIG. 47

| sizeId | Prediction Mode | cIdx(Color Component) | Two-Dimensional Transform Combination (mts_idx) | matrixId |
|---|---|---|---|---|
| 1, 2, 3, 4, 5 | Intra Prediction Mode | 0 (Y) | First Transform(mts_idx == -1) | 0 |
| 0, 1, 2, 3, 4 | Intra Prediction Mode | 1 (Cb) | First Transform(mts_idx == -1) | 1 |
| 0, 1, 2, 3, 4 | Intra Prediction Mode | 2 (Cr) | First Transform(mts_idx == -1) | 2 |
| 1, 2, 3, 4, 5 | Inter Prediction Mode | 0 (Y) | First Transform(mts_idx == -1) | 3 |
| 0, 1, 2, 3, 4 | Inter Prediction Mode | 1 (Cb) | First Transform(mts_idx == -1) | 4 |
| 0, 1, 2, 3, 4 | Inter Prediction Mode | 2 (Cr) | First Transform(mts_idx == -1) | 5 |
| 1, 2, 3, 4 | Intra Prediction Mode | 0 (Y) | Second Transform(mts_idx>-1 or mts_idx>=0) | 6 |
| 1, 2, 3, 4 | Inter Prediction Mode | 0 (Y) | Second Transform(mts_idx>-1 or mts_idx>=0) | 7 |

FIG. 48

| scaling_list_data( ) { | Descriptor |
|---|---|
| for( sizeId = 0; sizeId < 6; sizeId++ ) | |
| for( matrixId = 0; matrixId < 14; matrixId += ( sizeId = = 5 ) ? 3 : 1 ) { | |
| if( !( ( sizeId == 0 ) && ( matrixId % 3 == 0 ) ) ) { | |
| **scaling_list_pred_mode_flag**[ sizeId ][ matrixId ] | u(1) |
| if( !scaling_list_pred_mode_flag[ sizeId ][ matrixId ] ) | |
| **scaling_list_pred_matrix_id_delta**[ sizeId ][ matrixId ] | ue(v) |
| else { | |
| nextCoef = 8 | |
| coefNum = Min( 64, ( 1 << ( 2 + ( sizeId << 1 ) ) ) ) | |
| if( sizeId > 2 ) { | |
| **scaling_list_dc_coef_minus8**[ sizeId − 3 ][ matrixId ] | se(v) |
| nextCoef = scaling_list_dc_coef_minus8[ sizeId − 3 ][ matrixId ] + 8 | |
| } | |
| for( i = 0; i < coefNum; i++ ) { | |
| **scaling_list_delta_coef** | se(v) |
| nextCoef = ( nextCoef + scaling_list_delta_coef + 256 ) % 256 | |
| ScalingList[ sizeId ][ matrixId ][ i ] = nextCoef | |
| } | |
| } | |
| } | |
| } | |
| } | |

FIG. 49

| size | sizeId |
|---|---|
| 2x2 | 0 |
| 4x4 | 1 |
| 8x8 | 2 |
| 16x16 | 3 |
| 32x32 | 4 |
| 64x64 | 5 |

FIG. 50

| sizeId | Prediction Mode | cIdx(Color Component) | Two-Dimensional Transform Combination (ats_idx) | matrixId |
|---|---|---|---|---|
| 1, 2, 3, 4, 5 | Intra Prediction Mode | 0 (Y) | First Transform(ats_idx == -1) | 0 |
| 0, 1, 2, 3, 4 | Intra Prediction Mode | 1 (Cb) | First Transform(ats_idx == -1) | 1 |
| 0, 1, 2, 3, 4 | Intra Prediction Mode | 2 (Cr) | First Transform(ats_idx == -1) | 2 |
| 1, 2, 3, 4, 5 | Inter Prediction Mode | 0 (Y) | First Transform(ats_idx == -1) | 3 |
| 0, 1, 2, 3, 4 | Inter Prediction Mode | 1 (Cb) | First Transform(ats_idx == -1) | 4 |
| 0, 1, 2, 3, 4 | Inter Prediction Mode | 2 (Cr) | First Transform(ats_idx == -1) | 5 |
| 1, 2, 3, 4 | Intra Prediction Mode | 0 (Y) | Second Transform(ats_idx == 0 ) | 6 |
| 1, 2, 3, 4 | Inter Prediction Mode | 0 (Y) | Second Transform(ats_idx == 0 ) | 7 |
| 1, 2, 3, 4 | Intra Prediction Mode | 0 (Y) | Third Transform(ats_idx == 1 ) | 8 |
| 1, 2, 3, 4 | Inter Prediction Mode | 0 (Y) | Third Transform(ats_idx == 1 ) | 9 |
| 1, 2, 3, 4 | Intra Prediction Mode | 0 (Y) | Fourth Transform(ats_idx == 2 ) | 10 |
| 1, 2, 3, 4 | Inter Prediction Mode | 0 (Y) | Fourth Transform(ats_idx == 2 ) | 11 |
| 1, 2, 3, 4 | Intra Prediction Mode | 0 (Y) | Fifth Transform(ats_idx == 3 ) | 12 |
| 1, 2, 3, 4 | Inter Prediction Mode | 0 (Y) | Fifth Transform(ats_idx == 3 ) | 13 |

FIG. 51

| scaling_list_data( ) { | Descriptor |
|---|---|
| for( sizeId = 0; sizeId < 6; sizeId++ ) | |
| for( matrixId = 0; matrixId < 8; matrixId += ( sizeId = = 5 ) ? 3 : 1 ) { | |
| if( !(( sizeId == 0 ) && (matrixId % 3 == 0)) ) { | |
| **scaling_list_pred_mode_flag**[ sizeId ][ matrixId ] | u(1) |
| if( !scaling_list_pred_mode_flag[ sizeId ][ matrixId ] ) | |
| **scaling_list_pred_matrix_id_delta**[ sizeId ][ matrixId ] | ue(v) |
| else { | |
| nextCoef = 8 | |
| coefNum = Min( 64, ( 1 << ( 2 + ( sizeId << 1 ) ) ) ) | |
| if( sizeId > 2 ) { | |
| **scaling_list_dc_coef_minus8**[ sizeId − 3 ][ matrixId ] | se(v) |
| nextCoef = scaling_list_dc_coef_minus8[ sizeId − 3 ][ matrixId ] + 8 | |
| } | |
| for( i = 0; i < coefNum; i++) { | |
| **scaling_list_delta_coef** | se(v) |
| nextCoef = ( nextCoef + scaling_list_delta_coef + 256 ) % 256 | |
| ScalingList[ sizeId ][ matrixId ][ i ] = nextCoef | |
| } | |
| } | |
| } | |
| } | |
| } | |

FIG. 52

| size | sizeId |
|---|---|
| 2x2 | 0 |
| 4x4 | 1 |
| 8x8 | 2 |
| 16x16 | 3 |
| 32x32 | 4 |
| 64x64 | 5 |

FIG. 53

| sizeId | Prediction Mode | cIdx(Color Component) | Whether at least one of Primary Transform of Secondary Transform is used (transform_skip_flag) | matrixId |
|---|---|---|---|---|
| 1, 2, 3, 4, 5 | Intra Prediction Mode | 0 (Y) | Use of Transform (transform_skip_flag==0) | 0 |
| 0, 1, 2, 3, 4 | Intra Prediction Mode | 1 (Cb) | Use of Transform (transform_skip_flag==0) | 1 |
| 0, 1, 2, 3, 4 | Intra Prediction Mode | 2 (Cr) | Use of Transform (transform_skip_flag==0) | 2 |
| 1, 2, 3, 4, 5 | Inter Prediction Mode | 0 (Y) | Use of Transform (transform_skip_flag==0) | 3 |
| 0, 1, 2, 3, 4 | Inter Prediction Mode | 1 (Cb) | Use of Transform (transform_skip_flag==0) | 4 |
| 0, 1, 2, 3, 4 | Inter Prediction Mode | 2 (Cr) | Use of Transform (transform_skip_flag==0) | 5 |
| 1 | Intra Prediction Mode | 0 (Y) | Non-Use of Transform (transform_skip_flag==1) | 6 |
| 1 | Inter Prediction Mode | 0 (Y) | Non-Use of Transform (transform_skip_flag==1) | 7 |

FIG. 54

| scaling_list_data( ) { | Descriptor |
|---|---|
| for( sizeId = 1; sizeId < 7; sizeId++ ) | |
| for( matrixId = 0; matrixId < 9; matrixId += ( sizeId = = 6 ) ? 3 : 1 ) { | |
| if( !( ( sizeId == 1 ) && ( matrixId % 3 == 0 ) ) ) { | |
| **scaling_list_pred_mode_flag**[ sizeId ][ matrixId ] | u(1) |
| if( !scaling_list_pred_mode_flag[ sizeId ][ matrixId ] ) | |
| **scaling_list_pred_matrix_id_delta**[ sizeId ][ matrixId ] | ue(v) |
| else { | |
| nextCoef = 8 | |
| coefNum = Min( 64, ( 1 << ( sizeId << 1 ) ) ) | |
| if( sizeId > 3 ) { | |
| **scaling_list_dc_coef_minus8**[ sizeId − 4 ][ matrixId ] | se(v) |
| nextCoef = scaling_list_dc_coef_minus8[ sizeId − 4 ][ matrixId ] + 8 | |
| } | |
| for( i = 0; i < coefNum; i++ ) { | |
| **scaling_list_delta_coef** | se(v) |
| nextCoef = ( nextCoef + scaling_list_delta_coef + 256 ) % 256 | |
| ScalingList[ sizeId ][ matrixId ][ i ] = nextCoef | |
| } | |
| } | |
| } | |
| } | |
| } | |

FIG. 55

| size | sizeId |
|---|---|
| 1x1 | 0 |
| 2x2 | 1 |
| 4x4 | 2 |
| 8x8 | 3 |
| 16x16 | 4 |
| 32x32 | 5 |
| 64x64 | 6 |

FIG. 56

| sizeId | Prediction Mode | cIdx(Color Component) | matrixId |
|---|---|---|---|
| 2, 3, 4, 5, 6 | Intra Prediction Mode | 0 (Y) | 0 |
| 1, 2, 3, 4, 5 | Intra Prediction Mode | 1 (Cb) | 1 |
| 1, 2, 3, 4, 5 | Intra Prediction Mode | 2 (Cr) | 2 |
| 2, 3, 4, 5, 6 | Inter Prediction Mode | 0 (Y) | 3 |
| 1, 2, 3, 4, 5 | Inter Prediction Mode | 1 (Cb) | 4 |
| 1, 2, 3, 4, 5 | Inter Prediction Mode | 2 (Cr) | 5 |
| 2, 3, 4, 5, 6 | IBC Mode | 0 (Y) | 6 |
| 1, 2, 3, 4, 5 | IBC Mode | 1 (Cb) | 7 |
| 1, 2, 3, 4, 5 | IBC Mode | 2 (Cr) | 8 |

FIG. 57

| scaling_list_data( ) { | Descriptor |
|---|---|
| for( sizeId = 0; sizeId < 6; sizeId++ ) | |
| for( matrixId = 0; matrixId < 9; matrixId += ( sizeId = = 6 ) ? 3 : 1 ) { | |
| if( ! ( ( sizeId == 0 ) && ( matrixId % 3 == 0 ) ) ) { | |
| **scaling_list_pred_mode_flag[ sizeId ][ matrixId ]** | u(1) |
| if( !scaling_list_pred_mode_flag[ sizeId ][ matrixId ] ) | |
| **scaling_list_pred_matrix_id_delta[ sizeId ][ matrixId ]** | ue(v) |
| else { | |
| nextCoef = 8 | |
| coefNum = Min( 64, ( 1 << ( 2 + ( sizeId << 1 ) ) ) ) | |
| if( sizeId > 2 ) { | |
| **scaling_list_dc_coef_minus8[ sizeId − 3 ][ matrixId ]** | se(v) |
| nextCoef = scaling_list_dc_coef_minus8[ sizeId − 3 ][ matrixId ] + 8 | |
| } | |
| for( i = 0; i < coefNum; i++) { | |
| **scaling_list_delta_coef** | se(v) |
| nextCoef = ( nextCoef + scaling_list_delta_coef + 256 ) % 256 | |
| ScalingList[ sizeId ][ matrixId ][ i ] = nextCoef | |
| } | |
| } | |
| } | |
| } | |
| } | |

FIG. 58

| size | sizeId |
|---|---|
| 2x2 | 0 |
| 4x4 | 1 |
| 8x8 | 2 |
| 16x16 | 3 |
| 32x32 | 4 |
| 64x64 | 5 |

FIG. 59

| sizeId | Prediction Mode | cIdx(Color Component) | matrixId |
|---|---|---|---|
| 1, 2, 3, 4, 5 | Intra Prediction Mode | 0 (Y) | 0 |
| 0, 1, 2, 3, 4 | Intra Prediction Mode | 1 (Cb) | 1 |
| 0, 1, 2, 3, 4 | Intra Prediction Mode | 2 (Cr) | 2 |
| 1, 2, 3, 4, 5 | Inter Prediction Mode | 0 (Y) | 3 |
| 0, 1, 2, 3, 4 | Inter Prediction Mode | 1 (Cb) | 4 |
| 0, 1, 2, 3, 4 | Inter Prediction Mode | 2 (Cr) | 5 |
| 1, 2, 3, 4, 5 | IBC Mode | 0 (Y) | 6 |
| 0, 1, 2, 3, 4 | IBC Mode | 1 (Cb) | 7 |
| 0, 1, 2, 3, 4 | IBC Mode | 2 (Cr) | 8 |

FIG. 62

| refMap Mapping Table | | | |
|---|---|---|---|
| Matrix Size in the Quantization/ Dequantization, Prediction Mode, Color Component | refSizeid | refMatrixid | sizeMatrixid |
| 8x8 Intra Y | 1 | 0 | 0 |
| 8x8 Intra U | 1 | 1 | 1 |
| 8x8 Intra V | 1 | 2 | 2 |
| 8x8 Inter Y | 1 | 3 | 3 |
| 8x8 Inter U | 1 | 4 | 4 |
| 8x8 Inter V | 1 | 5 | 5 |
| 16x16 Intra Y | 2 | 0 | 6 |
| 16x16 Intra U | 2 | 1 | 7 |
| 16x16 Intra V | 2 | 2 | 8 |
| 16x16 Inter Y | 2 | 3 | 9 |
| 16x16 Inter U | 2 | 4 | 10 |
| 16x16 Inter V | 2 | 5 | 11 |
| 32x32 Intra Y | 3 | 0 | 12 |
| 32x32 Inter Y | 3 | 1 | 13 |

FIG. 63

| refMap Mapping Table | | | |
|---|---|---|---|
| Matrix Size in the Quantization/Dequantization, Prediction Mode, Color Component, One-Dimensional Transform Type | refSizeId | refMatrixId | sizeMatrixId |
| 8x8 Intra Y, First Transform | 1 | 0 | 0 |
| 8x8 Intra U, First Transform | 1 | 1 | 1 |
| 8x8 Intra V, First Transform | 1 | 2 | 2 |
| 8x8 Inter Y, First Transform | 1 | 3 | 3 |
| 8x8 Inter U, First Transform | 1 | 4 | 4 |
| 8x8 Inter V, First Transform | 1 | 5 | 5 |
| 8x8 Intra Y, Second Transform | 1 | 6 | 6 |
| 8x8 Intra U, First Transform | 1 | 7 | 7 |
| 8x8 Intra V, First Transform | 1 | 8 | 8 |
| 8x8 Inter Y, Second Transform | 1 | 9 | 9 |
| 8x8 Inter U, First Transform | 1 | 10 | 10 |
| 8x8 Inter V, First Transform | 1 | 11 | 11 |
| 16x16 Intra Y, First Transform | 2 | 0 | 12 |
| 16x16 Intra Y, Second Transform | 2 | 1 | 13 |

FIG. 64

| refMap Mapping Table | | | |
|---|---|---|---|
| Matrix Size in the Quantization/Dequantization, Prediction Mode, Color Component, Two-Dimensional Transform Combination | refSizeId | refMatrixId | sizeMatrixId |
| 8x8 Intra Y, First Transform | 1 | 0 | 0 |
| 8x8 Intra U, First Transform | 1 | 1 | 1 |
| 8x8 Intra V, First Transform | 1 | 2 | 2 |
| 8x8 Inter Y, First Transform | 1 | 3 | 3 |
| 8x8 Inter U, First Transform | 1 | 4 | 4 |
| 8x8 Inter V, First Transform | 1 | 5 | 5 |
| 16x16 Intra Y, Second Transform | 2 | 0 | 6 |
| 16x16 Intra U, First Transform | 2 | 1 | 7 |
| 16x16 Intra V, First Transform | 2 | 2 | 8 |
| 16x16 Inter Y, Second Transform | 2 | 3 | 9 |
| 16x16 Inter U, First Transform | 2 | 4 | 10 |
| 16x16 Inter V, First Transform | 2 | 5 | 11 |
| 32x32 Intra Y, First Transform | 3 | 0 | 12 |
| 32x32 Intra Y, Second Transform | 3 | 1 | 13 |

| Width or Height of Quantization Matrix | sIdW | sIdH |
|---|---|---|
| 1 | 0 | 0 |
| 2 | 1 | 1 |
| 4 | 2 | 2 |
| 8 | 3 | 3 |
| 16 | 4 | 4 |
| 32 | 5 | 5 |
| 64 | 6 | 6 |

FIG. 77

7.3.2.1 Sequence parameter set RBSP syntax

| seq_parameter_set_rbsp( ) { | Descriptor |
|---|---|
| ... | |
| **sps_ladf_enabled_flag** | u(1) |
| if ( sps_ladf_enabled_flag ) { | |
| **sps_num_ladf_intervals_minus2** | u(2) |
| **sps_ladf_lowest_interval_qp_offset** | se(v) |
| for( i = 0; i < sps_num_ladf_intervals_minus2 + 1; i++ ) { | |
| **sps_ladf_qp_offset**[ i ] | se(v) |
| **sps_ladf_delta_threshold_minus1**[ i ] | ue(v) |
| } | |
| } | |
| **scaling_list_enabled_flag** | u(1) |
| if( scaling_list_enabled_flag ) { | |
| **sps_scaling_list_data_present_flag** | u(1) |
| if( sps_scaling_list_data_present_flag ) | |
| scaling_list_data( ) | |
| } | |
| rbsp_trailing_bits( ) | |
| } | |

7.4.3.1 Sequence parameter set RBSP semantics scaling_list_enabled_flag equal to 1 specifies that a scaling list is used for the scaling process for transform coefficients. scaling_list_enabled_flag equal to 0 specifies that scaling list is not used for the scaling process for transform coefficients.

sps_scaling_list_data_present_flag equal to 1 specifies that the scaling_list_data( ) syntax structure is present in the SPS. sps_scaling_list_data_present_flag equal to 0 specifies that the scaling_list_data( ) syntax structure is not present in the SPS. When not present, the value of sps_scaling_list_data_present_flag is inferred to be equal to 0.

FIG. 78

7.3.2.2 Picture parameter set RBSP syntax

| pic_parameter_set_rbsp( ) { | Descriptor |
|---|---|
| … | |
| **deblocking_filter_control_present_flag** | u(1) |
| if( deblocking_filter_control_present_flag ) { | |
| **deblocking_filter_override_enabled_flag** | u(1) |
| **pps_deblocking_filter_disabled_flag** | u(1) |
| if( !pps_deblocking_filter_disabled_flag ) { | |
| **pps_beta_offset_div2** | se(v) |
| **pps_tc_offset_div2** | se(v) |
| } | |
| } | |
| **pps_scaling_list_data_present_flag** | u(1) |
| if( pps_scaling_list_data_present_flag ) | |
| scaling_list_data( ) | |
| rbsp_trailing_bits( ) | |
| } | |

7.4.3.2 Picture parameter set RBSP semantics pps_scaling_list_data_present_flag equal to 1 specifies that the scaling list data used for the pictures referring to the PPS are derived based on the scaling lists specified by the active SPS and the scaling lists specified by the PPS. pps_scaling_list_data_present_flag equal to 0 specifies that the scaling list data used for the pictures referring to the PPS are inferred to be equal to those specified by the active SPS. When scaling_list_enabled_flag is equal to 0, the value of pps_scaling_list_data_present_flag shall be equal to 0. When scaling_list_enabled_flag is equal to 1, sps_scaling_list_data_present_flag is equal to 0 and pps_scaling_list_data_present_flag is equal to 0, the default scaling list data are used to derive the array ScalingFactor as described in the scaling list data semantics as specified in clause X.X.X.

FIG. 79

7.3.2.3 Adaptation parameter set syntax

| adaptation_parameter_set_rbsp( ) { | Descriptor |
|---|---|
| **adaptation_parameter_set_id** | u(5) |
| alf_data( ) | |
| **aps_scaling_list_data_present_flag** | u(1) |
| if( aps_scaling_list_data_present_flag ) | |
| scaling_list_data( ) | |
| **aps_extension_flag** | u(1) |
| if( aps_extension_flag ) | |
| while( more_rbsp_data( ) ) | |
| **aps_extension_data_flag** | u(1) |
| rbsp_trailing_bits( ) | |
| } | |

7.4.3.3 Adaptation parameter set semanitcs aps_scaling_list_data_present_flag equal to 1 specifies that the scaling list data used for the tile groups referring to the APS are derived based on the scaling lists specified by the active SPS and the scaling lists specified by the APS. aps_scaling_list_data_present_flag equal to 0 specifies that the scaling list data used for the tile groups referring to the APS are inferred to be equal to those specified by the active SPS. When scaling_list_enabled_flag is equal to 0, the value of aps_scaling_list_data_present_flag shall be equal to 0. When scaling_list_enabled_flag is equal to 1, sps_scaling_list_data_present_flag is equal to 0 and aps_scaling_list_data_present_flag is equal to 0, the default scaling list data are used to derive the array ScalingFactor as described in the scaling list data semantics as specified in clause X.X.X.

FIG. 80

7.3.X Scaling list data syntax

| scaling_list_data( ) { | Descriptor |
|---|---|
| for( sizeId = 1; sizeId < 7; sizeId++ ) | |
| for( matrixId = 0; matrixId < 9; matrixId += ( sizeId = = 6 ) ? 3 : 1 ) { | |
| if( ! ( ( sizeId == 1 ) && ( matrixId % 3 == 0 ) ) ) { | |
| **scaling_list_pred_mode_flag**[ sizeId ][ matrixId ] | u(1) |
| if( !scaling_list_pred_mode_flag[ sizeId ][ matrixId ] ) | |
| **scaling_list_pred_matrix_id_delta**[ sizeId ][ matrixId ] | ue(v) |
| else { | |
| nextCoef = 8 | |
| coefNum = Min( 64, ( 1 << ( sizeId << 1 ) ) ) | |
| if( sizeId > 3 ) { | |
| **scaling_list_dc_coef_minus8**[ sizeId − 4 ][ matrixId ] | se(v) |
| nextCoef = scaling_list_dc_coef_minus8[ sizeId − 4 ][ matrixId ] + 8 | |
| } | |
| for( i = 0; i < coefNum; i++ ) { | |
| **scaling_list_delta_coef** | se(v) |
| nextCoef = ( nextCoef + scaling_list_delta_coef + 256 ) % 256 | |
| ScalingList[ sizeId ][ matrixId ][ i ] = nextCoef | |
| } | |
| } | |
| } | |
| } | |
| } | |

FIG. 81

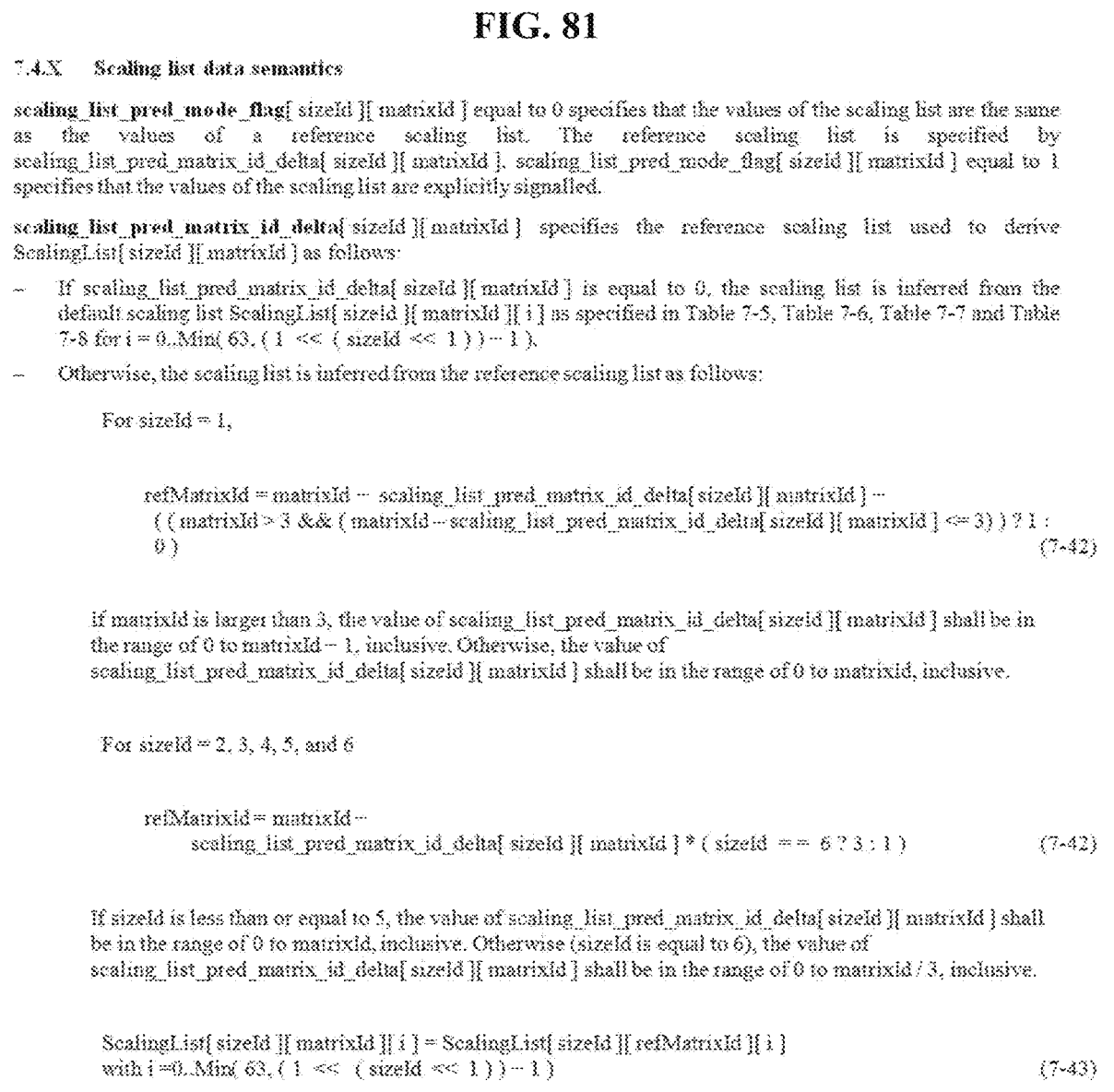

7.4.X Scaling list data semantics scaling_list_pred_mode_flag[ sizeId ][ matrixId ] equal to 0 specifies that the values of the scaling list are the same as the values of a reference scaling list. The reference scaling list is specified by scaling_list_pred_matrix_id_delta[ sizeId ][ matrixId ]. scaling_list_pred_mode_flag[ sizeId ][ matrixId ] equal to 1 specifies that the values of the scaling list are explicitly signalled.

scaling_list_pred_matrix_id_delta[ sizeId ][ matrixId ] specifies the reference scaling list used to derive ScalingList[ sizeId ][ matrixId ] as follows:

- If scaling_list_pred_matrix_id_delta[ sizeId ][ matrixId ] is equal to 0, the scaling list is inferred from the default scaling list ScalingList[ sizeId ][ matrixId ][ i ] as specified in Table 7-5, Table 7-6, Table 7-7 and Table 7-8 for i = 0..Min( 63, ( 1 << ( sizeId << 1 ) ) − 1 ).
- Otherwise, the scaling list is inferred from the reference scaling list as follows:

For sizeId = 1, refMatrixId = matrixId − scaling_list_pred_matrix_id_delta[ sizeId ][ matrixId ] − ( ( matrixId > 3 && ( matrixId − scaling_list_pred_matrix_id_delta[ sizeId ][ matrixId ] <= 3) ) ? 1 : 0 ) (7-42)

if matrixId is larger than 3, the value of scaling_list_pred_matrix_id_delta[ sizeId ][ matrixId ] shall be in the range of 0 to matrixId − 1, inclusive. Otherwise, the value of scaling_list_pred_matrix_id_delta[ sizeId ][ matrixId ] shall be in the range of 0 to matrixId, inclusive.

For sizeId = 2, 3, 4, 5, and 6 refMatrixId = matrixId − scaling_list_pred_matrix_id_delta[ sizeId ][ matrixId ] * ( sizeId = = 6 ? 3 : 1 ) (7-42)

If sizeId is less than or equal to 5, the value of scaling_list_pred_matrix_id_delta[ sizeId ][ matrixId ] shall be in the range of 0 to matrixId, inclusive. Otherwise (sizeId is equal to 6), the value of scaling_list_pred_matrix_id_delta[ sizeId ][ matrixId ] shall be in the range of 0 to matrixId / 3, inclusive.

ScalingList[ sizeId ][ matrixId ][ i ] = ScalingList[ sizeId ][ refMatrixId ][ i ] with i =0..Min( 63, ( 1 << ( sizeId << 1 ) ) − 1 ) (7-43)

FIG. 82

Table 7-3 – Specification of sizeId

| Size of quantization matrix | sizeId |
|---|---|
| 1x1 | 0 |
| 2x2 | 1 |
| 4x4 | 2 |
| 8x8 | 3 |
| 16x16 | 4 |
| 32x32 | 5 |
| 64x64 | 6 |

Table 7-4 – Specification of matrixId according to sizeId, prediction mode and colour component

| sizeId | CuPredMode | cIdx (Colour component) | matrixId |
|---|---|---|---|
| 2, 3, 4, 5, 6 | MODE_INTRA | 0 (Y) | 0 |
| 1, 2, 3, 4, 5 | MODE_INTRA | 1 (Cb) | 1 |
| 1, 2, 3, 4, 5 | MODE_INTRA | 2 (Cr) | 2 |
| 2, 3, 4, 5, 6 | MODE_INTER | 0 (Y) | 3 |
| 1, 2, 3, 4, 5 | MODE_INTER | 1 (Cb) | 4 |
| 1, 2, 3, 4, 5 | MODE_INTER | 2 (Cr) | 5 |
| 2, 3, 4, 5, 6 | MODE_IBC | 0 (Y) | 6 |
| 1, 2, 3, 4, 5 | MODE_IBC | 1 (Cb) | 7 |
| 1, 2, 3, 4, 5 | MODE_IBC | 2 (Cr) | 8 |

FIG. 83 scaling_list_dc_coef_minus8[ sizeId − 4 ][ matrixId ] plus 8 specifies the value of the variable ScalingFactor[ 4 ][ matrixId ][ 0 ][ 0 ] for the scaling list for the 16x16 size when sizeId is equal to 4 and specifies the value of ScalingFactor[ 5 ][ matrixId ][ 0 ][ 0 ] for the scaling list for the 32x32 size when sizeId is equal to 5, and specifies the value of ScalingFactor[ 6 ][ matrixId ][ 0 ][ 0 ] for the scaling list for the 64x64 size when sizeId is equal to 6. The value of scaling_list_dc_coef_minus8[ sizeId − 4 ][ matrixId ] shall be in the range of −7 to 247, inclusive.

When scaling_list_pred_mode_flag[ sizeId ][ matrixId ] is equal to 0, scaling_list_pred_matrix_id_delta[ sizeId ][ matrixId ] is equal to 0 and sizeId is greater than 3, the value of scaling_list_dc_coef_minus8[ sizeId − 4 ][ matrixId ] is inferred to be equal to 8.

When scaling_list_pred_matrix_id_delta[ sizeId ][ matrixId ] is not equal to 0 and sizeId is greater than 3, the value of scaling_list_dc_coef_minus8[ sizeId − 4 ][ matrixId ] is inferred to be equal to scaling_list_dc_coef_minus8[ sizeId − 4 ][ refMatrixId ], where the value of refMatrixId is given by Equation 7-42 .

scaling_list_delta_coef specifies the difference between the current matrix coefficient ScalingList[ sizeId ][ matrixId ][ i ] and the previous matrix coefficient ScalingList[ sizeId ][ matrixId ][ i − 1 ], when scaling_list_pred_mode_flag[ sizeId ][ matrixId ] is equal to 1. The value of scaling_list_delta_coef shall be in the range of −128 to 127, inclusive. The value of ScalingList[ sizeId ][ matrixId ][ i ] shall be greater than 0.

Table 7-5 – Specification of default values of ScalingList[ 1 ][ matrixId ][ i ] with i = 0..3

| i | 0 | 1 | 2 | 3 |
|---|---|---|---|---|
| ScalingList[ 1 ][ 1,2,4,5,7,8 ][ i ] | 16 | 16 | 16 | 16 |

Table 7-6 – Specification of default values of ScalingList[ 2 ][ matrixId ][ i ] with i = 0..15

| i | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| ScalingList[ 2 ][ 0..8 ][ i ] | 16 | 16 | 16 | 16 | 16 | 16 | 16 | 16 | 16 | 16 | 16 | 16 | 16 | 16 | 16 | 16 |

FIG. 84

Table 7-7 – Specification of default values of ScalingList[ 3..5 ][ matrixId ][ i ] with i = 0..63

| i | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| ScalingList[ 3..5 ][ 0..2 ][ i ] | 16 | 16 | 16 | 16 | 16 | 16 | 16 | 16 | 16 | 16 | 17 | 16 | 17 | 16 | 17 | 18 |
| ScalingList[ 3..5 ][ 3..5 ][ i ] | 16 | 16 | 16 | 16 | 16 | 16 | 16 | 16 | 16 | 16 | 17 | 17 | 17 | 17 | 17 | 18 |
| ScalingList[ 3..5 ][ 6..8 ][ i ] | 16 | 16 | 16 | 16 | 16 | 16 | 16 | 16 | 16 | 16 | 17 | 16 | 17 | 16 | 17 | 18 |
| i – 16 | 0 | 1 | 2 | 3 | 4 | 5 | 6 | 7 | 8 | 9 | 10 | 11 | 12 | 13 | 14 | 15 |
| ScalingList[ 3..5 ][ 0..2 ][ i ] | 17 | 18 | 18 | 17 | 18 | 21 | 19 | 20 | 21 | 20 | 19 | 21 | 24 | 22 | 22 | 24 |
| ScalingList[ 3..5 ][ 3..5 ][ i ] | 18 | 18 | 18 | 18 | 18 | 20 | 20 | 20 | 20 | 20 | 20 | 20 | 24 | 24 | 24 | 24 |
| ScalingList[ 3..5 ][ 6..8 ][ i ] | 17 | 18 | 18 | 17 | 18 | 21 | 19 | 20 | 21 | 20 | 19 | 21 | 24 | 22 | 22 | 24 |
| i – 32 | 0 | 1 | 2 | 3 | 4 | 5 | 6 | 7 | 8 | 9 | 10 | 11 | 12 | 13 | 14 | 15 |
| ScalingList[ 3..5 ][ 0..2 ][ i ] | 24 | 22 | 22 | 24 | 25 | 25 | 27 | 30 | 27 | 25 | 25 | 29 | 31 | 35 | 35 | 31 |
| ScalingList[ 3..5 ][ 3..5 ][ i ] | 24 | 24 | 24 | 24 | 25 | 25 | 25 | 25 | 25 | 25 | 25 | 28 | 28 | 28 | 28 | 28 |
| ScalingList[ 3..5 ][ 6..8 ][ i ] | 24 | 22 | 22 | 24 | 25 | 25 | 27 | 30 | 27 | 25 | 25 | 29 | 31 | 35 | 35 | 31 |
| i – 48 | 0 | 1 | 2 | 3 | 4 | 5 | 6 | 7 | 8 | 9 | 10 | 11 | 12 | 13 | 14 | 15 |
| ScalingList[ 3..5 ][ 0..2 ][ i ] | 29 | 36 | 41 | 44 | 41 | 36 | 47 | 54 | 54 | 47 | 65 | 70 | 65 | 88 | 88 | 115 |
| ScalingList[ 3..5 ][ 3..5 ][ i ] | 28 | 33 | 33 | 33 | 33 | 33 | 41 | 41 | 41 | 41 | 54 | 54 | 54 | 71 | 71 | 91 |
| ScalingList[ 3..5 ][ 6..8 ][ i ] | 29 | 36 | 41 | 44 | 41 | 36 | 47 | 54 | 54 | 47 | 65 | 70 | 65 | 88 | 88 | 115 |

Table 7-6 – Specification of default values of ScalingList[ 6 ][ matrixId ][ i ] with i = 0..63

| i | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| ScalingList[ 6 ][ 0 ][ i ] | 16 | 16 | 16 | 16 | 16 | 16 | 16 | 16 | 16 | 16 | 17 | 16 | 17 | 16 | 17 | 18 |
| ScalingList[ 6 ][ 3 ][ i ] | 16 | 16 | 16 | 16 | 16 | 16 | 16 | 16 | 16 | 16 | 17 | 17 | 17 | 17 | 17 | 18 |
| ScalingList[ 6 ][ 6 ][ i ] | 16 | 16 | 16 | 16 | 16 | 16 | 16 | 16 | 16 | 16 | 17 | 16 | 17 | 16 | 17 | 18 |
| i – 16 | 0 | 1 | 2 | 3 | 4 | 5 | 6 | 7 | 8 | 9 | 10 | 11 | 12 | 13 | 14 | 15 |
| ScalingList[ 6 ][ 0 ][ i ] | 17 | 18 | 18 | 17 | 18 | 21 | 19 | 20 | 21 | 20 | 19 | 21 | 24 | 22 | 22 | 24 |
| ScalingList[ 6 ][ 3 ][ i ] | 18 | 18 | 18 | 18 | 18 | 20 | 20 | 20 | 20 | 20 | 20 | 20 | 24 | 24 | 24 | 24 |
| ScalingList[ 6 ][ 6 ][ i ] | 17 | 18 | 18 | 17 | 18 | 21 | 19 | 20 | 21 | 20 | 19 | 21 | 24 | 22 | 22 | 24 |
| i – 32 | 0 | 1 | 2 | 3 | 4 | 5 | 6 | 7 | 8 | 9 | 10 | 11 | 12 | 13 | 14 | 15 |
| ScalingList[ 6 ][ 0 ][ i ] | 24 | 22 | 22 | 24 | 25 | 25 | 27 | 30 | 27 | 25 | 25 | 29 | 31 | 35 | 35 | 31 |
| ScalingList[ 6 ][ 3 ][ i ] | 24 | 24 | 24 | 24 | 25 | 25 | 25 | 25 | 25 | 25 | 25 | 28 | 28 | 28 | 28 | 28 |
| ScalingList[ 6 ][ 6 ][ i ] | 24 | 22 | 22 | 24 | 25 | 25 | 27 | 30 | 27 | 25 | 25 | 29 | 31 | 35 | 35 | 31 |
| i – 48 | 0 | 1 | 2 | 3 | 4 | 5 | 6 | 7 | 8 | 9 | 10 | 11 | 12 | 13 | 14 | 15 |
| ScalingList[ 6 ][ 0 ][ i ] | 29 | 36 | 41 | 44 | 41 | 36 | 47 | 54 | 54 | 47 | 65 | 70 | 65 | 88 | 88 | 115 |
| ScalingList[ 6 ][ 3 ][ i ] | 28 | 33 | 33 | 33 | 33 | 33 | 41 | 41 | 41 | 41 | 54 | 54 | 54 | 71 | 71 | 91 |
| ScalingList[ 6 ][ 6 ][ i ] | 29 | 36 | 41 | 44 | 41 | 36 | 47 | 54 | 54 | 47 | 65 | 70 | 65 | 88 | 88 | 115 |

FIG. 85

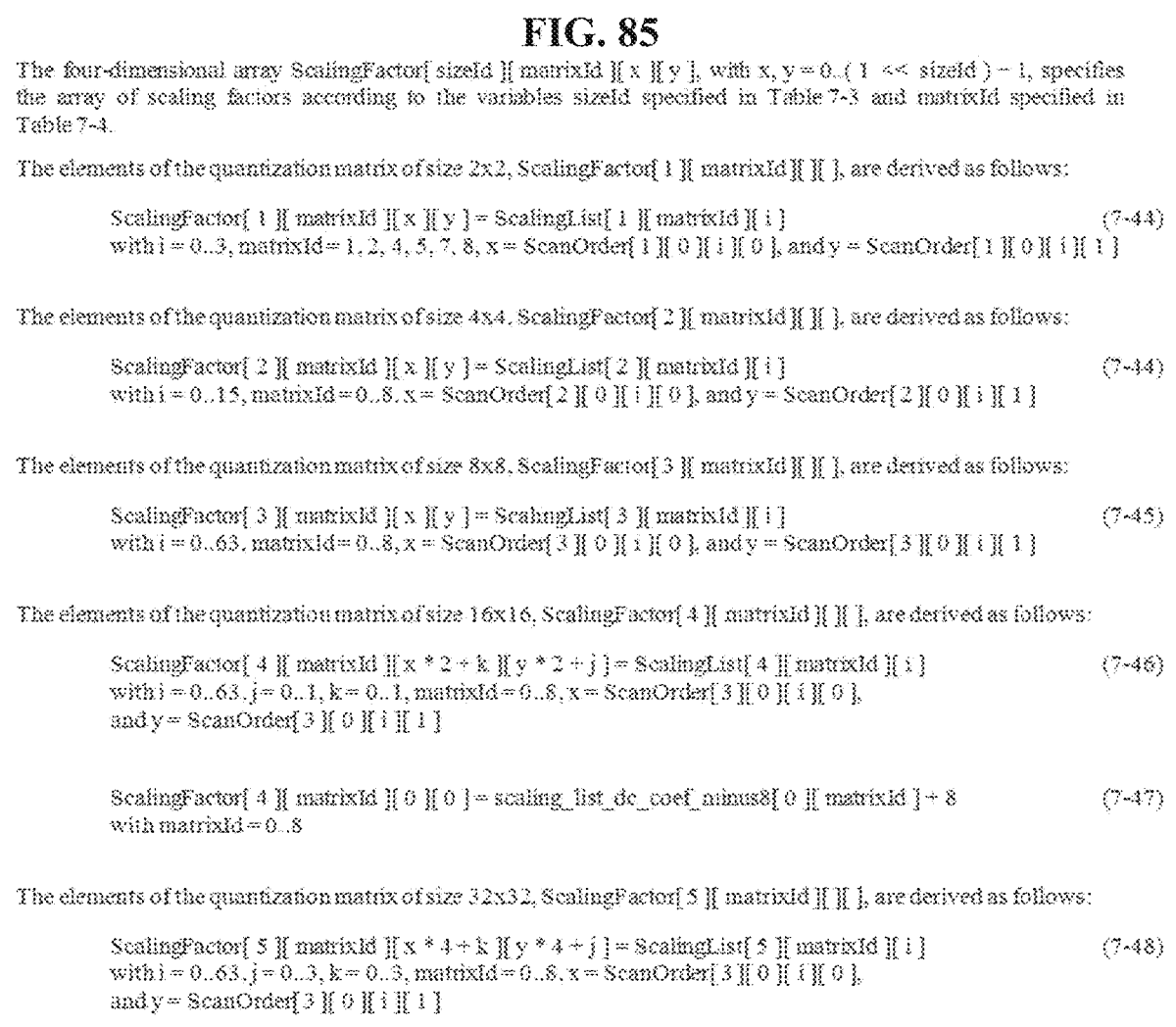

The four-dimensional array ScalingFactor[ sizeId ][ matrixId ][ x ][ y ], with x, y = 0..( 1 << sizeId ) − 1, specifies the array of scaling factors according to the variables sizeId specified in Table 7-3 and matrixId specified in Table 7-4.

The elements of the quantization matrix of size 2x2, ScalingFactor[ 1 ][ matrixId ][ ][ ], are derived as follows:

ScalingFactor[ 1 ][ matrixId ][ x ][ y ] = ScalingList[ 1 ][ matrixId ][ i ] (7-44)
with i = 0..3, matrixId = 1, 2, 4, 5, 7, 8, x = ScanOrder[ 1 ][ 0 ][ i ][ 0 ], and y = ScanOrder[ 1 ][ 0 ][ i ][ 1 ]

The elements of the quantization matrix of size 4x4, ScalingFactor[ 2 ][ matrixId ][ ][ ], are derived as follows:

ScalingFactor[ 2 ][ matrixId ][ x ][ y ] = ScalingList[ 2 ][ matrixId ][ i ] (7-44)
with i = 0..15, matrixId = 0..8, x = ScanOrder[ 2 ][ 0 ][ i ][ 0 ], and y = ScanOrder[ 2 ][ 0 ][ i ][ 1 ]

The elements of the quantization matrix of size 8x8, ScalingFactor[ 3 ][ matrixId ][ ][ ], are derived as follows:

ScalingFactor[ 3 ][ matrixId ][ x ][ y ] = ScalingList[ 3 ][ matrixId ][ i ] (7-45)
with i = 0..63, matrixId = 0..8, x = ScanOrder[ 3 ][ 0 ][ i ][ 0 ], and y = ScanOrder[ 3 ][ 0 ][ i ][ 1 ]

The elements of the quantization matrix of size 16x16, ScalingFactor[ 4 ][ matrixId ][ ][ ], are derived as follows:

ScalingFactor[ 4 ][ matrixId ][ x * 2 + k ][ y * 2 + j ] = ScalingList[ 4 ][ matrixId ][ i ] (7-46)
with i = 0..63, j = 0..1, k = 0..1, matrixId = 0..8, x = ScanOrder[ 3 ][ 0 ][ i ][ 0 ],
and y = ScanOrder[ 3 ][ 0 ][ i ][ 1 ]

ScalingFactor[ 4 ][ matrixId ][ 0 ][ 0 ] = scaling_list_dc_coef_minus8[ 0 ][ matrixId ] + 8 (7-47)
with matrixId = 0..8

The elements of the quantization matrix of size 32x32, ScalingFactor[ 5 ][ matrixId ][ ][ ], are derived as follows:

ScalingFactor[ 5 ][ matrixId ][ x * 4 + k ][ y * 4 + j ] = ScalingList[ 5 ][ matrixId ][ i ] (7-48)
with i = 0..63, j = 0..3, k = 0..3, matrixId = 0..8, x = ScanOrder[ 3 ][ 0 ][ i ][ 0 ],
and y = ScanOrder[ 3 ][ 0 ][ i ][ 1 ]

FIG. 86

The elements of the quantization matrix of size 64x64, ScalingFactor[ 6 ][ matrixId ][ ][ ], are derived as follows:

ScalingFactor[ 6 ][ matrixId ][ x * 8 + k ][ y * 8 + j ] = ScalingList[ 6 ][ matrixId ][ i ] (7-48)
with i = 0..63, j = 0..7, k = 0..7, matrixId = 0, 3, 6, x = ScanOrder[ 3 ][ 0 ][ i ][ 0 ],
and y = ScanOrder[ 3 ][ 0 ][ i ][ 1 ]

ScalingFactor[ 6 ][ matrixId ][ 0 ][ 0 ] = scaling_list_dc_coef_minus8[ 2 ][ matrixId ] + 8 (7-49)
with matrixId = 0, 3, 6

When ChromaArrayType is equal to 3, the elements of the chroma quantization matrix of size 64x64, ScalingFactor[ 6 ][ matrixId ][ ][ ], with matrixId = 1, 2, 4, 5, 7, and 8 are derived as follows:

ScalingFactor[ 6 ][ matrixId ][ x * 8 + k ][ y * 8 + j ] = ScalingList[ 5 ][ matrixId ][ i ] (7-50)
with i = 0..63, j = 0..7, k = 0..7, x = ScanOrder[ 3 ][ 0 ][ i ][ 0 ], and y = ScanOrder[ 3 ][ 0 ][ i ][ 1 ]

ScalingFactor[ 6 ][ matrixId ][ 0 ][ 0 ] = scaling_list_dc_coef_minus8[ 1 ][ matrixId ] + 8 (7-51)

The five-dimensional array ScalingFactor2[ sizeIdW ][sizeIdH][ matrixId ][ x ][ y ], with x = 0..( 1 << sizeIdW ) − 1, y = 0..( 1 << sizeIdH ) − 1, specifies the array of scaling factors according to the variables sizeIdW and sizeIdH specified in Table 7-XX, are derived as follows:

ScalingFactor2[ sizeIdW ][ sizeIdH ][ matrixId ][ x ][ y ] =
ScalingFactor[ sizeId ][ matrixId ][ x * ratioW ][ y * ratioH ] (7-XX)
with sizeId = max( sizeIdW, sizeIdH ), sizeIdW = 0..6, sizeIdH = 0..6, matrixId = 0..8, x = 0..( 1 << sizeIdW) − 1, y = 0..( 1 << sizeIdH ) − 1,
and ratioW = ( 1 << sizeId ) / ( 1 << sizeIdW ), ratioH = ( 1 << sizeId ) / ( 1 << sizeIdH ), ( sizeIdW, sizeIdH ) = (0, 0) is unused.

Table 7-XX – Specification of sizeIdW and sizeIdH

| Size of quantization matrix | sizeIdW | sizeIdH |
|---|---|---|
| 1 | 0 | 0 |
| 2 | 1 | 1 |
| 4 | 2 | 2 |
| 8 | 3 | 3 |
| 16 | 4 | 4 |
| 32 | 5 | 5 |
| 64 | 6 | 6 |

FIG. 87

Scaling process for transform coefficients

Inputs to this process are:

- a luma location ( xTbY, yTbY ) specifying the top-left sample of the current luma transform block relative to the top-left luma sample of the current picture,
- a variable nTbW specifying the transform block width,
- a variable nTbH specifying the transform block height,
- a variable cIdx specifying the colour component of the current block,
- a variable bitDepth specifying the bit depth of the current colour component.

Output of this process is the (nTbW)x(nTbH) array d of scaled transform coefficients with elements d[ x ][ y ].

The quantization parameter qP is derived as follows:

- If cIdx is equal to 0, the following applies:

$$qP = Qp'_Y \quad (8\text{-}975)$$

- Otherwise, if cIdx is equal to 1, the following applies:

$$qP = Qp'_{Cb} \quad (8\text{-}976)$$

- Otherwise (cIdx is equal to 2), the following applies:

$$qP = Qp'_{Cr} \quad (8\text{-}977)$$

The variables bdShift, rectNorm and bdOffset are derived as follows:

$$bdShift = bitDepth + ( ( ( Log2( nTbW ) + Log2( nTbH ) ) \& 1 ) * 8 + ( Log2( nTbW ) + Log2( nTbH ) ) / 2 ) - 5 + dep\_quant\_enabled\_flag \quad (8\text{-}978)$$

$$rectNorm = ( ( Log2( nTbW ) + Log2( nTbH ) ) \& 1 ) == 1 \ ? \ 181 \ : \ 1 \quad (8\text{-}979)$$

The list levelScale[ ] is specified as levelScale[ k ] = { 40, 45, 51, 57, 64, 72 } with k = 0..5.

For the derivation of the scaled transform coefficients d[ x ][ y ] with x = 0..nTbW − 1, y = 0..nTbH − 1, the following applies:

- The intermediate scaling factor m[ x ][ y ] is derived as follows:
  - If one or more of the following conditions are true, m[ x ][ y ] is set equal to 16:
    - scaling_list_enabled_flag is equal to 0.
    - transform_skip_flag[ xTbY ][ yTbY ] is equal to 1 and cIdx is equal to 0.
  - Otherwise, the following applies:
    - m[ x ][ y ] = ScalingFactor2[ sizeIdW ][ sizeIdH ][ matrixId ][ x ][ y ] (8-XXX)

Where sizeIdW and sizeIdH are specified in Table 7-XX for the size of the quantization matrix equal to (nTbW)x(nTbH) and matrixId is specified in Table 7-4 for sizeId, CuPredMode[ xTbY ][ yTbY ] and cIdx, respectively.

- The scaling factor ls[ x ][ y ] is derived as follows:
  - If dep_quant_enabled_flag is equal to 1, the following applies:

ls[ x ][ y ] = ( m[ x ][ y ] * levelScale[ (qP + 1) % 6 ] ) << ( (qP + 1) / 6 ) (8-981)

- Otherwise (dep_quant_enabled_flag is equal to 0), the following applies:

ls[ x ][ y ] = ( m[ x ][ y ] * levelScale[ qP % 6 ] ) << ( qP / 6 ) (8-982)

- The value dnc[ x ][ y ] is derived as follows:

dnc[ x ][ y ] = (8-983)
  ( TransCoeffLevel[ xTbY ][ yTbY ][ cIdx ][ x ][ y ] * ls[ x ][ y ] * rectNorm +bdOffset ) >> bdShift

- The scaled transform coefficient d[ x ][ y ] is derived as follows:

d[ x ][ y ] = Clip3( CoeffMin, CoeffMax, dnc[ x ][ y ] ) (8-984)

FIG. 89

| i | 0 | 1 | 2 | 3 |
|---|---|---|---|---|
| ScalingList[ 1 ][ 1,2,4,5,7,8 ][ i ] | 16 | 16 | 16 | 16 |

FIG. 90

| i | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| ScalingList[ 2 ][ 0..8 ][ i ] | 16 | 16 | 16 | 16 | 16 | 16 | 16 | 16 | 16 | 16 | 16 | 16 | 16 | 16 | 16 | 16 |

FIG. 91

| i | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| ScalingList[ 3..5 ][ 0..2 ][ i ] | 16 | 16 | 16 | 16 | 16 | 16 | 16 | 16 | 16 | 16 | 17 | 16 | 17 | 16 | 17 | 18 |
| ScalingList[ 3..5 ][ 3..5 ][ i ] | 16 | 16 | 16 | 16 | 16 | 16 | 16 | 16 | 16 | 16 | 17 | 17 | 17 | 17 | 17 | 18 |
| ScalingList[ 3..5 ][ 6..8 ][ i ] | 16 | 16 | 16 | 16 | 16 | 16 | 16 | 16 | 16 | 16 | 17 | 17 | 17 | 17 | 17 | 18 |
| i – 16 | 0 | 1 | 2 | 3 | 4 | 5 | 6 | 7 | 8 | 9 | 10 | 11 | 12 | 13 | 14 | 15 |
| ScalingList[ 3..5 ][ 0..2 ][ i ] | 17 | 18 | 18 | 17 | 18 | 21 | 19 | 20 | 21 | 20 | 19 | 21 | 24 | 22 | 22 | 24 |
| ScalingList[ 3..5 ][ 3..5 ][ i ] | 18 | 18 | 18 | 18 | 18 | 20 | 20 | 20 | 20 | 20 | 20 | 20 | 24 | 24 | 24 | 24 |
| ScalingList[ 3..5 ][ 6..8 ][ i ] | 18 | 18 | 18 | 18 | 18 | 20 | 20 | 20 | 20 | 20 | 20 | 20 | 24 | 24 | 24 | 24 |
| i – 32 | 0 | 1 | 2 | 3 | 4 | 5 | 6 | 7 | 8 | 9 | 10 | 11 | 12 | 13 | 14 | 15 |
| ScalingList[ 3..5 ][ 0..2 ][ i ] | 24 | 22 | 22 | 24 | 25 | 25 | 27 | 30 | 27 | 25 | 25 | 29 | 31 | 35 | 35 | 31 |
| ScalingList[ 3..5 ][ 3..5 ][ i ] | 24 | 24 | 24 | 24 | 25 | 25 | 25 | 25 | 25 | 25 | 25 | 28 | 28 | 28 | 28 | 28 |
| ScalingList[ 3..5 ][ 6..8 ][ i ] | 24 | 24 | 24 | 24 | 25 | 25 | 25 | 25 | 25 | 25 | 25 | 28 | 28 | 28 | 28 | 28 |
| i – 48 | 0 | 1 | 2 | 3 | 4 | 5 | 6 | 7 | 8 | 9 | 10 | 11 | 12 | 13 | 14 | 15 |
| ScalingList[ 3..5 ][ 0..2 ][ i ] | 29 | 36 | 41 | 44 | 41 | 36 | 47 | 54 | 54 | 47 | 65 | 70 | 65 | 88 | 88 | 115 |
| ScalingList[ 3..5 ][ 3..5 ][ i ] | 28 | 33 | 33 | 33 | 33 | 33 | 41 | 41 | 41 | 41 | 54 | 54 | 54 | 71 | 71 | 91 |
| ScalingList[ 3..5 ][ 6..8 ][ i ] | 28 | 33 | 33 | 33 | 33 | 33 | 41 | 41 | 41 | 41 | 54 | 54 | 54 | 71 | 71 | 91 |

FIG. 92

| i | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| ScalingList[ 6 ][ 0 ][ i ] | 16 | 16 | 16 | 16 | 16 | 16 | 16 | 16 | 16 | 16 | 17 | 16 | 17 | 16 | 17 | 18 |
| ScalingList[ 6 ][ 3 ][ i ] | 16 | 16 | 16 | 16 | 16 | 16 | 16 | 16 | 16 | 16 | 17 | 17 | 17 | 17 | 17 | 18 |
| ScalingList[ 6 ][ 6 ][ i ] | 16 | 16 | 16 | 16 | 16 | 16 | 16 | 16 | 16 | 16 | 17 | 17 | 17 | 17 | 17 | 18 |
| i – 16 | 0 | 1 | 2 | 3 | 4 | 5 | 6 | 7 | 8 | 9 | 10 | 11 | 12 | 13 | 14 | 15 |
| ScalingList[ 6 ][ 0 ][ i ] | 17 | 18 | 18 | 17 | 18 | 21 | 19 | 20 | 21 | 20 | 19 | 21 | 24 | 22 | 22 | 24 |
| ScalingList[ 6 ][ 3 ][ i ] | 18 | 18 | 18 | 18 | 18 | 20 | 20 | 20 | 20 | 20 | 20 | 20 | 24 | 24 | 24 | 24 |
| ScalingList[ 6 ][ 6 ][ i ] | 18 | 18 | 18 | 18 | 18 | 20 | 20 | 20 | 20 | 20 | 20 | 20 | 24 | 24 | 24 | 24 |
| i – 32 | 0 | 1 | 2 | 3 | 4 | 5 | 6 | 7 | 8 | 9 | 10 | 11 | 12 | 13 | 14 | 15 |
| ScalingList[ 6 ][ 0 ][ i ] | 24 | 22 | 22 | 24 | 25 | 25 | 27 | 30 | 27 | 25 | 25 | 29 | 31 | 35 | 35 | 31 |
| ScalingList[ 6 ][ 3 ][ i ] | 24 | 24 | 24 | 24 | 25 | 25 | 25 | 25 | 25 | 25 | 25 | 28 | 28 | 28 | 28 | 28 |
| ScalingList[ 6 ][ 6 ][ i ] | 24 | 24 | 24 | 24 | 25 | 25 | 25 | 25 | 25 | 25 | 25 | 28 | 28 | 28 | 28 | 28 |
| i – 48 | 0 | 1 | 2 | 3 | 4 | 5 | 6 | 7 | 8 | 9 | 10 | 11 | 12 | 13 | 14 | 15 |
| ScalingList[ 6 ][ 0 ][ i ] | 29 | 36 | 41 | 44 | 41 | 36 | 47 | 54 | 54 | 47 | 65 | 70 | 65 | 88 | 88 | 115 |
| ScalingList[ 6 ][ 3 ][ i ] | 28 | 33 | 33 | 33 | 33 | 33 | 41 | 41 | 41 | 41 | 54 | 54 | 54 | 71 | 71 | 91 |
| ScalingList[ 6 ][ 6 ][ i ] | 28 | 33 | 33 | 33 | 33 | 33 | 41 | 41 | 41 | 41 | 54 | 54 | 54 | 71 | 71 | 91 |

FIG. 93

| i | 0 | 1 | 2 | 3 |
|---|---|---|---|---|
| ScalingList[ 1 ][ 1,2,4,5,7,8 ][ i ] | 16 | 16 | 16 | 16 |

FIG. 94

| i | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| ScalingList[ 2 ][ 0..8 ][ i ] | 16 | 16 | 16 | 16 | 16 | 16 | 16 | 16 | 16 | 16 | 16 | 16 | 16 | 16 | 16 | 16 |

FIG. 95

| i | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| ScalingList[ 3..5 ][ 0..2 ][ i ] | 16 | 16 | 16 | 16 | 16 | 16 | 16 | 16 | 16 | 16 | 17 | 16 | 17 | 16 | 17 | 18 |
| ScalingList[ 3..5 ][ 3..5 ][ i ] | 16 | 16 | 16 | 16 | 16 | 16 | 16 | 16 | 16 | 16 | 17 | 17 | 17 | 17 | 17 | 18 |
| ScalingList[ 3..5 ][ 6..8 ][ i ] | 16 | 16 | 16 | 16 | 16 | 16 | 16 | 16 | 16 | 16 | 16 | 16 | 16 | 16 | 16 | 16 |
| i – 16 | 0 | 1 | 2 | 3 | 4 | 5 | 6 | 7 | 8 | 9 | 10 | 11 | 12 | 13 | 14 | 15 |
| ScalingList[ 3..5 ][ 0..2 ][ i ] | 17 | 18 | 18 | 17 | 18 | 21 | 19 | 20 | 21 | 20 | 19 | 21 | 24 | 22 | 22 | 24 |
| ScalingList[ 3..5 ][ 3..5 ][ i ] | 18 | 18 | 18 | 18 | 18 | 20 | 20 | 20 | 20 | 20 | 20 | 20 | 24 | 24 | 24 | 24 |
| ScalingList[ 3..5 ][ 6..8 ][ i ] | 16 | 16 | 16 | 16 | 16 | 16 | 16 | 16 | 16 | 16 | 16 | 16 | 16 | 16 | 16 | 16 |
| i – 32 | 0 | 1 | 2 | 3 | 4 | 5 | 6 | 7 | 8 | 9 | 10 | 11 | 12 | 13 | 14 | 15 |
| ScalingList[ 3..5 ][ 0..2 ][ i ] | 24 | 22 | 22 | 24 | 25 | 25 | 27 | 30 | 27 | 25 | 25 | 29 | 31 | 35 | 35 | 31 |
| ScalingList[ 3..5 ][ 3..5 ][ i ] | 24 | 24 | 24 | 24 | 25 | 25 | 25 | 25 | 25 | 25 | 25 | 28 | 28 | 28 | 28 | 28 |
| ScalingList[ 3..5 ][ 6..8 ][ i ] | 16 | 16 | 16 | 16 | 16 | 16 | 16 | 16 | 16 | 16 | 16 | 16 | 16 | 16 | 16 | 16 |
| i – 48 | 0 | 1 | 2 | 3 | 4 | 5 | 6 | 7 | 8 | 9 | 10 | 11 | 12 | 13 | 14 | 15 |
| ScalingList[ 3..5 ][ 0..2 ][ i ] | 29 | 36 | 41 | 44 | 41 | 36 | 47 | 54 | 54 | 47 | 65 | 70 | 65 | 88 | 88 | 115 |
| ScalingList[ 3..5 ][ 3..5 ][ i ] | 28 | 33 | 33 | 33 | 33 | 33 | 41 | 41 | 41 | 41 | 54 | 54 | 54 | 71 | 71 | 91 |
| ScalingList[ 3..5 ][ 6..8 ][ i ] | 16 | 16 | 16 | 16 | 16 | 16 | 16 | 16 | 16 | 16 | 16 | 16 | 16 | 16 | 16 | 16 |

FIG. 96

| i | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| ScalingList[ 6 ][ 0 ][ i ] | 16 | 16 | 16 | 16 | 16 | 16 | 16 | 16 | 16 | 16 | 17 | 16 | 17 | 16 | 17 | 18 |
| ScalingList[ 6 ][ 3 ][ i ] | 16 | 16 | 16 | 16 | 16 | 16 | 16 | 16 | 16 | 16 | 17 | 17 | 17 | 17 | 17 | 18 |
| ScalingList[ 6 ][ 6 ][ i ] | 16 | 16 | 16 | 16 | 16 | 16 | 16 | 16 | 16 | 16 | 16 | 16 | 16 | 16 | 16 | 16 |
| i – 16 | 0 | 1 | 2 | 3 | 4 | 5 | 6 | 7 | 8 | 9 | 10 | 11 | 12 | 13 | 14 | 15 |
| ScalingList[ 6 ][ 0 ][ i ] | 17 | 18 | 18 | 17 | 18 | 21 | 19 | 20 | 21 | 20 | 19 | 21 | 24 | 22 | 22 | 24 |
| ScalingList[ 6 ][ 3 ][ i ] | 18 | 18 | 18 | 18 | 18 | 20 | 20 | 20 | 20 | 20 | 20 | 20 | 24 | 24 | 24 | 24 |
| ScalingList[ 6 ][ 6 ][ i ] | 16 | 16 | 16 | 16 | 16 | 16 | 16 | 16 | 16 | 16 | 16 | 16 | 16 | 16 | 16 | 16 |
| i – 32 | 0 | 1 | 2 | 3 | 4 | 5 | 6 | 7 | 8 | 9 | 10 | 11 | 12 | 13 | 14 | 15 |
| ScalingList[ 6 ][ 0 ][ i ] | 24 | 22 | 22 | 24 | 25 | 25 | 27 | 30 | 27 | 25 | 25 | 29 | 31 | 35 | 35 | 31 |
| ScalingList[ 6 ][ 3 ][ i ] | 24 | 24 | 24 | 24 | 25 | 25 | 25 | 25 | 25 | 25 | 25 | 28 | 28 | 28 | 28 | 28 |
| ScalingList[ 6 ][ 6 ][ i ] | 16 | 16 | 16 | 16 | 16 | 16 | 16 | 16 | 16 | 16 | 16 | 16 | 16 | 16 | 16 | 16 |
| i – 48 | 0 | 1 | 2 | 3 | 4 | 5 | 6 | 7 | 8 | 9 | 10 | 11 | 12 | 13 | 14 | 15 |
| ScalingList[ 6 ][ 0 ][ i ] | 29 | 36 | 41 | 44 | 41 | 36 | 47 | 54 | 54 | 47 | 65 | 70 | 65 | 88 | 88 | 115 |
| ScalingList[ 6 ][ 3 ][ i ] | 28 | 33 | 33 | 33 | 33 | 33 | 41 | 41 | 41 | 41 | 54 | 54 | 54 | 71 | 71 | 91 |
| ScalingList[ 6 ][ 6 ][ i ] | 16 | 16 | 16 | 16 | 16 | 16 | 16 | 16 | 16 | 16 | 16 | 16 | 16 | 16 | 16 | 16 |

FIG. 97

| i | 0 | 1 | 2 | 3 |
|---|---|---|---|---|
| ScalingList[ 1 ][ 1,2,4,5,7,8 ][ i ] | 16 | 16 | 16 | 16 |

FIG. 98

| i | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| ScalingList[ 2 ][ 0..8 ][ i ] | 16 | 16 | 16 | 16 | 16 | 16 | 16 | 16 | 16 | 16 | 16 | 16 | 16 | 16 | 16 | 16 |

FIG. 99

| i | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| ScalingList[ 3..5 ][ 0..2 ][ i ] | 16 | 16 | 16 | 16 | 16 | 16 | 16 | 16 | 16 | 16 | 16 | 16 | 16 | 16 | 16 | 16 |
| ScalingList[ 3..5 ][ 3..5 ][ i ] | 16 | 16 | 16 | 16 | 16 | 16 | 16 | 16 | 16 | 16 | 16 | 16 | 16 | 16 | 16 | 16 |
| ScalingList[ 3..5 ][ 6..8 ][ i ] | 16 | 16 | 16 | 16 | 16 | 16 | 16 | 16 | 16 | 16 | 16 | 16 | 16 | 16 | 16 | 16 |
| i – 16 | 0 | 1 | 2 | 3 | 4 | 5 | 6 | 7 | 8 | 9 | 10 | 11 | 12 | 13 | 14 | 15 |
| ScalingList[ 3..5 ][ 0..2 ][ i ] | 16 | 16 | 16 | 16 | 16 | 16 | 16 | 16 | 16 | 16 | 16 | 16 | 16 | 16 | 16 | 16 |
| ScalingList[ 3..5 ][ 3..5 ][ i ] | 16 | 16 | 16 | 16 | 16 | 16 | 16 | 16 | 16 | 16 | 16 | 16 | 16 | 16 | 16 | 16 |
| ScalingList[ 3..5 ][ 6..8 ][ i ] | 16 | 16 | 16 | 16 | 16 | 16 | 16 | 16 | 16 | 16 | 16 | 16 | 16 | 16 | 16 | 16 |
| i – 32 | 0 | 1 | 2 | 3 | 4 | 5 | 6 | 7 | 8 | 9 | 10 | 11 | 12 | 13 | 14 | 15 |
| ScalingList[ 3..5 ][ 0..2 ][ i ] | 16 | 16 | 16 | 16 | 16 | 16 | 16 | 16 | 16 | 16 | 16 | 16 | 16 | 16 | 16 | 16 |
| ScalingList[ 3..5 ][ 3..5 ][ i ] | 16 | 16 | 16 | 16 | 16 | 16 | 16 | 16 | 16 | 16 | 16 | 16 | 16 | 16 | 16 | 16 |
| ScalingList[ 3..5 ][ 6..8 ][ i ] | 16 | 16 | 16 | 16 | 16 | 16 | 16 | 16 | 16 | 16 | 16 | 16 | 16 | 16 | 16 | 16 |
| i – 48 | 0 | 1 | 2 | 3 | 4 | 5 | 6 | 7 | 8 | 9 | 10 | 11 | 12 | 13 | 14 | 15 |
| ScalingList[ 3..5 ][ 0..2 ][ i ] | 16 | 16 | 16 | 16 | 16 | 16 | 16 | 16 | 16 | 16 | 16 | 16 | 16 | 16 | 16 | 16 |
| ScalingList[ 3..5 ][ 3..5 ][ i ] | 16 | 16 | 16 | 16 | 16 | 16 | 16 | 16 | 16 | 16 | 16 | 16 | 16 | 16 | 16 | 16 |
| ScalingList[ 3..5 ][ 6..8 ][ i ] | 16 | 16 | 16 | 16 | 16 | 16 | 16 | 16 | 16 | 16 | 16 | 16 | 16 | 16 | 16 | 16 |

FIG. 100

| i | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| ScalingList[ 6 ][ 0 ][ i ] | 16 | 16 | 16 | 16 | 16 | 16 | 16 | 16 | 16 | 16 | 16 | 16 | 16 | 16 | 16 | 16 |
| ScalingList[ 6 ][ 3 ][ i ] | 16 | 16 | 16 | 16 | 16 | 16 | 16 | 16 | 16 | 16 | 16 | 16 | 16 | 16 | 16 | 16 |
| ScalingList[ 6 ][ 6 ][ i ] | 16 | 16 | 16 | 16 | 16 | 16 | 16 | 16 | 16 | 16 | 16 | 16 | 16 | 16 | 16 | 16 |
| i – 16 | 0 | 1 | 2 | 3 | 4 | 5 | 6 | 7 | 8 | 9 | 10 | 11 | 12 | 13 | 14 | 15 |
| ScalingList[ 6 ][ 0 ][ i ] | 16 | 16 | 16 | 16 | 16 | 16 | 16 | 16 | 16 | 16 | 16 | 16 | 16 | 16 | 16 | 16 |
| ScalingList[ 6 ][ 3 ][ i ] | 16 | 16 | 16 | 16 | 16 | 16 | 16 | 16 | 16 | 16 | 16 | 16 | 16 | 16 | 16 | 16 |
| ScalingList[ 6 ][ 6 ][ i ] | 16 | 16 | 16 | 16 | 16 | 16 | 16 | 16 | 16 | 16 | 16 | 16 | 16 | 16 | 16 | 16 |
| i – 32 | 0 | 1 | 2 | 3 | 4 | 5 | 6 | 7 | 8 | 9 | 10 | 11 | 12 | 13 | 14 | 15 |
| ScalingList[ 6 ][ 0 ][ i ] | 16 | 16 | 16 | 16 | 16 | 16 | 16 | 16 | 16 | 16 | 16 | 16 | 16 | 16 | 16 | 16 |
| ScalingList[ 6 ][ 3 ][ i ] | 16 | 16 | 16 | 16 | 16 | 16 | 16 | 16 | 16 | 16 | 16 | 16 | 16 | 16 | 16 | 16 |
| ScalingList[ 6 ][ 6 ][ i ] | 16 | 16 | 16 | 16 | 16 | 16 | 16 | 16 | 16 | 16 | 16 | 16 | 16 | 16 | 16 | 16 |
| i – 48 | 0 | 1 | 2 | 3 | 4 | 5 | 6 | 7 | 8 | 9 | 10 | 11 | 12 | 13 | 14 | 15 |
| ScalingList[ 6 ][ 0 ][ i ] | 16 | 16 | 16 | 16 | 16 | 16 | 16 | 16 | 16 | 16 | 16 | 16 | 16 | 16 | 16 | 16 |
| ScalingList[ 6 ][ 3 ][ i ] | 16 | 16 | 16 | 16 | 16 | 16 | 16 | 16 | 16 | 16 | 16 | 16 | 16 | 16 | 16 | 16 |
| ScalingList[ 6 ][ 6 ][ i ] | 16 | 16 | 16 | 16 | 16 | 16 | 16 | 16 | 16 | 16 | 16 | 16 | 16 | 16 | 16 | 16 |

FIG. 101

Sequence parameter set RBSP syntax

| seq_parameter_set_rbsp( ) { | Descriptor |
|---|---|
| ... | |
| **scaling_list_enabled_flag** | u(1) |
| if( scaling_list_enabled_flag ) { | |
| **sps_scaling_list_data_present_flag** | u(1) |
| if( sps_scaling_list_data_present_flag ) | |
| scaling_list_data( ) | |
| } | |

Picture parameter set RBSP syntax

| pic_parameter_set_rbsp( ) { | Descriptor |
|---|---|
| ... | |
| **pps_scaling_list_data_present_flag** | u(1) |
| if( pps_scaling_list_data_present_flag ) | |
| scaling_list_data( ) | |
| **pps_extension_data_flag** | u(1) |
| rbsp_trailing_bits( ) | |
| } | |

FIG. 102

Scaling list data syntax

| scaling_list_data( ) { | Descriptor |
|---|---|
| for( sizeId = 1; sizeId < 7; sizeId++ ) | |
| for( matrixId = 0; matrixId < 6; matrixId ++ ) { | |
| if( ! ( (( sizeId == 1 ) && ( matrixId % 3 == 0 ) ) \|\| (( sizeId == 6 ) && ( matrixId % 3 != 0 ) )) ) { | |
| **scaling_list_pred_mode_flag**[ sizeId ][ matrixId ] | u(1) |
| if( !scaling_list_pred_mode_flag[ sizeId ][ matrixId ] ) | |
| **scaling_list_pred_matrix_id_delta**[ sizeId ][ matrixId ] | ue(v) |
| else { | |
| nextCoef = 8 | |
| coefNum = Min( 64, ( 1 << ( sizeId << 1 ) ) ) | |
| if( sizeId > 3 ) { | |
| **scaling_list_dc_coef_minus8**[ sizeId − 4 ][ matrixId ] | se(v) |
| nextCoef = scaling_list_dc_coef_minus8[ sizeId − 4 ][ matrixId ] + 8 | |
| } | |
| for( i = 0; i < coefNum; i++ ) { | |
| x = DiagScanOrder[ 3 ][ 3 ][ i ][ 0 ] | |
| y = DiagScanOrder[ 3 ][ 3 ][ i ][ 1 ] | |
| if ( !(sizeId==6 && x>=4 && y>=4) ) { | |
| **scaling_list_delta_coef** | se(v) |
| nextCoef = ( nextCoef + scaling_list_delta_coef + 256 ) % 256 | |
| ScalingList[ sizeId ][ matrixId ][ i ] = nextCoef | |
| } | |
| } | |
| } | |
| } | |
| } | |
| } | |
| } | |

FIG. 103

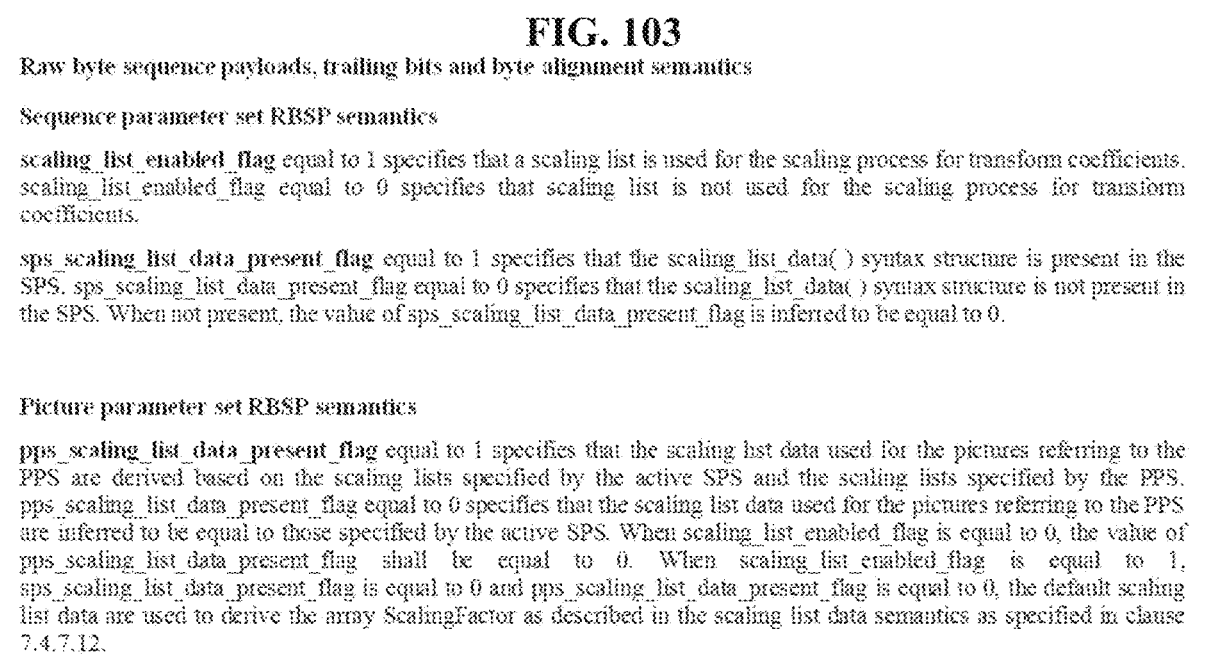

Raw byte sequence payloads, trailing bits and byte alignment semantics

Sequence parameter set RBSP semantics scaling_list_enabled_flag equal to 1 specifies that a scaling list is used for the scaling process for transform coefficients. scaling_list_enabled_flag equal to 0 specifies that scaling list is not used for the scaling process for transform coefficients.

sps_scaling_list_data_present_flag equal to 1 specifies that the scaling_list_data( ) syntax structure is present in the SPS. sps_scaling_list_data_present_flag equal to 0 specifies that the scaling_list_data( ) syntax structure is not present in the SPS. When not present, the value of sps_scaling_list_data_present_flag is inferred to be equal to 0.

Picture parameter set RBSP semantics pps_scaling_list_data_present_flag equal to 1 specifies that the scaling list data used for the pictures referring to the PPS are derived based on the scaling lists specified by the active SPS and the scaling lists specified by the PPS. pps_scaling_list_data_present_flag equal to 0 specifies that the scaling list data used for the pictures referring to the PPS are inferred to be equal to those specified by the active SPS. When scaling_list_enabled_flag is equal to 0, the value of pps_scaling_list_data_present_flag shall be equal to 0. When scaling_list_enabled_flag is equal to 1, sps_scaling_list_data_present_flag is equal to 0 and pps_scaling_list_data_present_flag is equal to 0, the default scaling list data are used to derive the array ScalingFactor as described in the scaling list data semantics as specified in clause 7.4.7.12.

FIG. 104

Scaling list data semantics scaling_list_pred_mode_flag[ sizeId ][ matrixId ] equal to 0 specifies that the values of the scaling list are the same as the values of a reference scaling list. The reference scaling list is specified by scaling_list_pred_matrix_id_delta[ sizeId ][ matrixId ]. scaling_list_pred_mode_flag[ sizeId ][ matrixId ] equal to 1 specifies that the values of the scaling list are explicitly signalled.

scaling_list_pred_matrix_id_delta[ sizeId ][ matrixId ] specifies the reference scaling list used to derive ScalingList[ sizeId ][ matrixId ]. the derivation of ScalingList[ sizeId ][ matrixId ] is based on scaling_list_pred_matrix_id_delta[ sizeId ][ matrixId ] as follows:

– If scaling_list_pred_matrix_id_delta[ sizeId ][ matrixId ] is equal to 0, the scaling list is inferred from the default scaling list ScalingList[ sizeId ][ matrixId ][ i ] as specified in Table 7-15, Table 7-16, Table 7-17 , Table 7-18 for i = 0..Min( 63, ( 1 << ( sizeId << 1 ) ) − 1 ).

– Otherwise, the scaling list is inferred from the reference scaling list as follows:

For sizeId = 1… 6, refMatrixId = matrixId − scaling_list_pred_matrix_id_delta[ sizeId ][ matrixId ] * ( sizeId = = 6 ? 3 : 1 )

If sizeId is equal to 1, the value of refMatrixId shall not be 0 or 3.

If sizeId is less than or equal to 5, the value of scaling_list_pred_matrix_id_delta[ sizeId ][ matrixId ] shall be in the range of 0 to matrixId, inclusive. Otherwise (sizeId is equal to 6), the value of scaling_list_pred_matrix_id_delta[ sizeId ][ matrixId ] shall be in the range of 0 to matrixId / 3, inclusive.

Table 7-13 – Specification of sizeId

| Size of quantization matrix | sizeId |
|---|---|
| 1x1 | 0 |
| 2x2 | 1 |
| 4x4 | 2 |
| 8x8 | 3 |
| 16x16 | 4 |
| 32x32 | 5 |
| 64x64 | 6 |

FIG. 105

Table 7-14 – Specification of matrixId according to sizeId, prediction mode and colour component

| sizeId | CuPredMode | cIdx (Colour component) | matrixId |
|---|---|---|---|
| 2, 3, 4, 5, 6 | MODE_INTRA | 0 (Y) | 0 |
| 1, 2, 3, 4, 5 | MODE_INTRA | 1 (Cb) | 1 |
| 1, 2, 3, 4, 5 | MODE_INTRA | 2 (Cr) | 2 |
| 2, 3, 4, 5, 6 | MODE_INTER | 0 (Y) | 3 |
| 1, 2, 3, 4, 5 | MODE_INTER | 1 (Cb) | 4 |
| 1, 2, 3, 4, 5 | MODE_INTER | 2 (Cr) | 5 |
| 2, 3, 4, 5, 6 | MODE_IBC | 0 (Y) | 0 |
| 1, 2, 3, 4, 5 | MODE_IBC | 1 (Cb) | 1 |
| 1, 2, 3, 4, 5 | MODE_IBC | 2 (Cr) | 2 |

scaling_list_dc_coef_minus8[ sizeId ][ matrixId ] plus 8 specifies the value of the variable ScalingFactor[ 4 ][ matrixId ][ 0 ][ 0 ] for the scaling list for the 16x16 size when sizeId is equal to 4 and specifies the value of ScalingFactor[ 5 ][ matrixId ][ 0 ][ 0 ] for the scaling list for the 32x32 size when sizeId is equal to 5, and specifies the value of ScalingFactor[ 6 ][ matrixId ][ 0 ][ 0 ] for the scaling list for the 64x64 size when sizeId is equal to 6. The value of scaling_list_dc_coef_minus8[ sizeId ][ matrixId ] shall be in the range of −7 to 247, inclusive.

When scaling_list_pred_mode_flag[ sizeId ][ matrixId ] is equal to 0, scaling_list_pred_matrix_id_delta[ sizeId ][ matrixId ] is equal to 0 and sizeId is greater than 3, the value of scaling_list_dc_coef_minus8[ sizeId ][ matrixId ] is inferred to be equal to 8.

When scaling_list_pred_matrix_id_delta[ sizeId ][ matrixId ] is not equal to 0 and sizeId is greater than 3, the value of scaling_list_dc_coef_minus8[ sizeId ][ matrixId ] is inferred to be equal to scaling_list_dc_coef_minus8[ sizeId ][ refMatrixId ], where the value of refMatrixId is given by Equation 7-XX.

scaling_list_delta_coef specifies the difference between the current matrix coefficient ScalingList[ sizeId ][ matrixId ][ i ] and the previous matrix coefficient ScalingList[ sizeId ][ matrixId ][ i − 1 ], when scaling_list_pred_mode_flag[ sizeId ][ matrixId ] is equal to 1. The value of scaling_list_delta_coef shall be in the range of −128 to 127, inclusive. The value of ScalingList[ sizeId ][ matrixId ][ i ] shall be greater than 0. When scaling_list_pred_mode_flag[ sizeId ][ matrixId ] is equal to 1 and scaling_list_delta_coef is not present, the value of ScalingList[ sizeId ][ matrixId ][ i ] is inferred to be 0.

FIG. 106

Table 7-15 – Specification of default values of ScalingList[ 1 ][ matrixId ][ i ] with i = 0..3

| i | 0 | 1 | 2 | 3 |
|---|---|---|---|---|
| ScalingList[ 1 ][1,2,4,5 ][ i ] | 16 | 16 | 16 | 16 |

Table 7-16 – Specification of default values of ScalingList[ 2 ][ matrixId ][ i ] with i = 0..15

| i | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| ScalingList[ 2 ][ 0..5 ][ i ] | 16 | 16 | 16 | 16 | 16 | 16 | 16 | 16 | 16 | 16 | 16 | 16 | 16 | 16 | 16 | 16 |

Table 7-17 – Specification of default values of ScalingList[ 3..6 ][ matrixId ][ i ] with i = 0..63

| i | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| ScalingList[ 3..5 ][ 0..5 ][ i ] | 16 | 16 | 16 | 16 | 16 | 16 | 16 | 16 | 16 | 16 | 16 | 16 | 16 | 16 | 16 | 16 |
| i – 16 | 0 | 1 | 2 | 3 | 4 | 5 | 6 | 7 | 8 | 9 | 10 | 11 | 12 | 13 | 14 | 15 |
| ScalingList[ 3..5 ][ 0..5 ][ i ] | 16 | 16 | 16 | 16 | 16 | 16 | 16 | 16 | 16 | 16 | 16 | 16 | 16 | 16 | 16 | 16 |
| i – 32 | 0 | 1 | 2 | 3 | 4 | 5 | 6 | 7 | 8 | 9 | 10 | 11 | 12 | 13 | 14 | 15 |
| ScalingList[ 3..5 ][ 0..5 ][ i ] | 16 | 16 | 16 | 16 | 16 | 16 | 16 | 16 | 16 | 16 | 16 | 16 | 16 | 16 | 16 | 16 |
| i – 48 | 0 | 1 | 2 | 3 | 4 | 5 | 6 | 7 | 8 | 9 | 10 | 11 | 12 | 13 | 14 | 15 |
| ScalingList[ 3..5 ][ 0..5 ][ i ] | 16 | 16 | 16 | 16 | 16 | 16 | 16 | 16 | 16 | 16 | 16 | 16 | 16 | 16 | 16 | 16 |

Table 7-18 – Specification of default values of ScalingList[ 6 ][ matrixId ][ i ] with i = 0..63

| i | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| ScalingList[ 6 ][ 0 ][ i ] | 16 | 16 | 16 | 16 | 16 | 16 | 16 | 16 | 16 | 16 | 16 | 16 | 16 | 16 | 16 | 16 |
| ScalingList[ 6 ][ 3 ][ i ] | 16 | 16 | 16 | 16 | 16 | 16 | 16 | 16 | 16 | 16 | 16 | 16 | 16 | 16 | 16 | 16 |
| i – 16 | 0 | 1 | 2 | 3 | 4 | 5 | 6 | 7 | 8 | 9 | 10 | 11 | 12 | 13 | 14 | 15 |
| ScalingList[ 6 ][ 0 ][ i ] | 16 | 16 | 16 | 16 | 16 | 16 | 16 | 16 | 16 | 16 | 16 | 16 | 16 | 16 | 16 | 16 |
| ScalingList[ 6 ][ 3 ][ i ] | 16 | 16 | 16 | 16 | 16 | 16 | 16 | 16 | 16 | 16 | 16 | 16 | 16 | 16 | 16 | 16 |
| i – 32 | 0 | 1 | 2 | 3 | 4 | 5 | 6 | 7 | 8 | 9 | 10 | 11 | 12 | 13 | 14 | 15 |
| ScalingList[ 6 ][ 0 ][ i ] | 16 | 16 | 16 | 16 | 16 | 16 | 16 | 16 | 16 | 16 | 16 | 16 | 16 | 16 | 16 | 16 |
| ScalingList[ 6 ][ 3 ][ i ] | 16 | 16 | 16 | 16 | 16 | 16 | 16 | 16 | 16 | 16 | 16 | 16 | 16 | 16 | 16 | 16 |
| i – 48 | 0 | 1 | 2 | 3 | 4 | 5 | 6 | 7 | 8 | 9 | 10 | 11 | 12 | 13 | 14 | 15 |
| ScalingList[ 6 ][ 0 ][ i ] | 16 | 16 | 16 | 16 | 16 | 16 | 16 | 16 | 16 | 16 | 16 | 16 | 16 | 16 | 16 | 16 |
| ScalingList[ 6 ][ 3 ][ i ] | 16 | 16 | 16 | 16 | 16 | 16 | 16 | 16 | 16 | 16 | 16 | 16 | 16 | 16 | 16 | 16 |

FIG. 107

The five-dimensional array ScalingFactor[ sizeId ][sizeId][ matrixId ][ x ][ y ], with x, y = 0..( 1 << sizeId ) − 1, specifies the array of scaling factors according to the variables sizeId specified in Table 7-13 and matrixId specified in Table 7-14.

The elements of the quantization matrix of size 2x2, ScalingFactor[ 1 ][ matrixId ][ ][ ], are derived as follows:

ScalingFactor[ 1 ][ 1 ][ matrixId ][ x ][ y ] = ScalingList[ 1 ][ matrixId ][ i ] (7-XX)
with i = 0..3, matrixId = 1, 2, 4, 5, x = DiagScanOrder[ 1 ][ 1 ][ i ][ 0 ], and y = DiagScanOrder[ 1 ][ 1 ][ i ][ 1 ]

The elements of the quantization matrix of size 4x4, ScalingFactor[ 2 ][ matrixId ][ ][ ], are derived as follows:

ScalingFactor[ 2 ][ 2 ][ matrixId ][ x ][ y ] = ScalingList[ 2 ][ matrixId ][ i ] (7-XX)
with i = 0..15, matrixId = 0..5, x = DiagScanOrder[ 2 ][ 2 ][ i ][ 0 ], and y = DiagScanOrder[ 2 ][ 2 ][ i ][ 1 ]

The elements of the quantization matrix of size 8x8, ScalingFactor[ 3 ][ matrixId ][ ][ ], are derived as follows:

ScalingFactor[ 3 ][ 3 ][ matrixId ][ x ][ y ] = ScalingList[ 3 ][ matrixId ][ i ] (7-XX)
with i = 0..63, matrixId = 0..5, x = DiagScanOrder[ 3 ][ 3 ][ i ][ 0 ], and y = DiagScanOrder[ 3 ][ 3 ][ i ][ 1 ]

The elements of the quantization matrix of size 16x16, ScalingFactor[ 4 ][ matrixId ][ ][ ], are derived as follows:

ScalingFactor[ 4 ][ 4 ][ matrixId ][ x * 2 + k ][ y * 2 + j ] = ScalingList[ 4 ][ matrixId ][ i ] (7-XX)
with i = 0..63, j = 0..1, k = 0..1, matrixId = 0..5, x = DiagScanOrder[ 3 ][ 3 ][ i ][ 0 ], and y = DiagScanOrder[ 3 ][ 3 ][ i ][ 1 ]

ScalingFactor[ 4 ][ 4 ][ matrixId ][ 0 ][ 0 ] = scaling_list_dc_coef_minus8[ 0 ][ matrixId ] + 8 (7-XX)
with matrixId = 0..5

The elements of the quantization matrix of size 32x32, ScalingFactor[ 5 ][ matrixId ][ ][ ], are derived as follows:

ScalingFactor[ 5 ][ 5 ][ matrixId ][ x * 4 + k ][ y * 4 + j ] = ScalingList[ 5 ][ matrixId ][ i ] (7-XX)
with i = 0..63, j = 0..3, k = 0..3, matrixId = 0..5, x = DiagScanOrder[ 3 ][ 3 ][ i ][ 0 ], and y = DiagScanOrder[ 3 ][ 3 ][ i ][ 1 ]

ScalingFactor[ 5 ][ 5 ][ matrixId ][ 0 ][ 0 ] = scaling_list_dc_coef_minus8[ 1 ][ matrixId ] + 8 (7-XX)
with matrixId = 0..5

The elements of the quantization matrix of size 64x64, ScalingFactor[ 6 ][ matrixId ][ ][ ], are derived as follows:

ScalingFactor[ 6 ][ 6 ][ matrixId ][ x * 8 + k ][ y * 8 + j ] = ScalingList[ 6 ][ matrixId ][ i ] (7-XX)
with i = 0..63, j = 0..7, k = 0..7, matrixId = 0, 3, x = DiagScanOrder[ 3 ][ 3 ][ i ][ 0 ], and y = DiagScanOrder[ 3 ][ 3 ][ i ][ 1 ]

ScalingFactor[ 6 ][ 6 ][ matrixId ][ 0 ][ 0 ] = scaling_list_dc_coef_minus8[ 2 ][ matrixId ] + 8 (7-XX)
with matrixId = 0, 3

When ChromaArrayType is equal to 3, the elements of the chroma quantization matrix of size 64x64, ScalingFactor[ 6 ][ 6 ][ matrixId ][ ][ ], with matrixId = 1, 2, 4 and 5 are derived as follows:

ScalingFactor[ 6 ][ 6 ][ matrixId ][ x * 8 + k ][ y * 8 + j ] = ScalingList[ 5 ][ matrixId ][ i ] (7-XX)
with i = 0..63, j = 0..7, k = 0..7, x = DiagScanOrder[ 3 ][ 3 ][ i ][ 0 ], and y = DiagScanOrder[ 3 ][ 3 ][ i ][ 1 ]

ScalingFactor[ 6 ][ 6 ][ matrixId ][ 0 ][ 0 ] = scaling_list_dc_coef_minus8[ 1 ][ matrixId ] + 8 (7-XX)

FIG. 108

For a quantization matrix with rectangular size,

The five-dimensional array ScalingFactor[ sizeIdW ][sizeIdH][ matrixId ][ x ][ y ], with x = 0..( 1 << sizeIdW ) − 1, y = 0..( 1 << sizeIdH ) − 1, sizeIdW!=sizeIdH, specifies the array of scaling factors according to the variables sizeIdW and sizeIdH specified in Table 7-19, are derived as follows:

ScalingFactor[ sizeIdW ][ sizeIdH ][ matrixId ][ x ][ y ] can be generated by ScalingList[ sizeLId ][ matrixId ][ i ] with sizeLId = max( sizeIdW, sizeIdH ), sizeIdW = 0,1..6, sizeIdH = 0,1..6, matrixId = 0..5, x = 0.. ( 1 << sizeIdW) - 1, y = 0.. ( 1 << sizeIdH ) − 1, , x = DiagScanOrder[ k ][ k ][ i ][ 0 ], and y = DiagScanOrder[ k ][ k ][ i ][ 1 ], k = min(sizeLId, 3), and ratioW = (1<<sizeIdW)/(1<<k), ratioH = (1<<sizeIdH)/(1<<k), and ratioWH = (1<<abs(sizeIdW-sizeIdH)), as the following rules:

If (sizeIdW>sizeIdH)

ScalingFactor[ sizeIdW ][ sizeIdH ][ matrixId ][ x ][ y ]
= ScalingList[ sizeLId ][ matrixId ][ Raster2Diag[(1<<k)*((y*ratioWH)/ratioW) + x/ratioW]]

else

ScalingFactor[ sizeIdW ][ sizeIdH ][ matrixId ][ x ][ y ]
= ScalingList[ sizeLId ][ matrixId ][ Raster2Diag[(1<<k)*(y/ratioH) + (x*ratioWH)/ratioH]], Where Raster2Diag[] is the function converting raster scan position in one 8x8 block to diagonal scan position A quantization matrix with rectangular size shall be zeroed out for the samples satisfying to the following conditions x > 32 y > 32 the decoded tu is not coded by default transform mode, (1<<sizeIdW)==32 and x > 16 the decoded tu is not coded by default transform mode, (1<<sizeIdH)==32 and y > 16

Table 7-19 – Specification of sizeIdW and sizeIdH

| Size of quantization matrix | sizeIdW | sizeIdH |
|---|---|---|
| 1 | 0 | 0 |
| 2 | 1 | 1 |
| 4 | 2 | 2 |
| 8 | 3 | 3 |
| 16 | 4 | 4 |
| 32 | 5 | 5 |
| 64 | 6 | 6 |

FIG. 109

Scaling process for transform coefficients

Inputs to this process are:

- a luma location ( xTbY, yTbY ) specifying the top-left sample of the current luma transform block relative to the top-left luma sample of the current picture,
- a variable nTbW specifying the transform block width,
- a variable nTbH specifying the transform block height,
- a variable cIdx specifying the colour component of the current block,
- a variable bitDepth specifying the bit depth of the current colour component.

Output of this process is the (nTbW)x(nTbH) array d of scaled transform coefficients with elements d[ x ][ y ].

The quantization parameter qP is derived as follows:

- If cIdx is equal to 0, the following applies:

$$qP = Qp'_Y \quad (8\text{-}1019)$$

- Otherwise, if cIdx is equal to 1, the following applies:

$$qP = Qp'_{Cb} \quad (8\text{-}1020)$$

- Otherwise (cIdx is equal to 2), the following applies:

$$qP = Qp'_{Cr} \quad (8\text{-}1021)$$

The variable rectNonTsFlag is derived as follows:

rectNonTsFlag = ( ( ( Log2( nTbW ) + Log2( nTbH ) ) & 1 ) = = 1 &&
transform_skip_flag[ xTbY ][ yTbY ] = = 0 ) (8-1022)

The variables bdShift, rectNorm and bdOffset are derived as follows:

bdShift = bitDepth + ( ( rectNonTsFlag ? 8 : 0 ) +
( Log2( nTbW ) + Log2( nTbH ) ) / 2 ) − 5 + dep_quant_enabled_flag (8-1023)

rectNorm = rectNonTsFlag ? 181 : 1 (8-1024)

FIG. 110

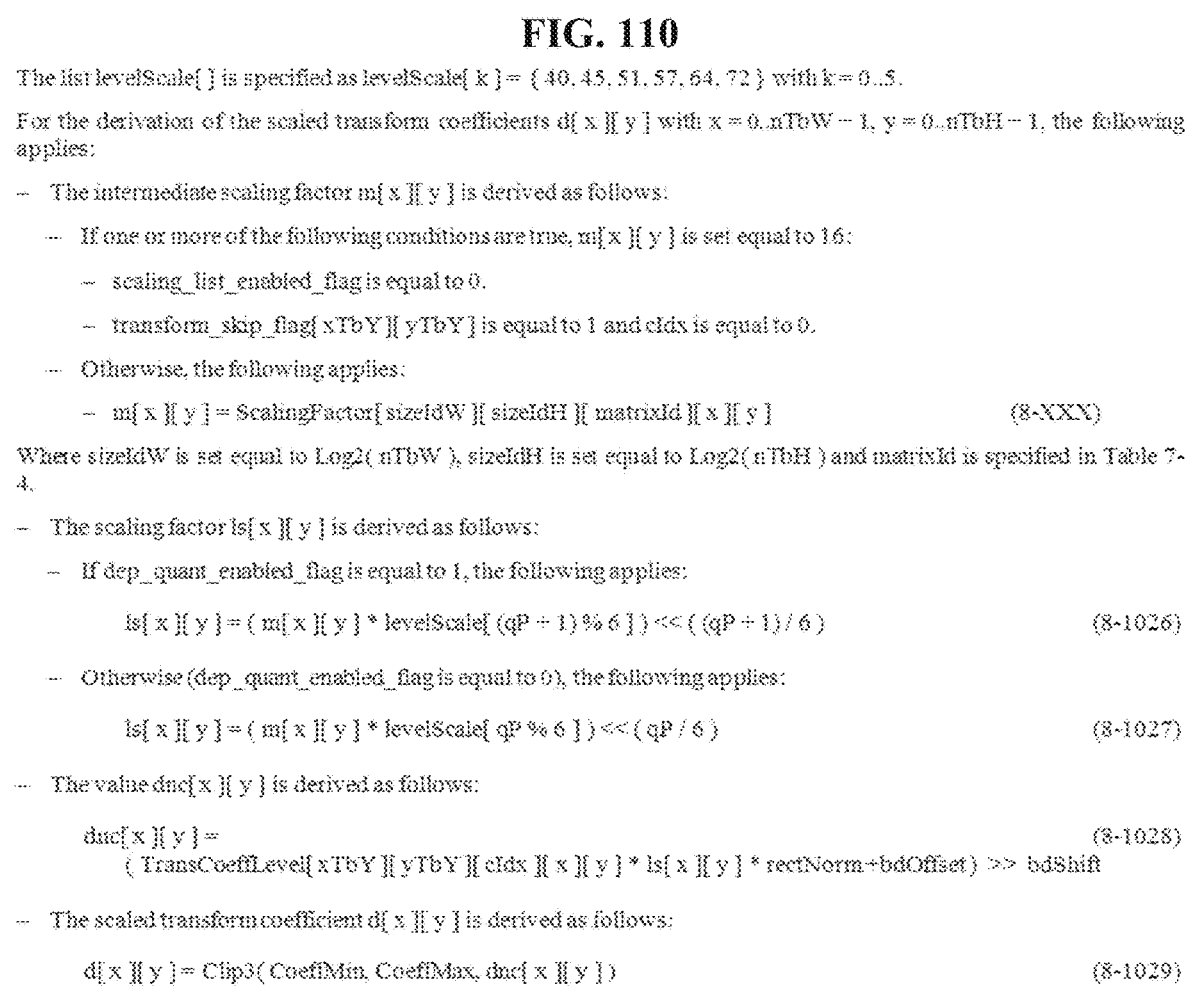

The list levelScale[ ] is specified as levelScale[ k ] = { 40, 45, 51, 57, 64, 72 } with k = 0..5.

For the derivation of the scaled transform coefficients d[ x ][ y ] with x = 0..nTbW − 1, y = 0..nTbH − 1, the following applies:

– The intermediate scaling factor m[ x ][ y ] is derived as follows:
  – If one or more of the following conditions are true, m[ x ][ y ] is set equal to 16:
    – scaling_list_enabled_flag is equal to 0.
    – transform_skip_flag[ xTbY ][ yTbY ] is equal to 1 and cIdx is equal to 0.
  – Otherwise, the following applies:
    – m[ x ][ y ] = ScalingFactor[ sizeIdW ][ sizeIdH ][ matrixId ][ x ][ y ] (8-XXX)

Where sizeIdW is set equal to Log2( nTbW ), sizeIdH is set equal to Log2( nTbH ) and matrixId is specified in Table 7-4.

– The scaling factor ls[ x ][ y ] is derived as follows:
  – If dep_quant_enabled_flag is equal to 1, the following applies:

ls[ x ][ y ] = ( m[ x ][ y ] * levelScale[ (qP + 1) % 6 ] ) << ( (qP + 1) / 6 ) (8-1026)

– Otherwise (dep_quant_enabled_flag is equal to 0), the following applies:

ls[ x ][ y ] = ( m[ x ][ y ] * levelScale[ qP % 6 ] ) << ( qP / 6 ) (8-1027)

– The value dnc[ x ][ y ] is derived as follows:

dnc[ x ][ y ] = (8-1028)
  ( TransCoeffLevel[ xTbY ][ yTbY ][ cIdx ][ x ][ y ] * ls[ x ][ y ] * rectNorm+bdOffset ) >> bdShift – The scaled transform coefficient d[ x ][ y ] is derived as follows:

d[ x ][ y ] = Clip3( CoeffMin, CoeffMax, dnc[ x ][ y ] ) (8-1029)

FIG. 111

Sequence parameter set RBSP syntax

| seq_parameter_set_rbsp( ) { | **Descriptor** |
|---|---|
| **scaling_list_enabled_flag** | u(1) |
| if( scaling_list_enabled_flag ) { | |
| **sps_scaling_list_data_present_flag** | u(1) |
| if( sps_scaling_list_data_present_flag ) | |
| scaling_list_data( ) | |
| } | |
| } | |

Picture parameter set RBSP syntax

| pic_parameter_set_rbsp( ) { | **Descriptor** |
|---|---|
| **pps_scaling_list_data_present_flag** | u(1) |
| if( pps_scaling_list_data_present_flag ) | |
| scaling_list_data( ) | |
| } | |

FIG. 112

Scaling list data syntax

| scaling_list_data( ) { | **Descriptor** |
|---|---|
| for( sizeId = 1; sizeId < 7; sizeId++ ) | |
| for( matrixId = 0; matrixId < 6; matrixId++ ) { | |
| if( ! ( ( ( sizeId = = 1 ) && ( matrixId % 3 = = 0 ) ) \|\| ( ( sizeId = = 6 ) && ( matrixId % 3 != 0 ) ) ) ) { | |
| **scaling_list_pred_mode_flag**[ sizeId ][ matrixId ] | u(1) |
| if( !scaling_list_pred_mode_flag[ sizeId ][ matrixId ] ) | |
| **scaling_list_pred_matrix_id_delta**[ sizeId ][ matrixId ] | ue(v) |
| else { | |
| nextCoef = 8 | |
| coefNum = Min( 64, ( 1 << ( sizeId << 1 ) ) ) | |
| if( sizeId > 3 ) { | |
| **scaling_list_dc_coef_minus8**[ sizeId − 4 ][ matrixId ] | se(v) |
| nextCoef = scaling_list_dc_coef_minus8[ sizeId − 4 ][ matrixId ] + 8 | |
| } | |
| for( i = 0; i < coefNum; i++ ) { | |
| x = DiagScanOrder[ 3 ][ 3 ][ i ][ 0 ] | |
| y = DiagScanOrder[ 3 ][ 3 ][ i ][ 1 ] | |
| if ( !( sizeId = = 6 && x >= 4 && y >= 4) ) { | |
| **scaling_list_delta_coef** | se(v) |
| nextCoef = ( nextCoef + scaling_list_delta_coef + 256 ) % 256 | |
| ScalingList[ sizeId ][ matrixId ][ i ] = nextCoef | |
| } | |
| } | |
| } | |
| } | |
| } | |
| } | |
| } | |

FIG. 113

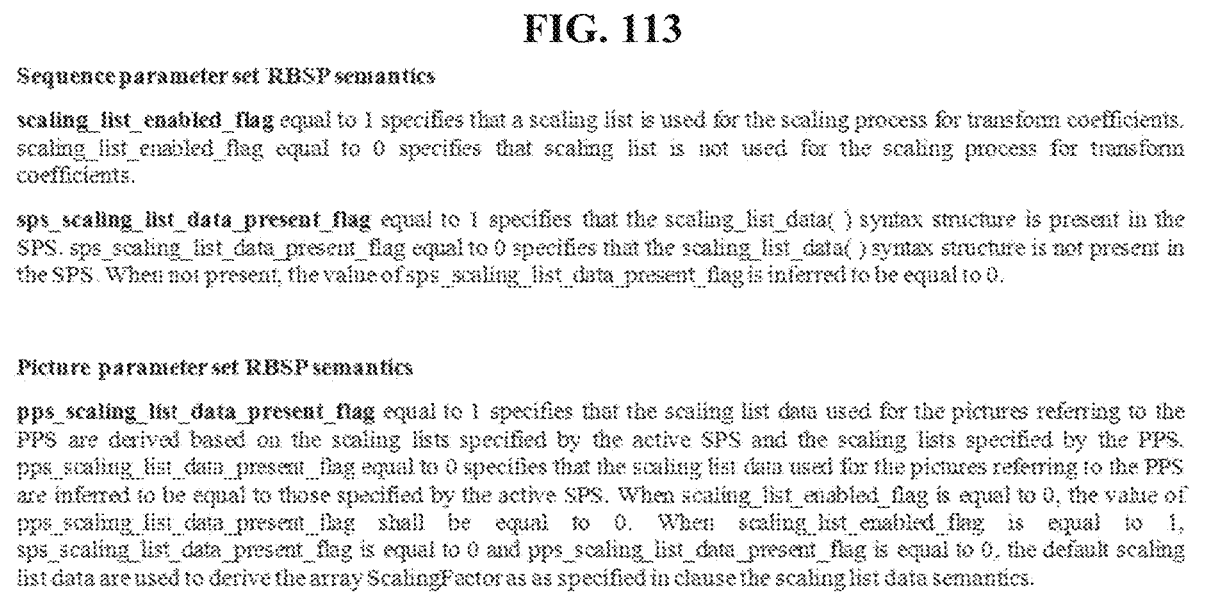

Sequence parameter set RBSP semantics scaling_list_enabled_flag equal to 1 specifies that a scaling list is used for the scaling process for transform coefficients. scaling_list_enabled_flag equal to 0 specifies that scaling list is not used for the scaling process for transform coefficients.

sps_scaling_list_data_present_flag equal to 1 specifies that the scaling_list_data( ) syntax structure is present in the SPS. sps_scaling_list_data_present_flag equal to 0 specifies that the scaling_list_data( ) syntax structure is not present in the SPS. When not present, the value of sps_scaling_list_data_present_flag is inferred to be equal to 0.

Picture parameter set RBSP semantics pps_scaling_list_data_present_flag equal to 1 specifies that the scaling list data used for the pictures referring to the PPS are derived based on the scaling lists specified by the active SPS and the scaling lists specified by the PPS. pps_scaling_list_data_present_flag equal to 0 specifies that the scaling list data used for the pictures referring to the PPS are inferred to be equal to those specified by the active SPS. When scaling_list_enabled_flag is equal to 0, the value of pps_scaling_list_data_present_flag shall be equal to 0. When scaling_list_enabled_flag is equal to 1, sps_scaling_list_data_present_flag is equal to 0 and pps_scaling_list_data_present_flag is equal to 0, the default scaling list data are used to derive the array ScalingFactor as as specified in clause the scaling list data semantics.

FIG. 114

Scaling list data semantics scaling_list_pred_mode_flag[ sizeId ][ matrixId ] equal to 0 specifies that the values of the scaling list are the same as the values of a reference scaling list. The reference scaling list is specified by scaling_list_pred_matrix_id_delta[ sizeId ][ matrixId ]. scaling_list_pred_mode_flag[ sizeId ][ matrixId ] equal to 1 specifies that the values of the scaling list are explicitly signalled.

scaling_list_pred_matrix_id_delta[ sizeId ][ matrixId ] specifies the reference scaling list used to derive ScalingList[ sizeId ][ matrixId ], the derivation of ScalingList[ sizeId ][ matrixId ] is based on scaling_list_pred_matrix_id_delta[ sizeId ][ matrixId ] as follows:

– If scaling_list_pred_matrix_id_delta[ sizeId ][ matrixId ] is equal to 0, the scaling list is inferred from the default scaling list ScalingList[ sizeId ][ matrixId ][ i ] as specified in Table 7-5, Table 7-6, Table 7-7 and Table 7-8 for i = 0..Min( 63, ( 1 << ( sizeId << 1 ) ) − 1 ).

– Otherwise, the scaling list is inferred from the reference scaling list as follows:

```
For sizeId =1…6,
    refMatrixId =
        matrixId − scaling_list_pred_matrix_id_delta[ sizeId ][ matrixId ] * ( sizeId = = 6 ? 3 : 1 )     (7-39)
```

If sizeId is equal to 1, the value of refMatrixId shall not be equal to 0 or 3. Otherwise, if sizeId is less than or equal to 5, the value of scaling_list_pred_matrix_id_delta[ sizeId ][ matrixId ] shall be in the range of 0 to matrixId, inclusive. Otherwise (sizeId is equal to 6), the value of scaling_list_pred_matrix_id_delta[ sizeId ][ matrixId ] shall be in the range of 0 to matrixId / 3, inclusive.

Table 7-3 – Specification of sizeId

| Size of quantization matrix | sizeId |
|---|---|
| 1x1 | 0 |
| 2x2 | 1 |
| 4x4 | 2 |
| 8x8 | 3 |
| 16x16 | 4 |
| 32x32 | 5 |
| 64x64 | 6 |

FIG. 115

Table 7-4 – Specification of matrixId according to sizeId, prediction mode and colour component

| sizeId | CuPredMode | cIdx (Colour component) | matrixId |
|---|---|---|---|
| 2, 3, 4, 5, 6 | MODE_INTRA | 0 (Y) | 0 |
| 1, 2, 3, 4, 5 | MODE_INTRA | 1 (Cb) | 1 |
| 1, 2, 3, 4, 5 | MODE_INTRA | 2 (Cr) | 2 |
| 2, 3, 4, 5, 6 | MODE_INTER | 0 (Y) | 3 |
| 1, 2, 3, 4, 5 | MODE_INTER | 1 (Cb) | 4 |
| 1, 2, 3, 4, 5 | MODE_INTER | 2 (Cr) | 5 |
| 2, 3, 4, 5, 6 | MODE_IBC | 0 (Y) | 0 |
| 1, 2, 3, 4, 5 | MODE_IBC | 1 (Cb) | 1 |
| 1, 2, 3, 4, 5 | MODE_IBC | 2 (Cr) | 2 |

scaling_list_dc_coef_minus8[ sizeId ][ matrixId ] plus 8 specifies the value of the variable ScalingFactor[ 4 ][ matrixId ][ 0 ][ 0 ] for the scaling list for the 16x16 size when sizeId is equal to 4 and specifies the value of ScalingFactor[ 5 ][ matrixId ][ 0 ][ 0 ] for the scaling list for the 32x32 size when sizeId is equal to 5, and specifies the value of ScalingFactor[ 6 ][ matrixId ][ 0 ][ 0 ] for the scaling list for the 64x64 size when sizeId is equal to 6. The value of scaling_list_dc_coef_minus8[ sizeId ][ matrixId ] shall be in the range of −7 to 247, inclusive.

When scaling_list_pred_mode_flag[ sizeId ][ matrixId ] is equal to 0, scaling_list_pred_matrix_id_delta[ sizeId ][ matrixId ] is equal to 0 and sizeId is greater than 3, the value of scaling_list_dc_coef_minus8[ sizeId ][ matrixId ] is inferred to be equal to 8.

When scaling_list_pred_matrix_id_delta[ sizeId ][ matrixId ] is not equal to 0 and sizeId is greater than 3, the value of scaling_list_dc_coef_minus8[ sizeId ][ matrixId ] is inferred to be equal to scaling_list_dc_coef_minus8[ sizeId ][ refMatrixId ], where the value of refMatrixId is given by Equation (7-39).

scaling_list_delta_coef specifies the difference between the current matrix coefficient ScalingList[ sizeId ][ matrixId ][ i ] and the previous matrix coefficient ScalingList[ sizeId ][ matrixId ][ i − 1 ], when scaling_list_pred_mode_flag[ sizeId ][ matrixId ] is equal to 1. The value of scaling_list_delta_coef shall be in the range of −128 to 127, inclusive. The value of ScalingList[ sizeId ][ matrixId ][ i ] shall be greater than 0. When scaling_list_pred_mode_flag[ sizeId ][ matrixId ] is equal to 1 and scaling_list_delta_coef is not present, the value of ScalingList[ sizeId ][ matrixId ][ i ] is inferred to be 0.

FIG. 116

Table 7-5 – Specification of default values of ScalingList[ 1 ][ matrixId ][ i ] with i = 0..3

| I | 0 | 1 | 2 | 3 |
|---|---|---|---|---|
| ScalingList[ 1 ][1,2,4,5][ i ] | 16 | 16 | 16 | 16 |

Table 7-6 – Specification of default values of ScalingList[ 2 ][ matrixId ][ i ] with i = 0..15

| i | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| ScalingList[ 2 ][ 0..5 ][ i ] | 16 | 16 | 16 | 16 | 16 | 16 | 16 | 16 | 16 | 16 | 16 | 16 | 16 | 16 | 16 | 16 |

Table 7-7 – Specification of default values of ScalingList[ 3..6 ][ matrixId ][ i ] with i = 0..63

| i | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| ScalingList[ 3..5 ][ 0..5 ][ i ] | 16 | 16 | 16 | 16 | 16 | 16 | 16 | 16 | 16 | 16 | 16 | 16 | 16 | 16 | 16 | 16 |
| i – 16 | 0 | 1 | 2 | 3 | 4 | 5 | 6 | 7 | 8 | 9 | 10 | 11 | 12 | 13 | 14 | 15 |
| ScalingList[ 3..5 ][ 0..5 ][ i ] | 16 | 16 | 16 | 16 | 16 | 16 | 16 | 16 | 16 | 16 | 16 | 16 | 16 | 16 | 16 | 16 |
| i – 32 | 0 | 1 | 2 | 3 | 4 | 5 | 6 | 7 | 8 | 9 | 10 | 11 | 12 | 13 | 14 | 15 |
| ScalingList[ 3..5 ][ 0..5 ][ i ] | 16 | 16 | 16 | 16 | 16 | 16 | 16 | 16 | 16 | 16 | 16 | 16 | 16 | 16 | 16 | 16 |
| i – 48 | 0 | 1 | 2 | 3 | 4 | 5 | 6 | 7 | 8 | 9 | 10 | 11 | 12 | 13 | 14 | 15 |
| ScalingList[ 3..5 ][ 0..5 ][ i ] | 16 | 16 | 16 | 16 | 16 | 16 | 16 | 16 | 16 | 16 | 16 | 16 | 16 | 16 | 16 | 16 |

FIG. 117

Table 7-8 – Specification of default values of ScalingList[ 6 ][ matrixId ][ i ] with i = 0..63

| | | | | | | | | | | | | | | | | |
|---|---|---|---|---|---|---|---|---|---|---|---|---|---|---|---|---|
| i | 0 | 1 | 2 | 3 | 4 | 5 | 6 | 7 | 8 | 9 | 10 | 11 | 12 | 13 | 14 | 15 |
| ScalingList[ 6 ][ 0, 3 ][ i ] | 16 | 16 | 16 | 16 | 16 | 16 | 16 | 16 | 16 | 16 | 16 | 16 | 16 | 16 | 16 | 16 |
| i – 16 | 0 | 1 | 2 | 3 | 4 | 5 | 6 | 7 | 8 | 9 | 10 | 11 | 12 | 13 | 14 | 15 |
| ScalingList[ 6 ][ 0, 3 ][ i ] | 16 | 16 | 16 | 16 | 16 | 16 | 16 | 16 | 16 | 16 | 16 | 16 | 16 | 16 | 16 | 16 |
| i – 32 | 0 | 1 | 2 | 3 | 4 | 5 | 6 | 7 | 8 | 9 | 10 | 11 | 12 | 13 | 14 | 15 |
| ScalingList[ 6 ][ 0, 3 ][ i ] | 16 | 16 | 16 | 16 | 16 | 16 | 16 | 16 | 16 | 16 | 16 | 16 | 16 | 16 | 16 | 16 |
| i – 48 | 0 | 1 | 2 | 3 | 4 | 5 | 6 | 7 | 8 | 9 | 10 | 11 | 12 | 13 | 14 | 15 |
| ScalingList[ 6 ][ 0, 3 ][ i ] | 16 | 16 | 16 | 16 | 16 | 16 | 16 | 16 | 16 | 16 | 16 | 16 | 16 | 16 | 16 | 16 |

The five-dimensional array ScalingFactor[ sizeId ][sizeId][ matrixId ][ x ][ y ], with x, y = 0..( 1 << sizeId ) – 1, specifies the array of scaling factors according to the variables sizeId specified in Table 7-3 and matrixId specified in Table 7-4.

The elements of the quantization matrix of size 2x2, ScalingFactor[ 1 ][ matrixId ][ ][ ], with i = 0..3, matrixId = 1, 2, 4 and 5, are derived as follows:

x = DiagScanOrder[ 1 ][ 1 ][ i ][ 0 ] (7-40)

y = DiagScanOrder[ 1 ][ 1 ][ i ][ 1 ] (7-41)

ScalingFactor[ 1 ][ 1 ][ matrixId ][ x ][ y ] = ScalingList[ 1 ][ matrixId ][ i ] (7-42)

The elements of the quantization matrix of size 4x4, ScalingFactor[ 2 ][ matrixId ][ ][ ], with i = 0..15, matrixId = 0..5, are derived as follows:

x = DiagScanOrder[ 2 ][ 2 ][ i ][ 0 ] (7-43)

y = DiagScanOrder[ 2 ][ 2 ][ i ][ 1 ] (7-44)

ScalingFactor[ 2 ][ 2 ][ matrixId ][ x ][ y ] = ScalingList[ 2 ][ matrixId ][ i ] (7-45)

The elements of the quantization matrix of size 8x8, ScalingFactor[ 3 ][ matrixId ][ ][ ], with i = 0..63, matrixId = 0..5, are derived as follows:

x = DiagScanOrder[ 3 ][ 3 ][ i ][ 0 ] (7-46)

y = DiagScanOrder[ 3 ][ 3 ][ i ][ 1 ] (7-47)

ScalingFactor[ 3 ][ 3 ][ matrixId ][ x ][ y ] = ScalingList[ 3 ][ matrixId ][ i ] (7-48)

FIG. 118

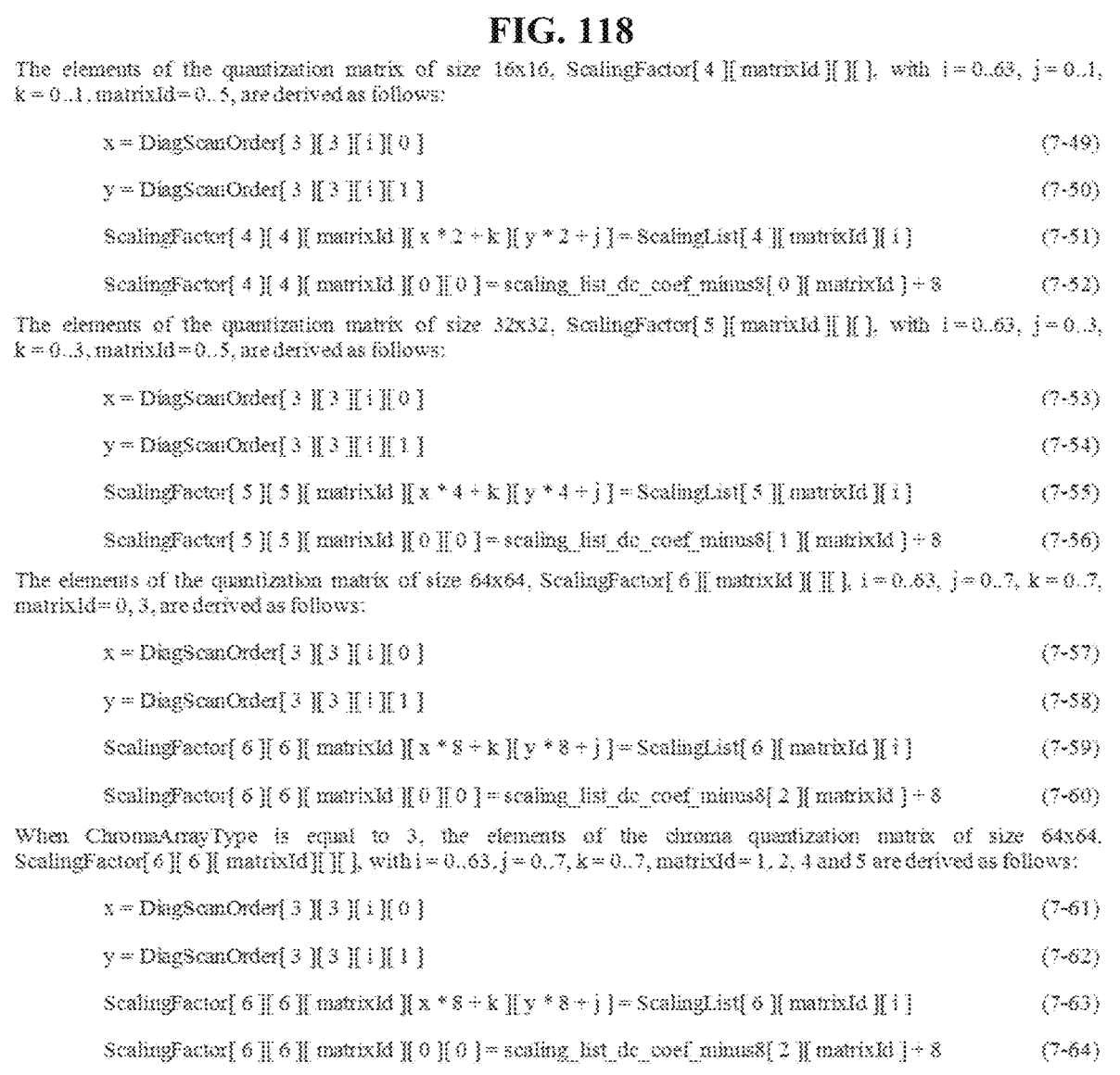

The elements of the quantization matrix of size 16x16, ScalingFactor[ 4 ][ matrixId ][ ][ ], with i = 0..63, j = 0..1, k = 0..1, matrixId = 0..5, are derived as follows:

x = DiagScanOrder[ 3 ][ 3 ][ i ][ 0 ] (7-49)

y = DiagScanOrder[ 3 ][ 3 ][ i ][ 1 ] (7-50)

ScalingFactor[ 4 ][ 4 ][ matrixId ][ x * 2 + k ][ y * 2 + j ] = ScalingList[ 4 ][ matrixId ][ i ] (7-51)

ScalingFactor[ 4 ][ 4 ][ matrixId ][ 0 ][ 0 ] = scaling_list_dc_coef_minus8[ 0 ][ matrixId ] + 8 (7-52)

The elements of the quantization matrix of size 32x32, ScalingFactor[ 5 ][ matrixId ][ ][ ], with i = 0..63, j = 0..3, k = 0..3, matrixId = 0..5, are derived as follows:

x = DiagScanOrder[ 3 ][ 3 ][ i ][ 0 ] (7-53)

y = DiagScanOrder[ 3 ][ 3 ][ i ][ 1 ] (7-54)

ScalingFactor[ 5 ][ 5 ][ matrixId ][ x * 4 + k ][ y * 4 + j ] = ScalingList[ 5 ][ matrixId ][ i ] (7-55)

ScalingFactor[ 5 ][ 5 ][ matrixId ][ 0 ][ 0 ] = scaling_list_dc_coef_minus8[ 1 ][ matrixId ] + 8 (7-56)

The elements of the quantization matrix of size 64x64, ScalingFactor[ 6 ][ matrixId ][ ][ ], i = 0..63, j = 0..7, k = 0..7, matrixId = 0, 3, are derived as follows:

x = DiagScanOrder[ 3 ][ 3 ][ i ][ 0 ] (7-57)

y = DiagScanOrder[ 3 ][ 3 ][ i ][ 1 ] (7-58)

ScalingFactor[ 6 ][ 6 ][ matrixId ][ x * 8 + k ][ y * 8 + j ] = ScalingList[ 6 ][ matrixId ][ i ] (7-59)

ScalingFactor[ 6 ][ 6 ][ matrixId ][ 0 ][ 0 ] = scaling_list_dc_coef_minus8[ 2 ][ matrixId ] + 8 (7-60)

When ChromaArrayType is equal to 3, the elements of the chroma quantization matrix of size 64x64, ScalingFactor[ 6 ][ 6 ][ matrixId ][ ][ ], with i = 0..63, j = 0..7, k = 0..7, matrixId = 1, 2, 4 and 5 are derived as follows:

x = DiagScanOrder[ 3 ][ 3 ][ i ][ 0 ] (7-61)

y = DiagScanOrder[ 3 ][ 3 ][ i ][ 1 ] (7-62)

ScalingFactor[ 6 ][ 6 ][ matrixId ][ x * 8 + k ][ y * 8 + j ] = ScalingList[ 6 ][ matrixId ][ i ] (7-63)

ScalingFactor[ 6 ][ 6 ][ matrixId ][ 0 ][ 0 ] = scaling_list_dc_coef_minus8[ 2 ][ matrixId ] + 8 (7-64)

FIG. 119

For a quantization matrix with rectangular size, the five-dimensional array ScalingFactor[ sizeIdW ][ sizeIdH ][ matrixId ][ x ][ y ], with sizeIdW = 0..6, sizeIdH = 0..6, matrixId = 0..5, x = 0..( 1 << sizeIdW ) − 1, y = 0..( 1 << sizeIdH ) − 1, and sizeIdW != sizeIdH, specifies the array of scaling factors for size (1 << sizeIdW)x(1 << sizeIdH), are generated by using ScalingList[ sizeLId ][ matrixId ][ i ] with sizeLId = max( sizeIdW, sizeIdH ), as follows:

```
x = DiagScanOrder[ k ][ k ][ i ][ 0 ],
y = DiagScanOrder[ k ][ k ][ i ][ 1 ],
k = min(sizeLId, 3),
ratioW = ( 1 << sizeIdW ) / ( 1 << k )
ratioH = ( 1 << sizeIdH ) / ( 1 << k )
ratioWH = 1 << abs( sizeIdW − sizeIdH )                                   (7-64)
If ( sizeIdW > sizeIdH )
    ScalingFactor[ sizeIdW ][ sizeIdH ][ matrixId ][ x ][ y ] =
        ScalingList[ sizeLId ][ matrixId ][ Raster2Diag[ ( 1 << k ) * ( (y * ratioWH ) / ratioW ) + ( x /
ratioW ) ] ]
else (sizeIdW < sizeIdH)
    ScalingFactor[ sizeIdW ][ sizeIdH ][ matrixId ][ x ][ y ] =
        ScalingList[ sizeLId ][ matrixId ][ Raster2Diag[ ( 1 << k ) * ( y / ratioH ) + (x * ratioWH) / ratioH ] ]
```

Raster2Diag[ ] is the function converting raster scan position in one 8x8 block to diagonal scan position NOTE – A quantization matrix element ScalingFactor[ sizeIdW ][ sizeIdH ][ matrixId ][ x ][ y ] can be zeroed out when any of the following conditions is true

- x > 32
- y > 32
- The decoded tu is not coded by default transform mode (i.e. tu_mts_idx is not equal to 0 or (trTypeHor is not equal to 0 and trTypeVer is not equal to 0)) and x > 16
- The decoded tu is not coded by default transform mode (i.e. tu_mts_idx is not equal to 0 or (trTypeHor is not equal to 0 and trTypeVer is not equal to 0)) and y > 16

Table 7-9 – Specification of sizeIdW and sizeIdH

| Size of quantization matrix | sizeIdW | sizeIdH |
|---|---|---|
| 1 | 0 | 0 |
| 2 | 1 | 1 |
| 4 | 2 | 2 |
| 8 | 3 | 3 |
| 16 | 4 | 4 |
| 32 | 5 | 5 |
| 64 | 6 | 6 |

FIG. 120

Scaling process for transform coefficients

Inputs to this process are:

- a luma location ( xTbY, yTbY ) specifying the top-left sample of the current luma transform block relative to the top-left luma sample of the current picture,
- a variable nTbW specifying the transform block width,
- a variable nTbH specifying the transform block height,
- a variable cIdx specifying the colour component of the current block,
- a variable bitDepth specifying the bit depth of the current colour component.

Output of this process is the (nTbW)x(nTbH) array d of scaled transform coefficients with elements d[ x ][ y ].

The quantization parameter qP is derived as follows:

- If cIdx is equal to 0, the following applies:

$$qP = Qp'_Y \tag{8-940}$$

- Otherwise, if cIdx is equal to 1 and tu_joint_cbcr_residual[ xTbY ][ yTbY ] is equal to 1, the following applies:

$$qP = Qp'_{CbCr} \tag{8-941}$$

- Otherwise, if cIdx is equal to 1, the following applies:

$$qP = Qp'_{Cb} \tag{8-942}$$

- Otherwise (cIdx is equal to 2), the following applies:

$$qP = Qp'_{Cr} \tag{8-943}$$

The variable rectNonTsFlag is derived as follows:

rectNonTsFlag = ( ( ( Log2( nTbW ) + Log2( nTbH ) ) & 1 ) = = 1 &&
transform_skip_flag[ xTbY ][ yTbY ] = = 0 ) (8-944)

FIG. 121

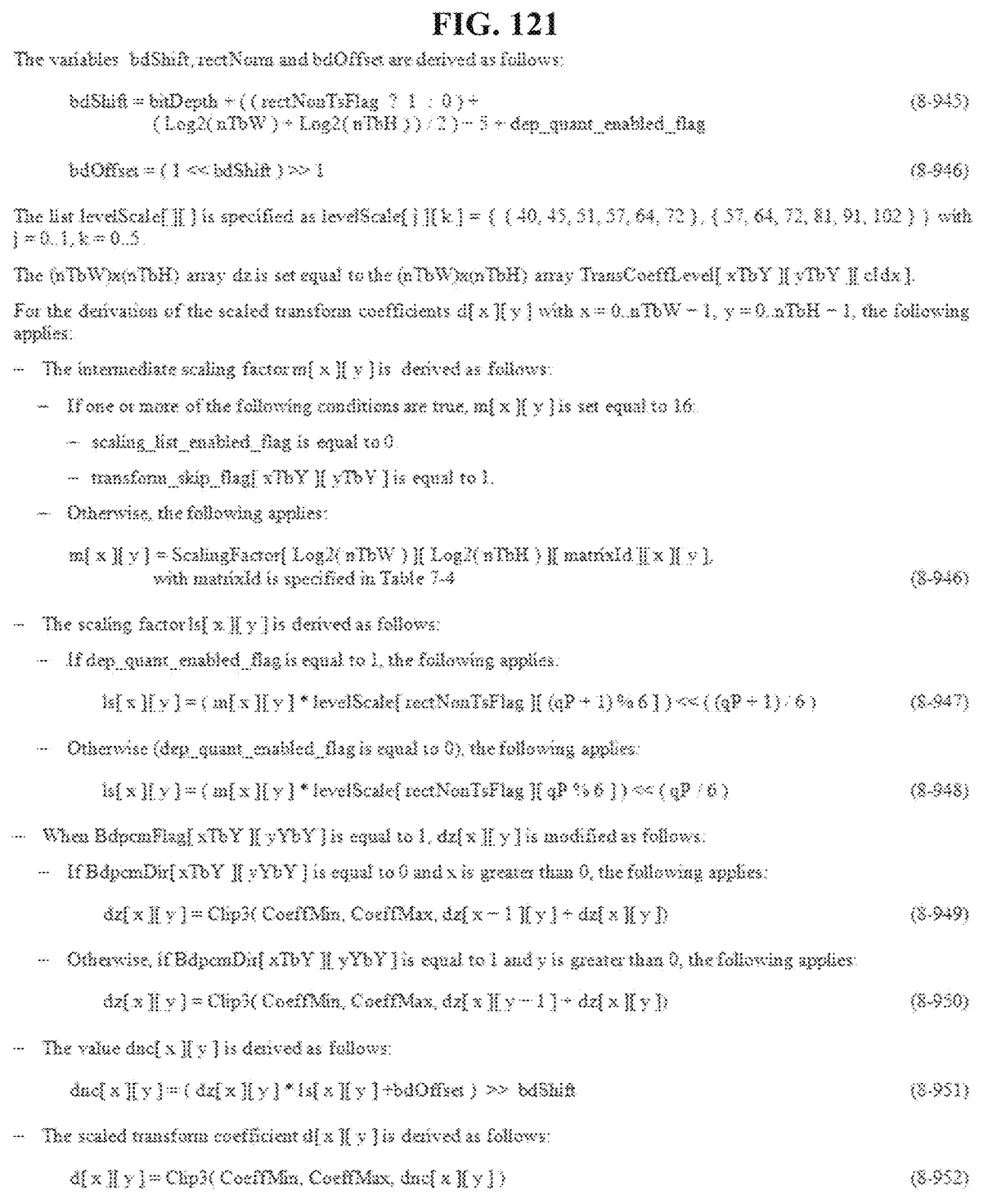

The variables bdShift, rectNorm and bdOffset are derived as follows:

bdShift = bitDepth + ( ( rectNonTsFlag ? 1 : 0 ) + ( Log2( nTbW ) + Log2( nTbH ) ) / 2 ) − 5 + dep_quant_enabled_flag (8-945)

bdOffset = ( 1 << bdShift ) >> 1 (8-946)

The list levelScale[ ][ ] is specified as levelScale[ j ][ k ] = { { 40, 45, 51, 57, 64, 72 }, { 57, 64, 72, 81, 91, 102 } } with j = 0..1, k = 0..5.

The (nTbW)x(nTbH) array dz is set equal to the (nTbW)x(nTbH) array TransCoeffLevel[ xTbY ][ yTbY ][ cIdx ].

For the derivation of the scaled transform coefficients d[ x ][ y ] with x = 0..nTbW − 1, y = 0..nTbH − 1, the following applies:

- The intermediate scaling factor m[ x ][ y ] is derived as follows:
  - If one or more of the following conditions are true, m[ x ][ y ] is set equal to 16:
    - scaling_list_enabled_flag is equal to 0.
    - transform_skip_flag[ xTbY ][ yTbY ] is equal to 1.
  - Otherwise, the following applies:

m[ x ][ y ] = ScalingFactor[ Log2( nTbW ) ][ Log2( nTbH ) ][ matrixId ][ x ][ y ], with matrixId is specified in Table 7-4 (8-946)

- The scaling factor ls[ x ][ y ] is derived as follows:
  - If dep_quant_enabled_flag is equal to 1, the following applies:

ls[ x ][ y ] = ( m[ x ][ y ] * levelScale[ rectNonTsFlag ][ (qP + 1) % 6 ] ) << ( (qP + 1) / 6 ) (8-947)

- Otherwise (dep_quant_enabled_flag is equal to 0), the following applies:

ls[ x ][ y ] = ( m[ x ][ y ] * levelScale[ rectNonTsFlag ][ qP % 6 ] ) << ( qP / 6 ) (8-948)

- When BdpcmFlag[ xTbY ][ yYbY ] is equal to 1, dz[ x ][ y ] is modified as follows:
  - If BdpcmDir[ xTbY ][ yYbY ] is equal to 0 and x is greater than 0, the following applies:

dz[ x ][ y ] = Clip3( CoeffMin, CoeffMax, dz[ x − 1 ][ y ] + dz[ x ][ y ]) (8-949)

- Otherwise, if BdpcmDir[ xTbY ][ yYbY ] is equal to 1 and y is greater than 0, the following applies:

dz[ x ][ y ] = Clip3( CoeffMin, CoeffMax, dz[ x ][ y − 1 ] + dz[ x ][ y ]) (8-950)

- The value dnc[ x ][ y ] is derived as follows:

dnc[ x ][ y ] = ( dz[ x ][ y ] * ls[ x ][ y ] +bdOffset ) >> bdShift (8-951)

- The scaled transform coefficient d[ x ][ y ] is derived as follows:

d[ x ][ y ] = Clip3( CoeffMin, CoeffMax, dnc[ x ][ y ] ) (8-952)

FIG. 122

Scan order array initialization process

Input to this process is a block width blkWidth and a block size height blkHeight.

Output of this process is the array diagScan[ sPos ][ sComp ]. The array index sPos specify the scan position ranging from 0 to ( blkWidth * blkHeight ) − 1. The array index sComp equal to 0 specifies the horizontal component and the array index sComp equal to 1 specifies the vertical component. Depending on the value of blkWidth and blkHeight, the array diagScan is derived as follows:

```
i = 0
x = 0
y = 0
stopLoop = FALSE
while( !stopLoop ) {
    while( y >= 0 ) {
        if( x < blkWidth && y < blkHeight ) {                    (6-11)
            diagScan[ i ][ 0 ] = x
            diagScan[ i ][ 1 ] = y

            rasterScan[log2blkWidth][log2blkHeight][x*blkWidth + y] = i
            i++
        }
        y− −
        x++
    }
    y = x
    x = 0
    if( i >= blkWidth * blkHeight )
        stopLoop = TRUE
}
```

FIG. 123

Sequence parameter set RBSP syntax

| seq_parameter_set_rbsp() { | **Descriptor** |
|---|---|
| **scaling_list_enabled_flag** | u(1) |
| if( scaling_list_enabled_flag ) { | |
| **sps_scaling_list_data_present_flag** | u(1) |
| if( sps_scaling_list_data_present_flag ) | |
| scaling_list_data() | |
| } | |
| } | |

Picture parameter set RBSP syntax

| pic_parameter_set_rbsp() { | **Descriptor** |
|---|---|
| **pps_scaling_list_data_present_flag** | u(1) |
| if( pps_scaling_list_data_present_flag ) | |
| scaling_list_data() | |
| } | |

FIG. 124

Scaling list data syntax

| scaling_list_data( ) { | **Descriptor** |
|---|---|
| for( sizeId = 1; sizeId < 7; sizeId++ ) | |
| for( matrixId = 0; matrixId < 6; matrixId++ ) { | |
| if( ! ( ( ( sizeId = = 1 ) && ( matrixId % 3 = = 0 ) ) \|\| ( ( sizeId = = 6 ) && ( matrixId % 3 != 0 ) ) ) ) { | |
| **scaling_list_pred_mode_flag**[ sizeId ][ matrixId ] | u(1) |
| if( !scaling_list_pred_mode_flag[ sizeId ][ matrixId ] ) | |
| **scaling_list_pred_matrix_id_delta**[ sizeId ][ matrixId ] | ue(v) |
| else { | |
| nextCoef = 8 | |
| coefNum = Min( 64, ( 1 << ( sizeId << 1 ) ) ) | |
| if( sizeId > 3 ) { | |
| **scaling_list_dc_coef_minus8**[ sizeId − 4 ][ matrixId ] | se(v) |
| nextCoef = scaling_list_dc_coef_minus8[ sizeId − 4 ][ matrixId ] + 8 | |
| } | |
| for( i = 0; i < coefNum; i++ ) { | |
| x = DiagScanOrder[ 3 ][ 3 ][ i ][ 0 ] | |
| y = DiagScanOrder[ 3 ][ 3 ][ i ][ 1 ] | |
| if ( !( sizeId = = 6 && x >= 4 && y >= 4) ) { | |
| **scaling_list_delta_coef** | se(v) |
| nextCoef = ( nextCoef + scaling_list_delta_coef + 256 ) % 256 | |
| ScalingList[ sizeId ][ matrixId ][ i ] = nextCoef | |
| } | |
| } | |
| } | |
| } | |
| } | |
| } | |
| } | |

FIG. 125

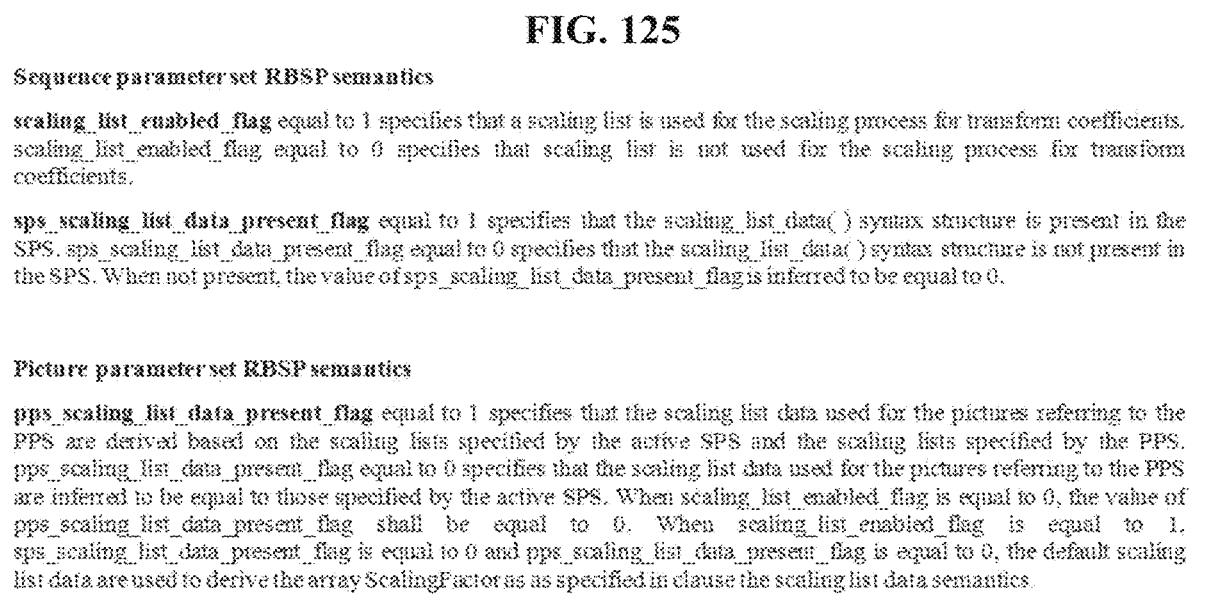

Sequence parameter set RBSP semantics scaling_list_enabled_flag equal to 1 specifies that a scaling list is used for the scaling process for transform coefficients. scaling_list_enabled_flag equal to 0 specifies that scaling list is not used for the scaling process for transform coefficients.

sps_scaling_list_data_present_flag equal to 1 specifies that the scaling_list_data( ) syntax structure is present in the SPS. sps_scaling_list_data_present_flag equal to 0 specifies that the scaling_list_data( ) syntax structure is not present in the SPS. When not present, the value of sps_scaling_list_data_present_flag is inferred to be equal to 0.

Picture parameter set RBSP semantics pps_scaling_list_data_present_flag equal to 1 specifies that the scaling list data used for the pictures referring to the PPS are derived based on the scaling lists specified by the active SPS and the scaling lists specified by the PPS. pps_scaling_list_data_present_flag equal to 0 specifies that the scaling list data used for the pictures referring to the PPS are inferred to be equal to those specified by the active SPS. When scaling_list_enabled_flag is equal to 0, the value of pps_scaling_list_data_present_flag shall be equal to 0. When scaling_list_enabled_flag is equal to 1, sps_scaling_list_data_present_flag is equal to 0 and pps_scaling_list_data_present_flag is equal to 0, the default scaling list data are used to derive the array ScalingFactor as as specified in clause the scaling list data semantics.

FIG. 126

Scaling list data semantics scaling_list_pred_mode_flag[ sizeId ][ matrixId ] equal to 0 specifies that the values of the scaling list are the same as the values of a reference scaling list. The reference scaling list is specified by scaling_list_pred_matrix_id_delta[ sizeId ][ matrixId ]. scaling_list_pred_mode_flag[ sizeId ][ matrixId ] equal to 1 specifies that the values of the scaling list are explicitly signalled.

scaling_list_pred_matrix_id_delta[ sizeId ][ matrixId ] specifies the reference scaling list used to derive ScalingList[ sizeId ][ matrixId ], the derivation of ScalingList[ sizeId ][ matrixId ] is based on scaling_list_pred_matrix_id_delta[ sizeId ][ matrixId ] as follows:

– If scaling_list_pred_matrix_id_delta[ sizeId ][ matrixId ] is equal to 0, the scaling list is inferred from the default scaling list ScalingList[ sizeId ][ matrixId ][ i ] as specified in Table 7-5, Table 7-6, Table 7-7 and Table 7-8 for i = 0..Min( 63, ( 1 << ( sizeId << 1 ) ) − 1 ).
– Otherwise, the scaling list is inferred from the reference scaling list as follows:

For sizeId = 1…6,
refMatrixId =
matrixId − scaling_list_pred_matrix_id_delta[ sizeId ][ matrixId ] * ( sizeId = = 6 ? 3 : 1 ) (7-39)

If sizeId is equal to 1, the value of refMatrixId shall not be equal to 0 or 3. Otherwise, if sizeId is less than or equal to 5, the value of scaling_list_pred_matrix_id_delta[ sizeId ][ matrixId ] shall be in the range of 0 to matrixId, inclusive. Otherwise (sizeId is equal to 6), the value of scaling_list_pred_matrix_id_delta[ sizeId ][ matrixId ] shall be in the range of 0 to matrixId / 3, inclusive.

Table 7-3 – Specification of sizeId

| **Size of quantization matrix** | **sizeId** |
|---|---|
| 1x1 | 0 |
| 2x2 | 1 |
| 4x4 | 2 |
| 8x8 | 3 |
| 16x16 | 4 |
| 32x32 | 5 |
| 64x64 | 6 |

FIG. 127

Table 7-4 – Specification of matrixId according to sizeId, prediction mode and colour component

| sizeId | CuPredMode | cIdx (Colour component) | matrixId |
|---|---|---|---|
| 2, 3, 4, 5, 6 | MODE_INTRA, MODE_IBC | 0 (Y) | 0 |
| 1, 2, 3, 4, 5, 6 | MODE_INTRA, MODE_IBC | 1 (Cb) | 1 |
| 1, 2, 3, 4, 5, 6 | MODE_INTRA, MODE_IBC | 2 (Cr) | 2 |
| 2, 3, 4, 5, 6 | MODE_INTER | 0 (Y) | 3 |
| 1, 2, 3, 4, 5, 6 | MODE_INTER | 1 (Cb) | 4 |
| 1, 2, 3, 4, 5, 6 | MODE_INTER | 2 (Cr) | 5 |

scaling_list_dc_coef_minus8[ sizeId − 4 ][ matrixId ] plus 8 specifies the value of the variable ScalingFactor[ 4 ][ matrixId ][ 0 ][ 0 ] for the scaling list for the 16x16 size when sizeId is equal to 4 and specifies the value of ScalingFactor[ 5 ][ matrixId ][ 0 ][ 0 ] for the scaling list for the 32x32 size when sizeId is equal to 5, and specifies the value of ScalingFactor[ 6 ][ matrixId ][ 0 ][ 0 ] for the scaling list for the 64x64 size when sizeId is equal to 6. The value of scaling_list_dc_coef_minus8[ sizeId − 4 ][ matrixId ] shall be in the range of −7 to 247, inclusive.

When scaling_list_pred_mode_flag[ sizeId ][ matrixId ] is equal to 0, scaling_list_pred_matrix_id_delta[ sizeId ][ matrixId ] is equal to 0 and sizeId is greater than 3, the value of scaling_list_dc_coef_minus8[ sizeId − 4 ][ matrixId ] is inferred to be equal to 8.

When scaling_list_pred_matrix_id_delta[ sizeId ][ matrixId ] is not equal to 0 and sizeId is greater than 3, the value of scaling_list_dc_coef_minus8[ sizeId − 4 ][ matrixId ] is inferred to be equal to scaling_list_dc_coef_minus8[ sizeId − 4 ][ refMatrixId ], where the value of refMatrixId is given by Equation (7−39).

scaling_list_delta_coef specifies the difference between the current matrix coefficient ScalingList[ sizeId ][ matrixId ][ i ] and the previous matrix coefficient ScalingList[ sizeId ][ matrixId ][ i − 1 ], when scaling_list_pred_mode_flag[ sizeId ][ matrixId ] is equal to 1. The value of scaling_list_delta_coef shall be in the range of −128 to 127, inclusive. The value of ScalingList[ sizeId ][ matrixId ][ i ] shall be greater than 0. When scaling_list_pred_mode_flag[ sizeId ][ matrixId ] is equal to 1 and scaling_list_delta_coef is not present, the value of ScalingList[ sizeId ][ matrixId ][ i ] is inferred to be 0.

FIG. 128

Table 7-5 – Specification of default values of ScalingList[ 1 ][ matrixId ][ i ] with i = 0..3

| I | 0 | 1 | 2 | 3 |
|---|---|---|---|---|
| ScalingList[ 1 ][1,2,4,5][ i ] | 16 | 16 | 16 | 16 |

Table 7-6 – Specification of default values of ScalingList[ 2 ][ matrixId ][ i ] with i = 0..15

| i | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| ScalingList[ 2 ][ 0..5 ][ i ] | 16 | 16 | 16 | 16 | 16 | 16 | 16 | 16 | 16 | 16 | 16 | 16 | 16 | 16 | 16 | 16 |

Table 7-7 – Specification of default values of ScalingList[ 3..5 ][ matrixId ][ i ] with i = 0..63

| i | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| ScalingList[ 3..5 ][ 0..5 ][ i ] | 16 | 16 | 16 | 16 | 16 | 16 | 16 | 16 | 16 | 16 | 16 | 16 | 16 | 16 | 16 | 16 |
| i – 16 | 0 | 1 | 2 | 3 | 4 | 5 | 6 | 7 | 8 | 9 | 10 | 11 | 12 | 13 | 14 | 15 |
| ScalingList[ 3..5 ][ 0..5 ][ i ] | 16 | 16 | 16 | 16 | 16 | 16 | 16 | 16 | 16 | 16 | 16 | 16 | 16 | 16 | 16 | 16 |
| i – 32 | 0 | 1 | 2 | 3 | 4 | 5 | 6 | 7 | 8 | 9 | 10 | 11 | 12 | 13 | 14 | 15 |
| ScalingList[ 3..5 ][ 0..5 ][ i ] | 16 | 16 | 16 | 16 | 16 | 16 | 16 | 16 | 16 | 16 | 16 | 16 | 16 | 16 | 16 | 16 |
| i – 48 | 0 | 1 | 2 | 3 | 4 | 5 | 6 | 7 | 8 | 9 | 10 | 11 | 12 | 13 | 14 | 15 |
| ScalingList[ 3..5 ][ 0..5 ][ i ] | 16 | 16 | 16 | 16 | 16 | 16 | 16 | 16 | 16 | 16 | 16 | 16 | 16 | 16 | 16 | 16 |

FIG. 129

Table 7-8 – Specification of default values of ScalingList[ 6 ][ matrixId ][ i ] with i = 0..63

| i | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| ScalingList[ 6 ][ 0..3 ][ i ] | 16 | 16 | 16 | 16 | 16 | 16 | 16 | 16 | 16 | 16 | 16 | 16 | 16 | 16 | 16 | 16 |
| i – 16 | 0 | 1 | 2 | 3 | 4 | 5 | 6 | 7 | 8 | 9 | 10 | 11 | 12 | 13 | 14 | 15 |
| ScalingList[ 6 ][ 0..3 ][ i ] | 16 | 16 | 16 | 16 | 16 | 16 | 16 | 16 | 16 | 16 | 16 | 16 | 16 | 16 | 16 | 16 |
| i – 32 | 0 | 1 | 2 | 3 | 4 | 5 | 6 | 7 | 8 | 9 | 10 | 11 | 12 | 13 | 14 | 15 |
| ScalingList[ 6 ][ 0..3 ][ i ] | 16 | 16 | 16 | 16 | 16 | 16 | 16 | 16 | 16 | 16 | 16 | 16 | 16 | 16 | 16 | 16 |
| i – 48 | 0 | 1 | 2 | 3 | 4 | 5 | 6 | 7 | 8 | 9 | 10 | 11 | 12 | 13 | 14 | 15 |
| ScalingList[ 6 ][ 0..3 ][ i ] | 16 | 16 | 16 | 16 | 16 | 16 | 16 | 16 | 16 | 16 | 16 | 16 | 16 | 16 | 16 | 16 |

The five-dimensional array ScalingFactor[ sizeId ][sizeId][ matrixId ][ x ][ y ], with x, y = 0..( 1 << sizeId ) − 1, specifies the array of scaling factors according to the variables sizeId specified in Table 7-3 and matrixId specified in Table 7-4.

The elements of the quantization matrix of size 2x2, ScalingFactor[ 1 ][ 1 ][ matrixId ][ x ][ y ], with i = 0..3, matrixId = 1, 2, 4, 5, are derived as follows:

x = DiagScanOrder[ 1 ][ 1 ][ i ][ 0 ] (7-40)

y = DiagScanOrder[ 1 ][ 1 ][ i ][ 1 ] (7-41)

ScalingFactor[ 1 ][ 1 ][ matrixId ][ x ][ y ] = ScalingList[ 1 ][ matrixId ][ i ] (7-42)

The elements of the quantization matrix of size 4x4, ScalingFactor[ 2 ][ 2 ][ matrixId ][ x ][ y ], with i = 0..15, matrixId = 0..5, are derived as follows:

x = DiagScanOrder[ 2 ][ 2 ][ i ][ 0 ] (7-43)

y = DiagScanOrder[ 2 ][ 2 ][ i ][ 1 ] (7-44)

ScalingFactor[ 2 ][ 2 ][ matrixId ][ x ][ y ] = ScalingList[ 2 ][ matrixId ][ i ] (7-45)

The elements of the quantization matrix of size 8x8, ScalingFactor[ 3 ][ 3 ][ matrixId ][ x ][ y ], with i = 0..63, matrixId = 0..5, are derived as follows:

x = DiagScanOrder[ 3 ][ 3 ][ i ][ 0 ] (7-46)

y = DiagScanOrder[ 3 ][ 3 ][ i ][ 1 ] (7-47)

ScalingFactor[ 3 ][ 3 ][ matrixId ][ x ][ y ] = ScalingList[ 3 ][ matrixId ][ i ] (7-48)

FIG. 130

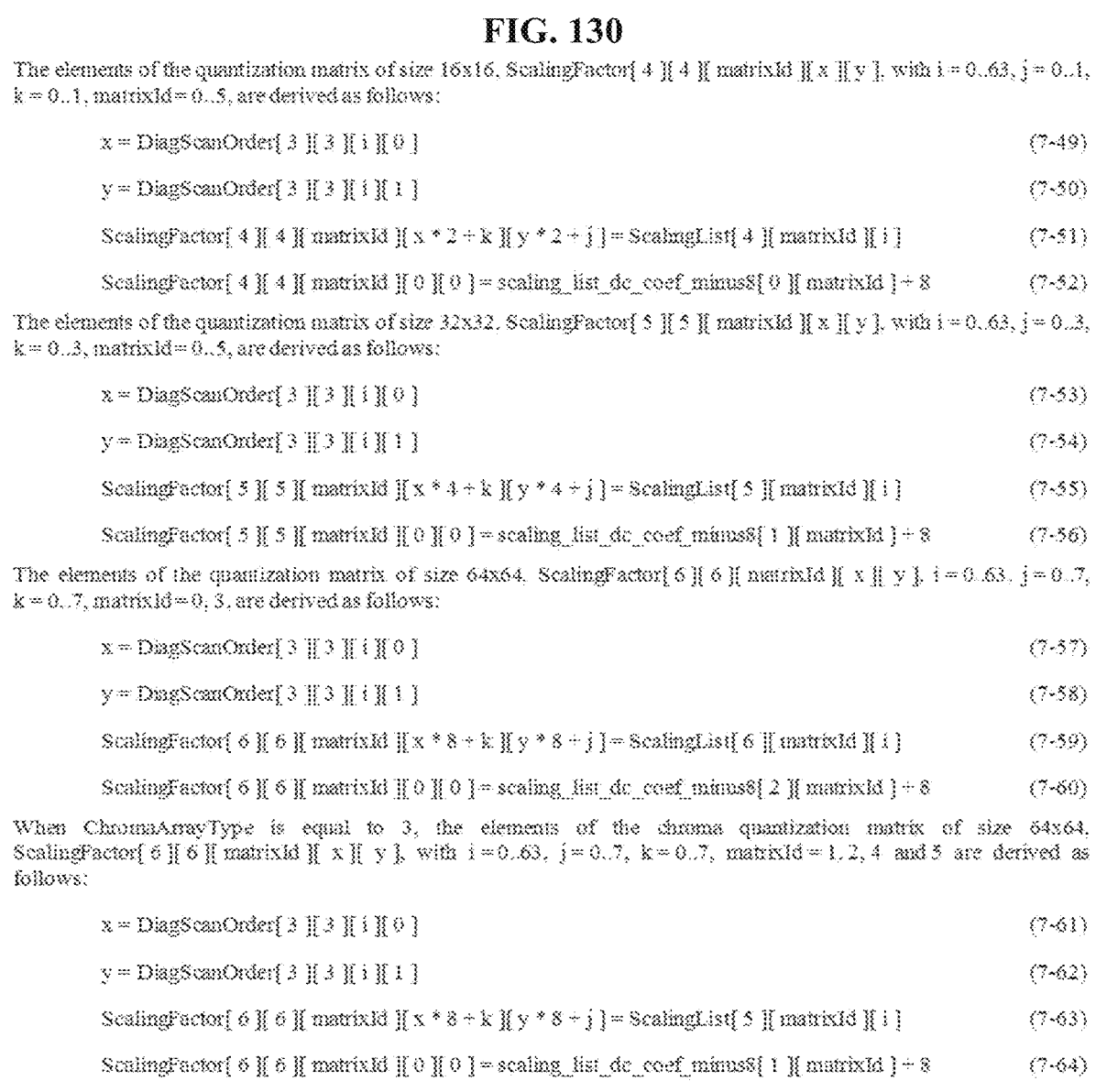

The elements of the quantization matrix of size 16x16, ScalingFactor[ 4 ][ 4 ][ matrixId ][ x ][ y ], with i = 0..63, j = 0..1, k = 0..1, matrixId = 0..5, are derived as follows:

x = DiagScanOrder[ 3 ][ 3 ][ i ][ 0 ] (7-49)

y = DiagScanOrder[ 3 ][ 3 ][ i ][ 1 ] (7-50)

ScalingFactor[ 4 ][ 4 ][ matrixId ][ x * 2 + k ][ y * 2 + j ] = ScalingList[ 4 ][ matrixId ][ i ] (7-51)

ScalingFactor[ 4 ][ 4 ][ matrixId ][ 0 ][ 0 ] = scaling_list_dc_coef_minus8[ 0 ][ matrixId ] + 8 (7-52)

The elements of the quantization matrix of size 32x32, ScalingFactor[ 5 ][ 5 ][ matrixId ][ x ][ y ], with i = 0..63, j = 0..3, k = 0..3, matrixId = 0..5, are derived as follows:

x = DiagScanOrder[ 3 ][ 3 ][ i ][ 0 ] (7-53)

y = DiagScanOrder[ 3 ][ 3 ][ i ][ 1 ] (7-54)

ScalingFactor[ 5 ][ 5 ][ matrixId ][ x * 4 + k ][ y * 4 + j ] = ScalingList[ 5 ][ matrixId ][ i ] (7-55)

ScalingFactor[ 5 ][ 5 ][ matrixId ][ 0 ][ 0 ] = scaling_list_dc_coef_minus8[ 1 ][ matrixId ] + 8 (7-56)

The elements of the quantization matrix of size 64x64, ScalingFactor[ 6 ][ 6 ][ matrixId ][ x ][ y ], i = 0..63, j = 0..7, k = 0..7, matrixId = 0, 3, are derived as follows:

x = DiagScanOrder[ 3 ][ 3 ][ i ][ 0 ] (7-57)

y = DiagScanOrder[ 3 ][ 3 ][ i ][ 1 ] (7-58)

ScalingFactor[ 6 ][ 6 ][ matrixId ][ x * 8 + k ][ y * 8 + j ] = ScalingList[ 6 ][ matrixId ][ i ] (7-59)

ScalingFactor[ 6 ][ 6 ][ matrixId ][ 0 ][ 0 ] = scaling_list_dc_coef_minus8[ 2 ][ matrixId ] + 8 (7-60)

When ChromaArrayType is equal to 3, the elements of the chroma quantization matrix of size 64x64, ScalingFactor[ 6 ][ 6 ][ matrixId ][ x ][ y ], with i = 0..63, j = 0..7, k = 0..7, matrixId = 1, 2, 4 and 5 are derived as follows:

x = DiagScanOrder[ 3 ][ 3 ][ i ][ 0 ] (7-61)

y = DiagScanOrder[ 3 ][ 3 ][ i ][ 1 ] (7-62)

ScalingFactor[ 6 ][ 6 ][ matrixId ][ x * 8 + k ][ y * 8 + j ] = ScalingList[ 5 ][ matrixId ][ i ] (7-63)

ScalingFactor[ 6 ][ 6 ][ matrixId ][ 0 ][ 0 ] = scaling_list_dc_coef_minus8[ 1 ][ matrixId ] + 8 (7-64)

FIG. 131

For a quantization matrix with rectangular size, the five-dimensional array ScalingFactor[ sizeIdW ][ sizeIdH ][ matrixId ][ x ][ y ], with sizeIdW = 0..6, sizeIdH = 0..6, matrixId = 0..5, x = 0..( 1 << sizeIdW ) − 1, y = 0..( 1 << sizeIdH ) − 1, and sizeIdW != sizeIdH, specifies the array of scaling factors for size ( 1 << sizeIdW )x( 1 << sizeIdH ), are generated by using ScalingList[ sizeLId ][ matrixId ][ i ] with sizeLId = max( sizeIdW, sizeIdH ), as follows:

```
x = DiagScanOrder[ k ][ k ][ i ][ 0 ],
y = DiagScanOrder[ k ][ k ][ i ][ 1 ],
k = min( sizeLId, 3 ),
ratioW = ( 1 << sizeIdW ) / ( 1 << k )
ratioH = ( 1 << sizeIdH ) / ( 1 << k )
ratioWH = 1 << abs( sizeIdW − sizeIdH )                                        (7-64)
If ( sizeIdW > sizeIdH )
    ScalingFactor[ sizeIdW ][ sizeIdH ][ matrixId ][ x ][ y ] =
        ScalingList[ sizeLId ][ matrixId ][ RasterScanOrder[ k ][ k ][ ( 1 << k ) * ( ( y * ratioWH ) / ratioW )
+ ( x / ratioW ) ] ]
else ( sizeIdW < sizeIdH )
    ScalingFactor[ sizeIdW ][ sizeIdH ][ matrixId ][ x ][ y ] =
    ScalingList[ sizeLId ][ matrixId ][ RasterScanOrder[ k ][ k ][ ( 1 << k ) * ( y / ratioH ) + ( (x * ratioWH) /
ratioH ) ] ]
```

The initialization process of raster scan order array RasterScan is as specified in clause scan order array initialization process.

NOTE – A quantization matrix element ScalingFactor[ sizeIdW ][ sizeIdH ][ matrixId ][ x ][ y ] shall be zeroed out when any of the following conditions is true

- x > 32
- y > 32
- trTypeHor > 0 (or tu_mts_idx > 0) and x > 16
- trTypeVer > 0 (or tu_mts_idx > 0) and y > 16
- trTypeHor > 0 (or tu_mts_idx > 0), (1 << sizeIdW) == 32, and x > 16
- trTypeVer > 0 (or tu_mts_idx > 0), (1 << sizeIdH) == 32, and y > 16

FIG. 132

Table 7-9 – Specification of sizeIdW and sizeIdH

| Size of quantization matrix | sizeIdW | sizeIdH |
|---|---|---|
| 1 | 0 | 0 |
| 2 | 1 | 1 |
| 4 | 2 | 2 |
| 8 | 3 | 3 |
| 16 | 4 | 4 |
| 32 | 5 | 5 |
| 64 | 6 | 6 |

FIG. 133

Scaling process for transform coefficients

Inputs to this process are:

- a luma location ( xTbY, yTbY ) specifying the top-left sample of the current luma transform block relative to the top-left luma sample of the current picture,
- a variable nTbW specifying the transform block width,
- a variable nTbH specifying the transform block height,
- a variable cIdx specifying the colour component of the current block,
- a variable bitDepth specifying the bit depth of the current colour component.

Output of this process is the (nTbW)x(nTbH) array d of scaled transform coefficients with elements d[ x ][ y ].

The quantization parameter qP is derived as follows:

- If cIdx is equal to 0, the following applies:

$$qP = Qp'_Y \tag{8-940}$$

- Otherwise, if cIdx is equal to 1 and tu_joint_cbcr_residual[ xTbY ][ yTbY ] is equal to 1, the following applies:

$$qP = Qp'_{CbCr} \tag{8-941}$$

- Otherwise, if cIdx is equal to 1, the following applies:

$$qP = Qp'_{Cb} \tag{8-942}$$

- Otherwise (cIdx is equal to 2), the following applies:

$$qP = Qp'_{Cr} \tag{8-943}$$

The variable rectNonTsFlag is derived as follows:

rectNonTsFlag = ( ( ( Log2( nTbW ) + Log2( nTbH ) ) & 1 ) = = 1 &&
transform_skip_flag[ xTbY ][ yTbY ] = = 0 ) (8-944)

The variables bdShift, rectNorm and bdOffset are derived as follows:

bdShift = bitDepth + ( ( rectNonTsFlag ? 1 : 0 ) +
( Log2( nTbW ) + Log2( nTbH ) ) / 2 ) − 5 + dep_quant_enabled_flag (8-945)

bdOffset = ( 1 << bdShift ) >> 1 (8-946)

FIG. 134

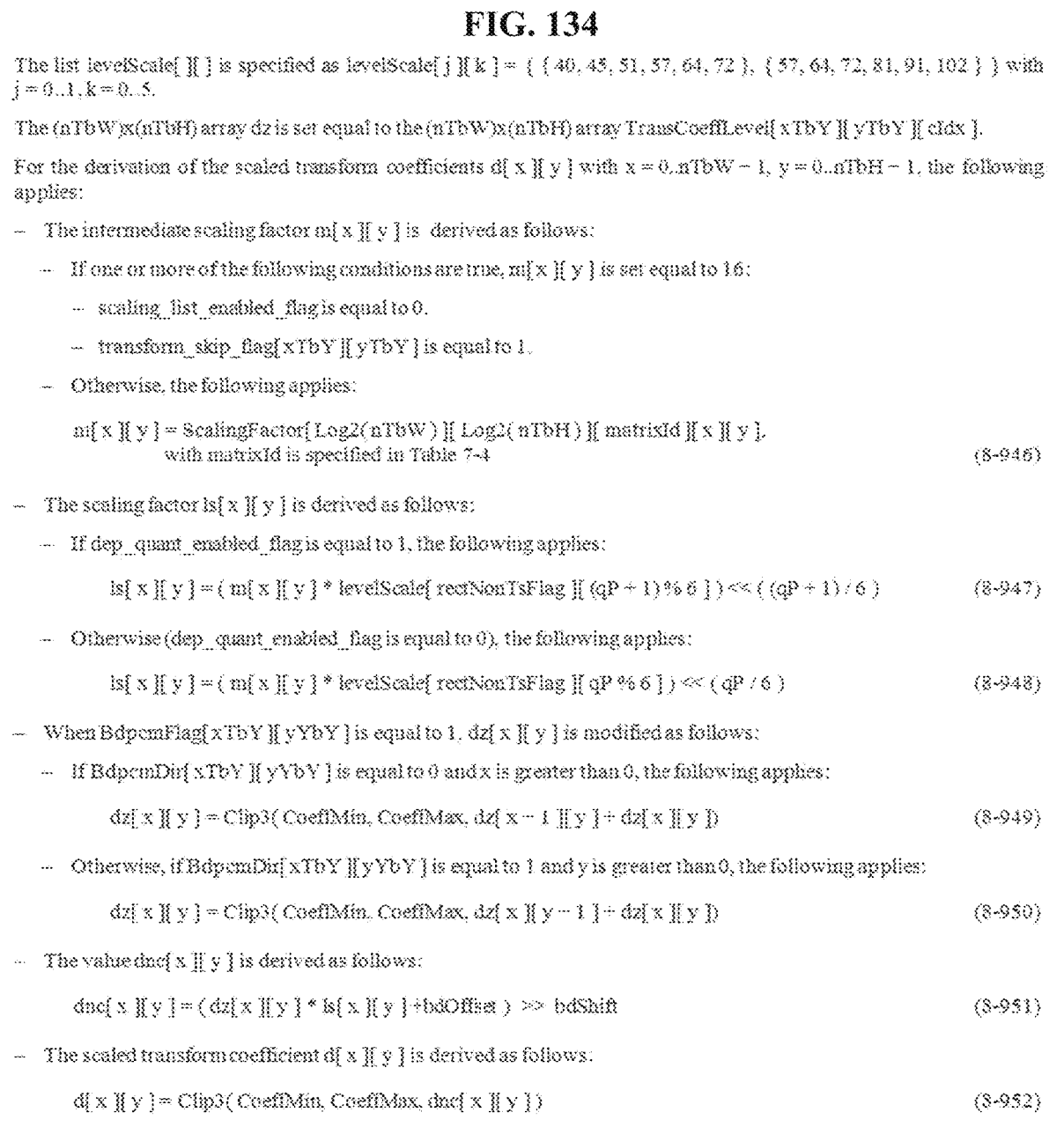

The list levelScale[ ][ ] is specified as levelScale[ j ][ k ] = { { 40, 45, 51, 57, 64, 72 }, { 57, 64, 72, 81, 91, 102 } } with j = 0..1, k = 0..5.

The (nTbW)x(nTbH) array dz is set equal to the (nTbW)x(nTbH) array TransCoeffLevel[ xTbY ][ yTbY ][ cIdx ].

For the derivation of the scaled transform coefficients d[ x ][ y ] with x = 0..nTbW − 1, y = 0..nTbH − 1, the following applies:

– The intermediate scaling factor m[ x ][ y ] is derived as follows:
  – If one or more of the following conditions are true, m[ x ][ y ] is set equal to 16:
    – scaling_list_enabled_flag is equal to 0.
    – transform_skip_flag[ xTbY ][ yTbY ] is equal to 1.
  – Otherwise, the following applies:

m[ x ][ y ] = ScalingFactor[ Log2( nTbW ) ][ Log2( nTbH ) ][ matrixId ][ x ][ y ], with matrixId is specified in Table 7-4 (8-946)

– The scaling factor ls[ x ][ y ] is derived as follows:
  – If dep_quant_enabled_flag is equal to 1, the following applies:

ls[ x ][ y ] = ( m[ x ][ y ] * levelScale[ rectNonTsFlag ][ (qP + 1) % 6 ] ) << ( (qP + 1) / 6 ) (8-947)

– Otherwise (dep_quant_enabled_flag is equal to 0), the following applies:

ls[ x ][ y ] = ( m[ x ][ y ] * levelScale[ rectNonTsFlag ][ qP % 6 ] ) << ( qP / 6 ) (8-948)

– When BdpcmFlag[ xTbY ][ yYbY ] is equal to 1, dz[ x ][ y ] is modified as follows:
  – If BdpcmDir[ xTbY ][ yYbY ] is equal to 0 and x is greater than 0, the following applies:

dz[ x ][ y ] = Clip3( CoeffMin, CoeffMax, dz[ x − 1 ][ y ] + dz[ x ][ y ]) (8-949)

– Otherwise, if BdpcmDir[ xTbY ][ yYbY ] is equal to 1 and y is greater than 0, the following applies:

dz[ x ][ y ] = Clip3( CoeffMin, CoeffMax, dz[ x ][ y − 1 ] + dz[ x ][ y ]) (8-950)

– The value dnc[ x ][ y ] is derived as follows:

dnc[ x ][ y ] = ( dz[ x ][ y ] * ls[ x ][ y ] +bdOffset ) >> bdShift (8-951)

– The scaled transform coefficient d[ x ][ y ] is derived as follows:

d[ x ][ y ] = Clip3( CoeffMin, CoeffMax, dnc[ x ][ y ] ) (8-952)

QUANTIZATION MATRIX ENCODING/DECODING METHOD AND DEVICE, AND RECORDING MEDIUM IN WHICH BITSTREAM IS STORED

CROSS-REFERENCE TO RELATED APPLICATION

This application is a continuation of U.S. application Ser. No. 18/674,647, filed on May 24, 2024, which is a continuation of U.S. application Ser. No. 17/418,690, filed on Jun. 25, 2021, now granted U.S. Pat. No. 12,034,929, issued on Jul. 9, 2024, which is a National Stage Entry of PCT International Application No. PCT/KR2019/018432, filed on Dec. 24, 2019, which claims priority to Korean Patent Application No. 10-2018-0169896, filed on Dec. 26, 2018, Korean Patent Application No. 10-2019-0026003, filed on Mar. 6, 2019, Korean Patent Application No. 10-2019-0026850, filed on Mar. 8, 2019, Korean Patent Application No. 10-2019-0033329, filed on Mar. 25, 2019, Korean Patent Application No. 10-2019-0071310, filed on Jun. 17, 2019, and Korean Patent Application No. 10-2019-0072278, filed on Jun. 18, 2019, the entire contents of which are hereby incorporated by references in its entirety.

TECHNICAL FIELD

The present invention relates to an image encoding/decoding method and apparatus, and a recording medium for storing a bitstream. More particularly, the present invention relates to a method and apparatus for encoding/decoding an image based on a quantization matrix, and a recording medium for storing a bitstream.

BACKGROUND ART

Recently, the demand for high resolution and quality images such as high definition (HD) or ultra-high definition (UHD) images has increased in various applications. As the resolution and quality of images are improved, the amount of data correspondingly increases. This is one of the causes of increase in transmission cost and storage cost when transmitting image data through existing transmission media such as wired or wireless broadband channels or when storing image data. In order to solve such problems with high resolution and quality image data, a high efficiency image encoding/decoding technique is required.

There are various video compression techniques such as an inter prediction technique of predicting the values of pixels within a current picture from the values of pixels within a preceding picture or a subsequent picture, an intra prediction technique of predicting the values of pixels within a region of a current picture from the values of pixels within another region of the current picture, a transform and quantization technique of compressing the energy of a residual signal, and an entropy coding technique of allocating frequently occurring pixel values with shorter codes and less occurring pixel values with longer codes.

In conventional quantization matrix encoding/decoding, since only a prediction mode, a color component or a size are considered, there is a limit in objective image quality and subjective image quality of an image.

DISCLOSURE

Technical Problem

An object of the present invention is to provide an image encoding/decoding method and apparatus with improved image encoding/decoding efficiency.

Another object of the present invention is to provide a method and apparatus considering at least one of a prediction mode, a color component, a size, a form, a one-dimensional transform type, a two-dimensional transform combination, or whether to use transform, in order to improve objective image quality and subjective image quality of an image.

Another object of the present invention is to provide a recording medium for storing a bitstream generated by an image encoding/decoding method or apparatus of the present invention.

Technical Solution

According to the present invention, a method of decoding an image includes decoding information on a quantization matrix from a bitstream, acquiring a quantization matrix of a current block based on the information on the quantization matrix, and dequantizing the current block using the quantization matrix of the current block. The acquiring of the quantization matrix of the current block includes deriving a single identifier using at least one of a size of the current block, a prediction mode or a color component and acquiring the quantization matrix of the current block based on the single identifier.

The information on the quantization matrix may include quantization matrix prediction method information, and the quantization matrix prediction method information may be decoded in an adaptation parameter set.

The prediction mode may include an intra mode, an inter mode and an intra block copy (IBC) mode, and a single identifier for the inter mode and a single identifier for the IBC mode may be the same.

The information on the quantization matrix may include information on whether a quantization matrix is present, and, when the information on whether the quantization matrix is present indicates that the quantization matrix is not present, all coefficient values of the quantization matrix of the current block may have a predetermined constant value.

The predetermined constant value may be 16.

The acquiring of the quantization matrix of the current block may include adjusting coefficient values of the quantization matrix of the current block in consideration of a transform size of the current block.

The adjusting of the coefficient values of the quantization matrix of the current block may include replacing coefficients of a region other than a first region corresponding to the transform size of the current block in the quantization matrix of the current block with 0.

The first region may be located at a left upper side of the quantization matrix of the current block.

The acquiring of the quantization matrix of the current block may include acquiring a default quantization matrix based on the information on the quantization matrix, and all coefficient values of the default quantization matrix may have a predetermined constant value regardless of the size of the current block.

The acquiring of the quantization matrix of the current block may include performing subsampling with respect to a reconstructed primary quantization matrix based on the information on the quantization matrix, and the subsampling may be performed in at least one of a horizontal direction or a vertical direction of the primary quantization matrix.

According to the present invention, a method of encoding an image may include determining a quantization matrix of a current block, quantizing the current block using the quantization matrix of the current block, and encoding information on the quantization matrix of the current block. The encoding of the information on the quantization matrix of the current block includes deriving a single identifier using at least one of a size of the current block, a prediction mode or a color component, and encoding the information on the quantization matrix of the current block based on the single identifier.

The information on the quantization matrix of the current block may include quantization matrix prediction method information, and the quantization matrix prediction method information may be encoded in an adaptation parameter set.

The prediction mode may include an intra mode, an inter mode and an intra block copy (IBC) mode, and a single identifier for the inter mode and a single identifier for the IBC mode may be the same.

When the quantization matrix of the current block is not present, all coefficient values of the quantization matrix of the current block may have a predetermined constant value.

The predetermined constant value may be 16.

The encoding of the information on the quantization matrix of the current block may include adjusting coefficient values of the quantization matrix of the current block in consideration of a transform size of the current block.

The adjusting of the coefficient values of the quantization matrix of the current block may include replacing coefficients of a region other than a first region corresponding to the transform size of the current block in the quantization matrix of the current block with 0.

The first region may be located at a left upper side of the quantization matrix of the current block.

The encoding of the information on the quantization matrix of the current block may include encoding the information on the quantization matrix of the current block based on a default quantization matrix, and all coefficient values of the default quantization matrix may have a predetermined constant value regardless of the size of the current block.

According to the present invention, a non-transitory computer-readable recording medium for storing a bitstream generated by an image encoding method including determining a quantization matrix of a current block, quantizing the current block using the quantization matrix of the current block, and encoding information on the quantization matrix of the current block. The encoding of the information on the quantization matrix of the current block includes deriving a single identifier using at least one of a size of the current block, a prediction mode or a color component, and encoding the information on the quantization matrix of the current block based on the single identifier.

Advantageous Effects

According to the present invention, it is possible to provide an image encoding/decoding method and apparatus with improved image encoding/decoding efficiency.

According to the present invention, it is possible to provide a method and apparatus considering at least one of a prediction mode, a color component, a size, a form, a one-dimensional transform type, a two-dimensional transform combination, or whether to use transform, in order to improve objective image quality and subjective image quality of an image.

According to the present invention, it is possible to provide a recording medium storing a bitstream generated by an image encoding/decoding method or apparatus of the present invention.

DESCRIPTION OF DRAWINGS

FIGS. 9 to 17 are views illustrating a quantization matrix according to an embodiment of the present invention.

FIGS. 18 to 20 are views illustrating a syntax element for signaling information on whether a quantization matrix is used in a parameter set according to an embodiment of the present invention.

FIGS. 21 to 26 are views illustrating a default matrix used in a quantization/dequantization process according to an embodiment of the present invention.

FIGS. 27 to 59 are views illustrating a process of entropy-encoding/decoding quantization matrix prediction method information according to an embodiment of the present invention.

FIGS. 62 to 64 are views illustrating a mapping table refMap according to an embodiment of the present invention.

FIGS. 77 to 88 are views illustrating syntax element information, semantics of the syntax element information and an encoding/decoding process necessary to implement a quantization matrix encoding/decoding method and apparatus and a recording medium storing a bitstream according to an embodiment of the present invention.

FIGS. 89 to 100 are views illustrating a default matrix used in a quantization/dequantization process according to an embodiment of the present invention.

FIGS. 101 to 134 are views illustrating syntax element information, semantics of the syntax element information and an encoding/decoding process necessary to implement a quantization matrix encoding/decoding method and apparatus and a recording medium storing a bitstream according to another embodiment of the present invention.

MODE FOR INVENTION

Figure 1:
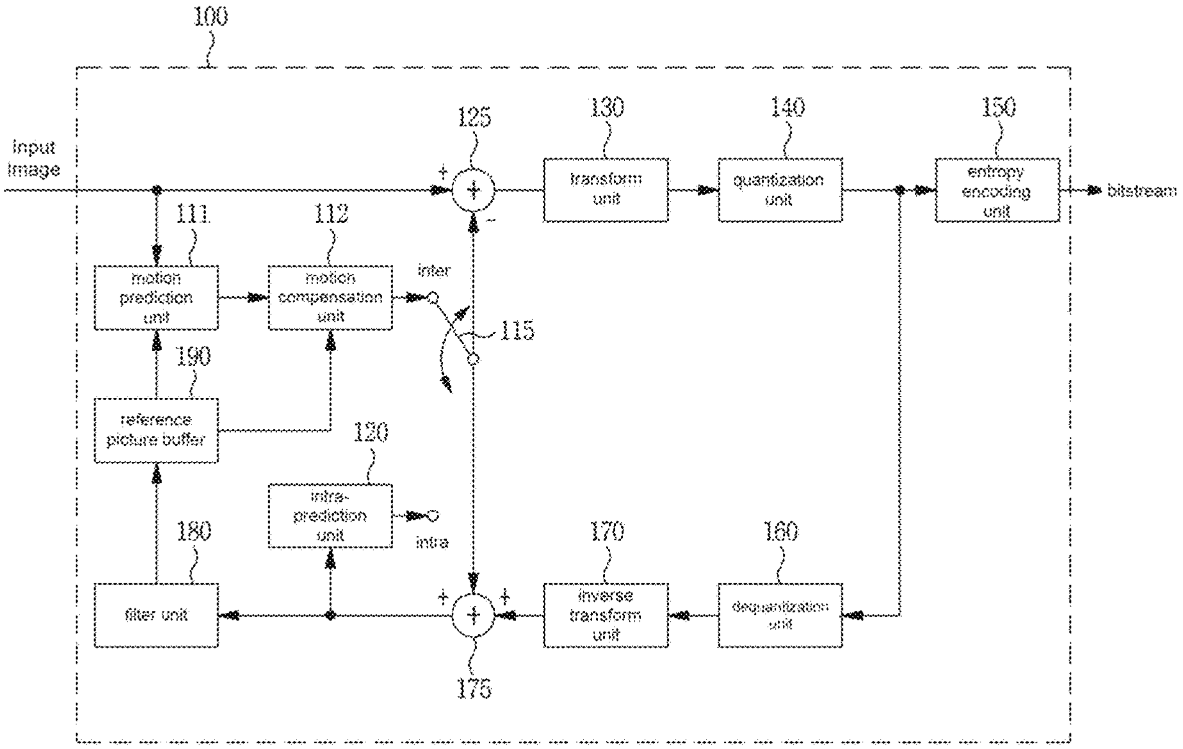
FIG. 1 is a block diagram showing a configuration of an encoding apparatus according to an embodiment to which the present invention is applied.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

Hereinafter, an image may mean a picture configuring a video, or may mean the video itself. For example, "encoding or decoding or both of an image" may mean "encoding or decoding or both of a moving picture", and may mean "encoding or decoding or both of one image among images of a moving picture."

Hereinafter, terms "moving picture" and "video" may be used as the same meaning and be replaced with each other.

Hereinafter, a target image may be an encoding target image which is a target of encoding and/or a decoding target image which is a target of decoding. Also, a target image may be an input image inputted to an encoding apparatus, and an input image inputted to a decoding apparatus. Here, a target image may have the same meaning with the current image.

Hereinafter, terms "image", "picture, "frame" and "screen" may be used as the same meaning and be replaced with each other.

Hereinafter, a target block may be an encoding target block which is a target of encoding and/or a decoding target block which is a target of decoding. Also, a target block may be the current block which is a target of current encoding and/or decoding. For example, terms “target block” and “current block” may be used as the same meaning and be replaced with each other.

Hereinafter, terms “block” and “unit” may be used as the same meaning and be replaced with each other. Or a “block” may represent a specific unit.

Hereinafter, terms “region” and “segment” may be replaced with each other.

Hereinafter, a specific signal may be a signal representing a specific block. For example, an original signal may be a signal representing a target block. A prediction signal may be a signal representing a prediction block. A residual signal may be a signal representing a residual block.

In embodiments, each of specific information, data, flag, index, element and attribute, etc. may have a value. A value of information, data, flag, index, element and attribute equal to “0” may represent a logical false or the first predefined value. In other words, a value “0”, a false, a logical false and the first predefined value may be replaced with each other. A value of information, data, flag, index, element and attribute equal to “1” may represent a logical true or the second predefined value. In other words, a value “1”, a true, a logical true and the second predefined value may be replaced with each other.

When a variable i or j is used for representing a column, a row or an index, a value of i may be an integer equal to or greater than 0, or equal to or greater than 1. That is, the column, the row, the index, etc. may be counted from 0 or may be counted from 1.

Description of Terms

Encoder: means an apparatus performing encoding. That is, means an encoding apparatus.

Decoder: means an apparatus performing decoding. That is, means a decoding apparatus.

Block: is an M×N array of a sample. Herein, M and N may mean positive integers, and the block may mean a sample array of a two-dimensional form. The block may refer to a unit. A current block my mean an encoding target block that becomes a target when encoding, or a decoding target block that becomes a target when decoding. In addition, the current block may be at least one of an encode block, a prediction block, a residual block, and a transform block.

Sample: is a basic unit constituting a block. It may be expressed as a value from 0 to $2^{Bd}-1$ according to a bit depth ($B_d$). In the present invention, the sample may be used as a meaning of a pixel. That is, a sample, a pel, a pixel may have the same meaning with each other.

Unit: may refer to an encoding and decoding unit. When encoding and decoding an image, the unit may be a region generated by partitioning a single image. In addition, the unit may mean a subdivided unit when a single image is partitioned into subdivided units during encoding or decoding. That is, an image may be partitioned into a plurality of units. When encoding and decoding an image, a predetermined process for each unit may be performed. A single unit may be partitioned into sub-units that have sizes smaller than the size of the unit. Depending on functions, the unit may mean a block, a macroblock, a coding tree unit, a code tree block, a coding unit, a coding block), a prediction unit, a prediction block, a residual unit), a residual block, a transform unit, a transform block, etc. In addition, in order to distinguish a unit from a block, the unit may include a luma component block, a chroma component block associated with the luma component block, and a syntax element of each color component block. The unit may have various sizes and forms, and particularly, the form of the unit may be a two-dimensional geometrical figure such as a square shape, a rectangular shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Coding Tree Unit: is configured with a single coding tree block of a luma component Y, and two coding tree blocks related to chroma components Cb and Cr. In addition, it may mean that including the blocks and a syntax element of each block. Each coding tree unit may be partitioned by using at least one of a quad-tree partitioning method, a binary tree partitioning method and ternary-tree partitioning method to configure a lower unit such as coding unit, prediction unit, transform unit, etc. It may be used as a term for designating a sample block that becomes a process unit when encoding/decoding an image as an input image. Here, the quad-tree may mean a quaternary-tree.

When the size of the coding block is within a predetermined range, the division is possible using only quad-tree partitioning. Here, the predetermined range may be defined as at least one of a maximum size and a minimum size of a coding block in which the division is possible using only quad-tree partitioning. Information indicating a maximum/minimum size of a coding block in which quad-tree partitioning is allowed may be signaled through a bitstream, and the information may be signaled in at least one unit of a sequence, a picture parameter, a tile group, or a slice (segment). Alternatively, the maximum/minimum size of the coding block may be a fixed size predetermined in the coder/decoder. For example, when the size of the coding block corresponds to 256×256 to 64×64, the division is possible only using quad-tree partitioning. Alternatively, when the size of the coding block is larger than the size of the maximum conversion block, the division is possible only using quad-tree partitioning. Herein, the block to be divided may be at least one of a coding block and a transform block. In this case, information indicating the division of the coded block (for example, split_flag) may be a flag indicating whether or not to perform the quad-tree partitioning. When the size of the coding block falls within a predetermined range, the division is possible only using binary tree or ternary tree partitioning. In this case, the above description of the quad-tree partitioning may be applied to binary tree partitioning or ternary tree partitioning in the same manner.

Coding Tree Block: may be used as a term for designating any one of a Y coding tree block, Cb coding tree block, and Cr coding tree block.

Neighbor Block: may mean a block adjacent to a current block. The block adjacent to the current block may mean a block that comes into contact with a boundary of the current block, or a block positioned within a predetermined distance from the current block. The neighbor block may mean a block adjacent to a vertex of the current block. Herein, the block adjacent to the vertex of the current block may mean a block vertically adjacent to a neighbor block that is horizontally adjacent to the current block, or a block horizontally adjacent to a neighbor block that is vertically adjacent to the current block.

Reconstructed Neighbor block: may mean a neighbor block adjacent to a current block and which has been already spatially/temporally encoded or decoded. Herein, the reconstructed neighbor block may mean a reconstructed neighbor unit. A reconstructed spatial neighbor block may be a block within a current picture and which has been already reconstructed through encoding or decoding or both. A reconstructed temporal neighbor block is a block at a corresponding position as the current block of the current picture within a reference image, or a neighbor block thereof.

Unit Depth: may mean a partitioned degree of a unit. In a tree structure, the highest node (Root Node) may correspond to the first unit which is not partitioned. Also, the highest node may have the least depth value. In this case, the highest node may have a depth of level 0. A node having a depth of level 1 may represent a unit generated by partitioning once the first unit. A node having a depth of level 2 may represent a unit generated by partitioning twice the first unit. A node having a depth of level n may represent a unit generated by partitioning n-times the first unit. A Leaf Node may be the lowest node and a node which cannot be partitioned further. A depth of a Leaf Node may be the maximum level. For example, a predefined value of the maximum level may be 3. A depth of a root node may be the lowest and a depth of a leaf node may be the deepest. In addition, when a unit is expressed as a tree structure, a level in which a unit is present may mean a unit depth.

Bitstream: may mean a bitstream including encoding image information.

Parameter Set: corresponds to header information among a configuration within a bitstream. At least one of a video parameter set, a sequence parameter set, a picture parameter set, and an adaptation parameter set may be included in a parameter set. In addition, a parameter set may include a slice header, a tile group header, and tile header information. The term "tile group" means a group of tiles and has the same meaning as a slice.

An adaptation parameter set may mean a parameter set that can be shared by being referred to in different pictures, subpictures, slices, tile groups, tiles, or bricks. In addition, information in an adaptation parameter set may be used by referring to different adaptation parameter sets for a subpicture, a slice, a tile group, a tile, or a brick inside a picture.

In addition, regarding the adaptation parameter set, different adaptation parameter sets may be referred to by using identifiers of different adaptation parameter sets for a subpicture, a slice, a tile group, a tile, or a brick inside a picture.

In addition, regarding the adaptation parameter set, different adaptation parameter sets may be referred to by using identifiers of different adaptation parameter sets for a slice, a tile group, a tile, or a brick inside a subpicture.

In addition, regarding the adaptation parameter set, different adaptation parameter sets may be referred to by using identifiers of different adaptation parameter sets for a tile or a brick inside a slice.

In addition, regarding the adaptation parameter set, different adaptation parameter sets may be referred to by using identifiers of different adaptation parameter sets for a brick inside a tile.

Information on an adaptation parameter set identifier may be included in a parameter set or a header of the subpicture, and an adaptation parameter set corresponding to the adaptation parameter set identifier may be used for the subpicture.

The information on the adaptation parameter set identifier may be included in a parameter set or a header of the tile, and an adaptation parameter set corresponding to the adaptation parameter set identifier may be used for the tile.

The information on the adaptation parameter set identifier may be included in a header of the brick, and an adaptation parameter set corresponding to the adaptation parameter set identifier may be used for the brick.

The picture may be partitioned into one or more tile rows and one or more tile columns.

The subpicture may be partitioned into one or more tile rows and one or more tile columns within a picture. The subpicture may be a region having the form of a rectangle/square within a picture and may include one or more CTUs. In addition, at least one or more tiles/bricks/slices may be included within one subpicture.

The tile may be a region having the form of a rectangle/square within a picture and may include one or more CTUs. In addition, the tile may be partitioned into one or more bricks.

The brick may mean one or more CTU rows within a tile. The tile may be partitioned into one or more bricks, and each brick may have at least one or more CTU rows. A tile that is not partitioned into two or more may mean a brick.

The slice may include one or more tiles within a picture and may include one or more bricks within a tile.

Parsing: may mean determination of a value of a syntax element by performing entropy decoding, or may mean the entropy decoding itself.

Symbol: may mean at least one of a syntax element, a coding parameter, and a transform coefficient value of an encoding/decoding target unit. In addition, the symbol may mean an entropy encoding target or an entropy decoding result.

Prediction Mode: may be information indicating a mode encoded/decoded with intra prediction or a mode encoded/decoded with inter prediction.

Prediction Unit: may mean a basic unit when performing prediction such as inter-prediction, intra-prediction, inter-compensation, intra-compensation, and motion compensation. A single prediction unit may be partitioned into a plurality of partitions having a smaller size, or may be partitioned into a plurality of lower prediction units. A plurality of partitions may be a basic unit in performing prediction or compensation. A partition which is generated by dividing a prediction unit may also be a prediction unit.

Prediction Unit Partition: may mean a form obtained by partitioning a prediction unit.

Reference picture list may refer to a list including one or more reference pictures used for inter prediction or motion compensation. There are several types of usable reference picture lists, including LC (List combined), L0 (List 0), L1 (List 1), L2 (List 2), L3 (List 3).

Inter prediction indicator may refer to a direction of inter prediction (unidirectional prediction, bidirectional prediction, etc.) of a current block. Alternatively, it may refer to the number of reference pictures used to generate a prediction block of a current block. Alternatively, it may refer to the number of prediction blocks used at the time of performing inter prediction or motion compensation on a current block.

Prediction list utilization flag indicates whether a prediction block is generated using at least one reference picture in a specific reference picture list. An inter prediction indicator can be derived using a prediction list utilization flag, and conversely, a prediction list utilization flag can be derived using an inter prediction indicator. For example, when the prediction list utilization flag has a first value of zero (0), it means that a reference picture in a reference picture list is not used to generate a prediction block. On the other hand, when the prediction list utilization flag has a second value of one (1), it means that a reference picture list is used to generate a prediction block.

Reference picture index may refer to an index indicating a specific reference picture in a reference picture list.

Reference picture may mean a reference picture which is referred to by a specific block for the purposes of inter prediction or motion compensation of the specific block. Alternatively, the reference picture may be a picture including a reference block referred to by a current block for inter prediction or motion compensation. Hereinafter, the terms “reference picture” and “reference image” have the same meaning and can be interchangeably.

Motion vector may be a two-dimensional vector used for inter prediction or motion compensation. The motion vector may mean an offset between an encoding/decoding target block and a reference block. For example, (mvX, mvY) may represent a motion vector. Here, mvX may represent a horizontal component and mvY may represent a vertical component.

Search range may be a two-dimensional region which is searched to retrieve a motion vector during inter prediction. For example, the size of the search range may be M×N. Here, M and N are both integers.

Motion vector candidate may refer to a prediction candidate block or a motion vector of the prediction candidate block when predicting a motion vector. In addition, a motion vector candidate may be included in a motion vector candidate list.

Motion vector candidate list may mean a list composed of one or more motion vector candidates.

Motion vector candidate index may mean an indicator indicating a motion vector candidate in a motion vector candidate list. Alternatively, it may be an index of a motion vector predictor.

Motion information may mean information including at least one of the items including a motion vector, a reference picture index, an inter prediction indicator, a prediction list utilization flag, reference picture list information, a reference picture, a motion vector candidate, a motion vector candidate index, a merge candidate, and a merge index.

Merge candidate list may mean a list composed of one or more merge candidates.

Merge candidate may mean a spatial merge candidate, a temporal merge candidate, a combined merge candidate, a combined bi-predictive merge candidate, or a zero merge candidate. The merge candidate may include motion information such as an inter prediction indicator, a reference picture index for each list, a motion vector, a prediction list utilization flag, and an inter prediction indicator.

Merge index may mean an indicator indicating a merge candidate in a merge candidate list. Alternatively, the merge index may indicate a block from which a merge candidate has been derived, among reconstructed blocks spatially/temporally adjacent to a current block. Alternatively, the merge index may indicate at least one piece of motion information of a merge candidate.

Transform Unit: may mean a basic unit when performing encoding/decoding such as transform, inverse-transform, quantization, dequantization, transform coefficient encoding/decoding of a residual signal. A single transform unit may be partitioned into a plurality of lower-level transform units having a smaller size. Here, transformation/inverse-transformation may comprise at least one among the first transformation/the first inverse-transformation and the second transformation/the second inverse-transformation.

Scaling: may mean a process of multiplying a quantized level by a factor. A transform coefficient may be generated by scaling a quantized level. The scaling also may be referred to as dequantization.

Quantization Parameter: may mean a value used when generating a quantized level using a transform coefficient during quantization. The quantization parameter also may mean a value used when generating a transform coefficient by scaling a quantized level during dequantization. The quantization parameter may be a value mapped on a quantization step size.

Delta Quantization Parameter: may mean a difference value between a predicted quantization parameter and a quantization parameter of an encoding/decoding target unit.

Scan: may mean a method of sequencing coefficients within a unit, a block or a matrix. For example, changing a two-dimensional matrix of coefficients into a one-dimensional matrix may be referred to as scanning, and changing a one-dimensional matrix of coefficients into a two-dimensional matrix may be referred to as scanning or inverse scanning.

Transform Coefficient: may mean a coefficient value generated after transform is performed in an encoder. It may mean a coefficient value generated after at least one of entropy decoding and dequantization is performed in a decoder. A quantized level obtained by quantizing a transform coefficient or a residual signal, or a quantized transform coefficient level also may fall within the meaning of the transform coefficient.

Quantized Level: may mean a value generated by quantizing a transform coefficient or a residual signal in an encoder. Alternatively, the quantized level may mean a value that is a dequantization target to undergo dequantization in a decoder. Similarly, a quantized transform coefficient level that is a result of transform and quantization also may fall within the meaning of the quantized level.

Non-zero Transform Coefficient: may mean a transform coefficient having a value other than zero, or a transform coefficient level or a quantized level having a value other than zero.

Quantization Matrix: may mean a matrix used in a quantization process or a dequantization process performed to improve subjective or objective image quality. The quantization matrix also may be referred to as a scaling list.

Quantization Matrix Coefficient: may mean each element within a quantization matrix. The quantization matrix coefficient also may be referred to as a matrix coefficient.

Default Matrix: may mean a predetermined quantization matrix preliminarily defined in an encoder or a decoder.

Non-default Matrix: may mean a quantization matrix that is not preliminarily defined in an encoder or a decoder but is signaled by a user.

Statistic Value: a statistic value for at least one among a variable, an encoding parameter, a constant value, etc. which have a computable specific value may be one or more among an average value, a sum value, a weighted average value, a weighted sum value, the minimum value, the maximum value, the most frequent value, a median value, an interpolated value of the corresponding specific values.

FIG. 1 is a block diagram showing a configuration of an encoding apparatus according to an embodiment to which the present invention is applied.

An encoding apparatus 100 may be an encoder, a video encoding apparatus, or an image encoding apparatus. A video may include at least one image. The encoding apparatus 100 may sequentially encode at least one image.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, an inverse-transform unit 170, an adder 175, a filter unit 180, and a reference picture buffer 190.

The encoding apparatus 100 may perform encoding of an input image by using an intra mode or an inter mode or both. In addition, encoding apparatus 100 may generate a bitstream including encoded information through encoding the input image, and output the generated bitstream. The generated bitstream may be stored in a computer readable recording medium, or may be streamed through a wired/wireless transmission medium. When an intra mode is used as a prediction mode, the switch 115 may be switched to an intra. Alternatively, when an inter mode is used as a prediction mode, the switch 115 may be switched to an inter mode. Herein, the intra mode may mean an intra-prediction mode, and the inter mode may mean an inter-prediction mode. The encoding apparatus 100 may generate a prediction block for an input block of the input image. In addition, the encoding apparatus 100 may encode a residual block using a residual of the input block and the prediction block after the prediction block being generated. The input image may be called as a current image that is a current encoding target. The input block may be called as a current block that is current encoding target, or as an encoding target block.

When a prediction mode is an intra mode, the intra-prediction unit 120 may use a sample of a block that has been already encoded/decoded and is adjacent to a current block as a reference sample. The intra-prediction unit 120 may perform spatial prediction for the current block by using a reference sample, or generate prediction samples of an input block by performing spatial prediction. Herein, the intra prediction may mean intra-prediction, When a prediction mode is an inter mode, the motion prediction unit 111 may retrieve a region that best matches with an input block from a reference image when performing motion prediction, and deduce a motion vector by using the retrieved region. In this case, a search region may be used as the region. The reference image may be stored in the reference picture buffer 190. Here, when encoding/decoding for the reference image is performed, it may be stored in the reference picture buffer 190.

The motion compensation unit 112 may generate a prediction block by performing motion compensation for the current block using a motion vector. Herein, inter-prediction may mean inter-prediction or motion compensation.

When the value of the motion vector is not an integer, the motion prediction unit 111 and the motion compensation unit 112 may generate the prediction block by applying an interpolation filter to a partial region of the reference picture. In order to perform inter-picture prediction or motion compensation on a coding unit, it may be determined that which mode among a skip mode, a merge mode, an advanced motion vector prediction (AMVP) mode, and a current picture referring mode is used for motion prediction and motion compensation of a prediction unit included in the corresponding coding unit. Then, inter-picture prediction or motion compensation may be differently performed depending on the determined mode.

The subtractor 125 may generate a residual block by using a difference of an input block and a prediction block. The residual block may be called as a residual signal. The residual signal may mean a difference between an original signal and a prediction signal. In addition, the residual signal may be a signal generated by transforming or quantizing, or transforming and quantizing a difference between the original signal and the prediction signal. The residual block may be a residual signal of a block unit.

The transform unit 130 may generate a transform coefficient by performing transform of a residual block, and output the generated transform coefficient. Herein, the transform coefficient may be a coefficient value generated by performing transform of the residual block. When a transform skip mode is applied, the transform unit 130 may skip transform of the residual block.

A quantized level may be generated by applying quantization to the transform coefficient or to the residual signal. Hereinafter, the quantized level may be also called as a transform coefficient in embodiments.

The quantization unit 140 may generate a quantized level by quantizing the transform coefficient or the residual signal according to a parameter, and output the generated quantized level. Herein, the quantization unit 140 may quantize the transform coefficient by using a quantization matrix.

The entropy encoding unit 150 may generate a bitstream by performing entropy encoding according to a probability distribution on values calculated by the quantization unit 140 or on coding parameter values calculated when performing encoding, and output the generated bitstream. The entropy encoding unit 150 may perform entropy encoding of sample information of an image and information for decoding an image. For example, the information for decoding the image may include a syntax element.

When entropy encoding is applied, symbols are represented so that a smaller number of bits are assigned to a symbol having a high chance of being generated and a larger number of bits are assigned to a symbol having a low chance of being generated, and thus, the size of bit stream for symbols to be encoded may be decreased. The entropy encoding unit 150 may use an encoding method for entropy encoding such as exponential Golomb, context-adaptive variable length coding (CAVLC), context-adaptive binary arithmetic coding (CABAC), etc. For example, the entropy encoding unit 150 may perform entropy encoding by using a variable length coding/code (VLC) table. In addition, the entropy encoding unit 150 may deduce a binarization method of a target symbol and a probability model of a target symbol/bin, and perform arithmetic coding by using the deduced binarization method, and a context model.

In order to encode a transform coefficient level (quantized level), the entropy encoding unit 150 may change a two-dimensional block form coefficient into a one-dimensional vector form by using a transform coefficient scanning method.

A coding parameter may include information (flag, index, etc.) such as syntax element that is encoded in an encoder and signaled to a decoder, and information derived when performing encoding or decoding. The coding parameter may mean information required when encoding or decoding an image. For example, at least one value or a combination form of a unit/block size, a unit/block depth, unit/block partition information, unit/block shape, unit/block partition structure, whether to partition of a quad tree form, whether to partition of a binary tree form, a partition direction of a binary tree form (horizontal direction or vertical direction), a partition form of a binary tree form (symmetric partition or asymmetric partition), whether or not a current coding unit is partitioned by ternary tree partitioning, direction (horizontal or vertical direction) of the ternary tree partitioning, type (symmetric or asymmetric type) of the ternary tree partitioning, whether a current coding unit is partitioned by multi-type tree partitioning, direction (horizontal or vertical direction) of the multi-type three partitioning, type (symmetric or asymmetric type) of the multi-type tree partitioning, and a tree (binary tree or ternary tree) structure of the multi-type tree partitioning, a prediction mode (intra prediction or inter prediction), a luma intra-prediction mode/direction, a chroma intra-prediction mode/direction, intra partition information, inter partition information, a coding block partition flag, a prediction block partition flag, a transform block partition flag, a reference sample filtering method, a reference sample filter tab, a reference sample filter coefficient, a prediction block filtering method, a prediction block filter tap, a prediction block filter coefficient, a prediction block boundary filtering method, a prediction block boundary filter tab, a prediction block boundary filter coefficient, an intra-prediction mode, an inter-prediction mode, motion information, a motion vector, a motion vector difference, a reference picture index, a inter-prediction angle, an inter-prediction indicator, a prediction list utilization flag, a reference picture list, a reference picture, a motion vector predictor index, a motion vector predictor candidate, a motion vector candidate list, whether to use a merge mode, a merge index, a merge candidate, a merge candidate list, whether to use a skip mode, an interpolation filter type, an interpolation filter tab, an interpolation filter coefficient, a motion vector size, a presentation accuracy of a motion vector, a transform type, a transform size, information of whether or not a primary (first) transform is used, information of whether or not a secondary transform is used, a primary transform index, a secondary transform index, information of whether or not a residual signal is present, a coded block pattern, a coded block flag (CBF), a quantization parameter, a quantization parameter residue, a quantization matrix, whether to apply an intra loop filter, an intra loop filter coefficient, an intra loop filter tab, an intra loop filter shape/form, whether to apply a deblocking filter, a deblocking filter coefficient, a deblocking filter tab, a deblocking filter strength, a deblocking filter shape/form, whether to apply an adaptive sample offset, an adaptive sample offset value, an adaptive sample offset category, an adaptive sample offset type, whether to apply an adaptive loop filter, an adaptive loop filter coefficient, an adaptive loop filter tab, an adaptive loop filter shape/form, a binarization/inverse-binarization method, a context model determining method, a context model updating method, whether to perform a regular mode, whether to perform a bypass mode, a context bin, a bypass bin, a significant coefficient flag, a last significant coefficient flag, a coded flag for a unit of a coefficient group, a position of the last significant coefficient, a flag for whether a value of a coefficient is larger than 1, a flag for whether a value of a coefficient is larger than 2, a flag for whether a value of a coefficient is larger than 3, information on a remaining coefficient value, a sign information, a reconstructed luma sample, a reconstructed chroma sample, a residual luma sample, a residual chroma sample, a luma transform coefficient, a chroma transform coefficient, a quantized luma level, a quantized chroma level, a transform coefficient level scanning method, a size of a motion vector search area at a decoder side, a shape of a motion vector search area at a decoder side, a number of time of a motion vector search at a decoder side, information on a CTU size, information on a minimum block size, information on a maximum block size, information on a maximum block depth, information on a minimum block depth, an image displaying/outputting sequence, slice identification information, a slice type, slice partition information, tile identification information, a tile type, tile partition information, tile group identification information, a tile group type, tile group partition information, a picture type, a bit depth of an input sample, a bit depth of a reconstruction sample, a bit depth of a residual sample, a bit depth of a transform coefficient, a bit depth of a quantized level, and information on a luma signal or information on a chroma signal may be included in the coding parameter.

Herein, signaling the flag or index may mean that a corresponding flag or index is entropy encoded and included in a bitstream by an encoder, and may mean that the corresponding flag or index is entropy decoded from a bitstream by a decoder.

When the encoding apparatus 100 performs encoding through inter-prediction, an encoded current image may be used as a reference image for another image that is processed afterwards. Accordingly, the encoding apparatus 100 may reconstruct or decode the encoded current image, or store the reconstructed or decoded image as a reference image in reference picture buffer 190.

A quantized level may be dequantized in the dequantization unit 160, or may be inverse-transformed in the inverse-transform unit 170. A dequantized or inverse-transformed coefficient or both may be added with a prediction block by the adder 175. By adding the dequantized or inverse-transformed coefficient or both with the prediction block, a reconstructed block may be generated. Herein, the dequantized or inverse-transformed coefficient or both may mean a coefficient on which at least one of dequantization and inverse-transform is performed, and may mean a reconstructed residual block.

A reconstructed block may pass through the filter unit 180. The filter unit 180 may apply at least one of a deblocking filter, a sample adaptive offset (SAO), and an adaptive loop filter (ALF) to a reconstructed sample, a reconstructed block or a reconstructed image. The filter unit 180 may be called as an in-loop filter.

The deblocking filter may remove block distortion generated in boundaries between blocks. In order to determine whether or not to apply a deblocking filter, whether or not to apply a deblocking filter to a current block may be determined based samples included in several rows or columns which are included in the block. When a deblocking filter is applied to a block, another filter may be applied according to a required deblocking filtering strength.

In order to compensate an encoding error, a proper offset value may be added to a sample value by using a sample adaptive offset. The sample adaptive offset may correct an offset of a deblocked image from an original image by a sample unit. A method of partitioning samples of an image into a predetermined number of regions, determining a region to which an offset is applied, and applying the offset to the determined region, or a method of applying an offset in consideration of edge information on each sample may be used.

The adaptive loop filter may perform filtering based on a comparison result of the filtered reconstructed image and the original image. Samples included in an image may be partitioned into predetermined groups, a filter to be applied to each group may be determined, and differential filtering may be performed for each group. Information of whether or not to apply the ALF may be signaled by coding units (CUs), and a form and coefficient of the ALF to be applied to each block may vary.

The reconstructed block or the reconstructed image having passed through the filter unit 180 may be stored in the reference picture buffer 190. A reconstructed block processed by the filter unit 180 may be a part of a reference image. That is, a reference image is a reconstructed image composed of reconstructed blocks processed by the filter unit 180. The stored reference image may be used later in inter prediction or motion compensation.

Figure 2:
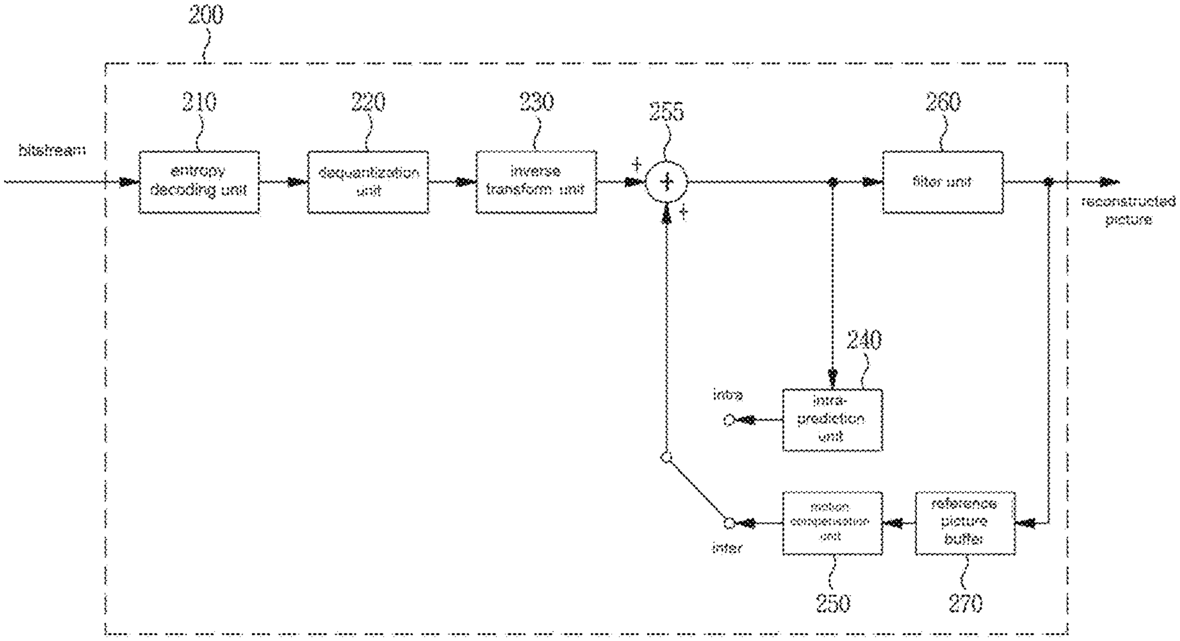
FIG. 2 is a block diagram showing a configuration of a decoding apparatus according to an embodiment and to which the present invention is applied.

FIG. 2 is a block diagram showing a configuration of a decoding apparatus according to an embodiment and to which the present invention is applied.

A decoding apparatus 200 may a decoder, a video decoding apparatus, or an image decoding apparatus.

Referring to FIG. 2, the decoding apparatus 200 may include an entropy decoding unit 210, a dequantization unit 220, an inverse-transform unit 230, an intra-prediction unit 240, a motion compensation unit 250, an adder 225, a filter unit 260, and a reference picture buffer 270.

The decoding apparatus 200 may receive a bitstream output from the encoding apparatus 100. The decoding apparatus 200 may receive a bitstream stored in a computer readable recording medium, or may receive a bitstream that is streamed through a wired/wireless transmission medium. The decoding apparatus 200 may decode the bitstream by using an intra mode or an inter mode. In addition, the decoding apparatus 200 may generate a reconstructed image generated through decoding or a decoded image, and output the reconstructed image or decoded image.

When a prediction mode used when decoding is an intra mode, a switch may be switched to an intra. Alternatively, when a prediction mode used when decoding is an inter mode, a switch may be switched to an inter mode.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block with the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be an inverse-process of the entropy encoding method described above.

In order to decode a transform coefficient level (quantized level), the entropy decoding unit 210 may change a one-directional vector form coefficient into a two-dimensional block form by using a transform coefficient scanning method.

A quantized level may be dequantized in the dequantization unit 220, or inverse-transformed in the inverse-transform unit 230. The quantized level may be a result of dequantizing or inverse-transforming or both, and may be generated as a reconstructed residual block. Herein, the dequantization unit 220 may apply a quantization matrix to the quantized level.

When an intra mode is used, the intra-prediction unit 240 may generate a prediction block by performing, for the current block, spatial prediction that uses a sample value of a block adjacent to a decoding target block and which has been already decoded.

When an inter mode is used, the motion compensation unit 250 may generate a prediction block by performing, for the current block, motion compensation that uses a motion vector and a reference image stored in the reference picture buffer 270.

Figure 3:
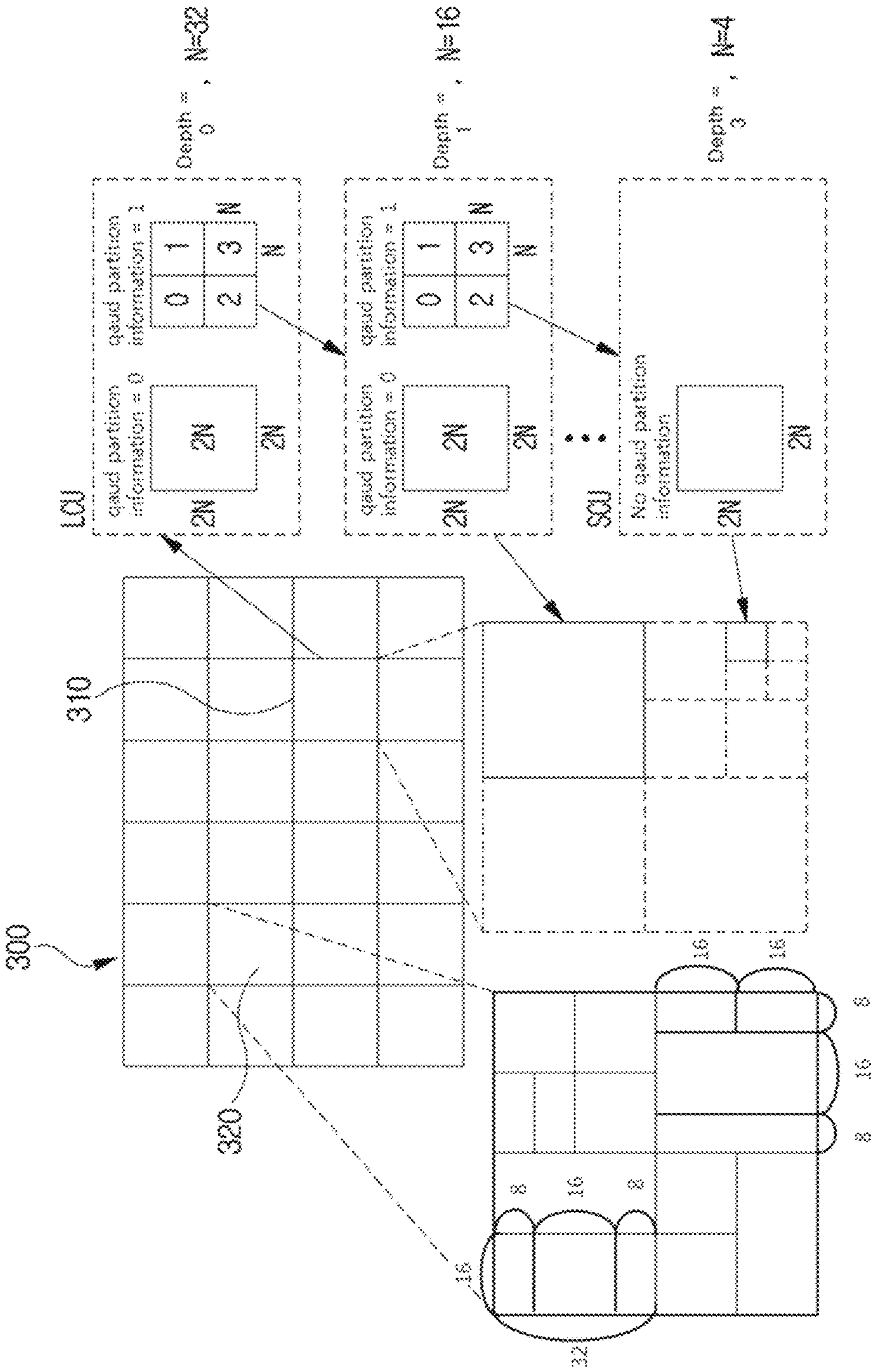
FIG. 3 is a view schematically showing a partition structure of an image when encoding and decoding the image.

The adder 225 may generate a reconstructed block by adding the reconstructed residual block with the prediction block. The filter unit 260 may apply at least one of a deblocking filter, a sample adaptive offset, and an adaptive loop filter to the reconstructed block or reconstructed image. The filter unit 260 may output the reconstructed image. The reconstructed block or reconstructed image may be stored in the reference picture buffer 270 and used when performing inter-prediction. A reconstructed block processed by the filter unit 260 may be a part of a reference image. That is, a reference image is a reconstructed image composed of reconstructed blocks processed by the filter unit 260. The stored reference image may be used later in inter prediction or motion compensation. FIG. 3 is a view schematically showing a partition structure of an image when encoding and decoding the image. FIG. 3 schematically shows an example of partitioning a single unit into a plurality of lower units.

In order to efficiently partition an image, when encoding and decoding, a coding unit (CU) may be used. The coding unit may be used as a basic unit when encoding/decoding the image. In addition, the coding unit may be used as a unit for distinguishing an intra prediction mode and an inter prediction mode when encoding/decoding the image. The coding unit may be a basic unit used for prediction, transform, quantization, inverse-transform, dequantization, or an encoding/decoding process of a transform coefficient.

Referring to FIG. 3, an image 300 is sequentially partitioned in a largest coding unit (LCU), and a LCU unit is determined as a partition structure. Herein, the LCU may be used in the same meaning as a coding tree unit (CTU). A unit partitioning may mean partitioning a block associated with to the unit. In block partition information, information of a unit depth may be included. Depth information may represent a number of times or a degree or both in which a unit is partitioned. A single unit may be partitioned into a plurality of lower level units hierarchically associated with depth information based on a tree structure. In other words, a unit and a lower level unit generated by partitioning the unit may correspond to a node and a child node of the node, respectively. Each of partitioned lower unit may have depth information. Depth information may be information representing a size of a CU, and may be stored in each CU. Unit depth represents times and/or degrees related to partitioning a unit. Therefore, partitioning information of a lower-level unit may comprise information on a size of the lower-level unit.

A partition structure may mean a distribution of a coding unit (CU) within an LCU 310. Such a distribution may be determined according to whether or not to partition a single CU into a plurality (positive integer equal to or greater than 2 including 2, 4, 8, 16, etc.) of CUs. A horizontal size and a vertical size of the CU generated by partitioning may respectively be half of a horizontal size and a vertical size of the CU before partitioning, or may respectively have sizes smaller than a horizontal size and a vertical size before partitioning according to a number of times of partitioning. The CU may be recursively partitioned into a plurality of CUs. By the recursive partitioning, at least one among a height and a width of a CU after partitioning may decrease comparing with at least one among a height and a width of a CU before partitioning. Partitioning of the CU may be recursively performed until to a predefined depth or predefined size. For example, a depth of an LCU may be 0, and a depth of a smallest coding unit (SCU) may be a predefined maximum depth. Herein, the LCU may be a coding unit having a maximum coding unit size, and the SCU may be a coding unit having a minimum coding unit size as described above. Partitioning is started from the LCU 310, a CU depth increases by 1 as a horizontal size or a vertical size or both of the CU decreases by partitioning. For example, for each depth, a CU which is not partitioned may have a size of 2N×2N. Also, in case of a CU which is partitioned, a CU with a size of 2N×2N may be partitioned into four CUs with a size of N×N. A size of N may decrease to half as a depth increase by 1.

In addition, information whether or not the CU is partitioned may be represented by using partition information of the CU. The partition information may be 1-bit information. All CUs, except for a SCU, may include partition information. For example, when a value of partition information is a first value, the CU may not be partitioned, when a value of partition information is a second value, the CU may be partitioned Referring to FIG. 3, an LCU having a depth 0 may be a 64×64 block. 0 may be a minimum depth. A SCU having a depth 3 may be an 8×8 block. 3 may be a maximum depth. A CU of a 32×32 block and a 16×16 block may be respectively represented as a depth 1 and a depth 2.

For example, when a single coding unit is partitioned into four coding units, a horizontal size and a vertical size of the four partitioned coding units may be a half size of a horizontal and vertical size of the CU before being partitioned. In one embodiment, when a coding unit having a 32×32 size is partitioned into four coding units, each of the four partitioned coding units may have a 16×16 size. When a single coding unit is partitioned into four coding units, it may be called that the coding unit may be partitioned into a quad tree form.

For example, when one coding unit is partitioned into two sub-coding units, the horizontal or vertical size (width or height) of each of the two sub-coding units may be half the horizontal or vertical size of the original coding unit. For example, when a coding unit having a size of 32×32 is vertically partitioned into two sub-coding units, each of the two sub-coding units may have a size of 16×32. For example, when a coding unit having a size of 8×32 is horizontally partitioned into two sub-coding units, each of the two sub-coding units may have a size of 8×16. When one coding unit is partitioned into two sub-coding units, it can be said that the coding unit is binary-partitioned or is partitioned by a binary tree partition structure.

For example, when one coding unit is partitioned into three sub-coding units, the horizontal or vertical size of the coding unit can be partitioned with a ratio of 1:2:1, thereby producing three sub-coding units whose horizontal or vertical sizes are in a ratio of 1:2:1. For example, when a coding unit having a size of 16×32 is horizontally partitioned into three sub-coding units, the three sub-coding units may have sizes of 16×8, 16×16, and 16×8 respectively, in the order from the uppermost to the lowermost sub-coding unit. For example, when a coding unit having a size of 32×32 is vertically split into three sub-coding units, the three sub-coding units may have sizes of 8×32, 16×32, and 8×32, respectively in the order from the left to the right sub-coding unit. When one coding unit is partitioned into three sub-coding units, it can be said that the coding unit is ternary-partitioned or partitioned by a ternary tree partition structure.

In FIG. 3, a coding tree unit (CTU) 320 is an example of a CTU to which a quad tree partition structure, a binary tree partition structure, and a ternary tree partition structure are all applied.

As described above, in order to partition the CTU, at least one of a quad tree partition structure, a binary tree partition structure, and a ternary tree partition structure may be applied. Various tree partition structures may be sequentially applied to the CTU, according to a predetermined priority order. For example, the quad tree partition structure may be preferentially applied to the CTU. A coding unit that cannot be partitioned any longer using a quad tree partition structure may correspond to a leaf node of a quad tree. A coding unit corresponding to a leaf node of a quad tree may serve as a root node of a binary and/or ternary tree partition structure. That is, a coding unit corresponding to a leaf node of a quad tree may be further partitioned by a binary tree partition structure or a ternary tree partition structure, or may not be further partitioned. Therefore, by preventing a coding block that results from binary tree partitioning or ternary tree partitioning of a coding unit corresponding to a leaf node of a quad tree from undergoing further quad tree partitioning, block partitioning and/or signaling of partition information can be effectively performed.

The fact that a coding unit corresponding to a node of a quad tree is partitioned may be signaled using quad partition information. The quad partition information having a first value (e.g., "1") may indicate that a current coding unit is partitioned by the quad tree partition structure. The quad partition information having a second value (e.g., "0") may indicate that a current coding unit is not partitioned by the quad tree partition structure. The quad partition information may be a flag having a predetermined length (e.g., one bit).

There may not be a priority between the binary tree partitioning and the ternary tree partitioning. That is, a coding unit corresponding to a leaf node of a quad tree may further undergo arbitrary partitioning among the binary tree partitioning and the ternary tree partitioning. In addition, a coding unit generated through the binary tree partitioning or the ternary tree partitioning may undergo a further binary tree partitioning or a further ternary tree partitioning, or may not be further partitioned.

A tree structure in which there is no priority among the binary tree partitioning and the ternary tree partitioning is referred to as a multi-type tree structure. A coding unit corresponding to a leaf node of a quad tree may serve as a root node of a multi-type tree. Whether to partition a coding unit which corresponds to a node of a multi-type tree may be signaled using at least one of multi-type tree partition indication information, partition direction information, and partition tree information. For partitioning of a coding unit corresponding to a node of a multi-type tree, the multi-type tree partition indication information, the partition direction, and the partition tree information may be sequentially signaled.

The multi-type tree partition indication information having a first value (e.g., "1") may indicate that a current coding unit is to undergo a multi-type tree partitioning. The multi-type tree partition indication information having a second value (e.g., "0") may indicate that a current coding unit is not to undergo a multi-type tree partitioning.

When a coding unit corresponding to a node of a multi-type tree is further partitioned by a multi-type tree partition structure, the coding unit may include partition direction information. The partition direction information may indicate in which direction a current coding unit is to be partitioned for the multi-type tree partitioning. The partition direction information having a first value (e.g., "1") may indicate that a current coding unit is to be vertically partitioned. The partition direction information having a second value (e.g., "0") may indicate that a current coding unit is to be horizontally partitioned.

When a coding unit corresponding to a node of a multi-type tree is further partitioned by a multi-type tree partition structure, the current coding unit may include partition tree information. The partition tree information may indicate a tree partition structure which is to be used for partitioning of a node of a multi-type tree. The partition tree information having a first value (e.g., "1") may indicate that a current coding unit is to be partitioned by a binary tree partition structure. The partition tree information having a second value (e.g., “0”) may indicate that a current coding unit is to be partitioned by a ternary tree partition structure.

The partition indication information, the partition tree information, and the partition direction information may each be a flag having a predetermined length (e.g., one bit).

At least any one of the quadtree partition indication information, the multi-type tree partition indication information, the partition direction information, and the partition tree information may be entropy encoded/decoded. For the entropy-encoding/decoding of those types of information, information on a neighboring coding unit adjacent to the current coding unit may be used. For example, there is a high probability that the partition type (the partitioned or non-partitioned, the partition tree, and/or the partition direction) of a left neighboring coding unit and/or an upper neighboring coding unit of a current coding unit is similar to that of the current coding unit. Therefore, context information for entropy encoding/decoding of the information on the current coding unit may be derived from the information on the neighboring coding units. The information on the neighboring coding units may include at least any one of quad partition information, multi-type tree partition indication information, partition direction information, and partition tree information.

As another example, among binary tree partitioning and ternary tree partitioning, binary tree partitioning may be preferentially performed. That is, a current coding unit may primarily undergo binary tree partitioning, and then a coding unit corresponding to a leaf node of a binary tree may be set as a root node for ternary tree partitioning. In this case, neither quad tree partitioning nor binary tree partitioning may not be performed on the coding unit corresponding to a node of a ternary tree.

A coding unit that cannot be partitioned by a quad tree partition structure, a binary tree partition structure, and/or a ternary tree partition structure becomes a basic unit for coding, prediction and/or transformation. That is, the coding unit cannot be further partitioned for prediction and/or transformation. Therefore, the partition structure information and the partition information used for partitioning a coding unit into prediction units and/or transformation units may not be present in a bit stream.

However, when the size of a coding unit (i.e., a basic unit for partitioning) is larger than the size of a maximum transformation block, the coding unit may be recursively partitioned until the size of the coding unit is reduced to be equal to or smaller than the size of the maximum transformation block. For example, when the size of a coding unit is 64×64 and when the size of a maximum transformation block is 32×32, the coding unit may be partitioned into four 32×32 blocks for transformation. For example, when the size of a coding unit is 32×64 and the size of a maximum transformation block is 32×32, the coding unit may be partitioned into two 32×32 blocks for the transformation. In this case, the partitioning of the coding unit for transformation is not signaled separately, and may be determined through comparison between the horizontal or vertical size of the coding unit and the horizontal or vertical size of the maximum transformation block. For example, when the horizontal size (width) of the coding unit is larger than the horizontal size (width) of the maximum transformation block, the coding unit may be vertically bisected. For example, when the vertical size (height) of the coding unit is larger than the vertical size (height) of the maximum transformation block, the coding unit may be horizontally bisected.

Information of the maximum and/or minimum size of the coding unit and information of the maximum and/or minimum size of the transformation block may be signaled or determined at an upper level of the coding unit. The upper level may be, for example, a sequence level, a picture level, a slice level, a tile group level, a tile level, or the like. For example, the minimum size of the coding unit may be determined to be 4×4. For example, the maximum size of the transformation block may be determined to be 64×64. For example, the minimum size of the transformation block may be determined to be 4×4.

Information of the minimum size (quad tree minimum size) of a coding unit corresponding to a leaf node of a quad tree and/or information of the maximum depth (the maximum tree depth of a multi-type tree) from a root node to a leaf node of the multi-type tree may be signaled or determined at an upper level of the coding unit. For example, the upper level may be a sequence level, a picture level, a slice level, a tile group level, a tile level, or the like. Information of the minimum size of a quad tree and/or information of the maximum depth of a multi-type tree may be signaled or determined for each of an intra-picture slice and an inter-picture slice.

Difference information between the size of a CTU and the maximum size of a transformation block may be signaled or determined at an upper level of the coding unit. For example, the upper level may be a sequence level, a picture level, a slice level, a tile group level, a tile level, or the like. Information of the maximum size of the coding units corresponding to the respective nodes of a binary tree (hereinafter, referred to as a maximum size of a binary tree) may be determined based on the size of the coding tree unit and the difference information. The maximum size of the coding units corresponding to the respective nodes of a ternary tree (hereinafter, referred to as a maximum size of a ternary tree) may vary depending on the type of slice. For example, for an intra-picture slice, the maximum size of a ternary tree may be 32×32. For example, for an inter-picture slice, the maximum size of a ternary tree may be 128×128. For example, the minimum size of the coding units corresponding to the respective nodes of a binary tree (hereinafter, referred to as a minimum size of a binary tree) and/or the minimum size of the coding units corresponding to the respective nodes of a ternary tree (hereinafter, referred to as a minimum size of a ternary tree) may be set as the minimum size of a coding block.

As another example, the maximum size of a binary tree and/or the maximum size of a ternary tree may be signaled or determined at the slice level. Alternatively, the minimum size of the binary tree and/or the minimum size of the ternary tree may be signaled or determined at the slice level.

Depending on size and depth information of the above-described various blocks, quad partition information, multi-type tree partition indication information, partition tree information and/or partition direction information may be included or may not be included in a bit stream.

For example, when the size of the coding unit is not larger than the minimum size of a quad tree, the coding unit does not contain quad partition information. Thus, the quad partition information may be deduced from a second value.

For example, when the sizes (horizontal and vertical sizes) of a coding unit corresponding to a node of a multi-type tree are larger than the maximum sizes (horizontal and vertical sizes) of a binary tree and/or the maximum sizes (horizontal and vertical sizes) of a ternary tree, the coding unit may not be binary-partitioned or ternary-partitioned. Accordingly, the multi-type tree partition indication information may not be signaled but may be deduced from a second value.

Alternatively, when the sizes (horizontal and vertical sizes) of a coding unit corresponding to a node of a multi-type tree are the same as the maximum sizes (horizontal and vertical sizes) of a binary tree and/or are two times as large as the maximum sizes (horizontal and vertical sizes) of a ternary tree, the coding unit may not be further binary-partitioned or ternary-partitioned. Accordingly, the multi-type tree partition indication information may not be signaled but be derived from a second value. This is because when a coding unit is partitioned by a binary tree partition structure and/or a ternary tree partition structure, a coding unit smaller than the minimum size of a binary tree and/or the minimum size of a ternary tree is generated.

Alternatively, the binary tree partitioning or the ternary tree partitioning may be limited on the basis of the size of a virtual pipeline data unit (hereinafter, a pipeline buffer size). For example, when the coding unit is divided into sub-coding units which do not fit the pipeline buffer size by the binary tree partitioning or the ternary tree partitioning, the corresponding binary tree partitioning or ternary tree partitioning may be limited. The pipeline buffer size may be the size of the maximum transform block (e.g., 64λ64). For example, when the pipeline buffer size is 64×64, the division below may be limited.

N×M (N and/or M is 128) Ternary tree partitioning for coding units

128×N (N<=64) Binary tree partitioning in horizontal direction for coding units

N×128 (N<=64) Binary tree partitioning in vertical direction for coding units

Alternatively, when the depth of a coding unit corresponding to a node of a multi-type tree is equal to the maximum depth of the multi-type tree, the coding unit may not be further binary-partitioned and/or ternary-partitioned. Accordingly, the multi-type tree partition indication information may not be signaled but may be deduced from a second value.

Alternatively, only when at least one of vertical direction binary tree partitioning, horizontal direction binary tree partitioning, vertical direction ternary tree partitioning, and horizontal direction ternary tree partitioning is possible for a coding unit corresponding to a node of a multi-type tree, the multi-type tree partition indication information may be signaled. Otherwise, the coding unit may not be binary-partitioned and/or ternary-partitioned. Accordingly, the multi-type tree partition indication information may not be signaled but may be deduced from a second value.

Alternatively, only when both of the vertical direction binary tree partitioning and the horizontal direction binary tree partitioning or both of the vertical direction ternary tree partitioning and the horizontal direction ternary tree partitioning are possible for a coding unit corresponding to a node of a multi-type tree, the partition direction information may be signaled. Otherwise, the partition direction information may not be signaled but may be derived from a value indicating possible partitioning directions.

Alternatively, only when both of the vertical direction binary tree partitioning and the vertical direction ternary tree partitioning or both of the horizontal direction binary tree partitioning and the horizontal direction ternary tree partitioning are possible for a coding tree corresponding to a node of a multi-type tree, the partition tree information may be signaled. Otherwise, the partition tree information may not be signaled but be deduced from a value indicating a possible partitioning tree structure.

Figure 4:
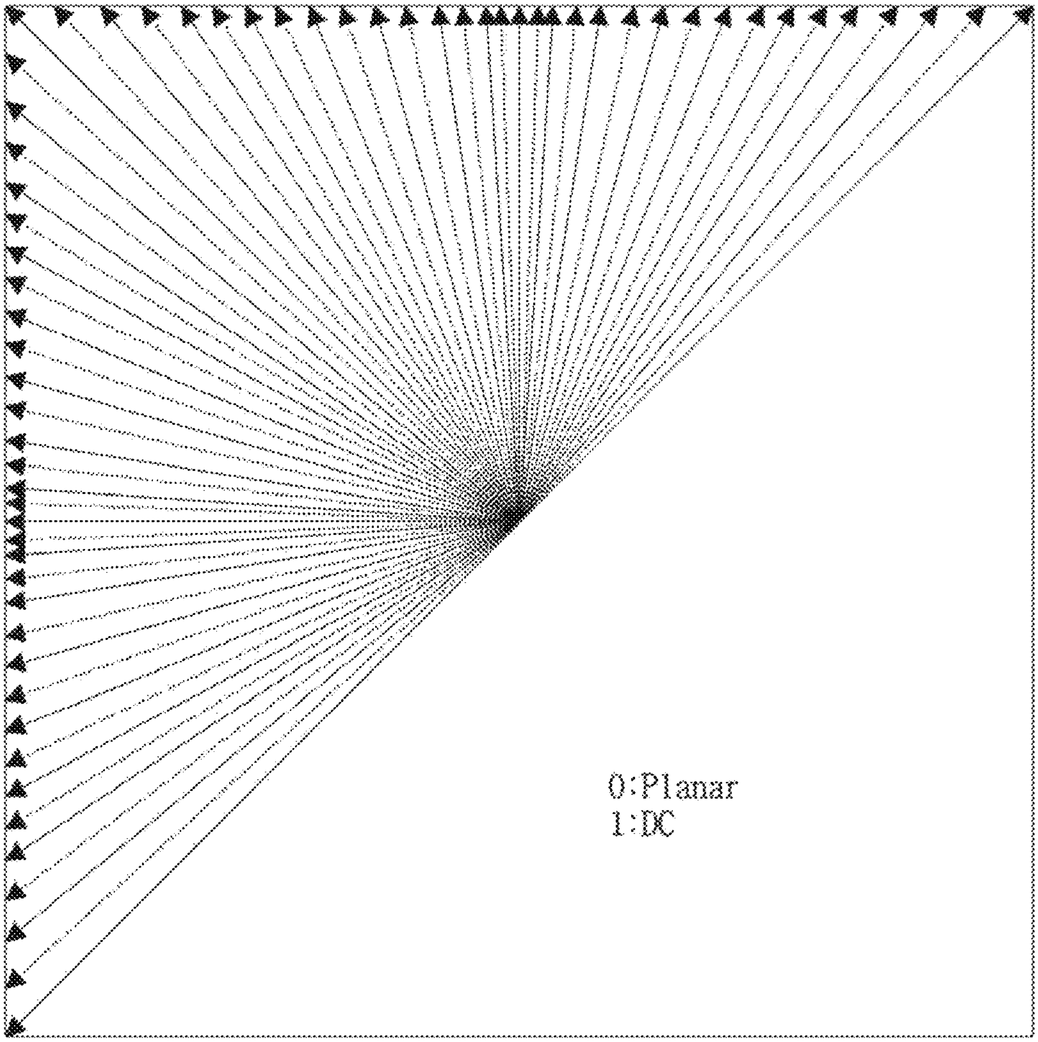
FIG. 4 is a view showing an intra-prediction process.

FIG. 4 is a view showing an intra-prediction process.

Arrows from center to outside in FIG. 4 may represent prediction directions of intra prediction modes.

Intra encoding and/or decoding may be performed by using a reference sample of a neighbor block of the current block. A neighbor block may be a reconstructed neighbor block. For example, intra encoding and/or decoding may be performed by using an encoding parameter or a value of a reference sample included in a reconstructed neighbor block.

A prediction block may mean a block generated by performing intra prediction. A prediction block may correspond to at least one among CU, PU and TU. A unit of a prediction block may have a size of one among CU, PU and TU. A prediction block may be a square block having a size of 2×2, 4×4, 16×16, 32×32 or 64×64 etc. or may be a rectangular block having a size of 2×8, 4×8, 2×16, 4×16 and 8×16 etc.

Intra prediction may be performed according to intra prediction mode for the current block. The number of intra prediction modes which the current block may have may be a fixed value and may be a value determined differently according to an attribute of a prediction block. For example, an attribute of a prediction block may comprise a size of a prediction block and a shape of a prediction block, etc.

The number of intra-prediction modes may be fixed to N regardless of a block size. Or, the number of intra prediction modes may be 3, 5, 9, 17, 34, 35, 36, 65, or 67 etc. Alternatively, the number of intra-prediction modes may vary according to a block size or a color component type or both. For example, the number of intra prediction modes may vary according to whether the color component is a luma signal or a chroma signal. For example, as a block size becomes large, a number of intra-prediction modes may increase. Alternatively, a number of intra-prediction modes of a luma component block may be larger than a number of intra-prediction modes of a chroma component block.

An intra-prediction mode may be a non-angular mode or an angular mode. The non-angular mode may be a DC mode or a planar mode, and the angular mode may be a prediction mode having a specific direction or angle. The intra-prediction mode may be expressed by at least one of a mode number, a mode value, a mode numeral, a mode angle, and mode direction. A number of intra-prediction modes may be M, which is larger than 1, including the non-angular and the angular mode.

In order to intra-predict a current block, a step of determining whether or not samples included in a reconstructed neighbor block may be used as reference samples of the current block may be performed. When a sample that is not usable as a reference sample of the current block is present, a value obtained by duplicating or performing interpolation on at least one sample value among samples included in the reconstructed neighbor block or both may be used to replace with a non-usable sample value of a sample, thus the replaced sample value is used as a reference sample of the current block.

Figure 7:
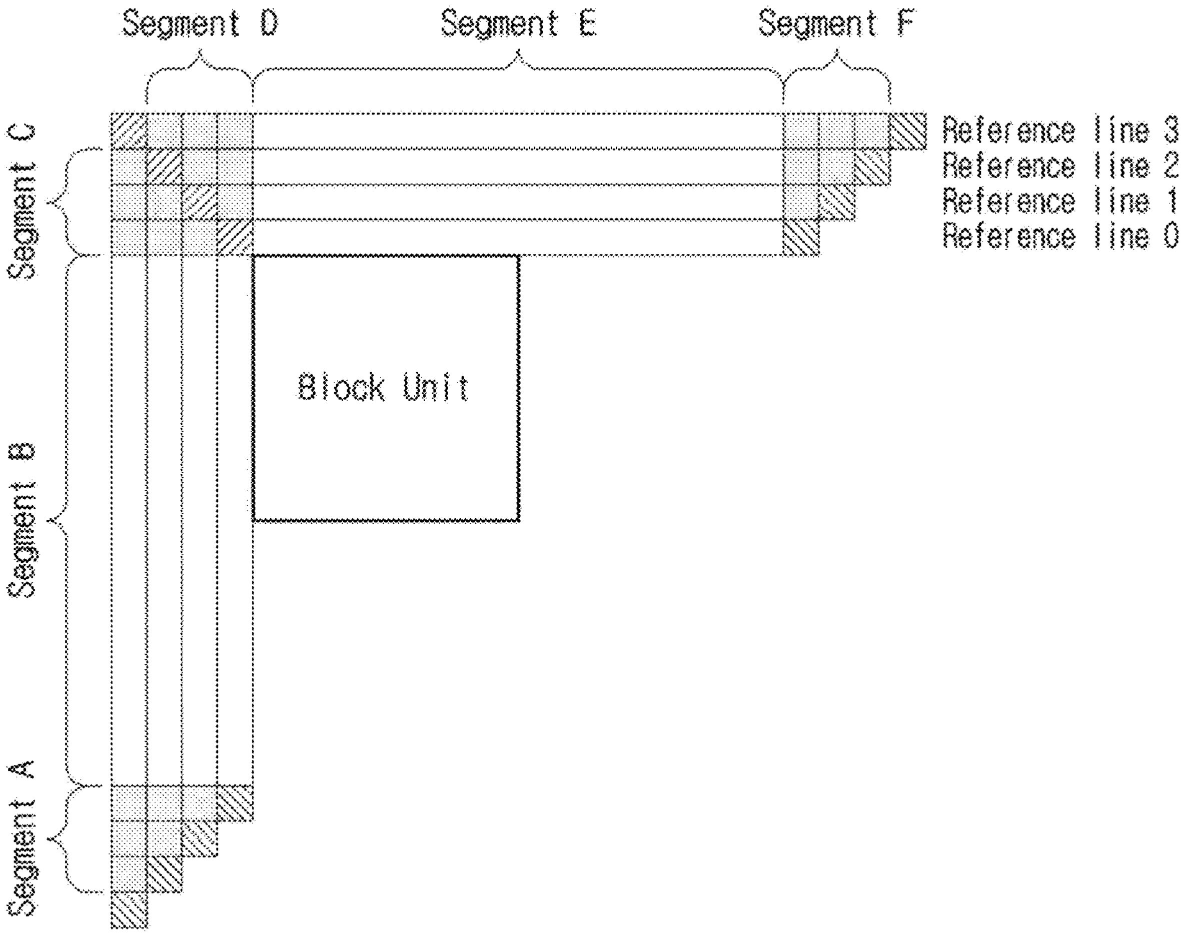
FIG. 7 is a diagram illustrating reference samples capable of being used for intra prediction.

FIG. 7 is a diagram illustrating reference samples capable of being used for intra prediction.

As shown in FIG. 7, at least one of the reference sample line 0 to the reference sample line 3 may be used for intra prediction of the current block. In FIG. 7, the samples of a segment A and a segment F may be padded with the samples closest to a segment B and a segment E, respectively, instead of retrieving from the reconstructed neighboring block. Index information indicating the reference sample line to be used for intra prediction of the current block may be signaled. When the upper boundary of the current block is the boundary of the CTU, only the reference sample line 0 may be available. Therefore, in this case, the index information may not be signaled. When a reference sample line other than the reference sample line 0 is used, filtering for a prediction block, which will be described later, may not be performed.

When intra-predicting, a filter may be applied to at least one of a reference sample and a prediction sample based on an intra-prediction mode and a current block size.

In case of a planar mode, when generating a prediction block of a current block, according to a position of a prediction target sample within a prediction block, a sample value of the prediction target sample may be generated by using a weighted sum of an upper and left side reference sample of a current sample, and a right upper side and left lower side reference sample of the current block. In addition, in case of a DC mode, when generating a prediction block of a current block, an average value of upper side and left side reference samples of the current block may be used. In addition, in case of an angular mode, a prediction block may be generated by using an upper side, a left side, a right upper side, and/or a left lower side reference sample of the current block. In order to generate a prediction sample value, interpolation of a real number unit may be performed.

In the case of intra prediction between color components, a prediction block for the current block of the second color component may be generated on the basis of the corresponding reconstructed block of the first color component. For example, the first color component may be a luma component, and the second color component may be a chroma component. For intra prediction between color components, the parameters of the linear model between the first color component and the second color component may be derived on the basis of the template. The template may include upper and/or left neighboring samples of the current block and upper and/or left neighboring samples of the reconstructed block of the first color component corresponding thereto. For example, the parameters of the linear model may be derived using a sample value of a first color component having a maximum value among samples in a template and a sample value of a second color component corresponding thereto, and a sample value of a first color component having a minimum value among samples in the template and a sample value of a second color component corresponding thereto. When the parameters of the linear model are derived, a corresponding reconstructed block may be applied to the linear model to generate a prediction block for the current block. According to a video format, subsampling may be performed on the neighboring samples of the reconstructed block of the first color component and the corresponding reconstructed block. For example, when one sample of the second color component corresponds to four samples of the first color component, four samples of the first color component may be sub-sampled to compute one corresponding sample. In this case, the parameter derivation of the linear model and intra prediction between color components may be performed on the basis of the corresponding sub-sampled samples. Whether or not to perform intra prediction between color components and/or the range of the template may be signaled as the intra prediction mode.

The current block may be partitioned into two or four sub-blocks in the horizontal or vertical direction. The partitioned sub-blocks may be sequentially reconstructed. That is, the intra prediction may be performed on the sub-block to generate the sub-prediction block. In addition, dequantization and/or inverse transform may be performed on the sub-blocks to generate sub-residual blocks. A reconstructed sub-block may be generated by adding the sub-prediction block to the sub-residual block. The reconstructed sub-block may be used as a reference sample for intra prediction of the sub-sub-blocks. The sub-block may be a block including a predetermined number (for example, 16) or more samples. Accordingly, for example, when the current block is an 8×4 block or a 4×8 block, the current block may be partitioned into two sub-blocks. Also, when the current block is a 4×4 block, the current block may not be partitioned into sub-blocks. When the current block has other sizes, the current block may be partitioned into four sub-blocks. Information on whether or not to perform the intra prediction based on the sub-blocks and/or the partitioning direction (horizontal or vertical) may be signaled. The intra prediction based on the sub-blocks may be limited to be performed only when reference sample line 0 is used. When the intra prediction based on the sub-block is performed, filtering for the prediction block, which will be described later, may not be performed.

The final prediction block may be generated by performing filtering on the prediction block that is intra-predicted. The filtering may be performed by applying predetermined weights to the filtering target sample, the left reference sample, the upper reference sample, and/or the upper left reference sample. The weight and/or the reference sample (range, position, etc.) used for the filtering may be determined on the basis of at least one of a block size, an intra prediction mode, and a position of the filtering target sample in the prediction block. The filtering may be performed only in the case of a predetermined intra prediction mode (e.g., DC, planar, vertical, horizontal, diagonal, and/or adjacent diagonal modes). The adjacent diagonal mode may be a mode in which k is added to or subtracted from the diagonal mode. For example, k may be a positive integer of 8 or less.

An intra-prediction mode of a current block may be entropy encoded/decoded by predicting an intra-prediction mode of a block present adjacent to the current block. When intra-prediction modes of the current block and the neighbor block are identical, information that the intra-prediction modes of the current block and the neighbor block are identical may be signaled by using predetermined flag information. In addition, indicator information of an intra-prediction mode that is identical to the intra-prediction mode of the current block among intra-prediction modes of a plurality of neighbor blocks may be signaled. When intra-prediction modes of the current block and the neighbor block are different, intra-prediction mode information of the current block may be entropy encoded/decoded by performing entropy encoding/decoding based on the intra-prediction mode of the neighbor block.

Figure 5:
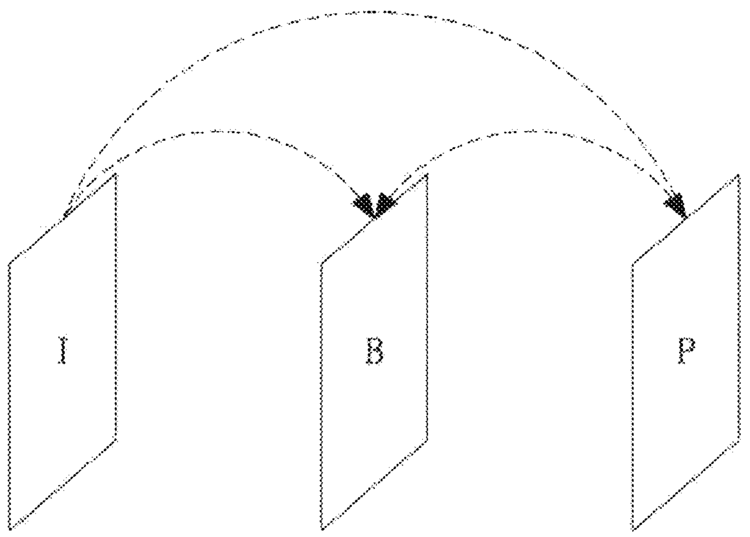
FIG. 5 is a diagram illustrating an embodiment of an inter-picture prediction process.

FIG. 5 is a diagram illustrating an embodiment of an inter-picture prediction process.

In FIG. 5, a rectangle may represent a picture. In FIG. 5, an arrow represents a prediction direction. Pictures may be categorized into intra pictures (I pictures), predictive pictures (P pictures), and Bi-predictive pictures (B pictures) according to the encoding type thereof.

The I picture may be encoded through intra-prediction without requiring inter-picture prediction. The P picture may be encoded through inter-picture prediction by using a reference picture that is present in one direction (i.e., forward direction or backward direction) with respect to a current block. The B picture may be encoded through inter-picture prediction by using reference pictures that are preset in two directions (i.e., forward direction and backward direction) with respect to a current block. When the inter-picture prediction is used, the encoder may perform inter-picture prediction or motion compensation and the decoder may perform the corresponding motion compensation.

Hereinbelow, an embodiment of the inter-picture prediction will be described in detail.

The inter-picture prediction or motion compensation may be performed using a reference picture and motion information.

Motion information of a current block may be derived during inter-picture prediction by each of the encoding apparatus 100 and the decoding apparatus 200. The motion information of the current block may be derived by using motion information of a reconstructed neighboring block, motion information of a collocated block (also referred to as a col block or a co-located block), and/or a block adjacent to the co-located block. The co-located block may mean a block that is located spatially at the same position as the current block, within a previously reconstructed collocated picture (also referred to as a col picture or a co-located picture). The co-located picture may be one picture among one or more reference pictures included in a reference picture list.

The derivation method of the motion information may be different depending on the prediction mode of the current block. For example, a prediction mode applied for inter prediction includes an AMVP mode, a merge mode, a skip mode, a merge mode with a motion vector difference, a subblock merge mode, a triangle partition mode, an inter-intra combination prediction mode, affine mode, and the like. Herein, the merge mode may be referred to as a motion merge mode.

For example, when the AMVP is used as the prediction mode, at least one of motion vectors of the reconstructed neighboring blocks, motion vectors of the co-located blocks, motion vectors of blocks adjacent to the co-located blocks, and a (0, 0) motion vector may be determined as motion vector candidates for the current block, and a motion vector candidate list is generated by using the emotion vector candidates. The motion vector candidate of the current block can be derived by using the generated motion vector candidate list. The motion information of the current block may be determined based on the derived motion vector candidate. The motion vectors of the collocated blocks or the motion vectors of the blocks adjacent to the collocated blocks may be referred to as temporal motion vector candidates, and the motion vectors of the reconstructed neighboring blocks may be referred to as spatial motion vector candidates.

The encoding apparatus 100 may calculate a motion vector difference (MVD) between the motion vector of the current block and the motion vector candidate and may perform entropy encoding on the motion vector difference (MVD). In addition, the encoding apparatus 100 may perform entropy encoding on a motion vector candidate index and generate a bitstream. The motion vector candidate index may indicate an optimum motion vector candidate among the motion vector candidates included in the motion vector candidate list. The decoding apparatus may perform entropy decoding on the motion vector candidate index included in the bitstream and may select a motion vector candidate of a decoding target block from among the motion vector candidates included in the motion vector candidate list by using the entropy-decoded motion vector candidate index. In addition, the decoding apparatus 200 may add the entropy-decoded MVD and the motion vector candidate extracted through the entropy decoding, thereby deriving the motion vector of the decoding target block.

Meanwhile, the coding apparatus 100 may perform entropy-coding on resolution information of the calculated MVD. The decoding apparatus 200 may adjust the resolution of the entropy-decoded MVD using the MVD resolution information.

Meanwhile, the coding apparatus 100 calculates a motion vector difference (MVD) between a motion vector and a motion vector candidate in the current block on the basis of an affine model, and performs entropy-coding on the MVD. The decoding apparatus 200 derives a motion vector on a per sub-block basis by deriving an affine control motion vector of a decoding target block through the sum of the entropy-decoded MVD and an affine control motion vector candidate.

The bitstream may include a reference picture index indicating a reference picture. The reference picture index may be entropy-encoded by the encoding apparatus 100 and then signaled as a bitstream to the decoding apparatus 200. The decoding apparatus 200 may generate a prediction block of the decoding target block based on the derived motion vector and the reference picture index information.

Another example of the method of deriving the motion information of the current may be the merge mode. The merge mode may mean a method of merging motion of a plurality of blocks. The merge mode may mean a mode of deriving the motion information of the current block from the motion information of the neighboring blocks. When the merge mode is applied, the merge candidate list may be generated using the motion information of the reconstructed neighboring blocks and/or the motion information of the collocated blocks. The motion information may include at least one of a motion vector, a reference picture index, and an inter-picture prediction indicator. The prediction indicator may indicate one-direction prediction (L0 prediction or L1 prediction) or two-direction predictions (L0 prediction and L1 prediction).

The merge candidate list may be a list of motion information stored. The motion information included in the merge candidate list may be at least one of motion information (spatial merge candidate) of a neighboring block adjacent to the current block, motion information (temporal merge candidate) of the collocated block of the current block in the reference picture, new motion information generated by a combination of the motion information exiting in the merge candidate list, motion information (history-based merge candidate) of the block that is encoded/decoded before the current block, and zero merge candidate.

The encoding apparatus 100 may generate a bitstream by performing entropy encoding on at least one of a merge flag and a merge index and may signal the bitstream to the decoding apparatus 200. The merge flag may be information indicating whether or not to perform the merge mode for each block, and the merge index may be information indicating that which neighboring block, among the neighboring blocks of the current block, is a merge target block. For example, the neighboring blocks of the current block may include a left neighboring block on the left side of the current block, an upper neighboring block disposed above the current block, and a temporal neighboring block temporally adjacent to the current block.

Meanwhile, the coding apparatus 100 performs entropy-coding on the correction information for correcting the motion vector among the motion information of the merge candidate and signals the same to the decoding apparatus 200. The decoding apparatus 200 can correct the motion vector of the merge candidate selected by the merge index on the basis of the correction information. Here, the correction information may include at least one of information on whether or not to perform the correction, correction direction information, and correction size information. As described above, the prediction mode that corrects the motion vector of the merge candidate on the basis of the signaled correction information may be referred to as a merge mode having the motion vector difference.

The skip mode may be a mode in which the motion information of the neighboring block is applied to the current block as it is. When the skip mode is applied, the encoding apparatus 100 may perform entropy encoding on information of the fact that the motion information of which block is to be used as the motion information of the current block to generate a bit stream, and may signal the bitstream to the decoding apparatus 200. The encoding apparatus 100 may not signal a syntax element regarding at least any one of the motion vector difference information, the encoding block flag, and the transform coefficient level to the decoding apparatus 200.

The subblock merge mode may mean a mode that derives the motion information in units of sub-blocks of a coding block (CU). When the subblock merge mode is applied, a subblock merge candidate list may be generated using motion information (sub-block based temporal merge candidate) of the sub-block collocated to the current sub-block in the reference image and/or an affine control point motion vector merge candidate.

The triangle partition mode may mean a mode that derives motion information by partitioning the current block into diagonal directions, derives each prediction sample using each of the derived motion information, and derives the prediction sample of the current block by weighting each of the derived prediction samples.

The inter-intra combined prediction mode may mean a mode that derives a prediction sample of the current block by weighting a prediction sample generated by inter prediction and a prediction sample generated by intra prediction.

The decoding apparatus 200 may correct the derived motion information by itself. The decoding apparatus 200 may search the predetermined region on the basis of the reference block indicated by the derived motion information and derive the motion information having the minimum SAD as the corrected motion information.

The decoding apparatus 200 may compensate a prediction sample derived via inter prediction using an optical flow.

Figure 6:
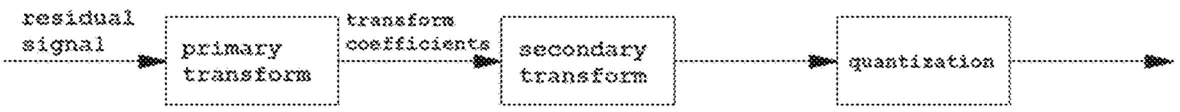
FIG. 6 is a diagram illustrating a transform and quantization process.

FIG. 6 is a diagram illustrating a transform and quantization process.

As illustrated in FIG. 6, a transform and/or quantization process is performed on a residual signal to generate a quantized level signal. The residual signal is a difference between an original block and a prediction block (i.e., an intra prediction block or an inter prediction block). The prediction block is a block generated through intra prediction or inter prediction. The transform may be a primary transform, a secondary transform, or both. The primary transform of the residual signal results in transform coefficients, and the secondary transform of the transform coefficients results in secondary transform coefficients.

At least one scheme selected from among various transform schemes which are preliminarily defined is used to perform the primary transform. For example, examples of the predefined transform schemes include discrete cosine transform (DCT), discrete sine transform (DST), and Karhunen-Loève transform (KLT). The transform coefficients generated through the primary transform may undergo the secondary transform. The transform schemes used for the primary transform and/or the secondary transform may be determined according to coding parameters of the current block and/or neighboring blocks of the current block. Alternatively, transform information indicating the transform scheme may be signaled. The DCT-based transform may include, for example, DCT-2, DCT-8, and the like. The DST-based transform may include, for example, DST-7.

A quantized-level signal (quantization coefficients) may be generated by performing quantization on the residual signal or a result of performing the primary transform and/or the secondary transform. The quantized level signal may be scanned according to at least one of a diagonal up-right scan, a vertical scan, and a horizontal scan, depending on an intra prediction mode of a block or a block size/shape. For example, as the coefficients are scanned in a diagonal up-right scan, the coefficients in a block form change into a one-dimensional vector form. Aside from the diagonal up-right scan, the horizontal scan of horizontally scanning a two-dimensional block form of coefficients or the vertical scan of vertically scanning a two-dimensional block form of coefficients may be used depending on the intra prediction mode and/or the size of a transform block. The scanned quantized-level coefficients may be entropy-encoded to be inserted into a bitstream.

A decoder entropy-decodes the bitstream to obtain the quantized-level coefficients. The quantized-level coefficients may be arranged in a two-dimensional block form through inverse scanning. For the inverse scanning, at least one of a diagonal up-right scan, a vertical scan, and a horizontal scan may be used.

The quantized-level coefficients may then be dequantized, then be secondary-inverse-transformed as necessary, and finally be primary-inverse-transformed as necessary to generate a reconstructed residual signal.

Inverse mapping in a dynamic range may be performed for a luma component reconstructed through intra prediction or inter prediction before in-loop filtering. The dynamic range may be divided into 16 equal pieces and the mapping function for each piece may be signaled. The mapping function may be signaled at a slice level or a tile group level. An inverse mapping function for performing the inverse mapping may be derived on the basis of the mapping function. In-loop filtering, reference picture storage, and motion compensation are performed in an inverse mapped region, and a prediction block generated through inter prediction is converted into a mapped region via mapping using the mapping function, and then used for generating the reconstructed block.

However, since the intra prediction is performed in the mapped region, the prediction block generated via the intra prediction may be used for generating the reconstructed block without mapping/inverse mapping.

When the current block is a residual block of a chroma component, the residual block may be converted into an inverse mapped region by performing scaling on the chroma component of the mapped region. The availability of the scaling may be signaled at the slice level or the tile group level. The scaling may be applied only when the mapping for the luma component is available and the division of the luma component and the division of the chroma component follow the same tree structure. The scaling may be performed on the basis of an average of sample values of a luma prediction block corresponding to the color difference block. In this case, when the current block uses inter prediction, the luma prediction block may mean a mapped luma prediction block. A value necessary for the scaling may be derived by referring to a lookup table using an index of a piece to which an average of sample values of a luma prediction block belongs. Finally, by scaling the residual block using the derived value, the residual block may be switched to the inverse mapped region. Then, chroma component block restoration, intra prediction, inter prediction, in-loop filtering, and reference picture storage may be performed in the inverse mapped area.

Information indicating whether the mapping/inverse mapping of the luma component and chroma component is available may be signaled through a set of sequence parameters.

The prediction block of the current block may be generated on the basis of a block vector indicating a displacement between the current block and the reference block in the current picture. In this way, a prediction mode for generating a prediction block with reference to the current picture is referred to as an intra block copy (IBC) mode. The IBC mode may be applied to M×N (M<=64, N<=64) coding units. The IBC mode may include a skip mode, a merge mode, an AMVP mode, and the like. In the case of a skip mode or a merge mode, a merge candidate list is constructed, and the merge index is signaled so that one merge candidate may be specified. The block vector of the specified merge candidate may be used as a block vector of the current block. The merge candidate list may include at least one of a spatial candidate, a history-based candidate, a candidate based on an average of two candidates, and a zero-merge candidate. In the case of an AMVP mode, the difference block vector may be signaled. In addition, the prediction block vector may be derived from the left neighboring block and the upper neighboring block of the current block. The index on which neighboring block to use may be signaled. The prediction block in the IBC mode is included in the current CTU or the left CTU and limited to a block in the already reconstructed area. For example, a value of the block vector may be limited such that the prediction block of the current block is positioned in an area of three 64×64 blocks preceding the 64×64 block to which the current block belongs in the coding/decoding order. By limiting the value of the block vector in this way, memory consumption and device complexity according to the IBC mode implementation may be reduced.

In an encoder, in order to improve subjective/objective quality of an image, based on a quantization matrix, quantization matrix coefficient values which differ between spatial frequencies may be used as transform coefficients in a block in a quantization process.

In a decoder, based on a quantization matrix, quantization matrix coefficient values which differ between spatial frequencies may be used as transform coefficients in a block in a dequantization process.

Here, dequantization may mean scaling. In addition, the quantization matrix may mean a scaling list.

In the quantization and dequantization processes, a default matrix predefined in the encoder and the decoder may be used as a quantization matrix. Here, the default matrix may be a default quantization matrix. All matrix coefficient values of the default matrix may have a constant value regardless of a prediction mode, a color component, a block size, etc. For example, the constant value may be a positive integer and may be 16.

In addition, in the encoder, a user-defined quantization matrix may be used. At this time, the user-defined quantization matrix may be referred to as a non-default matrix, and a quantization matrix may be encoded by the encoder and signaled to the decoder in the form of a bitstream. Here, the non-default matrix may mean a non-default quantization matrix.

Here, the quantization matrix may mean at least one of a default matrix, a non-default matrix, a reference matrix, etc.

Figure 8A:
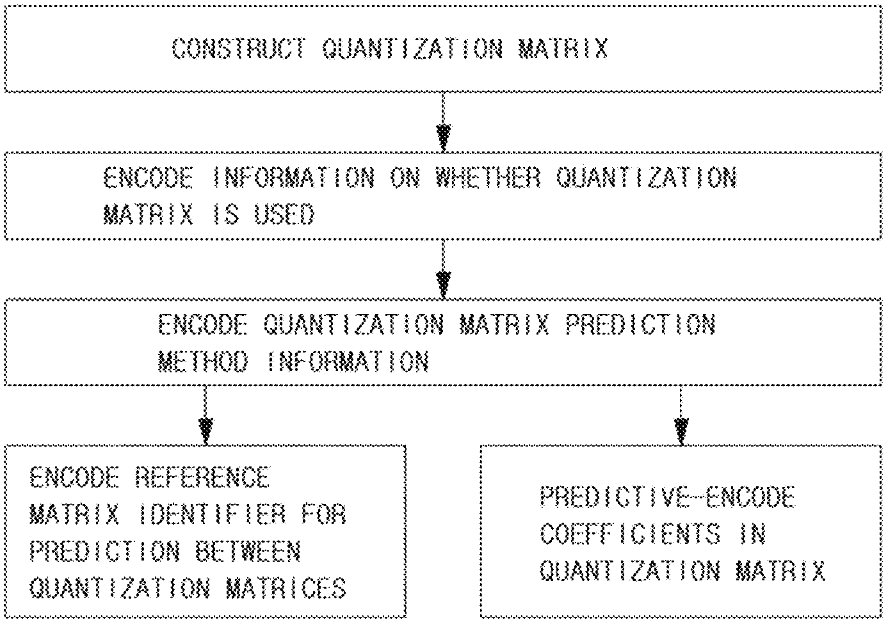
FIG. 8A is a view illustrating a method of operating an apparatus for encoding a quantization matrix according to an embodiment of the present invention.
Figure 8B:
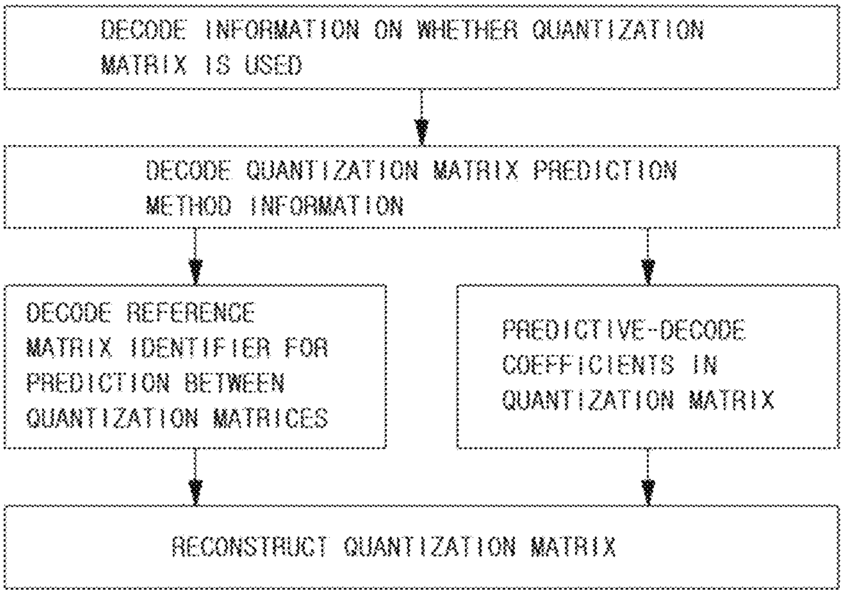
FIG. 8B is a view illustrating a method of operating an apparatus for decoding a quantization matrix according to an embodiment of the present invention.

FIG. 8A is a view illustrating a method of operating an apparatus for encoding a quantization matrix according to an embodiment of the present invention, and FIG. 8B is a view illustrating a method of operating an apparatus for decoding a quantization matrix according to an embodiment of the present invention.

Hereinafter, each step of FIGS. 8A and/8B will be described in detail.

Hereinafter, step of constructing a quantization matrix will be described.

According to one embodiment, a quantization matrix to be used in a quantization/dequantization process of at least one of blocks may be constructed. Here, a block may mean at least one of a coding unit (CU), a coding block (CB), a prediction unit (PU), a prediction block (PB), a transform unit (TU) or a transform block (TB).

The encoder and/or the decoder may construct a quantization matrix necessary for the quantization/dequantization process using a predefined default matrix. At this time, a reference matrix identifier which is information on whether a default matrix is used may be signaled from the encoder to the decoder.

A user may construct a quantization matrix necessary for the quantization/dequantization process using a non-default matrix input to the encoder. At this time, at least one of a reference matrix identifier which is information on the non-default matrix, a DC matrix coefficient, a lowest frequency matrix coefficient, a difference between a quantization matrix coefficient value encoded/decoded previously in the quantization matrix and a quantization matrix coefficient value to be encoded/decoded may be signaled from the encoder to the decoder.

A quantization matrix may be constructed such that different quantization matrices are used in the quantization/dequantization process based on at least one of a prediction mode of a block, a color component, a size, a form, a one-dimensional transform type, a two-dimensional transform combination or whether transformation is used. At this time, at least one coefficient in the quantization matrix may vary according to at least one of a prediction mode of a block, a color component, a size, a form, a one-dimensional transform type, a two-dimensional transform combination or whether transformation is used.

The prediction mode may mean the prediction mode of the block, and may mean in which of an intra prediction mode, an inter prediction mode or an intra block copy (IBC) mode encoding/decoding is performed.

Meanwhile, the quantization matrix constructed based on the IBC mode may be equal to the quantization matrix constructed based on inter prediction mode. That is, the quantization matrix constructed based on the inter prediction mode may be used for a block encoded/decoded in the IBC mode.

In addition, the quantization matrix reconstructed based on the IBC mode may be equal to the quantization matrix reconstructed based on the inter prediction mode. That is, the quantization matrix reconstructed based on the inter prediction mode may be used for a block encoded/decoded in the IBC mode.

In addition, a quantization matrix indicator (matrixId) for the quantization matrix corresponding to the IBC mode may be equal to a quantization matrix indicator for the quantization matrix corresponding to the inter prediction mode. In addition, a quantization matrix indicator for the quantization matrix corresponding to the IBC mode may be different from a quantization matrix indicator for the quantization matrix corresponding to the intra prediction mode. Here, the matrixId may be determined according to at least one of the prediction mode, the color component, the size of the block (the width of the block and/or the height of the block), or the larger value of the width of the block and the height of the block.

For example, when a prediction block is generated by performing intra prediction and inter prediction in a specific mode, the specific mode may mean an inter prediction mode.

In another example, when a current image is used as a reference image and a vector is used during prediction in a specific mode, the specific mode may mean an inter prediction mode. Here, a mode in which a current image is used as a reference image and a vector is used during prediction may mean an IBC mode.

Here, the IBC mode mean a mode in which a reference region is set in a current image/subpicture/slice/tile/tile group/CTU, a location in the reference region is indicated by a block vector, and prediction is performed using a region indicated by the block vector.

The color component may mean the color component of the block and mean a luma Y or chroma component.

For example, the chroma component may mean at least one of a Cb component or a Cr component. That is, a Y component, a Cb component or a Cr component.

In another example, the chroma component may mean at least one of a R component, a G component or a B component.

In another example, when an image is decomposed into various components and encoded/decoded, the chroma component may mean each of decomposed components.

The size may mean at least one of a block size, a transform size or a quantization matrix size.

Here, the transform size may mean a transform size used for a corresponding block. The transform size may be equal to or less than the block size.

Here, the quantization matrix size may mean a quantization matrix size used for a corresponding block. The quantization matrix size may be less than or equal to the corresponding block size. The quantization matrix size may be less than or equal to the transform size.

The size may be a size of M×N such as 2×2, 4×2, 2×4, 4×4, 8×4, 8×2, 2×8, 4×8, 8×8, 16×8, 16×4, 16×2, 2×16, 4×16, 8×16, 16×16, 32×16, 32×8, 32×4, 32×2, 2×32, 4×32, 8×32, 16×32, 32×32, 64×32, 64×16, 64×8, 64×4, 64×2, 2×64, 4×64, 8×64, 16×64, 32×64, 64×64, 128×64, 128×32, 32×128, 64×128 or 128×128. Here, M and N may be positive integers and may be equal to or different from each other. In addition, M may have a size of S*N. N may have a size of S*M. Here, S may be a positive integer.

For example, in case of a block having a size of 64×64, transform having a size of 32×32 may be performed in a left upper region of a block. At this time, a quantization matrix having a size of 32×32 may be used.

In another example, in case of a block having a size of 64×32, transform having a size of 32×32 may be performed in a left upper region of a block. At this time, a quantization matrix having a size of 32×32 may be used.

In another example, in case of a block having a size of 32×64, transform having a size of 16×32 may be performed in a left upper region of a block. At this time, a quantization matrix having a size of 16×32 may be used.

In another example, in case of a block having a size of 32×32, transform having a size of 32×32 may be performed in a block. At this time, a quantization matrix having a size of 32×32 may be used.

The size of the quantization matrix may be derived based on the size of the transform block. For example, a non-square quantization matrix may be derived for a non-square transform block. At this time, when the non-square quantization matrix for the non-square transform block is derived, the non-square quantization matrix may be derived using a square quantization matrix.

The form may mean at least one of a block form, a transform form or a quantization matrix form.

Here, the form may be a square form or a non-square form.

Here, the square form may mean a square form.

Here, the non-square form may mean a rectangular form.

Here, the transform form may mean the form of transform used for a corresponding block. When a horizontal transform size and a vertical transform size are different from each other, the transform form may be a non-square form. In addition, when the horizontal transform size and the vertical transform size are the same, the transform form may be a square form. The form of the transform may be equal to or different from the form of the corresponding block.

Here, the form of the quantization matrix may mean the form of the quantization matrix used for the corresponding block. When the horizontal transform size and the vertical transform size are different from each other, the form of the quantization matrix may be a non-square form. In addition, when the horizontal transform size and the vertical transform size are the same, the form of the quantization matrix may be a square form. The form of the quantization matrix may be equal to or different from that of the corresponding block. The form of the quantization matrix may be equal to or different from that of the transform.

For example, in case of a square bock having a size of 64×64, a square transform having a size of 32×32 may be performed in a left upper region of a block. At this time, a square quantization matrix having a size of 32×32 may be used.

In another example, in case of a square bock having a size of 16×16, a square transform having a size of 16×16 may be performed in a block. At this time, a square quantization matrix having a size of 16×16 may be used.

In another example, in case of a non-square bock having a size of 16×4, a transform having a size of 16×4 may be performed in a block. At this time, a quantization matrix having a size of 16×4 may be used.

In another example, in case of a non-square bock having a size of 2×8, a transform having a size of 2×8 may be performed in a block. At this time, a quantization matrix having a size of 2×8 may be used.

A primary transform may mean at least one of a DCT-J or DST-K based integer transform such as DCT-2, DCT-8, DST-7, DCT-4 or DST-4, which is performed in a residual block to generate a transform coefficient. Here, J and K may be positive integers.

A primary transform may be performed using a transform matrix extracted from a transform matrix of at least one of a DCT-J or DST-K based integer transform such as DCT-2, DCT-8, DST-7, DCT-4 or DST-4. That is, the primary transform may be performed using the extracted transform matrix. In addition, at least one of the coefficients in the extracted transform matrix may be equal to at least one of the coefficients in the transform matrix of at least one of a DCT-J or DST-K based integer transform such as DCT-2, DCT-8, DST-7, DCT-4 or DST-4. In addition, the extracted transform matrix may be included in a transform matrix to be extracted. In addition, the extracted transform matrix may be obtained by performing at least one of flipping or sign change with respect to specific coefficients in the transform matrix to be extracted.

For example, at least one of a DCT-J or DST-K based integer transform such as DCT-8, DST-7, DCT-4 or DST-4 may be extracted from the transform matrix of DCT-2 and may be used for primary transform.

Here, at least one of a DCT-J or DST-K based integer transform such as DCT-2, DCT-8, DST-7, DCT-4 or DST-4 may have a coefficient in a transform matrix different from at least one of a DCT-J or DST-K based integer transform such as DCT-2, DCT-8, DST-7, DCT-4 or DST-4.

For example, a DCT-8 based integer transform matrix may be derived by performing horizontal flipping with respect to the DST-7 based integer transform matrix and performing sign change with respect to at least one of the DST-7 transform matrix coefficients. At this time, vertical flipping may be used instead of horizontal flipping.

In another example, a DST-7 based integer transform matrix may be derived by performing horizontal flipping with respect to the DCT-8 based integer transform matrix and performing sign change with respect to at least one of the DCT-8 transform matrix coefficients. At this time, vertical flipping may be used instead of horizontal flipping.

In another example, a DCT-4 based integer transform matrix may be derived by performing horizontal flipping with respect to the DST-4 based integer transform matrix and performing sign change with respect to at least one of the DST-4 transform matrix coefficients. At this time, vertical flipping may be used instead of horizontal flipping.

In another example, a DST-4 based integer transform matrix may be derived by performing horizontal flipping with respect to the DCT-4 based integer transform matrix and performing sign change with respect to at least one of the DST-4 transform matrix coefficients. At this time, vertical flipping may be used instead of horizontal flipping.

A secondary transform may mean transform for rotating at least one of transform coefficients based on an angle. The secondary transform may be performed after the primary transform. In addition, the secondary transform may be performed with respect to a portion of a region, in which primary transformation is performed.

When the secondary transform is performed, the quantization matrix coefficients in the quantization/dequantization process may all have a value of K. Here, K may be a positive integer and may be, for example, 16. The value of K may be a default quantization matrix coefficient value predefined in the encoder/decoder.

In addition, when the secondary transform is performed, information on whether the quantization matrix coefficients are all set to the value of K may be signaled form the encoder to the decoder. Here, the information may mean information indicating whether the quantization matrix is applied to the block encoded/decoded using the secondary transform.

At this time, when all the matrix coefficient values in the quantization matrix have the value of K, this may mean that the quantization matrix is not used in the quantization/dequantization process.

Whether the transform is used may mean whether at least one of the primary transform or the secondary transform is used. Whether the transform is used may include at least one of whether the primary transform is used or whether the secondary transform is used.

For example, when a transform_skip_flag which is information on whether at least one of the primary transform or the secondary transform is used is a first value (e.g., 0), this may indicate that at least one of the primary transform or the secondary transform is used.

In another example, when a transform_skip_flag which is information on whether at least one of the primary transform or the secondary transform is used is a second value (e.g., 1), this may indicate that at least one of the primary transform or the second transform is not used.

Here, the transform may mean at least one of a transform or an inverse transform.

A one-dimensional transform type may mean the type of a primary transform (i.e., primary transform type) and mean horizontal transform type trTypeHor or a vertical transform type trTypeVer for at least one of a DCT-J or DST-K based integer transform type.

As the one-dimensional transform type, a first transform to an N-th transform may be used. Here, N may be a positive integer equal to or greater than 2.

For example, the first transform may mean DCT-2 based integer transform.

In another example, when the first transform is used in a horizontal transform and a vertical transform, trTypeHor which is a transform type for horizontal transform and trTypeVer which is a transform type for vertical transform may have values of Q and R, respectively. Here, Q and R may be at least one of a negative integer, 0 or a positive integer. For example, Q and R may be 0 and 0, respectively.

In addition, for example, the second transform may mean at least one of a DCT-J or DST-K based integer transform such as DCT-8, DST-7, DCT-4 or DST-4, which is not DCT-2. Here, J and K may be positive integers. That is, the second transform may mean at least one of transforms other than the first transform.

In another example, when the second transform is used in at least one of a horizontal transform or a vertical transform, trTypeHor which is a transform type for the horizontal transform and trTypeVer which is a transform type for the vertical transform may have values T and U, respectively. Here, each of T and U may be at least one of a negative integer, 0 or a positive integer. For example, T and U may be a value equal to or greater than 1 and a value equal to or greater than 1, respectively. In addition, T and U may be greater than Q and R, respectively.

In addition, for example, when trTypeHor is a first value, this may mean a DST-7 based integer horizontal transform.

In another example, when trTypeHor is a second value, this may mean a DCT-8 based integer horizontal transform.

In another example, when trTypeVer is a first value, this may mean a DST-7 based integer vertical transform.

In another example, when trTypeVer is a second value, this may mean a DCT-8 based integer vertical transform.

The first value may be 1. In addition, the second value may be 2.

Instead of DST-7, DST-4 may be used. In addition, instead of DCT-8, DCT-4 may be used.

In addition, for example, the first transform may be a DCT-2 based integer transform. In addition, the second transform may be a DST-7 based integer transform. In addition, the third transform may be a DCT-8 based integer transform. In addition, the second transform may mean at least one of the second transform or the third transform.

In another example, the first transform may be a DCT-2 based integer transform. In addition, the second transform may be a DST-4 based integer transform. In addition, the third transform may be a DCT-4 based integer transform. In addition, the second transform may mean at least one of the second transform or the third transform.

That is, the first transform may be a DCT-2 based integer transform, and the second transform to the N-th transform may mean at least one of a DCT-J or DST-K based integer transform such as DCT-8, DST-7, DCT-4 or DST-4, which is not DCT-2. Here, N may be a positive integer 3 or more.

In addition, for example, the first transform may be a DCT-2 based integer transform. In addition, the second transform may be a DST-7 based integer transform extracted from the DCT-2 based integer transform matrix. In addition, the third transform may be a DCT-8 based integer transform extracted from the DCT-2 based integer transform matrix. In addition, the second transform may be at least one of the second transform or the third transform.

In another example, the first transform may be a DCT-2 based integer transform. In addition, the second transform may be a DST-4 based integer transform extracted from the DCT-2 based integer transform matrix. In addition, the third transform may be a DCT-4 based integer transform extracted from the DCT-2 based integer transform matrix. In addition, the second transform may be at least one of the second transform or the third transform.

That is, the first transform may be a DCT-2 based integer transform, and the second transform to the N-th transform may mean at least one of a DCT-J or DST-K based integer transform such as DCT-8, DST-7, DCT-4 or DST-4 extracted from the DCT-2 based integer transform matrix. Here, N may be an integer of 3 or more. In addition, the second transform may be at least one of the second transform to the N-th transform.

Instead of the DCT-2 transform, at least one of a DCT-J or DST-K based integer transform such as DCT-8, DST-7, DCT-4 or DST-4 may be used.

A two-dimensional transform combination may mean a combination of primary transforms and may mean a combination of the horizontal transform type trTypeHor and the vertical transform type trTypeVer of at least one of the DCT-J or DST-K based integer transform type. In addition, the two-dimensional transform combination may mean a mts_idx which is a multi-transform selection index.

When the first transform is used in a horizontal transform and a vertical transform, the mts_idx which is the multi-transform selection index may have a value of P. Here, P may be at least one of a negative integer, 0 or a positive integer. For example, P may be −1.

For example, when mts_idx is −1, trTypeHor and trTypeVer may have values of 0 and 0, respectively. Alternatively, when mts_idx is 0, trTypeHor and trTypeVer may have values of 0 and 0, respectively.

When the second transform is used in at least one of a horizontal transform or a vertical transform, the mts_idx which is the multi-transform selection index may have a value of S or more. Here, S may be at least one of a negative integer, 0 or a positive integer. For example, S may be 0. In addition, S may be greater than P.

For example, when mts_idx is 0, trTypeHor and trTypeVer may have a first value and a first value, respectively.

In another example, when mts_idx is 1, trTypeHor and trTypeVer may have a second value and a first value, respectively.

In another example, when mts_idx is 2, trTypeHor and trTypeVer may have a first value and a second value, respectively.

In another example, when mts_idx is 3, trTypeHor and trTypeVer may have a second value and a second value, respectively.

In addition, for example, when mts_idx is 0, trTypeHor and trTypeVer may have a first value and a first value, respectively.

In another example, when mts_idx is 1, trTypeHor and trTypeVer may have a second value and a second value, respectively.

In another example, when mts_idx is 2, trTypeHor and trTypeVer may have a third value and a second value, respectively.

In another example, when mts_idx is 3, trTypeHor and trTypeVer may have a second value and a third value, respectively.

In another example, when mts_idx is 4, trTypeHor and trTypeVer may have a third value and a third value, respectively.

The first value may be 0. In addition, the second value may be 1. In addition, the third value may be 2.

In addition, for example, when trTypeHor is a first value, this may mean a DST-7 based integer horizontal transform.

In another example, when trTypeHor is a second value, this may mean a DCT-8 based integer horizontal transform.

In another example, when trTypeVer is a first value, this may mean a DST-7 based integer vertical transform.

In another example, when trTypeVer is a second value, this may mean DCT-8 based integer vertical transform.

The first value may be 1. In addition, the second value may be 2.

Instead of DST-7, DST-4 may be used. In addition, instead of DCT-8, DCT-4 may be used.

In addition, for example, in the first transform, the horizontal transform and the vertical transform may be DCT-2 based integer transforms, respectively. In addition, in the second transform, the horizontal transform and the vertical transform may be DST-7 and DST-7 based integer transforms, respectively. In addition, in the third transform, the horizontal transform and the vertical transform may be DCT-8 and DST-7 based integer transforms, respectively. In addition, in the fourth transform, the horizontal transform and the vertical transform may be DST-7 and DCT-8 based integer transforms, respectively. In addition, in the fifth transform, the horizontal transform and the vertical transform may be DCT-8 and DCT-8 based integer transforms, respectively. In addition, the second transform may mean at least one of the second transform, the third transform, the fourth transform or the fifth transform.

In another example, in the first transform, the horizontal transform and the vertical transform may be DCT-2 based integer transforms, respectively. In addition, in the second transform, the horizontal transform and the vertical transform may be DST-4 and DST-4 based integer transforms, respectively. In addition, in the third transform, the horizontal transform and the vertical transform may be DCT-4 and DST-4 based integer transforms, respectively. In addition, in the fourth transform, the horizontal transform and the vertical transform may be DST-4 and DCT-4 based integer transforms, respectively. In addition, in the fifth transform, the horizontal transform and the vertical transform may be DCT-4 and DCT-4 based integer transforms, respectively. In addition, the second transform may be at least one of the second transform, the third transform, the fourth transform or the fifth transform.

That is, in the first transform, the horizontal transform and the vertical transform may be respectively DCT-2 based integer transforms, and, in the second transform to the N-th transform, the horizontal transform and the vertical transform may mean at least one of the DCT-J or DST-K based integer transform such as DCT-8, DST-7, DCT-4 or DST-4, which is not DCT-2. Here, N may be a positive integer of 3 or more.

For example, in the first transform, the horizontal transform and the vertical transform may be DCT-2 based integer transforms, respectively. In addition, in the second transform, the horizontal transform and the vertical transform may be DST-7 and DST-7 based integer transforms extracted from the DCT-2 based integer transform matrix, respectively. In addition, in the third transform, the horizontal transform and the vertical transform may be DCT-8 based integer transform extracted from the DCT-2 based integer transform matrix and DST-7 based integer transform extracted from the DCT-2 based integer transform matrix, respectively. In addition, in the fourth transform, the horizontal transform and the vertical transform may be DST-7 based integer transform extracted from the DCT-2 based integer transform matrix and DCT-8 based integer transform extracted from the DCT-2 based integer transform matrix, respectively. In addition, in the fifth transform, the horizontal transform and the vertical transform may be DCT-8 and DCT-8 based integer transforms extracted from the DCT-2 based integer transform matrix, respectively. In addition, the second transform may mean at least one of the second transform, the third transform, the fourth transform or the fifth transform.

In another example, in the first transform, the horizontal transform and the vertical transform may be DCT-2 based integer transforms, respectively. In addition, in the second transform, the horizontal transform and the vertical transform may be DST-4 and DST-4 based integer transforms extracted from the DCT-2 based integer transform matrix, respectively. In addition, in the third transform, the horizontal transform and the vertical transform may be DCT-4 based integer transform extracted from the DCT-2 based integer transform matrix and DST-4 based integer transforms extracted from the DCT-2 based integer transform matrix, respectively. In addition, in the fourth transform, the horizontal transform and the vertical transform may be DST-4 based integer transform extracted from the DCT-2 based integer transform matrix and DCT-4 based integer transforms extracted from the DCT-2 based integer transform matrix, respectively. In addition, in the fifth transform, the horizontal transform and the vertical transform may be DCT-4 and DCT-4 based integer transforms extracted from the DCT-2 based integer transform matrix. In addition, the second transform may mean at least one of the second transform, the third transform, the fourth transform or the fifth transform.

That is, in the first transform, the horizontal transform and the vertical transform may be respectively DCT-2 based integer transforms, and, in the second transform to the N-th transform, the horizontal transform and the vertical transform may be at least one of the DCT-J or DST-K based integer transform such as DCT-8, DST-7, DCT-4 or DST-4 extracted from the DCT-2 based integer transform matrix. Here, N may be an integer of 3 or more. In this case, the second transform may mean at least one of the second transform to the N-th transform.

Instead of DCT-2 transform, at least one of the DCT-J or DST-K based integer transform such as DCT-8, DST-7, DCT-4 or DST-4 may be used.

FIGS. 9 to 17 are views illustrating a quantization matrix according to an embodiment of the present invention.

As in the example of FIG. 9, the quantization matrix may be constructed. For example, as in the example of FIG. 9, the quantization matrix may be constructed based on at least one of a prediction mode, a color component or a size.

As in the example of FIG. 10, the quantization matrix may be constructed. For example, as in the example of FIG. 10, a default matrix predefined in the encoder and the decoder may be constructed. In addition, as in the example of FIG. 10, the quantization matrix may be constructed based on at least one of a prediction mode, a color component or a size.

As in the example of FIG. 11, the quantization matrix may be constructed. For example, as in the example of FIG. 11, a default matrix predefined in the encoder and the decoder may be constructed. In addition, as in the example of FIG. 11, the quantization matrix may be constructed based on at least one of a prediction mode, a color component or a size.

As in the example of FIG. 12, the quantization matrix may be constructed. For example, as in the example of FIG. 12, a default matrix predefined in the encoder and the decoder may be constructed. In addition, as in the example of FIG. 12, the quantization matrix may be constructed based on at least one of a prediction mode, a color component, a size, a form or a primary transform type.

For example, when there are at least N primary transform types, K different quantization matrices may be constructed according to the primary transform type. Here, N and K may be positive integers. In addition, K may be less than or equal to N.

As in the example of FIG. 13, the quantization matrix may be constructed. For example, as in the example of FIG. 13, a default matrix predefined in the encoder and the decoder may be constructed. In addition, as in the example of FIG. 13, the quantization matrix may be constructed based on at least one of a prediction mode, a color component, a size, a form or a two-dimensional transform combination.

For example, when there are at least N two-dimensional transform combinations, K different quantization matrices may be constructed according to the two-dimensional transform combination. Here, N and K may be positive integers. In addition, K may be less than or equal to N.

As in the example of FIG. 14, the quantization matrix may be constructed. For example, as in the example of FIG. 14, a default matrix predefined in the encoder and the decoder may be constructed. In addition, as in the example of FIG. 14, the quantization matrix may be constructed based on at least one of a prediction mode, a color component, a size, a form or a two-dimensional transform combination.

For example, when there are at least N two-dimensional transform combinations, K different quantization matrices may be constructed according to the two-dimensional transform combination. Here, N and K may be positive integers. In addition, K may be less than or equal to N.

As in the example of FIG. 15, the quantization matrix may be constructed. For example, as in the example of FIG. 15, a default matrix predefined in the encoder and the decoder may be constructed. In addition, as in the example of FIG. 15, the quantization matrix may be constructed based on at least one of a prediction mode, a color component, a size, a form or whether a transform is used.

As in the example of FIG. 16, the quantization matrix may be constructed. For example, as in the example of FIG. 16, a default matrix predefined in the encoder and the decoder may be constructed. In addition, as in the example of FIG. 16, the quantization matrix may be constructed based on at least one of a prediction mode, a color component, a size, a form or whether a primary transform is used.

As in the example of FIG. 17, the quantization matrix may be constructed. For example, as in the example of FIG. 17, a default matrix predefined in the encoder and the decoder may be constructed. In addition, as in the example of FIG. 17, the quantization matrix may be constructed based on at least one of a prediction mode, a color component, a size, a form or whether a secondary transform is used.

Hereinafter, encoding/decoding step of information on whether a quantization matrix is used will be described.

Information on whether a quantization matrix is used, which indicates whether the quantization matrix is used, may be encoded/decoded in at least one of a parameter set or a header. Here, information on whether the quantization matrix is used may include at least one of whether the quantization matrix is used or whether an quantization matrix is present.

At this time, at least one of the parameter set or the header may be at least one of a video parameter set, a sequence parameter set, an adaptation parameter set, a picture parameter set, a picture header, a slice header, a tile group header or a tile header.

For example, in order to indicate whether the quantization matrix is used in a video, information on whether the quantization matrix is used may be entropy-encoded/decoded in a video parameter set.

In another example, in order to indicate whether the quantization matrix is used in a sequence, information on whether the quantization matrix is used may be entropy-encoded/decoded in a sequence parameter set.

In another example, in order to indicate whether the quantization matrix is used in several pictures, several subpictures, several tile groups, several tiles or several slices, information on whether the quantization matrix is used may be entropy-encoded/decoded in an adaptation parameter set.

In another example, in order to indicate whether the quantization matrix is used in a picture, information on whether the quantization matrix is used may be entropy-encoded/decoded in a picture parameter set or a picture header.

In another example, in order to indicate whether the quantization matrix is used in a slice, information on whether the quantization matrix is used may be entropy-encoded/decoded in a slice header.

In another example, in order to indicate whether the quantization matrix is used in a tile group, information on whether the quantization matrix is used may be entropy-encoded/decoded in a tile group header.

In another example, in order to indicate whether the quantization matrix is used in a tile, information on whether the quantization matrix is used may be entropy-encoded/decoded in a tile header.

FIGS. 18 to 20 are views illustrating a syntax element for signaling information on whether a quantization matrix is used in a parameter set or header according to an embodiment of the present invention.

As in the example of the syntax element of FIG. 18, a scaling_list_enable_flag which is information on whether the quantization matrix is used in a sequence parameter set may be entropy-encoded/decoded. At this time, information on whether the quantization matrix is used may mean information indicating whether the quantization matrix is used in the quantization/dequantization process of a specific unit in the encoder and the decoder.

For example, the scaling_list_enable_flag may be encoded/decoded as a first value (e.g., 0) to indicate that the quantization matrix is not used in the quantization/dequantization process of the encoder and the decoder in sequence units.

In another example, the scaling_list_enable_flag may be encoded/decoded as a second value (e.g., 1) to indicate that the quantization matrix is used in the quantization/dequantization process of the encoder and the decoder in sequence units.

As in the example of the syntax element of FIG. 18, an sps_scaling_list_data_present_flag which is information on whether the quantization matrix is present in a sequence parameter set may be entropy-encoded/decoded. At this time, the information on whether the quantization matrix is present may mean information indicating whether information on the quantization matrix is present in specific units in a bitstream. The information on whether the quantization matrix is present may be a flag. Meanwhile, although, in FIG. 18, the sps_scaling_list_data_present_flag is used as the information on whether the quantization matrix is present, this is merely an example and the name of the flag may be changed.

For example, the sps_scaling_list_data_present_flag may be encoded/decoded as a first value (e.g., 0) to indicate that the quantization matrix is not present in sequence units. At this time, when the quantization matrix is not present, the quantization matrix coefficients in the quantization/dequantization process may all have a value of K. Here, K may be a positive integer and may be, for example, 16. The value of K may be a default quantization matrix coefficient value predefined in the encoder/decoder.

In another example, the sps_scaling_list_data_present_flag may be encoded/decoded as a second value (e.g., 1) to indicate that the quantization matrix is present in sequence units.

As in the example of the syntax element of FIG. 19, a pps_scaling_list_data_present_flag which is the information on whether the quantization matrix is present in a picture parameter set may be entropy-encoded/decoded. At this time, the information on whether the quantization matrix is present may mean information indicating whether information on the quantization matrix is present in specific units in a bitstream. The information on whether the quantization matrix is present may be a flag. Meanwhile, although, in FIG. 19, the pps_scaling_list_data_present_flag is used as the information on whether the quantization matrix is present, this is merely an example and the name of the flag may be changed.

For example, the pps_scaling_list_data_present_flag may be encoded/decoded as a first value (e.g., 0) to indicate that the quantization matrix is not present in picture units. At this time, the quantization matrix encoded/decoded in the sequence parameter set may be used in the quantization/dequantization process. Alternatively, when the quantization matrix is not present, the quantization matrix coefficients in the quantization/dequantization process may all have a value of K. Here, K may be a positive integer and may be, for example, 16. The value of K may be a default quantization matrix coefficient value predefined in the encoder/decoder.

In another example, the pps_scaling_list_data_present_flag may be encoded/decoded as a second value (e.g., 1) to indicate that the quantization matrix is present in picture units. At this time, the quantization matrix encoded/decoded in the picture parameter set may be used in the quantization/dequantization process.

As in the example of the syntax element of FIG. 20, an aps_scaling_list_data_present_flag which is the information on whether the quantization matrix is present in the adaptation parameter set may be entropy-encoded/decoded. At this time, the information on whether the quantization matrix is present may mean information indicating whether information on the quantization matrix is present in specific units in a bitstream. The information on whether the quantization matrix is present may be a flag. Meanwhile, although, in FIG. 20, the aps_scaling_list_data_present_flag is used as the information on whether the quantization matrix is present, this is merely an example and the name of the flag may be changed.

For example, the aps_scaling_list_data_present_flag may be encoded/decoded as a first value (e.g., 0) to indicate that the quantization matrix is not present in several pictures, several subpictures, several tile groups, several tiles or several slices. At this time, the quantization matrix encoded/decoded in the sequence parameter set may be used in the quantization/dequantization process. Alternatively, when the quantization matrix is not present, the quantization matrix coefficients in the quantization/dequantization process may all have a value of K. Here, K may be a positive integer and may be, for example, 16. The value of K may be a default quantization matrix coefficient value predefined in the encoder/decoder.

In another example, the aps_scaling_list_data_present_flag may be encoded/decoded as a second value (e.g., 1) to indicate that the quantization matrix is present in several pictures, several subpictures, several tile groups, several tiles or several slices. At this time, the quantization matrix encoded/decoded in the adaptation parameter set may be used in the quantization/dequantization process.

In addition, in order to indicate the quantization matrix in the adaptation parameter set (APS) referenced in the picture, a pic_scaling_list_aps_id may be encoded/decoded in the picture header. For example, in FIGS. 18 to 20, the pic_scaling_list_aps_id may be encoded/decoded based on the information on whether the quantization matrix is present.

FIGS. 21 to 26 are views illustrating a default matrix used in a quantization/dequantization process according to an embodiment of the present invention.

As in the example of FIGS. 21 to 22, a default matrix having a size of J×K predefined in the encoder and the decoder may be used in the quantization/dequantization process of a block having a size of M×N.

Different default matrices may be used in the quantization/dequantization process based on at least one of the prediction mode of a block, a color component, a size, a form, a one-dimensional transform type, a two-dimensional transform combination, or whether a transform is used. In addition, different default matrices may be predefined in the encoder and the decoder based on at least one of the prediction mode of a block, a color component, a size, a form, a one-dimensional transform type, a two-dimensional transform combination, or whether a transform is used. At this time, at least one of coefficients of a default matrix may be different from each other according to at least one of the prediction mode of a block, a color component, a size, a form, a one-dimensional transform type, a two-dimensional transform combination, or whether a transform is used.

For example, different default matrices may be used in the quantization/dequantization process according to at least one of trTypeHor, trTypeVer, mts_idx or transform_skip_flag.

In another example, different default matrices may be predefined in the encoder and the decoder according to at least one of trTypeHor, trTypeVer, mts_idx or transform_skip_flag. J, K, M and N may be positive integers.

For example, at least one of J, K, M or N may be 2.

In another example, J and M may be the same and K and N may be the same.

In another example, as in the example of FIG. 21, at least one of J, K, M or N may be 4.

In another example, as in the example of FIG. 22, at least one of J or K may be 8. In addition, at least one of M or N may be greater than 8.

At this time, J may be less than M and K may be less than N.

In another example, at least one of J or K may be 16. In addition, at least one of M or N may be greater than 16.

At this time, J may be less than M and K may be less than N.

In addition, J and K may be equal to or different from each other and M and N may be equal to or different from each other.

At least one of the size of J×K or the size of M×N may be 2×2, 4×2, 2×4, 4×4, 8×4, 8×2, 2×8, 4×8, 8×8, 16×8, 16×4, 16×2, 2×16, 4×16, 8×16, 16×16, 32×16, 32×8, 32×4, 32×2, 2×32, 4×32, 8×32, 16×32, 32×32, 64×32, 64×16, 64×8, 64×4, 64×2, 2×64, 4×64, 8×64, 16×64, 32×64, 64×64, 128×64, 128×32, 32×128, 64×128 or 128×128. In addition, M may have a size of S*N. N may have a size of S*M. Here, S may be a positive integer.

At this time, i may denote a scan order and ScalingList[sizeId][matrixId][i] may denote a default quantization matrix coefficient corresponding to sizeId, matrixId and i.

Similar to the example of FIGS. 21 to 22, as in the examples of FIGS. 23 to 26, the default matrix having a size of J×K predefined in the encoder and the decoder may be used in the quantization/dequantization process of a block having a size of M×N.

Here, ScalingList[sizeId][matrixId][i] may indicate a default quantization matrix coefficient corresponding to sizeId, matrixId and i, and sizeId and matrixId may mean those defined in FIGS. 55 and 56 or FIGS. 58 and 59.

Hereinafter, the encoding/decoding step of the quantization matrix prediction method information will be described.

The quantization matrix prediction method information indicating a quantization matrix prediction method type may be entropy-encoded/decoded in at least one of a parameter set or a header. Here, the quantization matrix prediction method type may include at least one of a predictive encoding/decoding method of coefficients in the quantization matrix or an inter-quantization matrix prediction method (or prediction method between quantization matrices). In addition, the inter-quantization matrix prediction method may include at least one of a default matrix use method and a reference matrix use method.

At this time, at least one of the parameter set or the header may be at least one of a video parameter set, a sequence parameter set, an adaptation parameter set, a picture parameter set, a picture header, a slice header, a tile group header, or a tile header.

For example, the quantization matrix prediction method information may be entropy-encoded/decoded in the adaptation parameter set.

In addition, information on an adaptation parameter set identifier may be entropy-encoded/decoded in the picture header.

For example, in order to indicate the quantization matrix prediction method in a video, the quantization matrix prediction method information may be entropy-encoded/decoded in the video parameter set.

In another example, in order to indicate the quantization matrix prediction method in a sequence, the quantization matrix prediction method information may be entropy-encoded/decoded in the sequence parameter set.

In another example, in order to indicate the quantization matrix prediction method in several pictures, several sub-pictures, several tile groups, several tiles or several slices, the quantization matrix prediction method information may be entropy-encoded/decoded in the adaptation parameter set.

In another example, in order to indicate the quantization matrix prediction method in a picture, the quantization matrix prediction method information may be entropy-encoded/decoded in the picture parameter set or the picture header.

In another example, in order to indicate the quantization matrix prediction method in a slice, the quantization matrix prediction method information may be entropy-encoded/decoded in the slice header.

In another example, in order to indicate the quantization matrix prediction method in a tile group, the quantization matrix prediction method information may be entropy-encoded/decoded in the tile group header.

In another example, in order to indicate the quantization matrix prediction method in a tile, the quantization matrix prediction method information may be entropy-encoded/decoded in the tile header.

Meanwhile, information indicating whether the quantization matrix is applied to the encoded/decoded block using the secondary transform which is a two-dimensional non-separable transform may be entropy-encoded/decoded in at least one of the parameter set or the header. At this time, the parameter set may be an adaptation parameter set.

When information indicating whether the quantization matrix is applied to the encoded/decoded block using the secondary transform is a first value (e.g., 0), quantization/dequantization may be performed using the quantization matrix corresponding to the corresponding block. In addition, when information indicating whether the quantization matrix is applied to the encoded/decoded block using the secondary transform is a second value (e.g., 1) and the secondary transform is performed with respect to the corresponding block, the quantization matrix coefficients in the quantization/dequantization process of the corresponding block may all have a value of K. Here, K may be a positive integer and may be 16, for example. The value of K may mean a default quantization matrix coefficient value predefined in the encoder/decoder.

FIGS. 27 to 59 are views illustrating a process of entropy-encoding/decoding quantization matrix prediction method information according to an embodiment of the present invention.

As in the example of the syntax element of FIGS. 27 to 59, a scaling_list_pred_mode_flag which is the prediction method information of the quantization matrix in the sequence parameter set, the adaptation parameter set and the picture parameter set may be entropy-encoded/decoded. At this time, as the quantization matrix prediction method during quantization matrix encoding/decoding, use of the prediction encoding/decoding method of coefficients in the quantization matrix or the inter-quantization matrix prediction method may be indicated.

For example, the scaling_list_pred_mode_flag may be encoded/decoded as a first value (e.g., 0) to indicate an inter-quantization matrix prediction method using at least one of a reference matrix use method or a default matrix use method for determining that a reference matrix and an encoding/decoding target quantization matrix matrixId have the same value.

At this time, the reference matrix use method may mean an inter-quantization matrix prediction method for copying a reference matrix coefficient value into an encoding/decoding target quantization matrix coefficient value.

In addition, the default matrix use method may mean an inter-quantization matrix prediction method for copying a default matrix coefficient value into an encoding/decoding target quantization matrix coefficient value.

In another example, the scaling_list_pred_mode_flag may be encoded/decoded as a second value (e.g., 1) to indicate the predictive encoding/decoding method of the coefficients in the quantization matrix using at least one of quantization matrix scan, DPCM (Differential Pulse Code Modulation)/inverse DPCM, or Exponential-Golomb code.

In addition, the scaling_list_copy_mode_flag and scaling_list_pred_mode_flag which are the prediction method information of the quantization matrix may be entropy-encoded/decoded in the sequence parameter set, the adaptation parameter set and the picture parameter set.

The scaling_list_pred_mode_flag may be entropy-encoded/decoded based on the value of the scaling_list_copy_mode_flag. For example, when the scaling_list_copy_mode_flag has a first value (e.g., 0), the scaling_list_pred_mode_flag may be entropy-encoded/decoded.

For example, the scaling_list_copy_mode_flag may be encoded/decoded as a second value (e.g., 1) to indicate an inter-quantization matrix prediction method using at least one of a reference matrix use method and a default matrix use method for determining that a reference matrix and an encoding/decoding target quantization matrix id have the same value.

Here, id may mean matrix information corresponding to at least one of a prediction mode, a color component, a width of a transform block or a height of a transform block. For example, id may have a value between S to T. Here, S and T may be positive integers including 0 and may be respectively 0 and 27. In addition, id may be an identifier of a combination of a matrixId and a sizeId. As in the example of Table 1, id may be represented according to the prediction mode, the color component, the width of the transform block, the height of the transform block, etc.

TABLE 1

| max(nTbW, nTbH) | | 2 | 4 | 8 | 16 | 32 | 64 |
|---|---|---|---|---|---|---|---|
| predMode = | cIdx = 0 (Y) | | 2 | 8 | 14 | 20 | 26 |
| MODE_INTRA | cIdx = 1 (Cb) | | 3 | 9 | 15 | 21 | 21 |
| | cIdx = 2 (Cr) | | 4 | 10 | 16 | 22 | 22 |
| predMode = | cIdx = 0 (Y) | | 5 | 11 | 17 | 23 | 27 |
| MODE_INTER | cIdx = 1 (Cb) | 0 | 6 | 12 | 18 | 24 | 24 |
| (INTER, IBC) | cIdx = 2 (Cr) | 1 | 7 | 13 | 19 | 25 | 25 |

In another example, the scaling_list_copy_mode_flag may be encoded/decoded as a first value (e.g., 0) to indicate a predictive encoding/decoding method of coefficients in the quantization matrix using at least one of quantization matrix scan, DPCM (Differential Pulse Code Modulation)/inverse DPCM, or Exponential-Golomb code.

In another example, the scaling_list_pred_mode_flag may be encoded/decoded as a second value (e.g., 1) to predict the encoding/decoding target quantization matrix coefficient value from the previously encoded/decoded quantization matrix. At this time, a difference value between the matrix coefficient value of a current quantization matrix and a matrix coefficient value of a quantization matrix used for prediction may be signaled from the encoder to the decoder for each matrix component.

For example, the decoding target quantization matrix coefficient value may be acquired based on a scaling_list_pred_id_delta indicating the reference quantization matrix identifier of the encoding/decoding target quantization matrix.

For example, when the scaling_list_pred_id_delta has a first value (e.g., 0), the decoding target quantization matrix may be acquired based on a default matrix.

In another example, when the scaling_list_pred_id_delta has a second value (e.g., a non-zero positive integer), an encoded/decoded quantization matrix indicated by a refId may be determined as the reference quantization matrix of the decoding target quantization matrix, and the decoding target quantization matrix may be acquired based on the reference quantization matrix.

Meanwhile, the scaling_list_pred_id_delta may be encoded in the parameter set. At this time, the reference quantization matrix identifier scaling_list_pred_id_delta may be determined using the id indicating the encoding target quantization matrix and the refId indicating the reference quantization matrix. For example, this may be represented as in the example of refId=id−scaling_list_pred_id_delta [id].

In addition, scaling_list_pred_id_delta information indicating the reference quantization matrix identifier of the decoding target quantization matrix may be decoded in the parameter set. At this time, using the reference quantization matrix identifier (scaling_list_pred_id_delta) and id indicating the decoding target quantization matrix, the reference quantization matrix refId of the decoding target quantization matrix may be determined. For example, this may be represented as in the example of refId=id−scaling_list_pred_id_delta [id].

Meanwhile, all matrix coefficient values of the default matrix may have a constant value regardless of a prediction mode, a color component, a block size, etc. For example, the constant value may be a positive integer and may be 16.

When the scaling_list_pred_id_delta [id] has a first value (e.g., 0), prediction values used to predict or copy the quantization matrix may all have a constant value. For example, the constant value may be a positive integer and may be 16. At this time, the prediction value may be set as the value of the matrix coefficient of the quantization matrix.

In addition, a quantization matrix having a size of 2×2 for an intra chroma component may be removed from a default matrix list, and a user-defined quantization matrix may not be encoded/decoded for the quantization matrix having the size of 2×2 for the intra prediction block. Here, the user-defined the quantization matrix may mean a quantization matrix signaled by the user. The quantization matrix having the size of 2×2 for the intra prediction block may be a quantization matrix having a size of 2×2 for a chroma intra prediction block.

When the scaling_list_copy_mode_flag and the scaling_list_pred_mode_flag have both a first value (e.g., 0), the prediction values used to predict or copy the quantization matrix may all have a constant value. For example, the constant value may be a positive integer and may be 8. By adding a difference value to the prediction value, it is possible to calculate the matrix coefficient in the quantization matrix.

When the scaling_list_copy_mode_flag has a second value (e.g., 1), the difference values may all be set to 0.

In addition, in case of at least one of the case where the information on whether the quantization matrix is used has a first value (e.g., 0) indicating that the quantization matrix is not used, the case where the information on whether the quantization matrix is present has a first value (e.g., 0) indicating that the quantization matrix is not present in the bitstream, or the case where a transform skip mode of a current block has a second value (e.g., 1) indicating that a transform skip mode is used, all the matrix coefficients in the quantization matrix may all have a constant value. For example, the constant value may be a positive integer and may be 16.

As in the example of FIGS. 27 to 29, a sizeId may mean size information corresponding to at least one of a block size, a transform size or a quantization matrix size. In addition, a matrixId may mean matrix information corresponding to at least one of a prediction mode or a color component.

For example, the sizeId may have a value from U to V corresponding to J×K to M×N. Here, J, K, M, N, U and V may have positive integers including 0.

Here, J and K may be 4, and M and N may be 32.

Here, U and V may be 0 and 3, respectively.

For example, the matrixId may have a value of P to Q. Here, P and Q may be positive integers including 0.

Here, P and Q may be 0 and 5, respectively.

As in the example of FIGS. 30 to 32, a sizeId may mean size information corresponding to at least one of a block size, a transform size or a quantization matrix size. In addition, a matrixId may mean matrix information corresponding to at least one of a prediction mode or a color component.

For example, the sizeId may have a value of U to V corresponding to J×K to M×N. Here, J, K, M, N, U and V may be positive integers including 0.

Here, J and K may be 2, and M and N may be 64.

Here, U and V may be 0 and 5, respectively.

For example, the matrixId may have a value of P to Q. Here, P and Q may be positive integers including 0.

Here, P and Q may be 0 and 5, respectively.

When the sizeId is 0, the matrixId may have a value of at least one of 1, 2, 4 or 5. In addition, when the sizeId is 5, the matrixId may have a value of at least one of 0 or 3.

As in the example of FIGS. 33 to 35, a sizeId may mean size information corresponding to at least one of a block size, a transform size or a quantization matrix size. In addition, a matrixId may mean matrix information corresponding to at least one of a prediction mode, a color component or a one-dimensional transform type.

For example, the sizeId may have a value of U to V corresponding to J×K to M×N. Here, J, K, M, N, U and V may be positive integers including 0.

Here, J and K may be 2, and M and N may be 64.

Here, U and V may be 0 and 5, respectively.

For example, the matrixId may have a value of P to Q. Here, P and Q may be positive integers including 0.

Here, P and Q may be 0 and 7, respectively.

When the sizeId is 0, the matrixId may have a value of at least one of 1, 2, 4 or 5. In addition, when the sizeId is 1 to 4, the matrixId may have a value of at least one of 0 to 7. In addition, when the sizeId is 6 to 7, the matrixId may have a value of at least one of 1 to 4. In addition, when the sizeId is 5, the matrixId may have a value of at least one of 0 or 3.

As in the example of FIGS. 36 to 38, a sizeId may mean size information corresponding to at least one of a block size, a transform size or a quantization matrix size. In addition, a matrixId may mean matrix information corresponding to at least one of a prediction mode, a color component or a one-dimensional transform type.

For example, the sizeId may have a value of U to V corresponding to J×K to M×N. Here, J, K, M, N, U and V may be positive integers including 0.

Here, J and K may be 2, and M and N may be 64.

Here, U and V may be 0 and 5, respectively.

For example, the matrixId may have a value of P to Q. Here, P and Q may be positive integers including 0.

Here, P and Q may be 0 and 9, respectively.

When the sizeId is 0, the matrixId may have a value of at least one of 1, 2, 4 or 5. In addition, when the sizeId is 1 to 4, the matrixId may have a value of at least one of 0 to 9. In addition, when the sizeId is 6 to 9, the matrixId may have a value of at least one of 1 to 4. In addition, when the sizeId is 5, the matrixId may have a value of at least one of 0 or 3.

As in the example of FIGS. 39 to 41, a sizeId may mean size information corresponding to at least one of a block size, a transform size or a quantization matrix size. In addition, a matrixId may mean matrix information corresponding to at least one of a prediction mode, a color component or a two-dimensional transform combination.

For example, the sizeId may have a value of U to V corresponding to J×K to M×N. Here, J, K, M, N, U and V may be positive integers including 0.

Here, J and K may be 2, and M and N may be 64.

Here, U and V may be 0 and 5, respectively.

For example, the matrixId may have a value of P to Q. Here, P and Q may be positive integers including 0.

Here, P and Q may be 0 and 7, respectively.

When the sizeId is 0, the matrixId may have a value of at least one of 1, 2, 4 or 5. In addition, when the sizeId is 1 to 4, the matrixId may have a value of at least one of 0 to 7. In addition, when the sizeId is 6 to 7, the matrixId may have a value of at least one of 1 to 4. In addition, when the sizeId is 5, the matrixId may have a value of at least one of 0 or 3.

As in the example of FIGS. 42 to 44, a sizeId may mean size information corresponding to at least one of a block size, a transform size or a quantization matrix size. In addition, a matrixId may mean matrix information corresponding to at least one of a prediction mode, a color component or a two-dimensional transform combination.

For example, the sizeId may have a value of U to V corresponding to J×K to M×N. Here, J, K, M, N, U and V may be positive integers including 0.

Here, J and K may be 2, and M and N may be 64.

Here, U and V may be 0 and 5, respectively.

For example, the matrixId may have a value of P to Q. Here, P and Q may be positive integers including 0.

Here, P and Q may be 0 and 13, respectively.

When the sizeId is 0, the matrixId may have a value of at least one of 1, 2, 4 or 5. In addition, when the sizeId is 1 to 4, the matrixId may have a value of at least one of 0 to 13. In addition, when the sizeId is 6 to 13, the matrixId may have a value of at least one of 1 to 4. In addition, when the sizeId is 5, the matrixId may have a value of at least one of 0 or 3.

As in the example of FIGS. 45 to 47, a sizeId may mean size information corresponding to at least one of a block size, a transform size or a quantization matrix size. In addition, a matrixId may mean matrix information corresponding to at least one of a prediction mode, a color component or a two-dimensional transform combination.

For example, the sizeId may have a value of U to V corresponding to J×K to M×N. Here, J, K, M, N, U and V may be positive integers including 0.

Here, J and K may be 2, and M and N may be 64.

Here, U and V may be 0 and 5, respectively.

For example, the matrixId may have a value of P to Q. Here, P and Q may be positive integers including 0.

Here, P and Q may be 0 and 7, respectively.

When the sizeId is 0, the matrixId may have a value of at least one of 1, 2, 4 or 5. In addition, when the sizeId is 1 to 4, the matrixId may have a value of at least one of 0 to 7. In addition, when the sizeId is 6 to 7, the matrixId may have a value of at least one of 1 to 4. In addition, when the sizeId is 5, the matrixId may have a value of at least one of 0 or 3.

As in the example of FIGS. 48 to 50, a sizeId may mean size information corresponding to at least one of a block size, a transform size or a quantization matrix size. In addition, a matrixId may mean matrix information corresponding to at least one of a prediction mode, a color component or a two-dimensional transform combination.

For example, the sizeId may have a value of U to V corresponding to J×K to M×N. Here, J, K, M, N, U and V may be positive integers including 0.

Here, J and K may be 2, and M and N may be 64.

Here, U and V may be 0 and 5, respectively.

For example, the matrixId may have a value of P to Q. Here, P and Q may be positive integers including 0.

Here, P and Q may be 0 and 13, respectively.

When the sizeId is 0, the matrixId may have a value of at least one of 1, 2, 4 or 5. In addition, when the sizeId is 1 to 4, the matrixId may have a value of at least one of 0 to 13. In addition, when the sizeId is 6 to 13, the matrixId may have a value of at least one of 1 to 4. In addition, when the sizeId is 5, the matrixId may have a value of at least one of 0 or 3.

As in the example of FIGS. 51 to 53, a sizeId may mean size information corresponding to at least one of a block size, a transform size or a quantization matrix size. In addition, a matrixId may mean matrix information corresponding to at least one of a prediction mode, a color component or whether a transform is used.

For example, the sizeId may have a value of U to V corresponding to J×K to M×N. Here, J, K, M, N, U and V may be positive integers including 0.

Here, J and K may be 2, and M and N may be 64.

Here, U and V may be 0 and 5, respectively.

For example, the matrixId may have a value of P to Q. Here, P and Q may be positive integers including 0.

Here, P and Q may be 0 and 7, respectively.

When the sizeId is 0, the matrixId may have a value of at least one of 1, 2, 4 or 5. In addition, when the sizeId is 1 to 4, the matrixId may have a value of at least one of 0 to 7. In addition, when the sizeId is 6 to 7, the matrixId may have a value of 1. In addition, when the sizeId is 5, the matrixId may have a value of at least one of 0 or 3.

As in the example of FIGS. 54 to 56, a sizeId may mean size information corresponding to at least one of a block size, a transform size or a quantization matrix size. In addition, a matrixId may mean matrix information corresponding to at least one of a prediction mode or a color component.

For example, the sizeId may have a value of U to V corresponding to J×K to M×N. Here, J, K, M, N, U and V may be positive integers including 0.

Here, J and K may be 1, and M and N may be 64.

Here, U and V may be 0 and 6, respectively.

For example, the matrixId may have a value of P to Q. Here, P and Q may be positive integers including 0.

Here, P and Q may be 0 and 8, respectively.

When the sizeId is 1, the matrixId may have a value of at least one of 1, 2, 4, 5, 7 or 8. In addition, when the sizeId is 6, the matrixId may have a value of at least one of 0, 3 or 6.

As in the example of FIGS. 57 to 59, a sizeId may mean size information corresponding to at least one of a block size, a transform size or a quantization matrix size. In addition, a matrixId may mean matrix information corresponding to at least one of a prediction mode or a color component.

For example, the sizeId may have a value of U to V corresponding to J×K to M×N. Here, J, K, M, N, U and V may be positive integers including 0.

Here, J and K may be 2, and M and N may be 64.

Here, U and V may be 0 and 5, respectively.

For example, the matrixId may have a value of P to Q. Here, P and Q may be positive integers including 0.

Here, P and Q may be 0 and 8, respectively.

When the sizeId is 0, the matrixId may have a value of at least one of 1, 2, 4, 5, 7 or 8. In addition, when the sizeId is 5, the matrixId may have a value of at least one of 0, 3 or 6.

Hereinafter, the encoding/decoding of the reference matrix identifier for inter-quantization matrix prediction will be described.

When the quantization matrix prediction method information scaling_list_pred_mode_flag has a first value (e.g., 0), the reference matrix identifier of the encoding/decoding target quantization matrix may be entropy-encoded/decoded in at least one of the parameter set or the header. Here, the reference matrix identifier may indicate a quantization matrix referenced in the encoding/decoding target quantization matrix for inter-quantization matrix prediction. At this time, inter-quantization matrix prediction method may include at least one of a default matrix use method or a reference matrix use method.

At this time, at least one of the parameter set or the header may be at least one of a video parameter set, a sequence parameter set, an adaptation parameter set, a picture parameter set, a picture header, a slice header, a tile group header or a tile header.

For example, in order to indicate the reference matrix of the encoding/decoding target quantization matrix in a video, the reference matrix identifier may be entropy-encoded/decoded in the video parameter set.

In another example, in order to indicate the reference matrix of the encoding/decoding target quantization matrix in a sequence, the reference matrix identifier may be entropy-encoded/decoded in the sequence parameter set.

In another example, in order to indicate the reference matrix of the encoding/decoding target quantization matrix in several pictures, several subpictures, several tile groups, several tiles or several slices, the reference matrix identifier may be entropy-encoded/decoded in the adaptation parameter set.

In another example, in order to indicate the reference matrix of the encoding/decoding target quantization matrix in a picture, the reference matrix identifier may be entropy-encoded/decoded in the picture parameter set or the picture header.

In another example, in order to indicate the reference matrix of the encoding/decoding target quantization matrix in a slice, the reference matrix identifier may be entropy-encoded/decoded in the slice header.

In another example, in order to indicate the reference matrix of the encoding/decoding target quantization matrix in a tile group, the reference matrix identifier may be entropy-encoded/decoded in the tile group header.

In another example, in order to indicate the reference matrix of the encoding/decoding target quantization matrix in a tile, the reference matrix identifier may be entropy-encoded/decoded in the tile header.

As in the example of the syntax element of FIGS. 27 to 59, a scaling_list_pred_matrix_id_delta which is the reference matrix identifier of the encoding/decoding target quantization matrix may be entropy-encoded/decoded in at least one of the parameter set or the header.

For example, the scaling_list_pred_matrix_id_delta may be encoded/decoded as a first value (e.g., 0) to indicate a default matrix use method for determining that the encoding/decoding target quantization matrix has the same value as the default matrix.

The default matrix use method may mean an inter-quantization matrix prediction method for copying a default matrix coefficient value into an encoding/decoding target quantization matrix coefficient value. That is, the default matrix use method may mean an inter-quantization matrix prediction method for determining a default matrix as the reference matrix of the encoding/decoding target quantization matrix matrixId and copying a default matrix coefficient value into an encoding/decoding target quantization matrix coefficient value.

In another example, the scaling_list_pred_matrix_id_delta may be encoded/decoded as a second value (e.g., P) to indicate a reference matrix use method for determining that the encoding/decoding target quantization matrix has the same value as the reference matrix. Here, P may be a positive integer and may have a value between 1 and matrixId.

The reference matrix use method may mean an inter-quantization matrix prediction method for copying the reference matrix coefficient value into the encoding/decoding target quantization matrix coefficient value. That is, the reference matrix use method may mean an inter-quantization matrix prediction method for determining the reference matrix corresponding to a refMatrixId as the reference matrix of the encoding/decoding target quantization matrix matrixId and copying the reference matrix coefficient value into the encoding/decoding target quantization matrix coefficient value.

For example, when the encoder determines that the encoding target quantization matrix coefficient value is equal to the default matrix coefficient value predetermined in the encoder/decoder, the scaling_list_pred_matrix_id_delta is encoded as a first value (e.g., 0) such that the refMatrixId value and the matrixId value are the same. At this time, the default matrix may mean a default matrix corresponding to the sizeId and the matrixId.

In another example, when the encoder determines that the encoding target quantization matrix coefficient value is equal to the reference matrix coefficient value, the scaling_list_pred_matrix_id_delta may be encoded as a second value (e.g., P) such that the refMatrixId value and the matrixId may not be the same. At this time, the reference matrix may mean a quantization matrix corresponding to the refMatrixId.

For example, when the result of decoding the scaling_list_pred_matrix_id_delta in the decoder has a first value (e.g., 0) (the refMatrixId value and the matrixId value are the same), the decoding target quantization matrix coefficient value corresponding to the sizeId and the matrixId may be determined as being equal to the default matrix coefficient value predetermined in the encoder/decoder. Determining the decoding target quantization matrix coefficient value as being equal to the default matrix coefficient value predetermined in the encoder/decoder may mean a default matrix use method for copying a default matrix coefficient value into the decoding target quantization matrix coefficient value.

In another example, when the result of decoding the scaling_list_pred_matrix_id_delta in the decoder has a second value (e.g., P) (the refMatrixId value and the matrixId value are different), the quantization matrix corresponding to the refMatrixId may be determined as the reference matrix of the decoding target quantization matrix, and the decoding target quantization matrix coefficient value may be determined as being equal to the reference matrix coefficient value. Determining the decoding target quantization matrix coefficient value as being equal to the reference matrix coefficient value may mean a reference matrix use method for determining the reference matrix corresponding to the refMatrixId as the reference matrix of the decoding target quantization matrix and copying the reference matrix coefficient value into the decoding target quantization matrix coefficient value.

Using the matrixId meaning the encoding/decoding target quantization matrix and the scaling_list_pred_matrix_id_delta which is the reference matrix identifier, the refMatrixId meaning the reference matrix or the default matrix may be determined as follows:

$$refMatrixId = matrixId - \text{scaling\_list\_pred\_id\_delta}[sizeId][matrixId] * (sizeId == 3 ? 3 : 1)$$

or $$refMatrixId = matrixId - \text{scaling\_list\_pred\_matrix\_id\_delta}[sizeId][matrixId] * (sizeId == 5 ? 3 : 1)$$

or in case of a 2×2 block size, $$refMatrixId = matrixId - \text{scaling\_list\_pred\_matrix\_id\_delta}[sizeId][matrixId] - ((matrixId > 3 \;\&\&\; (matrixId - \text{scaling\_list\_pred\_matrix\_id\_delta}[sizeId][matrixId] <= 3)) ? 1 : 0)$$

Figure 60:
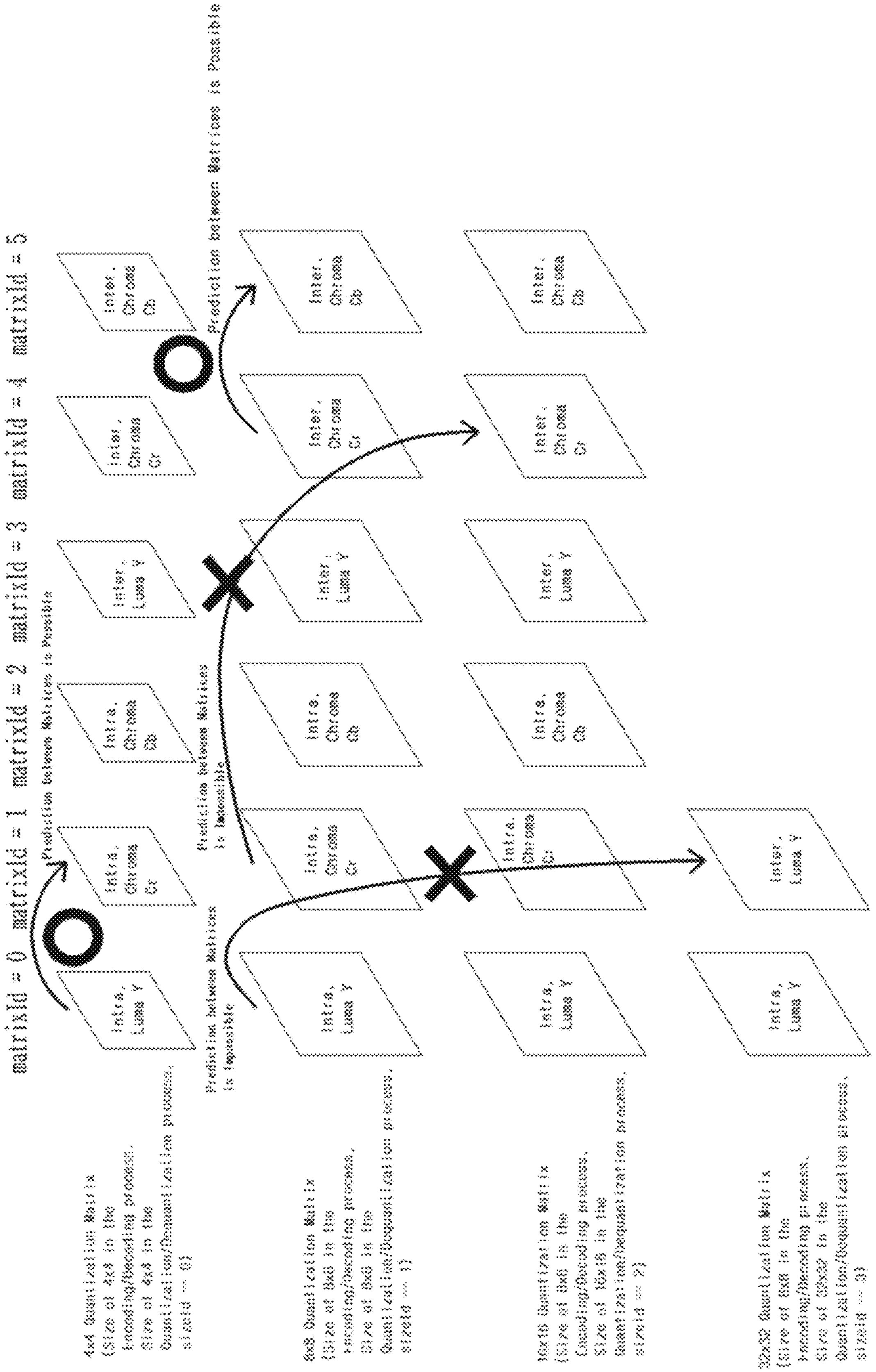
FIGS. 60 to 61 are views illustrating a process of performing inter-quantization matrix prediction based on a block size according to an embodiment of the present invention.
Figure 61:
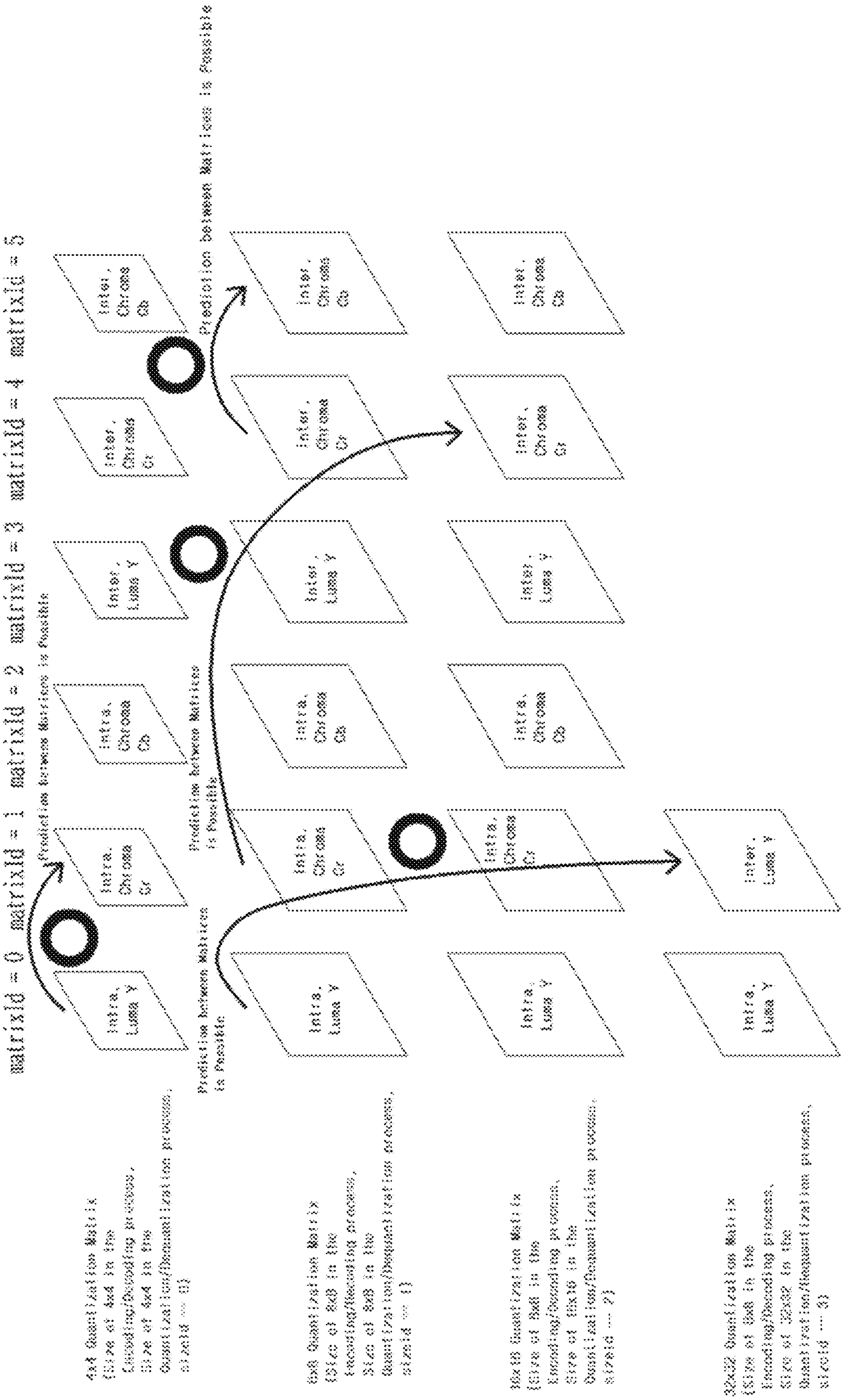

FIGS. 60 to 61 are views illustrating a process of performing inter-quantization matrix prediction based on a block size according to an embodiment of the present invention.

As in the example of FIG. 60, inter-quantization matrix prediction may be performed using a quantization matrix size (block size) in the quantization/dequantization process rather than a quantization matrix size in the encoding/decoding process. That is, prediction may not be performed between quantization matrices having different sizeIds that distinguish between quantization matrix sizes in the quantization/dequantization process.

For example, an 8×8 inter chroma Cb quantization matrix (sizeId==1, matrixId==5) may be predicted from an 8×8 inter chroma Cr quantization matrix (sizeId==1, matrixId==4).

In another example, a 32×32 inter luma Y quantization matrix (sizeId==3, matrixId==1) may not be predicted from an 8×8 intra luma Y quantization matrix (sizeId==1, matrixId==0).

In another example, a 16×16 inter chroma Cr quantization matrix (sizeId==2, matrixId==4) may not be predicted from an 8×8 intra chroma Cr quantization matrix (sizeId==1, matrixId==1).

As in the example of FIG. 61, inter-quantization matrix prediction may be performed from a quantization matrix having the same size as a quantization matrix size (block size) in the encoding/decoding process. At this time, quantization matrix copy may be performed using the quantization matrix size (block size) in the encoding/decoding process. That is, when the sizeIds that distinguish between quantization matrix sizes in the quantization/dequantization process are different but the quantization matrix sizes in the encoding/decoding process are the same, inter-quantization matrix prediction may be performed.

For example, an 8×8 inter chroma Cb quantization matrix (sizeId==1, matrixId==5) may be predicted from an 8×8 inter chroma Cr quantization matrix (sizeId==1, matrixId==4).

In another example, a 32×32 inter luma Y quantization matrix (sizeId==3, matrixId==1) may be predicted from an 8×8 intra luma Y quantization matrix (sizeId==1, matrixId==0).

In another example, a 16×16 inter chroma Cr quantization matrix (sizeId==2, matrixId==4) may be predicted from an 8×8 intra chroma Cr quantization matrix (sizeId==1, matrixId==1).

In another example, a 16×16 intra luma Y quantization matrix (sizeId==2, matrixId==0) may be predicted from an 8×8 intra luma Y quantization matrix (sizeId==1, matrixId==0). At this time, the sizeID of the quantization matrix referenced by quantization matrix copy, quantization matrix prediction, etc. may be less than or equal to the sizeId of the current quantization matrix.

When different quantization matrices have at least one of the same prediction mode, color component, size, form, one-dimensional transform type, two-dimensional transform combination or whether a transform is used in the encoding/decoding process by the prediction mode, the color component, the size, the form, the one-dimensional transform type, the two-dimensional transform combination or whether a transform is used, inter-quantization matrix prediction may be performed.

For example, when different quantization matrices have the same size in the encoding/decoding process by the prediction mode, inter-quantization matrix prediction may be performed.

In another example, when different quantization matrices have the same size in the encoding/decoding process by the color component, inter-quantization matrix prediction may be performed.

In another example, when different quantization matrices have the same form in the encoding/decoding process by the form, inter-quantization matrix prediction may be performed.

In another example, when different quantization matrices have the same size in the encoding/decoding process by at least one of the one-dimensional transform type, the two-dimensional transform combination, or whether a transform is used, inter-quantization matrix prediction may be performed.

In another example, when different quantization matrices have the same size in the encoding/decoding process by the size, inter-quantization matrix prediction may be performed. A detailed example thereof will be described below.

A quantization matrix having a size of J×K in the encoding/decoding process may have a size of J×K even in the quantization/dequantization process, but a quantization matrix having a size of M×N in the encoding/decoding process may have a size of M×N, 2*M×2*N, 4*M×4*N, 8*M×8*N, etc. in the quantization/dequantization process.

Here, J, K, M and N may be positive integers. In addition, J and K may be less than or equal to M and N.

For example, a quantization matrix having a size of 4×4 in the encoding/decoding process may have a size of 4×4 even in the quantization/dequantization process, but a quantization matrix having a size of 8×8 in the encoding/decoding process may have a size of 8×8, 16×16, 32×32, 64×64, etc. in the quantization/dequantization process.

In another example, a quantization matrix having a size of 2×2 or 4×4 in the encoding/decoding process may have a size of 2×2 or 4×4 even in the quantization/dequantization process, but a quantization matrix having a size of 8×8 in the encoding/decoding process may have a size of 8×8, 16×16, 32×32, 64×64, etc. in the quantization/dequantization process.

In another example, a quantization matrix having a size of 4×4 in the encoding/decoding process may have a size of 2×2 or 4×4 even in the quantization/dequantization process, but a quantization matrix having a size of 8×8 in the encoding/decoding process may have a size of 8×8, 16×16, 32×32, 64×64, etc. in the quantization/dequantization process.

In another example, a quantization matrix having a size of 2×2, 4×4 or 8×8 in the encoding/decoding process may have a size of 2×2, 4×4 or 8×8 even in the quantization/dequantization process, but a quantization matrix having a size of 16×16 in the encoding/decoding process may have a size of 16×16, 32×32, 64×64, etc. in the quantization/dequantization process.

Since quantization matrices having sizes of M×N, 2*M×2*N, 4*M×4*N, 8*M×8*N, etc. in the quantization/dequantization process have the same size of M×N in the encoding/decoding process, inter-quantization matrix prediction may be performed. Here, M and N may be positive integers.

For example, quantization matrices having sizes of 8×8, 16×16, 32×32, 64×64, etc. in the quantization/dequantization process have the same size of 8×8 in the encoding/decoding process, inter-quantization matrix prediction may be performed.

In another example, quantization matrices having sizes of 2×2, 4×4, etc. in the quantization/dequantization process have the same size of 4×4 in the encoding/decoding process, inter-quantization matrix prediction may be performed.

In another example, quantization matrices having sizes of 16×16, 32×32, 64×64, etc. in the quantization/dequantization process have the same size of 16×16 in the encoding/decoding process, inter-quantization matrix prediction may be performed.

When quantization matrices having the same size (M×N) are signaled in the encoding/decoding process, but quantization matrices having different sizes (M×N, 2*M×2*N, 4*M×4*N, 8*M×8*N, etc.) are derived in the quantization/dequantization process, prediction may be allowed only between the quantization matrices having the same size in the encoding/decoding process (between quantization matrices having the size of M×N in the encoding/decoding process). Here, M and N may be positive integers.

For example, when quantization matrices having the same size (8×8) are signaled in the encoding/decoding process, but quantization matrices having different sizes (8×8, 16×16, 32×32, 64×64, etc.) are derived in the quantization/dequantization process, prediction may be allowed only between the quantization matrices having the same size in the encoding/decoding process (between quantization matrices having the size of 8×8 in the encoding/decoding process).

In another example, when quantization matrices having the same size (4×4) are signaled in the encoding/decoding process, but quantization matrices having different sizes (2×2, 4×4, etc.) are derived in the quantization/dequantization process, prediction may be allowed only between the quantization matrices having the same size in the encoding/decoding process (between quantization matrices having the size of 4×4 in the encoding/decoding process).

In another example, when quantization matrices having the same size (16×16) are signaled in the encoding/decoding process, but quantization matrices having different sizes (16×16, 32×32, 64×64, etc.) are derived in the quantization/dequantization process, prediction may be allowed only between the quantization matrices having the same size in the encoding/decoding process (between quantization matrices having the size of 16×16 in the encoding/decoding process).

Prediction between quantization matrices having different sizes in the encoding/decoding process (between the size of J×K and the size of M×N in the encoding/decoding process) may not be allowed. Here, J, K, M and N may be positive integers. In addition, J and K may be less than M and N, respectively.

For example, prediction between quantization matrices having different sizes in the encoding/decoding process (between the size of 4×4 and the size of 8×8 in the encoding/decoding process) may not be allowed.

The encoder may determine a scaling_list_pred_size_matrix_id_delta which is a reference matrix identifier, based on at least one of the matrix information matrixId of the encoding/decoding target quantization matrix, the matrix information refMatrixId of the reference matrix, the encoding/decoding target quantization matrix size information sizeId, the size information refSizeId of the reference matrix or the encoding/decoding target quantization matrix size and matrix information sizeMatrixId as follows:

$$\text{scaling\_list\_pred\_size\_matrix\_id\_delta} = sizeMatrixId - refMap[refSizeId][refMatrixId]$$

The method may be applied to the quantization matrix having the size of M×N in the encoding/decoding process, and may not be applied to the quantization matrix having the size of J×K in the encoding/decoding process. For the quantization matrix having the size of J×K in the encoding/decoding process, the reference matrix identifier scaling_list_pred_size_matrix_id_delta may be determined. That is, the inter-quantization matrix prediction method may vary according to the quantization matrix size in the encoding/decoding process and the reference matrix identifier determination method may also vary. Here, J, K, M and N may be positive integers. In addition, J and K may be less than M and N, respectively.

$$\text{scaling\_list\_pred\_size\_matrix\_id\_delta} = matrixId - refMatrixId$$

The decoder may determine at least one of the matrix information refMatrixId of the reference matrix or the size information refSizeId of the reference matrix based on at least one of the reference matrix identifier scaling_list_pred_size_matrix_id_delta or the encoding/decoding target quantization matrix size and matrix information sizeMatrixId.

$$refSizeId = refMap[sizeMatrixId - \text{scaling\_list\_pred\_size\_matrix\_id\_delta}]$$

$$refMatrixId = refMap[sizeMatrixId - \text{scaling\_list\_pred\_size\_matrix\_id\_delta}]$$

The method may be applied to the quantization matrix having the size of M×N in the encoding/decoding process, and may not be applied to the quantization matrix having the size of J×K in the encoding/decoding process. For the quantization matrix having the size of J×K in the encoding/decoding process, the refMatrixId which is the matrix information of the reference matrix may be determined. That is, the inter-quantization matrix prediction method may vary according to the quantization matrix size in the encoding/decoding process and the reference matrix identifier determination method may also vary. Here, J, K, M and N may be positive integers. In addition, J and K may be less than M and N, respectively.

$$refMatrixId = matrixId - \text{scaling\_list\_pred\_size\_matrix\_id\_delta}$$

FIGS. 62 to 64 are views illustrating a mapping table refMap according to an embodiment of the present invention.

As in the example of FIGS. 62 to 64, the refMap may be a mapping table for at least one of sizeMatrixId, refSizeId or refMatrixId. At this time, since the quantization matrix sizes in the quantization/dequantization process are different but the quantization matrix sizes in the encoding/decoding process are the same, the reference matrix identifiers may be sequentially assigned according to the quantization matrix information having the size of 8×8 in the encoding/decoding process.

Here, the encoding/decoding target quantization matrix size and matrix information may mean a single identifier. Meanwhile, the single identifier may be derived based on a matrix size in the quantization/dequantization process, a prediction mode, a color component, the size of a current block, etc. Meanwhile, a single identifier for an intra mode and a single identifier for an IBC mode may be the same.

For example, in case of a quantization matrix having a size of M×N in the encoding/decoding process, the scaling_list_pred_size_matrix_id_delta may be encoded/decoded as a first value (e.g., 0) to indicate a default matrix use method for determining that the encoding/decoding target quantization matrix has the same value as the default matrix. That is, the refMatrixId and the matrixId may be allowed to be the same and the refSizeId and the sizeId may be allowed to be the same. At this time, the default matrix may mean a default matrix corresponding to the sizeId and the matrixId. Here, M and N may be positive integers and M×N may be 8×8.

In another example, in case of a quantization matrix having a size of J×K in the encoding/decoding process, the scaling_list_pred_size_matrix_id_delta may be encoded/decoded as a first value (e.g., 0) to indicate a default matrix use method for determining that the encoding/decoding target quantization matrix has the same value as the default matrix. That is, the refMatrixId and the matrixId may be allowed to be the same. At this time, the default matrix may mean a default matrix corresponding to the sizeId and the matrixId. Here, J and K may be positive integers and J×K may be 4×4.

For example, in case of a quantization matrix having a size of M×N in the encoding/decoding process, the scaling_list_pred_size_matrix_id_delta may be encoded/decoded as a second value (e.g., P) to indicate a reference matrix use method for determining that the encoding/decoding target quantization matrix has the same value as the reference matrix. Here, P may be a positive integer and may have a value between 1 and matrixId. That is, inter-matrix prediction may be performed from the reference matrix corresponding to the refMatrixId and the refSizeId. Here, M and N may be positive integers and M×N may be 8×8.

In another example, in case of a quantization matrix having a size of J×K in the encoding/decoding process, the scaling_list_pred_size_matrix_id_delta may be encoded/decoded as a second value (e.g., P) to indicate a reference matrix use method for determining that the encoding/decoding target quantization matrix has the same value as the reference matrix. Here, P may be a positive integer and may have a value between 1 and matrixId. That is, inter-matrix prediction may be performed from the reference matrix corresponding to the refMatrixId. Here, J and K may be positive integers and J×K may be 4×4.

In addition, restriction may be imposed such that inter-matrix prediction is not performed from the quantization matrix having a value greater than the sizeMatrixId of the encoding/decoding target quantization matrix and the reference matrix identifier scaling_list_pred_size_matrix_id_delta may be restricted to have a value between 0 and U. Here, U may be a positive integer.

For example, when quantization matrix copy is performed using quantization matrix size in the quantization/dequantization process, restriction may be imposed such that the reference matrix identifier of the quantization matrix having a size of 2×2 in the quantization/dequantization process has a value between 0 and X, the reference matrix identifier of the quantization matrix having the size of 4×4, 8×8, 16×16 or 32×32 in the quantization/dequantization process has a value between 0 and Y, and the reference matrix identifier of the quantization matrix having a size of 64×64 in the quantization/dequantization process has a value between 0 and Z. Here, X, Y and Z may be positive integers and may have different values.

At this time, when the matrix size in the quantization/dequantization process is at least one of 8×8, 16×16, 32×32, 64×64, etc. which is equal to or greater than a specific size of M×N, a lowest frequency matrix coefficient or a DC matrix coefficient may be included. Accordingly, during prediction, the lowest frequency matrix coefficient or the DC matrix coefficient may also be predicted from the quantization matrix having a size equal to or greater than a specific size of M×N, such as 8×8, 16×16, 32×32, 64×64, etc., in the quantization/dequantization process. Here, M and N may be positive integers and M×N may be 8×8.

Hereinafter, the predictive encoding/decoding step of the coefficients in the quantization matrix will be described.

When the quantization matrix prediction method information scaling_list_pred_mode_flag has a second value (e.g., 1), the quantization matrix prediction method information may indicate the predictive encoding/decoding method of the coefficients in the quantization matrix. The predictive encoding/decoding method of the coefficients in the quantization matrix may mean a method of using at least one of quantization matrix scan, DPCM (Differential Pulse Code Modulation)/inverse DPCM, or Exponential-Golomb code.

In case of the predictive encoding/decoding method of the coefficients in the quantization matrix, at least one of a difference value between the quantization matrix coefficient value encoded/decoded previously in the quantization matrix and the encoding/decoding target quantization matrix coefficient value or the lowest frequency matrix coefficient may be entropy-encoded/decoded in at least one of the parameter set or the header.

Here, the lowest frequency matrix coefficient may mean a coefficient in a quantization matrix which is at least one of a DC matrix coefficient and a lowest frequency matrix coefficient for quantizing/dequantizing at least one of a DC transform coefficient and a lowest frequency transform coefficient located at a left upper side among transform coefficients in a residual block. The lowest frequency matrix coefficient may be first encoded/decoded during predictive encoding/decoding of coefficients in the quantization matrix.

For example, as a one-dimensional transform type, when DCT-2 is used as the horizontal transform or the vertical transform, the lowest frequency matrix coefficient for the DC transform coefficient may be a DC matrix coefficient.

In another example, as a one-dimensional transform type, a transform (DCT-8, DST-7, DCT-4, DST-4, etc.) other than DCT-2 is used as the horizontal transform or the vertical transform, the lowest frequency matrix coefficient for the lowest frequency transform coefficient may be a lowest frequency matrix coefficient.

For example, as a two-dimensional transform combination, when DCT-2 is used as the horizontal transform or the vertical transform, the lowest frequency matrix coefficient for the DC transform coefficient may be a DC matrix coefficient.

In another example, as a two-dimensional transform combination, when a transform (DCT-8, DST-7, DCT-4, DST-4, etc.) other than DCT-2 is used as at least one of the horizontal transform or the vertical transform, the lowest frequency matrix coefficient for the lowest frequency transform coefficient may be a lowest frequency matrix coefficient.

For example, when at least one of the primary transform or the secondary transform is not used, the lowest frequency matrix coefficient value may not be encoded/decoded.

As in the example of the syntax element of FIGS. 27 to 59, when the encoding/decoding target quantization matrix size is at least one of 8×8, 16×16, 32×32, etc. which is equal to or greater than the specific size of M×N, the scaling_list_dc_coef_minus8 which is the DC matrix coefficient or the lowest frequency matrix coefficient may be encoded/decoded in at least one of the parameter set or the header. Here, M and N may be positive integers. M×N may be 8×8, 16×16, etc.

At this time, scaling_list_dc_coef_minus8 may be restricted to a value between-A and B, and may be encoded/decoded as a value between-A and B using a signed Exponential-Golomb code.

Here, A and B may be positive integers.

For example, when the quantization matrix coefficient is represented by 6 bits, A may be 7, B may be 55, and A+B may be 62 or 63.

In another example, when the quantization matrix coefficient is represented by 8 bits, A may be 7, B may be 247, and A+B may be 254 or 255.

In another example, when the quantization matrix coefficient is represented by 10 bits, A may be 7, B may be 1015, and A+B may be 1022 or 1023.

When the quantization matrix is reconstructed, the DC matrix coefficient or the lowest frequency matrix coefficient may be calculated as the value of the scaling_list_dc_coef_minus8+L, and the calculated value may be a value between C and D. Here, L may be a positive integer and may be 8.

Here, C and D may be positive integers.

For example, when the quantization matrix coefficient is represented by 6 bits, C may be 1 and D may be 63.

In another example, when the quantization matrix coefficient is represented by 8 bits, C may be 1 and D may be 255.

In another example, when the quantization matrix coefficient is represented by 10 bits, C may be 1, and D may be 1023.

When the scaling_list_pred_mode_flag which is the prediction method information of the quantization matrix has a first value, the scaling_list_pred_matrix_id_delta which is the reference matrix identifier has a first value, and the quantization matrix size is equal to or greater than the size of M×N, the scaling_list_dc_coef_minus8 may be determined as L. Here, M and N may be positive integers. M×N may be 8×8, 16×16, etc. Here, L may be a positive integer and may be 8.

As in the example of the syntax element of FIGS. 27 to 59, a scaling_list_delta_coef which is a difference value between the quantization matrix coefficient value ScalingList[sizeId][matrixId][i−1] encoded/decoded previously in the quantization matrix and the encoding/decoding target quantization matrix coefficient value ScalingList[sizeId][matrixId][i] may be encoded/decoded in at least one of the parameter set or the header.

When the quantization matrix having a size of J×K is encoded/decoded, a total of J×K scaling_list_delta_coef, which is the number of coefficients in the J×K quantization matrix, may be encoded/decoded. Here, J and K may be positive integers.

For example, when a quantization matrix having a size of 4×4 is encoded/decoded, a total of 16 scaling_list_delta_coef, which is the number of coefficients in the 4×4 quantization matrix, may be encoded/decoded.

When a quantization matrix used in a block having a size of M×N or more is encoded/decoded, a total of M*N scaling_list_delta_coef, which is the number of coefficients in the M×N quantization matrix, may be encoded/decoded. Here, M and N may be positive integers.

For example, when a quantization matrix used in a block having a size of 8×8 or more is encoded/decoded, a total of 64 coefficients in an 8×8 quantization matrix may be encoded/decoded.

At this time, the scaling_list_delta_coef may be restricted to a value between-A and B, and may be encoded/decoded as a value between-A and B using a signed Exponential-Golomb code.

Here, A and B may be positive integers.

For example, when the quantization matrix coefficient is represented by 6 bits, A may be 32, B may be 31, and A+B may be 63.

In another example, when the quantization matrix coefficient is represented by 8 bits, A may be 128, B may be 127, and A+B may be 255.

In another example, when the quantization matrix coefficient is represented by 10 bits, A may be 512, B may be 511, and A+B may be 1023.

When the quantization matrix is reconstructed, the quantization matrix coefficient nextCoef may be calculated as the value of nextCoef+scaling_list_delta_coef+(C+D)) % (C+D), and the calculated value may be a value between C and D.

Here, C and D may be positive integers.

For example, when the quantization matrix coefficient is represented by 6 bits, C may be 1, and D may be 63.

In another example, when the quantization matrix coefficient is represented by 8 bits, C may be 1, and D may be 255.

In another example, when the quantization matrix coefficient is represented by 10 bits, C may be 1, and D may be 1023.

When the scaling_list_pred_mode_flag which is the prediction method information of the quantization matrix has a first value and the scaling_list_pred_matrix_id_delta which is the reference matrix identifier has a first value, the scaling_list_delta_coef may be determined as L. Here, M and N may be positive integers. M×N may be 8×8, 16×16, etc. Here, L may be at least one of a negative integer, 0 or a positive integer and may be 0.

In addition, use of a default matrix may be indicated using the scaling_list_dc_coef_minus8 or the scaling_list_delta_coef used to calculate the nextCoef.

For example, the encoder may encode the value of the scaling_list_dc_coef_minus8 as −8 for the encoding target quantization matrix and signal use of the default matrix to the decoder. In addition, the scaling_list_delta_coef may be encoded such that the first nextCoef value becomes 0, thereby signaling use of the default matrix to the decoder.

In another example, when the decoder decodes the value of the scaling_list_dc_coef_minus8 as −8, the decoding target quantization matrix may be determined as the default matrix. In addition, when the first nextCoef value calculated by decoding scaling_list_delta_coef is 0, the decoding target quantization matrix may be determined as the default matrix.

At this time, at least one of the parameter set or the header may be at least one of a video parameter set, a sequence parameter set, an adaptation parameter set, a picture parameter set, a picture header, a slice header, a tile group header or a tile header.

For example, in order to predictively encode/decode the coefficients in the quantization matrix in a video, at least one of the difference value of the quantization matrix coefficient value or the lowest frequency matrix coefficient value may be entropy-encoded/decoded in the video parameter set.

In another example, in order to predictively encode/decode the coefficients in the quantization matrix in a sequence, at least one of the difference value of the quantization matrix coefficient value or the lowest frequency matrix coefficient value may be entropy-encoded/decoded in the sequence parameter set.

In another example, in order to predictively encode/decode the coefficients in the quantization matrix in several pictures, several subpictures, several tile groups, several tiles or several slices, at least one of the difference value of the quantization matrix coefficient value or the lowest frequency matrix coefficient value may be entropy-encoded/decoded in the adaptation parameter set.

In another example, in order to predictively encode/decode the coefficients in the quantization matrix in a picture, at least one of the difference value of the quantization matrix coefficient value or the lowest frequency matrix coefficient value may be entropy-encoded/decoded in the picture parameter set or the picture header.

In another example, in order to predictively encode/decode the coefficients in the quantization matrix in a slice, at least one of the difference value of the quantization matrix coefficient value or the lowest frequency matrix coefficient value may be entropy-encoded/decoded in the slice header.

In another example, in order to predictively encode/decode the coefficients in the quantization matrix in a tile group, at least one of the difference value of the quantization matrix coefficient value or the lowest frequency matrix coefficient value may be entropy-encoded/decoded in the tile group header.

In another example, in order to predictively encode/decode the coefficients in the quantization matrix in a tile, at least one of the difference value of the quantization matrix coefficient value or the lowest frequency matrix coefficient value may be entropy-encoded/decoded in the tile header.

The encoder may encode a difference value between the quantization matrix coefficient value encoded previously in the quantization matrix and the encoding target quantization matrix coefficient value in the following processes.

In a first process, scan may be performed in order to align at least one of the coefficients in the two-dimensional quantization matrix in a one-dimensional coefficient array.

In a second process, a scaling_list_delta_coef which is a difference value between the encoding target quantization matrix coefficient by the scan method and the quantization matrix coefficient located in a previous order in the one-dimensional coefficient array may be generated. At this time, the difference value may be calculated using DPCM, and the quantization matrix coefficient located in the previous order may be an encoded coefficient located immediately before the encoding target quantization matrix coefficient. In addition, since the first coefficient in the one-dimensional coefficient array does not have a quantization matrix coefficient located in the previous order, which will be predicted, the difference value may be generated using a predetermined constant value. For example, when the quantization matrix size is greater than 8×8, the difference value may be generated using a DC matrix coefficient or a lowest frequency matrix coefficient. At this time, the predetermined constant value may be a value between C and D, which is a positive integer, and, more particularly, may be a positive value such as 8 or 16.

In a third process, the scaling_list_delta_coef which is the calculated difference value may be encoded using an exponential-Golomb code. At this time, the difference value has sign information and thus may be encoded using a signed exponential-Golomb code. The scaling_list_delta_coef may be limited to a value between-A and B, and may be encoded as a value between-A and B.

The decoder may decode the difference value between the quantization matrix coefficient value encoded previously in the quantization matrix and the decoding target quantization matrix coefficient value in the following processes.

In a first process, the scaling_list_delta_coef may be decoded using an exponential-Golomb code. The scaling_list_delta_coef may be limited to a value between-A and B, the difference value has sign information and thus may be decoded as a value between-A and B using a signed exponential-Golomb code. The decoded difference value may be sequentially stored in the one-dimensional coefficient array in decoding order.

In a second process, the sum of the decoded difference value and the quantization matrix coefficient located in the previous order in the one-dimensional coefficient array is calculated to reconstruct a nextCoef or scalingList[i] which is a decoding target quantization matrix coefficient. At this time, i may mean the order in the one-dimensional coefficient array. The decoding target quantization matrix coefficient may be calculated using inverse DPCM, and the quantization matrix coefficient located in the previous order may be a decoded coefficient located immediately before the decoding target quantization matrix coefficient. In addition, the first coefficient in the one-dimensional coefficient array does not have a quantization matrix coefficient located in the previous order, which will be predicted, and thus may be reconstructed using a predetermined constant. For example, when the quantization matrix size is greater than 8×8, the quantization matrix may be reconstructed using a DC matrix coefficient or a lowest frequency matrix coefficient. At this time, the predetermined constant value may be a value between C and D, which is a positive integer, and, more particularly, may be a positive value such as 8 or 16. The reconstructed quantization matrix coefficient may be a value between C and D.

In a third process, inverse scan may be performed in align the reconstructed one-dimensional coefficient array in a two-dimensional quantization matrix. At this time, inverse scan may be performed in the same manner as scan or may be performed in the reverse order of scan.

A, B, C and D may be positive integers.

For example, when the quantization matrix is represented by 6 bits, A may be 32, B may be 31, and A+B may be 63.

In another example, when the quantization matrix coefficient is represented by 8 bits, A may be 128, B may be 127, and A+B may be 255.

In another example, when the quantization matrix coefficient is represented by 10 bits, A may be 512, B may be 511, and A+B may be 1023.

For example, when the quantization matrix coefficient is represented by 6 bits, C may be 1, and D may 63.

In another example, when the quantization matrix coefficient is represented by 8 bits, C may be 1, and D may be 255.

In another example, when the quantization matrix coefficient is represented by 10 bits, C may be 1, and D may be 1023.

FIGS. 65 to 73 are views illustrating a scan method for a quantization matrix coefficient according to an embodiment of the present invention.

At least one of the following scan methods may be performed with respect to at least one of an encoding target quantization matrix coefficient or a reconstructed coefficient.

Figure 65:
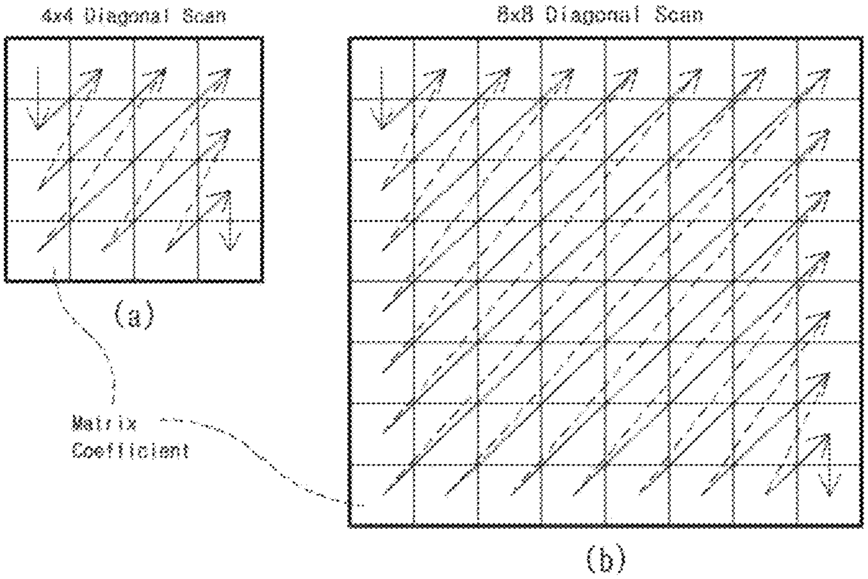
FIGS. 65 to 73 are views illustrating a scan method for a quantization matrix coefficient according to an embodiment of the present invention.

As in the example of FIG. 65, coefficients in a two-dimensional quantization matrix may be aligned in a one-dimensional coefficient array using diagonal scan. In addition, the reconstructed one-dimensional coefficient array may be aligned in the two-dimensional quantization matrix using diagonal scan.

At this time, a diagonal scan direction may be from a left lower side to a right upper side as in the example of FIG. 65 or may be from a right upper side to a left lower side.

When the scan direction is from the left lower side to the right upper side, the scan may be referred to as up-right diagonal scan. In addition, when the scan direction is from the right upper side to the left lower side, the scan may be referred to as down-left diagonal scan.

FIG. 65 shows up-right diagonal scan as diagonal scan.

Figure 66:
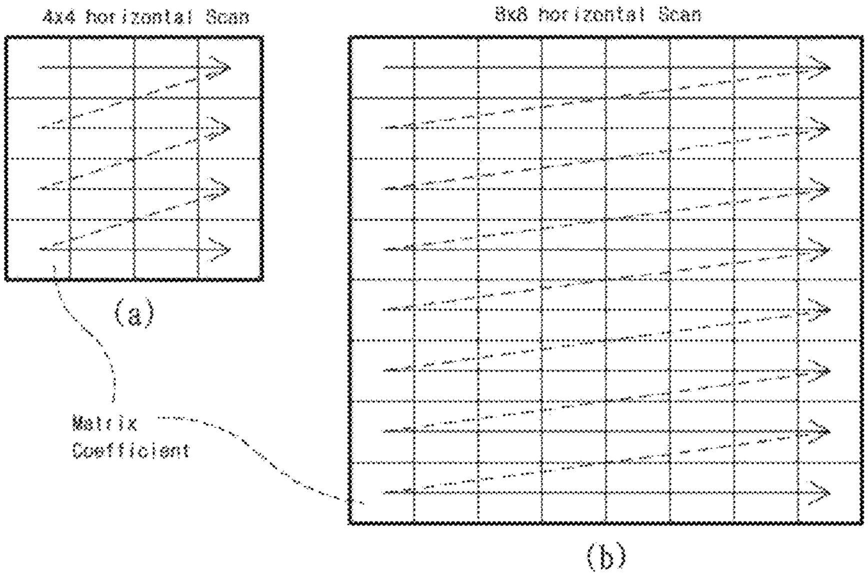

As in the example of FIG. 66, the coefficients in two-dimensional quantization matrix may be aligned in a one-dimensional coefficient array using horizontal scan. In addition, the reconstructed one-dimensional coefficient array may be aligned in a two-dimensional quantization matrix using horizontal scan.

At this time, in horizontal scan, coefficients corresponding to a first row may be preferentially scanned.

Figure 67:
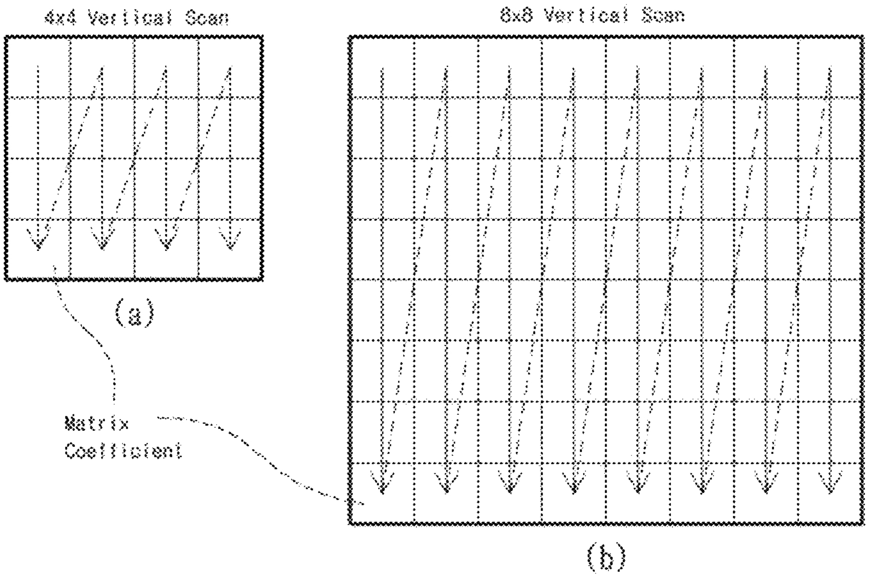

As in the example of FIG. 67, the coefficients in two-dimensional quantization matrix may be aligned in a one-dimensional coefficient array using vertical scan. In addition, the reconstructed one-dimensional coefficient array may be aligned in a two-dimensional quantization matrix using horizontal scan.

At this time, in vertical scan, coefficients corresponding to a first column may be preferentially scanned.

Figure 68:
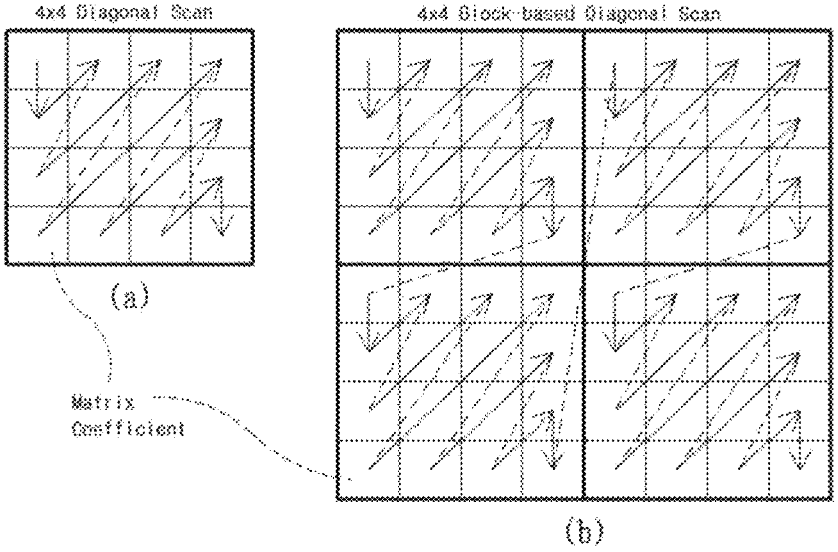

As in the example of FIG. 68, the coefficients in two-dimensional quantization matrix may be aligned in a one-dimensional coefficient array using block-based diagonal scan. In addition, the reconstructed one-dimensional coefficient array may be aligned in a two-dimensional quantization matrix using block-based diagonal scan.

At this time, a block size may be M×N. Here, at least one of M or N may be a positive integer and may be 4. In addition, a block size may be equal to the size of a coefficient group used for transform coefficient encoding/decoding.

The diagonal scan direction may be from a left lower side to a right upper side as in the example of FIG. 68. In addition, the diagonal scan direction may be from a right upper side to a left lower side.

FIG. 68 shows block-based up-right diagonal scan as block-based diagonal scan.

At this time, the block may mean a subblock partitioned from a specific block size. When the block-based scan is used, subblocks in a specific block may be scanned using the same scan method as the scan method of the block.

As in the example of FIG. 68, when the block-based diagonal scan is used, a block having a size of 8×8 may be partitioned into subblocks each having a size of 4×4, the subblocks each having the size of 4×4 may be scanned using diagonal scan, and the coefficients in the subblock may be scanned using diagonal scan.

Figure 69:
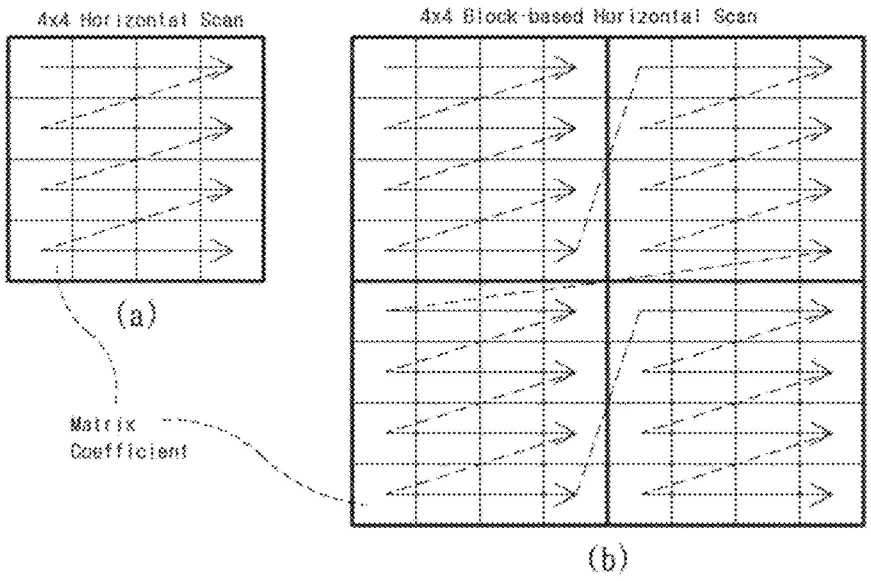

As in the example of FIG. 69, the coefficients in two-dimensional quantization matrix may be aligned in a one-dimensional coefficient array using block-based horizontal scan. In addition, the reconstructed one-dimensional coefficient array may be aligned in a two-dimensional quantization matrix using block-based horizontal scan. At this time, a block size may be 4×4, and blocks corresponding to a first row may be preferentially scanned.

At this time, a block size may be M×N. Here, at least one of M or N may be a positive integer and may be 4. In addition, a block size may be equal to the size of a coefficient group used for transform coefficient encoding/decoding.

At this time, in block-based horizontal scan, blocks corresponding to a first row may be preferentially scanned.

Figure 70:
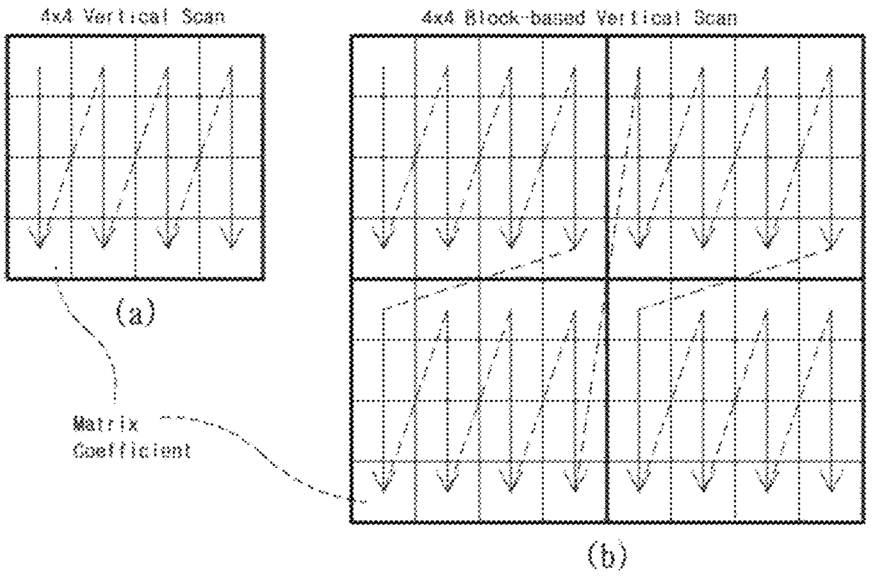

As in the example of FIG. 70, the coefficients in two-dimensional quantization matrix may be aligned in a one-dimensional coefficient array using block-based vertical scan. In addition, the reconstructed one-dimensional coefficient array may be aligned in a two-dimensional quantization matrix using block-based vertical scan.

At this time, a block size may be M×N. Here, at least one of M or N may be a positive integer and may be 4. In addition, a block size may be equal to the size of a coefficient group used for transform coefficient encoding/decoding.

At this time, in block-based vertical scan, blocks corresponding to a first column may be preferentially scanned.

Figure 71:
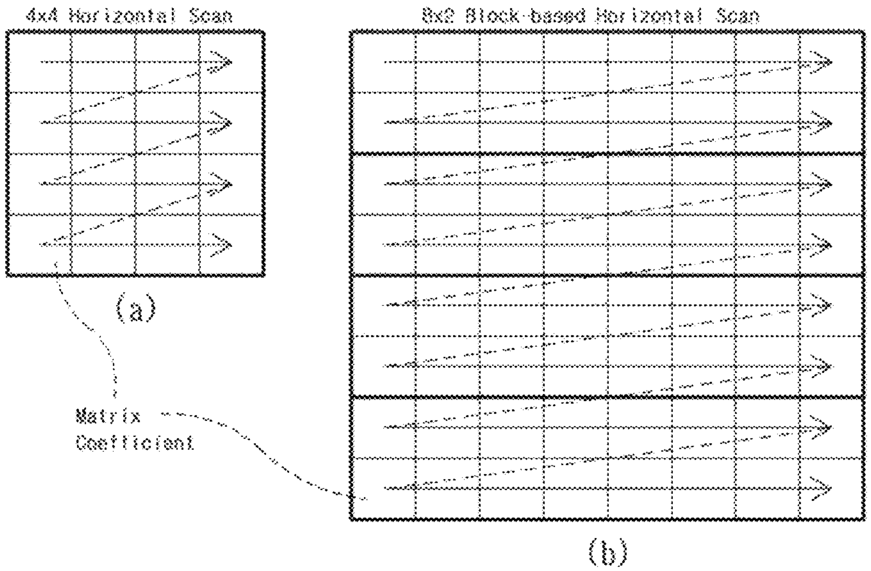

As in the example of FIG. 71, the coefficients in two-dimensional quantization matrix may be aligned in a one-dimensional coefficient array using block-based horizontal scan. In addition, the reconstructed one-dimensional coefficient array may be aligned in a two-dimensional quantization matrix using block-based horizontal scan.

At this time, a block size may be M×N. Here, at least one of M or N may be a positive integer and may be respectively 8 and 2. In addition, a block size may be equal to the size of a coefficient group used for transform coefficient encoding/decoding.

At this time, in block-based horizontal scan, blocks corresponding to a first row may be preferentially scanned.

Figure 72:
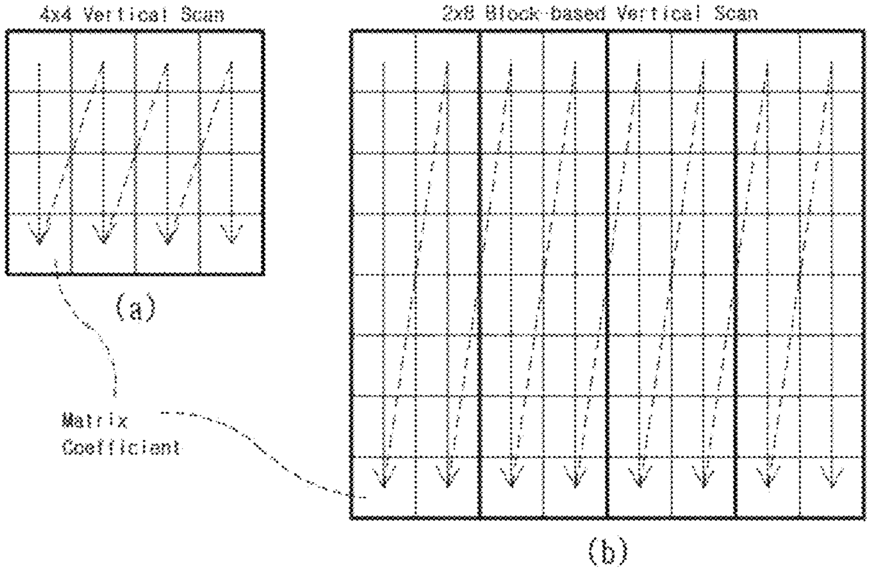

As in the example of FIG. 72, the coefficients in two-dimensional quantization matrix may be aligned in a one-dimensional coefficient array using block-based vertical scan. In addition, the reconstructed one-dimensional coefficient array may be aligned in a two-dimensional quantization matrix using block-based vertical scan.

At this time, a block size may be M×N. Here, at least one of M or N may be a positive integer and may be respectively 2 and 8. In addition, a block size may be equal to the size of a coefficient group used for transform coefficient encoding/decoding.

At this time, in block-based horizontal scan, blocks corresponding to a first column may be preferentially scanned.

As in the example of FIGS. 65 to 72, the scan corresponding to (a) may be used for a quantization matrix having a size of J×K for a J×K block, the scan corresponding to (b) may be used for a quantization matrix having a size of M×N or more for at least one block such as 8×8/16×16/32×32/64×64 or a quantization matrix having a size of M×N. J, K, M and N may be positive integers. In addition, J and K may be less than M and N, respectively. In addition, J×K may be 4×4 and M×N may be 8×8.

Although only the scan method corresponding to a maximum size of 8×8 is shown in the examples of FIGS. 65 to 72, a scan method corresponding to a size of 8×8 is applicable to a scan method corresponding to a size greater than 8×8, and the scan method is applicable not only to a square quantization matrix but also to a non-square quantization matrix.

The encoder may scan the quantization matrix coefficients in order to align the coefficients in a square/non-square two-dimensional quantization matrix in a one-dimensional coefficient array. In addition, the decoder may scan the quantization matrix coefficients in order to align the reconstructed one-dimensional coefficient array in a square/non-square two-dimensional quantization matrix. In addition, the quantization matrix to be aligned in the two-dimensional quantization matrix may be a default matrix predefined in the encoder and the decoder.

Figures 73, 74:
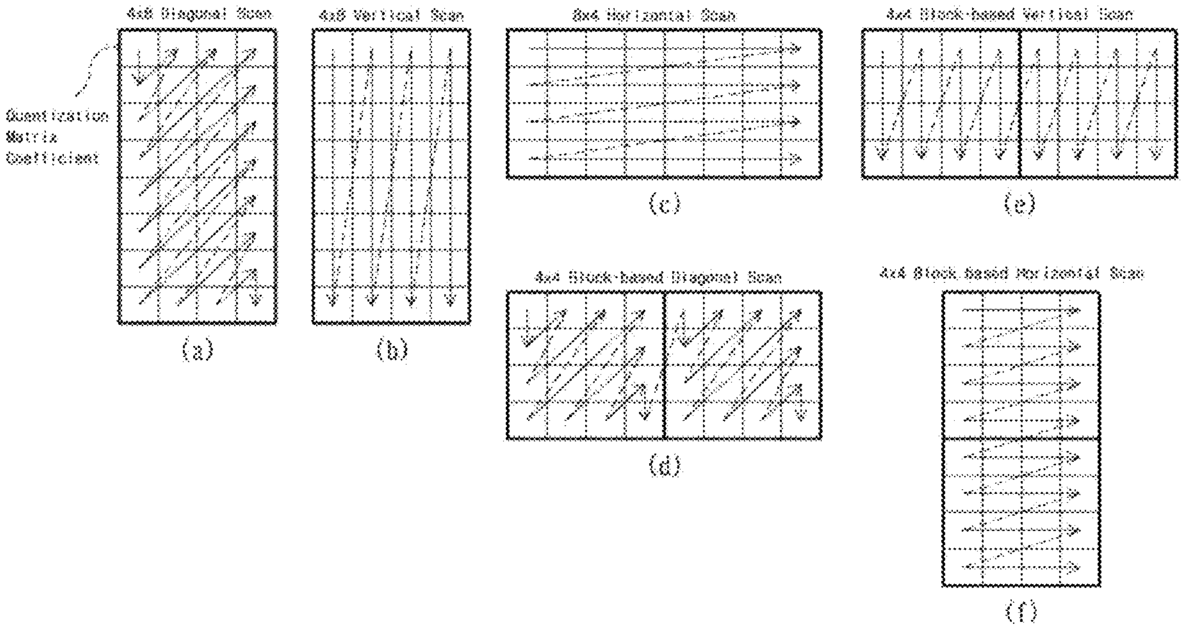
FIGS. 74 to 76 are views illustrating a process of reconstructing a quantization matrix according to an embodiment of the present invention.

As in the example of FIG. 73, at least one of the quantization matrix coefficients may be scanned.

For example, as in the example of (a) of FIG. 73, the coefficients in the two-dimensional quantization matrix may be aligned in a one-dimensional coefficient array using diagonal scan. In addition, the reconstructed one-dimensional coefficient array may be aligned in the two-dimensional quantization matrix using diagonal scan.

At this time, the diagonal scan direction may be from a left lower side to a right upper side as in the example of (a) of FIG. 73 and may be from the right upper side to the left lower side.

When the scan direction is from the left lower side to the right upper side, the scan may be referred to as an up-right diagonal scan. In addition, when the scan direction is from the right upper side to the left lower side, the scan may be referred to as a down-left diagonal scan.

(a) of FIG. 73 shows up-right diagonal scan as diagonal scan.

In another example, as in the example of (b) of FIG. 73, the coefficients in the two-dimensional quantization matrix may be aligned in a one-dimensional coefficient array using the vertical scan. In addition, the reconstructed one-dimensional coefficient array may be aligned in a two-dimensional quantization matrix using the vertical scan.

At this time, in the vertical scan, the coefficients corresponding to a first column may be preferentially scanned.

In another example, as in the example of (c) of FIG. 73, the coefficients in the two-dimensional quantization matrix may be aligned in a one-dimensional coefficient array using the horizontal scan. In addition, the reconstructed one-dimensional coefficient array may be aligned in a two-dimensional quantization matrix using the horizontal scan.

At this time, in the horizontal scan, the coefficients corresponding to a first row may be preferentially scanned.

In another example, as in the example of (d) of FIG. 73, the coefficients in the two-dimensional quantization matrix may be aligned in a one-dimensional coefficient array using the block-based diagonal scan. In addition, the reconstructed one-dimensional coefficient array may be aligned in a two-dimensional quantization matrix using the block-based diagonal scan.

At this time, a block size may be M×N. Here, at least one of M or N may be a positive integer and may be 4. In addition, a block size may be equal to the size of a coefficient group used for transform coefficient encoding/decoding.

The diagonal scan direction may be from a left lower side to a right upper side as in the example of (d) of FIG. 73. In addition, the diagonal scan direction may be from a right upper side to a left lower side.

(d) of FIG. 73 shows block-based up-right diagonal scan as block-based diagonal scan for a 8×4 block.

In another example, as in the example of (e) of FIG. 73, the coefficients in the two-dimensional quantization matrix may be aligned in a one-dimensional coefficient array using the block-based vertical scan for the entire 8×4 block. In addition, the reconstructed one-dimensional coefficient array may be aligned in a two-dimensional quantization matrix using the block-based vertical scan for the entire 8×4 block.

At this time, a block size may be M×N. Here, at least one of M or N may be a positive integer and may be 4. In addition, a block size may be equal to the size of a coefficient group used for transform coefficient encoding/decoding.

At this time, in block-based vertical scan, blocks corresponding to a first column may be preferentially scanned.

In another example, as in the example of (f) of FIG. 73, the coefficients in the two-dimensional quantization matrix may be aligned in a one-dimensional coefficient array using the block-based horizontal scan for the entire 4×8 block. In addition, the reconstructed one-dimensional coefficient array may be aligned in a two-dimensional quantization matrix using the block-based horizontal scan for the entire 4×8 block.

At this time, a block size may be M×N. Here, at least one of M or N may be a positive integer and may be 4. In addition, a block size may be equal to the size of a coefficient group used for transform coefficient encoding/decoding.

At this time, in block-based horizontal scan, blocks corresponding to a first row may be preferentially scanned.

As in the example of FIGS. 65 to 73, when a quantization matrix used for a non-square block has a non-square form, the scan may be performed in a non-square form when the quantization matrix is scanned or a scan for each specific square block unit and a scan in a specific square block unit may be performed by partitioning the corresponding quantization matrix to have a size of M×N which is a specific square block unit. Here, M and N may be positive integers and may have the same value or different values.

Hereinafter, the step of reconstructing the quantization matrix will be described.

Figure 75:
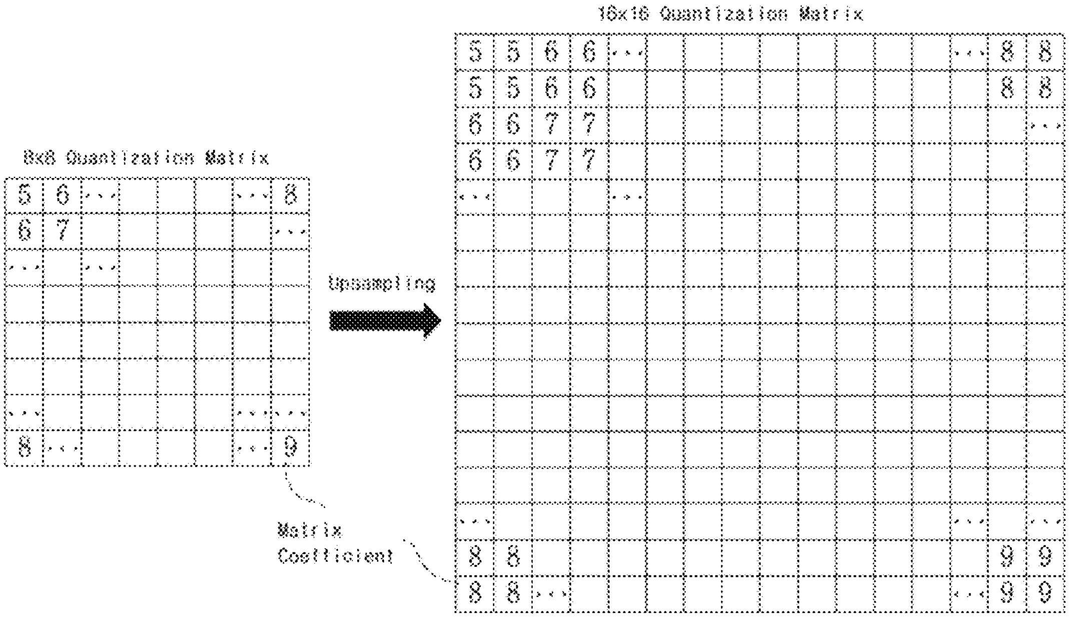
Figure 76:
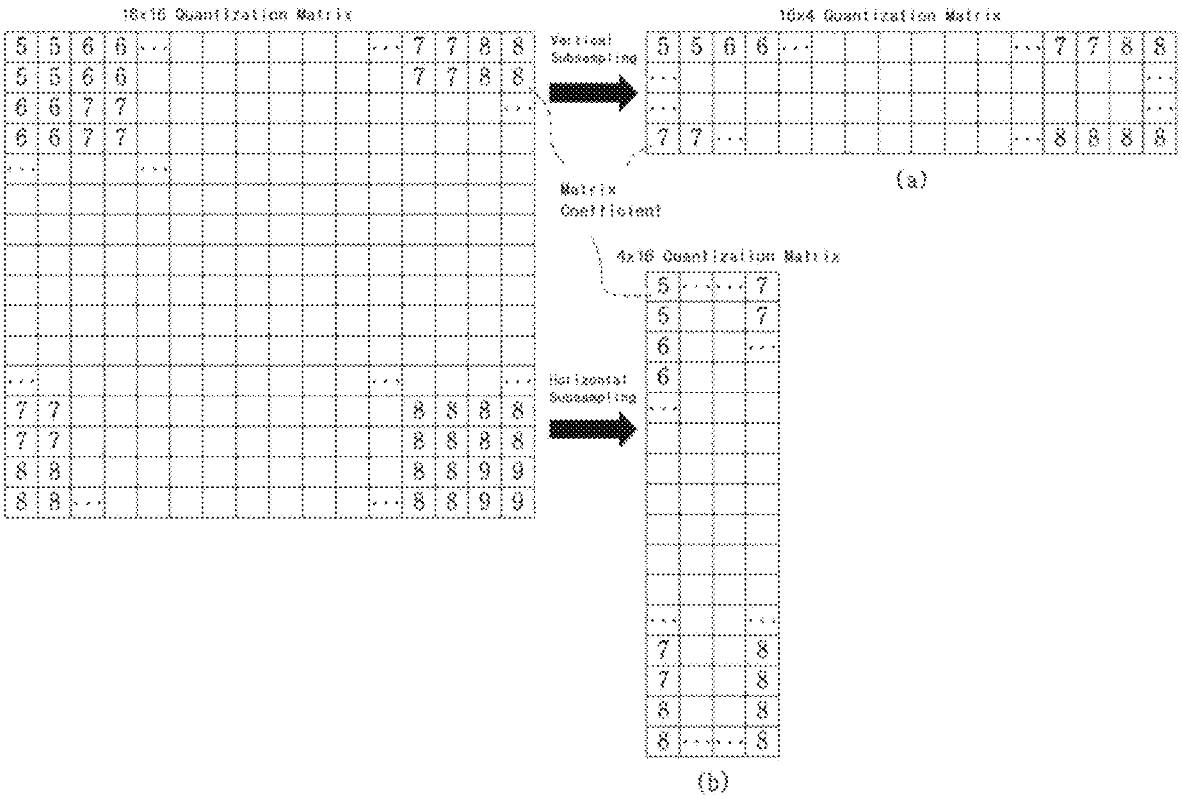

FIGS. 74 to 76 are views illustrating a process of reconstructing a quantization matrix according to an embodiment of the present invention.

The quantization matrix coefficients aligned and reconstructed in the two-dimensional quantization matrix may be reconstructed into a square two-dimensional quantization matrix to be used for quantization/dequantization. At this time, the two-dimensional quantization matrix may be reconstructed using at least one of upsampling, interpolation, DC matrix coefficient or lowest frequency matrix coefficient replacement, subsampling or downsampling. The example of reconstructing the quantization matrix is as follows.

For example, the quantization matrix used for quantization/dequantization of a square block having a size of M×M such as 2×2, 4×4, 8×8, 16×16, 32×32 or 64×64 may be reconstructed using the following method. Here, M may be a positive integer.

As in the example of Equation 1, a quantization matrix RQM used for quantization/dequantization of a block having a size of 2×2 may be reconstructed by performing subsampling with respect to an aligned two-dimensional quantization matrix QM having a size of 4×4.

$$RQM(x, y) = QM(x*F, y*F) \text{ with } x = 0, 1, y = 0, 1, F = 2 \quad \text{[Equation 1]}$$

Alternatively, in the example of Equation 2, in a quantization matrix RQM used for quantization/dequantization of a block having a size of 2×2, the aligned two-dimensional quantization matrix QM having a size of 2×2 may be used without change.

$$RQM(x, y) = QM(x, y) \text{ with } x = 0, 1, y = 0, 1 \quad \text{[Equation 2]}$$

As in the example of Equation 3, in a quantization matrix RQM used for quantization/dequantization of a block having a size of 4×4, the aligned two-dimensional quantization matrix QM having a size of 4×4 may be used without change.

$$RQM(x, y) = QM(x, y) \text{ with } x = 0, 1, \ldots 3, y = 0, 1, \ldots 3 \quad \text{[Equation 3]}$$

As in the example of Equation 4, in a quantization matrix RQM used for quantization/dequantization of a block having a size of 8×8, the aligned two-dimensional quantization matrix QM having a size of 8×8 may be used without change.

$$RQM(x, y) = QM(x, y) \text{ with } x = 0, 1, \ldots 7, y = 0, 1, \ldots 7 \quad \text{[Equation 4]}$$

As in the example of Equation 5, a quantization matrix RQM used for quantization/dequantization of a block having a size of 16×16 may be reconstructed by performing upsampling while copying from a neighbor matrix coefficient closest to the aligned two-dimensional quantization matrix QM having a size of 8×8 as in the example of FIG. 75. In addition, as in the example of Equation 6, the quantization matrix coefficient located at a location (0, 0) in the quantization matrix may be replaced by a value of scaling_list_dc_coef_minus8+8 which is the DC matrix coefficient or the lowest frequency matrix coefficient.

[Equation 5]

$$RQM(x, y) = QM(x/F, y/F) \text{ with } x = 0, 1, \ldots 15, y = 0, 1, \ldots 15, F = 2$$

$$RQM(0, 0) = \text{scaling\_list\_dc\_coef\_minus8} + 8 \quad \text{[Equation 6]}$$

As in the example of Equation 7, a quantization matrix RQM used for quantization/dequantization of a block having a size of 32×32 may be reconstructed by performing upsampling while copying from a neighbor matrix coefficient closest to the aligned two-dimensional quantization matrix QM having a size of 8×8 as in the example of FIG. 75. In addition, as in the example of Equation 8, the quantization matrix coefficient located at a location (0, 0) in the quantization matrix may be replaced by a value of scaling_list_dc_coef_minus8+8 which is the DC matrix coefficient or the lowest frequency matrix coefficient.

[Equation 7]

$$RQM(x, y) = QM(x/F, y/F) \text{ with } x = 0, 1, \ldots 31, y = 0, 1, \ldots 31, F = 4$$

$$RQM(0, 0) = \text{scaling\_list\_dc\_coef\_minus8} + 8 \quad \text{[Equation 8]}$$

As in the example of Equation 9, a quantization matrix RQM used for quantization/dequantization of a block having a size of 64×64 may be reconstructed by performing upsampling while copying from a neighbor matrix coefficient closest to the aligned two-dimensional quantization matrix QM having a size of 8×8 as in the example of FIG. 75. In addition, as in the example of Equation 10, the quantization matrix coefficient located at a location (0, 0) in the quantization matrix may be replaced by a value of scaling_list_dc_coef_minus8+8 which is the DC matrix coefficient or the lowest frequency matrix coefficient.

[Equation 9]

$$RQM(x, y) = QM(x/F, y/F) \text{ with } x = 0, 1, \ldots 63, y = 0, 1, \ldots 63, F = 8$$

$$RQM(0, 0) = \text{scaling\_list\_dc\_coef\_minus8} + 8 \quad \text{[Equation 10]}$$

The quantization matrix coefficients aligned and reconstructed in the two-dimensional quantization matrix may be reconstructed into a non-square two-dimensional quantization matrix to be used for quantization/dequantization. At this time, the two-dimensional quantization matrix may be reconstructed using at least one of upsampling, interpolation, DC matrix coefficient or lowest frequency matrix coefficient replacement, subsampling or downsampling. The example of reconstructing the quantization matrix is as follows.

For example, the quantization matrix used for the non-square block having a size of M×N, such as 4×2, 2×4, 8×4, 8×2, 2×8, 4×8, 16×8, 16×4, 16×2, 2×16, 4×16, 8×16, 32×16, 32×8, 32×4, 32×2, 2×32, 4×32, 8×32, 16×32, 64×32, 64×16, 64×8, 64×4, 64×2, 2×64, 4×64, 8×64, 16×64, 32×64, 128×64, 128×32, 32×128, or 64×128 may be reconstructed using the following method. Here, M and N may be positive integers. In addition, M and N have different values.

As in the example of Equation 11, a quantization matrix RQM used for quantization/dequantization of a block having a size of 8×2 may be reconstructed by performing subsampling with respect to the reconstructed quantization matrix QM having a size of 8×8 while skipping by J (=F−1) rows at a y location (row, vertical direction) as in the example of (a) of FIG. 76. Here, J may be a positive integer.

[Equation 11]

$$RQM(x, y) = QM(x, y*F) \text{ with } x = 0, 1, \ldots 7, y = 0, 1, F = 4$$

As in the example of Equation 12, a quantization matrix RQM used for quantization/dequantization of a block having a size of 2×8 may be reconstructed by performing subsampling with respect to the reconstructed quantization matrix QM having a size of 8×8 while skipping by K (=F−1) columns at an x location (column, horizontal direction) as in the example of (b) of FIG. 76. Here, K may be a positive integer.

[Equation 12]

$$RQM(x, y) = QM(x*F, y) \text{ with } x = 0, 1, y = 0, 1, \ldots , F = 4$$

As in the example of Equation 13, a quantization matrix RQM used for quantization/dequantization of a block having a size of 16×4 may be reconstructed by performing subsampling with respect to the reconstructed quantization matrix QM having a size of 16×16 while skipping by J (=F−1) rows at a y location (row, vertical direction) as in the example of (a) of FIG. 76. Here, J may be a positive integer.

[Equation 13]

$$RQM(x, y) = QM(x, y*F) \text{ with } x = 0, 1, \ldots 15, y = 0, 1, \ldots 3, F = 4$$

As in the example of Equation 14, a quantization matrix RQM used for quantization/dequantization of a block having a size of 4×16 may be reconstructed by performing subsampling with respect to the reconstructed quantization matrix QM having a size of 16×16 while skipping by K (=F−1) columns at an x location (column, horizontal direction) as in the example of (b) of FIG. 76. Here, K may be a positive integer.

[Equation 14]

$$RQM(x, y) = QM(x*F, y) \text{ with } x = 0, 1, \ldots 3, y = 0, 1, \ldots 15, F = 4$$

As in the example of Equation 15, a quantization matrix RQM used for quantization/dequantization of a block having a size of 32×8 may be reconstructed by performing subsampling with respect to the reconstructed quantization matrix QM having a size of 32×32 while skipping by J (=F−1) rows at a y location (row, vertical direction) as in the example of (a) of FIG. 76. Here, J may be a positive integer.

[Equation 15]

$$RQM(x, y) = QM(x, y*F) \text{ with } x = 0, 1, \ldots 31, y = 0, 1, \ldots 7, F = 4$$

As in the example of Equation 16, a quantization matrix RQM used for quantization/dequantization of a block having a size of 8×32 may be reconstructed by performing subsampling with respect to the reconstructed quantization matrix QM having a size of 32×32 while skipping by K (=F−1) columns at an x location (column, horizontal direction) as in the example of (b) of FIG. 76. Here, K may be a positive integer.

[Equation 16]

$$RQM(x, y) = QM(x*F, y) \text{ with } x = 0, 1, \ldots 7, y = 0, 1, \ldots 31, F = 4$$

As in the example of Equation 17, a quantization matrix RQM used for quantization/dequantization of a block having a size of 64×32 may be reconstructed by performing subsampling with respect to the reconstructed quantization matrix QM having a size of 64×64 while skipping by J (=F−1) rows at a y location (row, vertical direction) as in the example of (a) of FIG. 76. Here, J may be a positive integer.

[Equation 17]

$$RQM(x, y) = QM(x, y*F) \text{ with } x = 0, 1, \ldots 63, y = 0, 1, \ldots 31, F = 2$$

As in the example of Equation 18, a quantization matrix RQM used for quantization/dequantization of a block having a size of 32×64 may be reconstructed by performing subsampling with respect to the reconstructed quantization matrix QM having a size of 64×64 while skipping by K (=F−1) columns at an x location (column, horizontal direction) as in the example of (b) of FIG. 76. Here, K may be a positive integer.

[Equation 18]

$$RQM(x, y) = QM(x*F, y) \text{ with } x = 0, 1, \ldots 31, y = 0, 1, \ldots 63, F = 2$$

That is, subsampling may be performed in at least one of the row or the column with respect to a quantization matrix having a size of M×N, thereby reconstructing a quantization matrix having a size of J×K. Here, J, K, M and N may be positive integers. In addition, J and K may be different values.

When a quantization matrix having a size of J×K is generated by subsampling in the row, subsampling may be performed while skipping by (N/K)−1 rows in a quantization matrix having a size of M×N.

When a quantization matrix having a size of J×K is generated by subsampling in the column, subsampling may be performed while skipping by (M/J)−1 columns in a quantization matrix having a size of M×N.

Here, F may be an integer which is a multiple of 2. In addition, F may include 1.

In addition, F may be represented by (M/J). Alternatively, F may be represented by (N/K). Here, J may mean the width of the transform block. In addition, K may mean the height of the transform block.

In addition, as in the example of Equation 18-1, subsampling may be performed with respect to the quantization matrix having the size of M×N while skipping by (Fx−1) columns at an x location (column, horizontal direction) and subsampling may be performed while skipping by (Fy−1) rows at y location (row, vertical direction), thereby reconstructing the quantization matrix RQM used for quantization/dequantization of the block having the size of J×K.

[Equation 18-1]

$$RQM(x, y) = QM(x*Fx, y*Fy) \text{ with } Fx = M/J, Fy = N/K$$

where, each of Fx and Fy may be an integer which is a multiple of 2. In addition, Fx and Fy may be different values.

The reconstructed quantization matrix QM may mean a primary quantization matrix. That is, by performing predetermined subsampling with respect to the primary quantization matrix, it is possible to acquire a final quantization matrix (e.g., RQM) of a current block.

As in the example of FIG. 74, the quantization matrix coefficients aligned and reconstructed into the two-dimensional quantization matrix may be reconstructed into a non-square two-dimensional quantization matrix to be used for quantization/dequantization. At this time, the two-dimensional quantization matrix may be reconstructed using at least one of upsampling, interpolation, DC matrix coefficient or lowest frequency matrix coefficient replacement, subsampling or downsampling, and the quantization matrix may be reconstructed as in the example of Equation 19. At this time, a non-square quantization matrix ScalingFactorR may be reconstructed from a square quantization matrix ScalingFactor.

[Equation 19]

$$ScalingFactorR[SizeIdW][sizeIdH][matrixId][x][y] = ScalingFactor[sId][matrixId][x*rW][y*rH],$$

$$sId = \max(sIdW, sIdH), sIdW = 0 \ldots 6, sIdH = 0 \ldots 6, matrixId = 0 \ldots 5$$

$$\text{or } matrixId = 0 \ldots 8, x = 0 \ldots (1 \ll sIdW) - 1, y = 0 \ldots (1 \ll sIdH) - 1,$$

$$\text{and } rW = (1 \ll sId)/(1 \ll sIdW), rH = (1 \ll sId)/(1 \ll sIdH)$$

If a default matrix used for quantization/dequantization of a block having a size of M×N exists as a default matrix having a size of J×K in order to reduce the memory storage space of a default matrix predefined in the encoder and the decoder, a quantization matrix having a size of M×N may be reconstructed by performing at least one of upsampling, interpolation, subsampling or downsampling while performing copying from a nearest neighbor matrix coefficient. Here, M, N, J and K may be positive integers.

As in the example of Equation 20, a quantization matrix RQM used for quantization/dequantization of a block having a size of 2×2 may be reconstructed by performing subsampling with respect to a default DQM having a size of 4×4.

[Equation 20]

$$RQM(x, y) = DQM(x*F, y*F) \text{ with } x = 0, 1, y = 0, 1, F = 2$$

As in the example of Equation 21, a quantization matrix RQM used for quantization/dequantization of a block having a size of 16×16 may be reconstructed by subsampling a default DQM having a size of 8×8 while performing copying from a nearest neighbor matrix coefficient as in the example of FIG. 75.

[Equation 21]

$$RQM(x, y) = DQM(x/F, y/F) \text{ with } x = 0, 1, \ldots 15, y = 0, 1, \ldots 15, F = 2$$

As in the example of Equation 22, a quantization matrix RQM used for quantization/dequantization of a block having a size of 32×326 may be reconstructed by subsampling a default DQM having a size of 8×8 while performing copying from a nearest neighbor matrix coefficient as in the example of FIG. 75.

[Equation 22]

$$RQM(x, y) = DQM(x/F, y/F) \text{ with } x = 0, 1, \ldots 31, y = 0, 1, \ldots 31, F = 4$$

As in the example of Equation 23, a quantization matrix RQM used for quantization/dequantization of a block having a size of 64×64 may be reconstructed by subsampling a default DQM having a size of 8×8 while performing copying from a nearest neighbor matrix coefficient as in the example of FIG. 75.

[Equation 23]

$$RQM(x, y) = DQM(x/F, y/F) \text{ with } x = 0, 1, \ldots 63, = 0, 1, \ldots 63, F = 8$$

As in the example of Equation 24, a quantization matrix RQM used for quantization/dequantization of a block having a size of 8×2 may be reconstructed by subsampling the default quantization matrix DQM having a size of 8×8 while skipping by J (=F−1) rows at a y location (row, vertical direction) as in the example of (a) of FIG. 76. Here, J may be a positive integer.

[Equation 24]

$$RQM(x, y) = DQM(x, y*F) \text{ with } x = 0, 1, \ldots 7, y = 0, 1, F = 4$$

As in the example of Equation 25, a quantization matrix RQM used for quantization/dequantization of a block having a size of 2×8 may be reconstructed by subsampling the default quantization matrix DQM having a size of 8×8 while skipping by K (=F−1) columns at an x location (column, horizontal direction) as in the example of (b) of FIG. 76. Here, K may be a positive integer.

$$RQM(x, y) = DQM(x*F, y) \text{ with } x = 0, 1, y = 0, 1, \ldots 7, F = 4 \quad \text{[Equation 25]}$$

As in the example of Equation 26, a quantization matrix RQM used for quantization/dequantization of a block having a size of 16×8 may be reconstructed by subsampling the default quantization matrix DQM having a size of 8×8 at an x location (column, horizontal direction).

$$RQM(x, y) = DQM(x/F, y) \text{ with } x = 0, 1, \ldots 15, y = 0, 1, \ldots 7, F = 2 \quad \text{[Equation 26]}$$

As in the example of Equation 27, a quantization matrix RQM used for quantization/dequantization of a block having a size of 8×16 may be reconstructed by subsampling the default quantization matrix DQM having a size of 8×8 at a y location (row, vertical direction).

$$RQM(x, y) = DQM(x, y/F) \text{ with } x = 0, 1, \ldots 7, y = 0, 1, \ldots 15, F = 2 \quad \text{[Equation 27]}$$

As in the example of Equation 28, a quantization matrix RQM used for quantization/dequantization of a block having a size of 16×4 may be reconstructed by upsampling the default matrix DQM having a size of 8×8 at an x location (column, horizontal direction) and subsampling the default matrix DQM having the size of 8×8 at a y location (row, vertical direction) while skipping by J (=F−1) rows. Here, J may be a positive integer.

$$RQM(x, y) = DQM(x/F, y*F) \text{ with } x = 0, 1, \ldots 15, y = 0, 1, \ldots, 3, F = 2 \quad \text{[Equation 28]}$$

As in the example of Equation 29, a quantization matrix RQM used for quantization/dequantization of a block having a size of 4×16 may be reconstructed by upsampling the default quantization matrix DQM having a size of 8×8 at an x location (column, horizontal direction) while skipping by K (=F−1) columns and subsampling the default quantization matrix DQM having the size of 8×8 at a y location (row, vertical direction). Here, K may be a positive integer.

$$RQM(x, y) = DQM(x*F, y/F) \text{ with } x = 0, 1, \ldots 3, y = 0, 1, \ldots, 15, F = 2 \quad \text{[Equation 29]}$$

As in the example of Equation 30, a quantization matrix RQM used for quantization/dequantization of a block having a size of 32×4 may be reconstructed by upsampling the default quantization matrix DQM having a size of 8×8 by Fx at an x location (column, horizontal direction) and subsampling the default quantization matrix DQM having a size of 8×8 at a y location (row, vertical direction) while skipping by J (=Fy−1) rows. Here, J may be a positive integer.

$$RQM(x, y) = DQM(x/Fx, y*Fy) \text{ with } x = 0, 1, \ldots 31, y = 0, 1, \ldots, 3, Fx = 4, Fy = 2 \quad \text{[Equation 30]}$$

As in the example of Equation 31, a quantization matrix RQM used for quantization/dequantization of a block having a size of 4×32 may be reconstructed by upsampling the default quantization matrix DQM having a size of 8×8 columns at an x location (column, horizontal direction) while skipping by K (=Fx−1) columns and subsampling the default quantization matrix DQM having a size of 8×8 by Fy at a y location (row, vertical direction). Here, K may be a positive integer.

$$RQM(x, y) = DQM(x*Fx, y/Fy) \text{ with } x = 0, 1, \ldots 3, y = 0, 1, \ldots, 31, Fx = 2, Fy = 4 \quad \text{[Equation 31]}$$

As in the example of Equation 32, a quantization matrix RQM used for quantization/dequantization of a block having a size of 64×32 may be reconstructed by upsampling the default quantization matrix DQM having a size of 8×8 by Fx and Fy, which are factors having different sizes, at an x location (column, horizontal direction) and a y location (row, vertical direction).

$$RQM(x, y) = DQM(x/Fx, y/Fy) \text{ with } x = 0, 1, \ldots 63, y = 0, 1, \ldots, 31, Fx = 8, Fy = 4 \quad \text{[Equation 32]}$$

As in the example of Equation 33, a quantization matrix RQM used for quantization/dequantization of a block having a size of 32×64 may be reconstructed by upsampling the default quantization matrix DQM having a size of 8×8 by Fx and Fy, which are factors having different sizes, at an x location (column, horizontal direction) and a y location (row, vertical direction).

$$RQM(x, y) = DQM(x/Fx, y/Fy) \text{ with } x = 0, 1, \ldots 31, y = 0, 1, \ldots, 63, Fx = 4, Fy = 8 \quad \text{[Equation 33]}$$

In order to reconstruct the quantization matrix used for quantization/dequantization using the default matrix and the encoded/decoded quantization matrix, at least one of the following methods may be used. At this time, at least one of the following methods may be performed based on the size of at least one of the default matrix, the encoded/decoded quantization matrix, or the quantization matrix used for quantization/dequantization.

For example, subsampling/downsampling may be performed with respect to at least one of the default matrix or the encoded/decoded quantization matrix in the row direction and the column direction, thereby reconstructing the square quantization matrix used for quantization/dequantization.

In another example, upsampling/interpolation may be performed with respect to at least one of the default matrix or the encoded/decoded quantization matrix in the row direction and the column direction, thereby reconstructing the square quantization matrix used for quantization/dequantization.

In another example, subsampling/downsampling may be performed with respect to at least one of the default matrix or the encoded/decoded quantization matrix in the row direction or the column direction, thereby reconstructing the non-square quantization matrix used for quantization/dequantization. At this time, the factors used for subsampling/downsampling may be different from each other in the row direction and the column direction.

In another example, upsampling/interpolation may be performed with respect to at least one of the default matrix or the encoded/decoded quantization matrix in the row direction or the column direction, thereby reconstructing the non-square quantization matrix used for quantization/dequantization. At this time, the factors used for upsampling/interpolation may be different from each other in the row direction and the column direction.

In another example, upsampling/interpolation may be performed in the row direction and subsampling/downsampling may be performed in the column direction with respect to at least one of the default matrix or the encoded/decoded quantization matrix, thereby reconstructing the non-square quantization matrix used for quantization/dequantization. At this time, the factors used for upsampling/interpolation and subsampling/downsampling may be different from each other.

In another example, subsampling/downsampling may be performed in the row direction and upsampling/interpolation may be performed in the column direction with respect to at least one of the default matrix or the encoded/decoded quantization matrix, thereby reconstructing the non-square quantization matrix used for quantization/dequantization. At this time, the factors used for upsampling/interpolation and subsampling/downsampling may be different from each other.

In Equation 1 to Equation 33, QM(x, y) may mean an aligned two-dimensional quantization matrix having a size of 4×4, RQM(x, y) mean a reconstructed quantization matrix, and DQM(x, y) may mean a default matrix.

The upsampling method of performing copying from the nearest neighbor matrix coefficient may be referred to as a nearest neighbor interpolation method or a zeroth order interpolation method.

In addition, the quantization matrix may be reconstructed using at least one of the following methods.

The coefficient ScalingFactor [sizeId][matrixId][ ][ ] of a quantization matrix having a size of 2×2 may be derived as in the example of Equation 34.

$$ScalingFactot[sizeId][matnxId][x][y] = ScalingList[sizeId][matnxId][i] \text{ with } i = 0 \ldots 3, matnxId = 0 \ldots 5 \text{ or } matnxId = 0 \ldots 8, x = ScanOrder[2][0][i][0], \text{ and } y = ScanOrder[2][0][i][1] \quad \text{[Equation 34]}$$

The coefficient ScalingFactor [sizeId][matrixId][ ][ ] of a quantization matrix having a size of 4×4 may be derived as in the example of Equation 35.

$$ScalingFactor[sizeId][matrixId][x][y] = ScalingList[sizeId][matnxId][i] \text{ with } i = 0 \ldots 15, matnxId = 0 \ldots 5 \text{ or } matnxId = 0 \ldots 8, x = ScanOrder[2][0][i][0], \text{ and } y = ScanOrder[2][0][i][1] \quad \text{[Equation 35]}$$

The coefficient ScalingFactor [sizeId][matrixId][ ][ ] of a quantization matrix having a size of 8×8 may be derived as in the example of Equation 36.

$$ScalingFactor[sizeId][matrixId][x][y] = ScalingList[sizeId][matnxId][i] \text{ with } i = 0 \ldots 63, matnxId = 0 \ldots 5 \text{ or } matnxId = 0 \ldots 8, x = ScanOrder[3][0][i][0], \text{ and } y = ScanOrder[3][0][i][1] \quad \text{[Equation 36]}$$

The coefficient ScalingFactor [sizeId][matrixId][ ][ ] of a quantization matrix having a size of 16×16 may be derived as in the examples of Equation 37 and Equation 38.

$$ScalingFactor[x*2+k][y*2+j] = ScalingList[sizeId][matnxId][i] \text{ with } i = 0 \ldots 63, j = 0 \ldots 1, k = 0 \ldots 1, matnxId = 0 \ldots 5 \text{ or } matnxId = 0 \ldots 8, x = ScanOrder[3][0][i][0], \text{ and } y = ScanOrder[3][0][i][1] \quad \text{[Equation 37]}$$

$$ScalingFactor[sizeId][matrixId][0][0] = \text{scaling\_list\_dc\_coef\_minus8}[0][matrixId] + 8 \text{ with } matnxId = 0 \ldots 5 \text{ or } matnxId = 0 \ldots 8 \quad \text{[Equation 38]}$$

The coefficient ScalingFactor [sizeId][matrixId][ ][ ] of a quantization matrix having a size of 32×32 may be derived as in the examples of Equation 39 and Equation 40.

$$ScalingFactor[x*4+k][y*4+j] = ScalingList[sizeId][matnxId][i] \text{ with } i = 0 \ldots 63, j = 0 \ldots 3, k = 0 \ldots 3, matnxId = 0 \ldots 5 \text{ or } matnxId = 0 \ldots 8, x = ScanOrder[3][0][i][0], \text{ and } y = ScanOrder[3][0][i][1] \quad \text{[Equation 39]}$$

$$ScalingFactor[sizeId][matrixId][0][0] = \text{scaling\_list\_dc\_coef\_minus8}[1][matrixId] + 8 \text{ with } matnxId = 0 \ldots 5 \text{ or } matnxId = 0 \ldots 8 \quad \text{[Equation 40]}$$

The coefficient ScalingFactor [sizeId][matrixId][ ][ ] of a quantization matrix having a size of 64×64 may be derived as in the examples of Equation 41 and Equation 42.

$$ScalingFactor[x*8+k][y*8+j] = ScalingList[sizeId][matnxId][i] \text{ with } i = 0 \ldots 63, j = 0 \ldots 7, k = 0 \ldots 7, matnxId = 0 \ldots 5 \text{ or } matnxId = 0 \ldots 8, x = ScanOrder[3][0][i][0], \text{ and } y = ScanOrder[3][0][i][1] \quad \text{[Equation 41]}$$

$$ScalingFactor[sizeId][matrixId][0][0] = \text{scaling\_list\_dc\_coef\_minus8}[1][matrixId] + 8 \text{ with } matnxId = 0 \ldots 5 \text{ or } matnxId = 0 \ldots 8 \quad \text{[Equation 42]}$$

Alternatively, the coefficient ScalingFactor [sizeId][matrixId][ ][ ] of a quantization matrix having a size of 64×64 may be derived as in the examples of Equation 43 and Equation 44.

$$ScalingFactor[x*8+k][y*8+j] = ScalingList[sizeId][matnxId][i] \text{ with } i = 0 \ldots 63, j = 0 \ldots 7, k = 0 \ldots 7, matnxId = 0, 3 \text{ or } matnxId = 0, 3, 6, x = ScanOrder[3][0][i][0], \text{ and } y = ScanOrder[3][0][i][1] \quad \text{[Equation 43]}$$

$$ScalingFactor[sizeId][matrixId][0][0] = \text{scaling\_list\_dc\_coef\_minus8}[1][matrixId] + 8 \text{ with } matnxId = 0, 3 \text{ or } matnxId = 0, 3, 6 \quad \text{[Equation 44]}$$

The size of the quantization matrix used in the quantization/dequantization process and the size of the encoded/decoded quantization matrix may be equal to each other.

For example, when at least one of the width or the height of at least one of a block, a transform or a quantization matrix is less than equal to M, the size of the quantization matrix used in the quantization/dequantization process and the size of the encoded/decoded quantization matrix may be equal to each other. At this time, M may be a positive integer. For example, M may be 8.

The size of the quantization matrix used in the quantization/dequantization process and the size of the encoded/decoded quantization matrix may be different from each other.

For example, when at least one of the width or the height of at least one of a block, a transform or a quantization matrix is greater than M, the size of the quantization matrix used in the quantization/dequantization process and the size of the encoded/decoded quantization matrix may be different from each other. At this time, M may be a positive integer. For example, M may be 8.

When the size of the quantization matrix used in the quantization/dequantization process and the size of the encoded/decoded quantization matrix is different from each other, the encoder may perform at least one of upsampling, interpolation, subsampling or downsampling with respect to the quantization matrix and entropy-encode the quantization matrix.

When the size of the quantization matrix used in the quantization/dequantization process and the size of the encoded/decoded quantization matrix is different from each other, the decoder may perform at least one of upsampling, interpolation, subsampling or downsampling with respect to the entropy-encoded quantization matrix in at least one of a horizontal direction (column direction) and a vertical direction (row direction) and reconstruct the quantization matrix.

When the block size is greater than M×N, a quantization matrix having the same size as the block size may be used in the quantization/dequantization process of the block, represented/constructed by a quantization matrix having a size of J×K, and encoded/decoded.

At this time, M, N, J and K may be positive integers. For example, at least one of M, N, J or K may be 8.

In addition, J may be less than or equal to M, and K may be less than or equal to N.

In the quantization/dequantization process of a block having a size of J×K, a quantization matrix having the same size as the block size is used, represented/constructed by a quantization matrix having a size, in which at least one of J or K is replaced by M, when at least one or J or K is greater than M in the quantization matrix having the size of J×K, and encoded and decoded. At this time, the quantization matrix may be encoded/decoded to have a size of at least one of J×M, M×K or M×M.

At this time, M, N, J and K may be positive integers. For example, at least one of M, N, J or K may be 16.

For example, a quantization matrix having a size of 16×16, 32×32 or 64×64 may be used in a quantization/dequantization for a size of 16×16, 32×32 or 64×64 in quantization/dequantization, represented/constructed by a quantization matrix having a size of 8×8, and encoded/decoded.

For example, the encoder may use a quantization matrix having a size of 16×16, 32×32 or 64×64 in quantization/dequantization and subsample and encode the quantization matrix having the size of 16×16, 32×32 or 64×64 into a quantization matrix having a size of 8×8.

For example, the decoder may decode a quantization matrix having a size of 8×8, perform interpolation and reconstruct a quantization matrix having a size of 16×16, 32×32 or 64×64, and use the quantization matrix having the size of 16×16, 32×32 or 64×64 in dequantization.

In the above example, in case of a block having a width or height greater than 32, such as 64×64, 64×32, 64×16, 16×64 or 32×64, the maximum size of the transform may be 32 in the horizontal or vertical direction. In this case, the size of the quantization matrix used in quantization/dequantization may correspond to the size of the transform. In addition, the quantization matrix may be encoded/decoded to have the size of the quantization matrix corresponding to the size of the transform. For example, the coefficient value of the quantization matrix of the current block may be adjusted in consideration of the transform size of the current block. That is, the coefficients of the region excluding a first region corresponding to the transform size of the current block in the quantization matrix of the current block may be replaced with 0. Here, the first region may be located at the left upper side of the quantization matrix of the current block.

For example, when a 32×32 transform is used in a 64×64 block, the size of the quantization matrix used in quantization/dequantization may be 32×32. Alternatively, in case of a region other than a left upper side having a size of 32×32 in the quantization matrix, the coefficients of the region may be replaced with 0.

In another example, when a 32×32 transform is used in a 64×32 block, the size of the quantization matrix used in quantization/dequantization may be 32×32. Alternatively, in case of a region other than a left upper side having a size of 32×32 in the quantization matrix, the coefficients of the region may be replaced with 0.

In another example, when a 32×16 transform is used in a 64×16 block, the size of the quantization matrix used in quantization/dequantization may be 32×16. Alternatively, in case of a region other than a left upper side having a size of 32×16 in the quantization matrix, the coefficients of the region may be replaced with 0.

At least one of representation, construction, reconstruction, prediction or encoding/decoding of the quantization matrix may be performed by applying at least one of horizontal flipping, vertical flipping or sign change to at least one of quantization matrices.

For example, at least one of horizontal flipping, vertical flipping or sign change may be performed with respect to at least one of the quantization matrices, and the quantization matrix may be used in the quantization/dequantization process.

In another example, at least one of horizontal flipping, vertical flipping or sign change may be performed with respect to at least one of the quantization matrices, and the quantization matrix may be used as a default matrix in the quantization/dequantization process. For example, the quantization matrix may be used as a default matrix in the quantization/dequantization process.

In another example, at least one of horizontal flipping, vertical flipping or sign change may be performed with respect to at least one of the quantization matrices, and the quantization matrix may be used as a reference matrix. For example, the quantization matrix may be used as a reference matrix in the quantization/dequantization process.

In another example, at least one of horizontal flipping, vertical flipping or sign change may be performed with respect to at least one of the quantization matrices, thereby performing prediction between quantization matrices.

In another example, at least one of horizontal flipping, vertical flipping or sign change may be performed with respect to at least one of the quantization matrices, thereby performing predictive encoding/decoding with respect to the coefficients in the quantization matrix.

In addition, for example, at least one of horizontal flipping, vertical flipping or sign change may be applied to at least one of quantization matrices used in a DST-7 based transform to derive a quantization matrix used in a DCT-8 based transform, thereby performing at least one of representation, construction, reconstruction, prediction or encoding/decoding of the quantization matrix. The quantization matrix may be used in the quantization/dequantization process. At this time, horizontal flipping or vertical flipping may be performed.

In another example, at least one of horizontal flipping, vertical flipping or sign change may be applied to at least one of quantization matrices used in a DCT-8 based transform to derive a quantization matrix used in a DST-7 based transform, thereby performing at least one of representation, construction, reconstruction, prediction or encoding/decoding of the quantization matrix. The quantization matrix may be used in the quantization/dequantization process. At this time, horizontal flipping or vertical flipping may be performed.

In another example, at least one of horizontal flipping, vertical flipping or sign change may be applied to at least one of quantization matrices used in a DST-4 based transform to derive a quantization matrix used in a DCT-4 based transform, thereby performing at least one of representation, construction, reconstruction, prediction or encoding/decoding of the quantization matrix. The quantization matrix may be used in the quantization/dequantization process. At this time, horizontal flipping or vertical flipping may be performed.

In another example, at least one of horizontal flipping, vertical flipping or sign change may be applied to at least one of quantization matrices used in a DCT-4 based transform to derive a quantization matrix used in a DST-4 based transform, thereby performing at least one of representation, construction, reconstruction, prediction or encoding/decoding of the quantization matrix. The quantization matrix may be used in the quantization/dequantization process. At this time, horizontal flipping or vertical flipping may be performed.

In addition, for example, at least one of horizontal flipping, vertical flipping or sign change may be applied to at least one of quantization matrices used in the horizontal transform and the vertical transform, that is, DST-7 and DST-7 based transforms, to derive a quantization matrix used in the horizontal transform and the vertical transform, that is, DCT-8 and DCT-8 based transforms, thereby performing at least one of representation, construction, reconstruction, prediction or encoding/decoding of the quantization matrix. The quantization matrix may be used in the quantization/dequantization process. At this time, horizontal flipping or vertical flipping may also be performed.

In another example, at least one of horizontal flipping, vertical flipping or sign change may be applied to at least one of quantization matrices used in the horizontal transform and the vertical transform, that is, DCT-8 and DCT-8 based transforms, to derive a quantization matrix used in the horizontal transform and the vertical transform, that is, DST-7 and DST-7 based transforms, thereby performing at least one of representation, construction, reconstruction, prediction or encoding/decoding of the quantization matrix. The quantization matrix may be used in the quantization/dequantization process. At this time, horizontal flipping or vertical flipping may also be performed.

In another example, at least one of horizontal flipping, vertical flipping or sign change may be applied to at least one of quantization matrices used in the horizontal transform and the vertical transform, that is, DCT-8 and DST-7 based transforms to derive a quantization matrix used in the horizontal transform and the vertical transform, that is, DST-7 and DCT-8 based transforms, thereby performing at least one of representation, construction, reconstruction, prediction or encoding/decoding of the quantization matrix. The quantization matrix may be used in the quantization/dequantization process.

In another example, at least one of horizontal flipping, vertical flipping or sign change may be applied to at least one of quantization matrices used in the horizontal transform and the vertical transform, that is, DST-7 and DCT-8 based transforms, to derive a quantization matrix used in the horizontal transform and the vertical transform, that is, DCT-8 and DST-7 based transforms, thereby performing at least one of representation, construction, reconstruction, prediction or encoding/decoding of the quantization matrix. The quantization matrix may be used in the quantization/dequantization process.

In addition, for example, at least one of horizontal flipping, vertical flipping or sign change may be applied to at least one of quantization matrices used in the horizontal transform and the vertical transform, that is, DST-4 and DST-4 based transforms, to derive a quantization matrix used in the horizontal transform and the vertical transform, that is, DCT-4 and DCT-4 based transforms, thereby performing at least one of representation, construction, reconstruction, prediction or encoding/decoding of the quantization matrix. The quantization matrix may be used in the quantization/dequantization process. At this time, horizontal flipping or vertical flipping may also be performed.

In another example, at least one of horizontal flipping, vertical flipping or sign change may be applied to at least one of quantization matrices used in the horizontal transform and the vertical transform, that is, DCT-4 and DCT-4 based transforms, to derive a quantization matrix used in the horizontal transform and the vertical transform, that is, DST-4 and DCT-4 based transforms, thereby performing at least one of representation, construction, reconstruction, prediction or encoding/decoding of the quantization matrix. The quantization matrix may be used in the quantization/dequantization process. At this time, horizontal flipping or vertical flipping may also be performed.

In another example, at least one of horizontal flipping, vertical flipping or sign change may be applied to at least one of quantization matrices used in the horizontal transform and the vertical transform, that is, DCT-4 and DST-4 based transforms, to derive a quantization matrix used in the horizontal transform and the vertical transform, that is, DST-4 and DCT-4 based transforms, thereby performing at least one of representation, construction, reconstruction, prediction or encoding/decoding of the quantization matrix. The quantization matrix may be used in the quantization/dequantization process. At this time, horizontal flipping or vertical flipping may also be performed.

In another example, at least one of horizontal flipping, vertical flipping or sign change may be applied to at least one of quantization matrices used in the horizontal transform and the vertical transform, that is, DST-4 and DCT-4 based transforms, to derive a quantization matrix used in the horizontal transform and the vertical transform, that is, DCT-4 and DST-4 based transforms, thereby performing at least one of representation, construction, reconstruction, prediction or encoding/decoding of the quantization matrix. The quantization matrix may be used in the quantization/dequantization process. At this time, horizontal flipping or vertical flipping may also be performed.

At least one of DST-7, DCT-8, DST-4 or DCT-4 may be a transform using a transform matrix extracted from at least one of DCT-J or DST-K based integer transforms, such as DCT-2, DCT-8, DST-7, DCT-4, DST-4, etc.

FIGS. 77 to 88 are views illustrating syntax element information, semantics of the syntax element information and an encoding/decoding process necessary to implement a quantization matrix encoding/decoding method and apparatus and a recording medium for storing a bitstream according to an embodiment of the present invention.

FIGS. 89 to 100 are views illustrating a default matrix used in a quantization/dequantization process according to an embodiment of the present invention.

Referring to FIGS. 89 to 92, similar to the examples of FIGS. 21 to 22, a default matrix having a size of J×K predefined in the encoder and the decoder may be used in the quantization/dequantization process of a block having a size of M×N.

Here, ScalingList[sizeId][matrixId][i] may indicate a default quantization matrix coefficient corresponding to sizeId, matrixId and i, and sizeId and matrixId may mean those defined in FIGS. 55 and 56 or FIGS. 58 and 59.

Referring to FIGS. 93 to 96, similar to the examples of FIGS. 21 to 22, a default matrix having a size of J×K predefined in the encoder and the decoder may be used in the quantization/dequantization process of a block having a size of M×N.

Here, ScalingList[sizeId][matrixId][i] may indicate a default quantization matrix coefficient corresponding to sizeId, matrixId and i, and sizeId and matrixId may mean those defined in FIGS. 55 and 56 or FIGS. 58 and 59.

Referring to FIGS. 97 to 100, similar to the examples of FIGS. 21 to 22, a default matrix having a size of J×K predefined in the encoder and the decoder may be used in the quantization/dequantization process of a block having a size of M×N. The matrix coefficient values of the default matrix may all have constant values regardless of the prediction mode, the color component, the block size, etc.

Here, ScalingList[sizeId][matrixId][i] may indicate a default quantization matrix coefficient corresponding to sizeId, matrixId and i, and sizeId and matrixId may mean those defined in FIGS. 55 and 56 or FIGS. 58 and 59. That is, the default matrix coefficient values may all be set to a fixed value regardless of sizeId and matrixId. At this time, the fixed value may be a positive integer including 0 and may be 16.

FIGS. 101 to 134 are views illustrating syntax element information, semantics of the syntax element information and an encoding/decoding process necessary to implement a quantization matrix encoding/decoding method and apparatus and a recording medium for storing a bitstream according to another embodiment of the present invention.

Referring to FIGS. 124 to 130, the matrix coefficient values of a default matrix may all have a constant value regardless of the prediction mode, the color component and the block size. For example, the constant value may be 16. The block size may mean the size of the current block and the transform block.

Meanwhile, there are three modes in the quantization matrix (an Off mode, a Default mode, a User-defined mode). In the Default mode, the matrix coefficient values of the quantization matrix may all be 16.

Meanwhile, the DC matrix coefficient value may be separately signaled with respect to a quantization matrix having a size of 16×16, 32×32 or 64×64.

In case of a transform block having a size less than 8×8, all elements of the quantization matrix may be signaled.

In contrast, in case of a transform block having a size of greater than 8×8 (e.g., 16×16, 32×32, 64×64), 64 elements of one quantization matrix having a size of 8×8 may be signaled as a base scaling matrix. In addition, a square matrix having a size greater than 8×8 may be acquired by upsampling an 8×8 base scaling matrix.

In a W×H (weight×height) non-square transform block, when H is greater than W, the quantization matrix of the block may be derived from a reference quantization matrix having a size of baseL×baseL as in the example of Equation 45. Here, baseL may mean min (log 2(H),3).

$$ScalingMatrix(i, j) = ScalingList\left[baseL \times \text{int}\left(j/ratioH\right) + \text{int}\left(\left(i \times ratioHW\right)/ratioH\right)\right], \quad \text{[Equation 45]}$$

$$\text{for } i = 0\text{: } W-1,\ j = 0\text{: } H-1, \text{ and } ratioH = H/baseL = ratioHW = H/W.$$

Alternatively, in a W×H (weight×height) non-square transform block, when W is greater than H, the quantization matrix of the block may be derived from a reference quantization matrix having a size of baseL×baseL as in the example of Equation 46. Here, baseL may mean min (log 2(W),3).

$$ScalingMatrix(1, j) = \quad \text{[Equation 46]}$$

$$ScalingList\left[baseL \times \text{int}\left(\left(j \times ratioWH/ratioW\right) + \text{int}(w)\right],\right.$$

$$\text{for } i = 0\text{: } W-1,\ j = 0\text{: } H-1, \text{ and}$$

$$ratioW = W/baseL,\ ratioWH = W/H.$$

In addition, referring to FIGS. 133 to 134, a quantization matrix may be derived based on information (e.g., pic_dep_quant_enabled_flag) on whether dependent quantization is possible with respect to a slice associated with a picture header. Here, the information may be entropy-encoded/decoded in a tile header.

Figure 135:
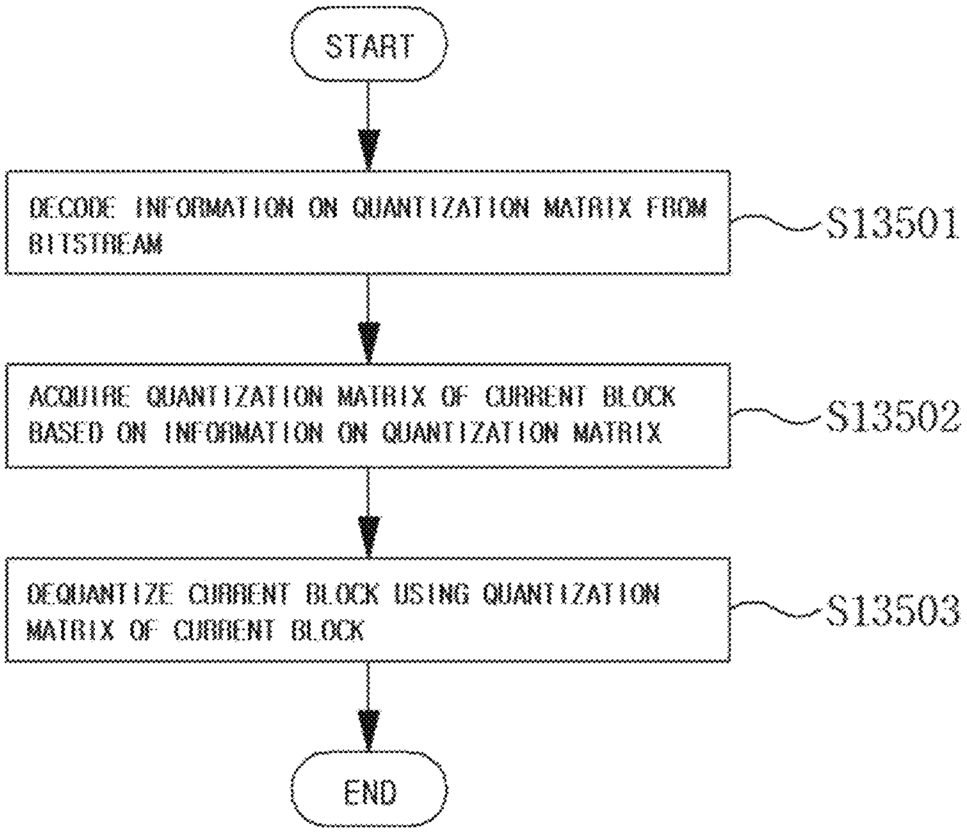
FIG. 135 is a flowchart illustrating an image decoding method according to another embodiment of the present invention.

FIG. 135 is a flowchart illustrating an image decoding method according to another embodiment of the present invention.

The decoder may decode information on a quantization matrix from a bitstream (S13501).

The quantization matrix of the current block may be acquired based on the information on the quantization matrix (S13502).

Here, acquiring the quantization matrix of the current block may mean that a single identifier is derived using at least one of the size of the current block, a prediction mode or a color component and the quantization matrix of the current block is acquired based on the single identifier.

The information on the quantization matrix includes quantization matrix prediction method information, and the quantization matrix prediction method information may be decoded in an adaptation parameter set.

The prediction mode includes an intra mode, an inter mode and an IBC (Intra Block Copy) mode, and a single identifier for the inter mode and a single identifier for the IBC mode may be the same.

The information on the quantization matrix includes information on whether the quantization matrix is present, and, when the information on whether the quantization matrix is present indicates that the quantization matrix is not present, all the coefficient values of the quantization matrix of the current block may have a predetermined constant value. For example, the predetermined constant value may be 16.

In addition, acquiring the quantization matrix of the current block mean that the coefficient values of the quantization matrix of the current block may be adjusted in consideration of the transform size of the current block.

Adjustment of the coefficient values of the quantization matrix of the current block may mean that the coefficients of the region other than a first region corresponding to the transform size of the current block in the quantization matrix of the current block may be replaced with 0.

The first region may be located at the left upper side of the quantization matrix of the current block.

In addition, acquiring the quantization matrix of the current block may mean that a default quantization matrix is acquired based on the information on the quantization matrix. All the coefficient values of the default quantization matrix may have a predetermined constant value regardless of the size of the current block.

In addition, acquiring the quantization matrix of the current block may mean that subsampling is performed with respect to a reconstructed primary quantization matrix based on the information on the quantization matrix. Subsampling may be performed in at least one of the horizontal direction or the vertical direction of the primary quantization matrix.

The current block may be dequantized using the quantization matrix of the current block (S13503).

Figure 136:
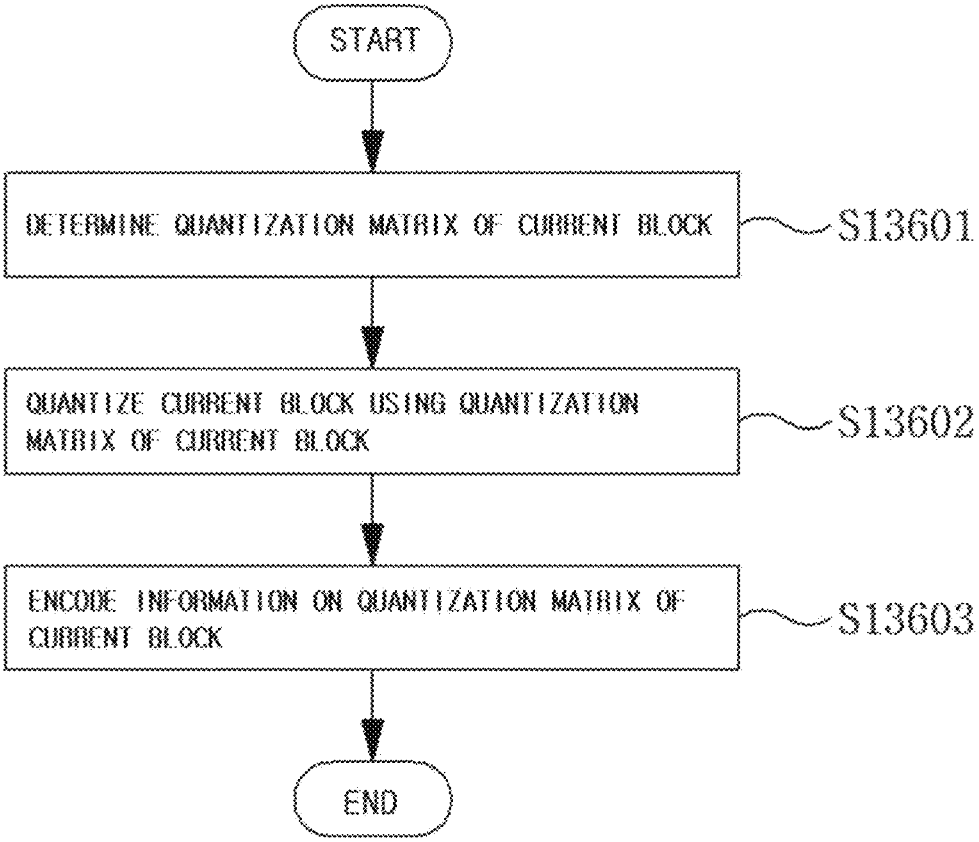
FIG. 136 is a flowchart illustrating an image encoding method according to another embodiment of the present invention.

FIG. 136 is a flowchart illustrating an image encoding method according to another embodiment of the present invention.

The encoder may determine the quantization matrix of the current block (S13601).

The current block may be quantized using the quantization matrix of the current block (S13602).

Information on the quantization matrix of the current block may be encoded (S13603).

Encoding the information on the quantization matrix of the current block may mean that a single identifier is derived using at least one of the size of the current block, a prediction mode or a color component and the information on the quantization matrix of the current block is encoded based on the single identifier.

The information on the quantization matrix includes quantization matrix prediction method information, and the quantization matrix prediction method information may be encoded in an adaptation parameter set.

The prediction mode includes an intra mode, an inter mode and an IBC (Intra Block Copy) mode, and a single identifier for the inter mode and a single identifier for the IBC mode may be the same.

When the quantization matrix is not present, all the coefficient values of the quantization matrix of the current block may have a predetermined constant value.

The predetermined constant value may be 16.

In addition, encoding the quantization matrix of the current block mean that the coefficient values of the quantization matrix of the current block may be adjusted in consideration of the transform size of the current block.

Adjustment of the coefficient values of the quantization matrix of the current block may mean that the coefficients of the region other than a first region corresponding to the transform size of the current block in the quantization matrix of the current block may be replaced with 0.

The first region may be located at the left upper side of the quantization matrix of the current block.

In addition, encoding the quantization matrix of the current block may mean that the information on the quantization matrix of the current block is encoded based on a default quantization matrix. All the coefficient values of the default quantization matrix may have a predetermined constant value regardless of the size of the current block.

In addition, provided is a non-transitory computer-readable recording medium for storing a bitstream generated by an image encoding method, the image encoding method including determining a quantization matrix of a current block, quantizing the current block using the quantization matrix of the current block, and encoding information on the quantization matrix of the current block, wherein the encoding of the information on the quantization matrix of the current block includes deriving a single identifier using at least one of a size of the current block, a prediction mode or a color component, and encoding the information on the quantization matrix of the current block based on the single identifier.

The encoder may perform quantization/dequantization using the quantization matrix in the quantization/dequantization process through the above-described embodiments. In addition, the decoder may perform dequantization using the reconstructed quantization matrix in the dequantization process through the above-described embodiments. The reconstructed quantization matrix may be a two-dimensional quantization matrix.

In the above-described embodiments, at least one of representation, construction, reconstruction, prediction or encoding/decoding of the quantization matrix may be performed such that different quantization matrices are used in the quantization/dequantization process based on at least one of the prediction mode of a block, a color component, a size, a form, a one-dimensional transform type, a two-dimensional transform combination, or whether transform is used. At this time, at least one of quantization matrices subjected to at least one of representation, construction, reconstruction, prediction or encoding/decoding may be a quantization matrix in which at least one of the coefficients in the quantization matrix is different according to a prediction mode, a color component, a size, a form, a one-dimensional transform type, a two-dimensional transform combination, or whether transform is used.

In the above-described embodiments, the encoder may generate a transform coefficient level using a quantization matrix in transform coefficients in the quantization process and the decoder may generate a transform coefficient using a quantization in a transform coefficient level in the dequantization process. In the present invention, for convenience, the transform coefficient and the transform coefficient level are collectively referred to as a transform coefficient.

In the above-described embodiments, a quantization matrix having a size of M×N or N×M may be derived from a square quantization matrix having a size of M×M, representation of a quantization matrix having a size of M×M in the quantization/dequantization process may mean not only a square quantization matrix having a size of M×M but also a non-square quantization matrix having a size of M×N or N×M. Here, M and N may be positive value and may have a value between 2 to 64. M and N may be different values.

For example, since a non-square quantization matrix having a size of 16×4 or 4×16 in the quantization/dequantization process is derived from a square quantization matrix having a size of 16×16, representation of a quantization matrix having a size of 16×16 in the quantization/dequantization process may mean not only a square quantization matrix having a size of 16×16 but also a non-square quantization matrix having a size of 16×4 or 4×16.

In the above-described embodiments, the information on the quantization matrix may mean at least one of the quantization matrix or information necessary to derive the quantization matrix. At this time, the information necessary to derive the quantization matrix may include at least one of information whether the quantization matrix is used, the information on whether the quantization matrix is present, the quantization matrix prediction method information, a reference matrix identifier, a DC matrix coefficient or a lowest frequency matrix coefficient, or a difference value between the quantization matrix coefficient value encoded/decoded previously in the quantization matrix and the encoding/decoding target quantization matrix coefficient value.

The embodiments of the present invention are applicable according to the size of at least one of the block or the unit. The size may be defined as a minimum size and/or a maximum size for application of the embodiments and may be defined as a fixed size, to which the embodiments are applied. In addition, the first embodiment is applicable in a first size and the second embodiment is applicable in a second size. In addition, the embodiments of the present invention are applicable only in case of a minimum size or more and a maximum size or less. That is, the embodiments are applicable only when the block size is in a certain range.

In addition, the embodiments of the present invention are applicable only in case of a minimum size or more and a maximum size or less. The minimum size and the maximum size may be the size of one of the block or the unit. That is, a target block having a minimum size and a target block having a maximum size may be different from each other. For example, the embodiments of the present invention are applicable only when the size of the current block is equal to or greater than a minimum size of the block or is equal to or less than the maximum size of the block.

For example, the embodiments are applicable only when the size of the current block is equal to or greater than 8×8. For example, the embodiments are applicable only when the size of the current block is equal to or greater than 16×16. For example, the embodiments are applicable only when the size of the current block is equal to or greater than 32×32. For example, the embodiments are applicable only when the size of the current block is equal to or greater than 64×64. For example, the embodiments are applicable only when the size of the current block is equal to or greater than 128×128. For example, the embodiments are applicable only when the size of the current block is 4×4. For example, the embodiments are applicable only when the size of the current block is equal to or less than 8×8. For example, the embodiments are applicable only when the size of the current block is equal to or less than 16×16. For example, the embodiments are applicable only when the size of the current block is equal to or greater than 8×8 and is equal to or less than 16×16. For example, the embodiments are applicable only when the size of the current block is equal to or greater than 16×16 and is equal to or less than 64×64.

The form of the block, to which the embodiments of the present invention are applicable, may be a square or a non-square.

At least one of the syntax elements (flag, index, etc.) entropy-encoded by the encoder and entropy-decoded by the decoder may use at least one of the following binarization methods.

Truncated Rice binarization method
K-th order Exp_Golomb binarization method
Restricted K-th order Exp_Golomb binarization method
Fixed-length binarization method
Unary binarization method
Truncated Unary binarization method
Truncated Binary binarization method Only one of the embodiments is not applied to the encoding/decoding of the current block and a specific embodiment or a combination of the above-described embodiments is applicable to the encoding/decoding process of the current block.

The above embodiments may be performed in the same method in an encoder and a decoder.

At least one or a combination of the above embodiments may be used to encode/decode a video.

A sequence of applying to above embodiment may be different between an encoder and a decoder, or the sequence applying to above embodiment may be the same in the encoder and the decoder.

The above embodiment may be performed on each luma signal and chroma signal, or the above embodiment may be identically performed on luma and chroma signals.

A block form to which the above embodiments of the present invention are applied may have a square form or a non-square form.

The above embodiment of the present invention may be applied depending on a size of at least one of a coding block, a prediction block, a transform block, a block, a current block, a coding unit, a prediction unit, a transform unit, a unit, and a current unit. Herein, the size may be defined as a minimum size or maximum size or both so that the above embodiments are applied, or may be defined as a fixed size to which the above embodiment is applied. In addition, in the above embodiments, a first embodiment may be applied to a first size, and a second embodiment may be applied to a second size. In other words, the above embodiments may be applied in combination depending on a size. In addition, the above embodiments may be applied when a size is equal to or greater that a minimum size and equal to or smaller than a maximum size. In other words, the above embodiments may be applied when a block size is included within a certain range.

For example, the above embodiments may be applied when a size of current block is 8×8 or greater. For example, the above embodiments may be applied when a size of current block is 4×4 only. For example, the above embodiments may be applied when a size of current block is 16×16 or smaller. For example, the above embodiments may be applied when a size of current block is equal to or greater than 16×16 and equal to or smaller than 64×64.

The above embodiments of the present invention may be applied depending on a temporal layer. In order to identify a temporal layer to which the above embodiments may be applied, a corresponding identifier may be signaled, and the above embodiments may be applied to a specified temporal layer identified by the corresponding identifier. Herein, the identifier may be defined as the lowest layer or the highest layer or both to which the above embodiment may be applied, or may be defined to indicate a specific layer to which the embodiment is applied. In addition, a fixed temporal layer to which the embodiment is applied may be defined.

For example, the above embodiments may be applied when a temporal layer of a current image is the lowest layer. For example, the above embodiments may be applied when a temporal layer identifier of a current image is 1. For example, the above embodiments may be applied when a temporal layer of a current image is the highest layer.

A slice type or a tile group type to which the above embodiments of the present invention are applied may be defined, and the above embodiments may be applied depending on the corresponding slice type or tile group type.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used to encode or decode an image.

The invention claimed is:

1. A method of decoding quantized transform coefficients of a current block which have been encoded in a bitstream, the method comprising:

decoding information on a quantization matrix from the bitstream;

determining a plurality of quantization matrices based on the information on the quantization matrix, wherein the plurality of quantization matrices are identified by a single identifier, and respectively correspond to values of the single identifier which are assigned according to block sizes, prediction modes and color components;

deriving a value of the single identifier for indicating a quantization matrix of the current block among the plurality of quantization matrices, by using a size of the current block, a prediction mode used for predicting the current block, and a color component of the current block;

reconstructing the quantized transform coefficients from the bitstream; and determining the quantization matrix of the current block based on the value of the single identifier for indicating the quantization matrix of the current block, and dequantizing the quantized transform coefficients using the quantization matrix of the current block, wherein the information on the quantization matrix contains syntax elements for representing quantization matrix coefficients, wherein the information on the quantization matrix to be used for the current block having a size greater than 8×8 contains the syntax elements up to a maximum of 64 corresponding to a 8×8 block, wherein the information on the quantization matrix to be used for the current block having a size equal to 64×64 does not contain the syntax elements which correspond to a bottom-right 4×4 block in the 8×8 block.

2. A method of encoding residuals of a current block into a bitstream, the method comprising:

determining a plurality of quantization matrices, wherein the plurality of quantization matrices are identified by a single identifier, and respectively correspond to values of the single identifier which are assigned according to block sizes, prediction modes and color components;

deriving a value of the single identifier for indicating a quantization matrix of the current block among the plurality of quantization matrices, by using a size of the current block, a prediction mode used for predicting the current block, and a color component of the current block;

transforming the residuals of the current block to generate transform coefficients;

determining the quantization matrix of the current block based on the value of the single identifier for indicating the quantization matrix of the current block, and quantizing the transform coefficients using the quantization matrix of the current block; and encoding information on the quantization matrix indicating the plurality of quantization matrices and encoding the quantized transform coefficients, wherein the information on the quantization matrix contains syntax elements for representing quantization matrix coefficients, wherein the information on the quantization matrix to be used for the current block having a size greater than 8×8 contains the syntax elements up to a maximum of 64 corresponding to a 8×8 block, wherein the information on the quantization matrix to be used for the current block having a size equal to 64×64 does not contain the syntax elements which correspond to a bottom-right 4×4 block in the 8×8 block.

3. A bitstream transmitting method comprising:

generating a bitstream based on an image encoding method of encoding residuals of a current block; and transmitting the generated bitstream, and wherein the image encoding method comprises:

determining a plurality of quantization matrices, wherein the plurality of quantization matrices are identified by a single identifier, and respectively correspond to values of a single identifier which are assigned according to block sizes, prediction modes and color components;

deriving a value of the single identifier for indicating a quantization matrix of the current block among the plurality of quantization matrices, by using a size of the current block, a prediction mode used for predicting the current block, and a color component of the current block;

transforming the residuals of the current block to generate transform coefficients;

determining the quantization matrix of the current block based on the value of the single identifier for indicating the quantization matrix of the current block, and quantizing the transform coefficients using the quantization matrix of the current block; and encoding information on the quantization matrix indicating the plurality of quantization matrices and encoding the quantized transform coefficients, wherein the information on the quantization matrix to be used for the current block having a size greater than 8×8 contains the syntax elements up to a maximum of 64 corresponding to a 8×8 block, wherein the information on the quantization matrix to be used for the current block having a size equal to 64×64 does not contain the syntax elements which correspond to a bottom-right 4×4 block in the 8×8 block.

* * * * *